US010191627B2

(12) United States Patent
Cieplinski et al.

(10) Patent No.: US 10,191,627 B2
(45) Date of Patent: Jan. 29, 2019

(54) DEVICE, METHOD, AND GRAPHICAL USER INTERFACE FOR MANIPULATING FRAMED GRAPHICAL OBJECTS

(71) Applicant: Apple Inc., Cupertino, CA (US)

(72) Inventors: Avi E. Cieplinski, San Francisco, CA (US); Jeffrey Traer Bernstein, San Francisco, CA (US); Julian Missig, Redwood City, CA (US); May-Li Khoe, San Francisco, CA (US); B. Michael Victor, Castro Valley, CA (US)

(73) Assignee: APPLE INC., Cupertino, CA (US)

( * ) Notice: Subject to any disclaimer, the term of this patent is extended or adjusted under 35 U.S.C. 154(b) by 709 days.

(21) Appl. No.: 14/536,235

(22) Filed: Nov. 7, 2014

(65) Prior Publication Data

US 2015/0067560 A1    Mar. 5, 2015

Related U.S. Application Data

(63) Continuation of application No. PCT/US2013/040054, filed on May 8, 2013.
(Continued)

(51) Int. Cl.
*G06F 3/0484*    (2013.01)
*G06F 3/0488*    (2013.01)
(Continued)

(52) U.S. Cl.
CPC .......... *G06F 3/04842* (2013.01); *G06F 3/016* (2013.01); *G06F 3/0488* (2013.01);
(Continued)

(58) Field of Classification Search
CPC .... G06F 3/04842; G06F 3/016; G06F 3/0412; G06F 3/04817; G06F 3/04847; G06F 3/0488; G06F 3/04883; G06F 3/04886
See application file for complete search history.

(56) References Cited

U.S. PATENT DOCUMENTS 4,674,044 A    6/1987    Kalmus et al.
4,750,135 A    6/1988    Boilen
(Continued)

FOREIGN PATENT DOCUMENTS

AU    2016100649 A4    6/2016
CN    1658150          8/2005
(Continued)

OTHER PUBLICATIONS

Office Action, dated Aug. 27, 2015, received in Australian Patent Application No. 2013259614, which corresponds with U.S. Appl. No. 14/536,141, 4 pages.
(Continued)

*Primary Examiner* — Jennifer N To
*Assistant Examiner* — Joseph R. Burwell
(74) *Attorney, Agent, or Firm* — Morgan, Lewis & Bockius LLP

(57) ABSTRACT

An electronic device with a touch-sensitive surface, a display, and one or more sensors to detect intensity of contacts with the touch-sensitive surface displays a graphical object inside of a frame on the display, and detects a gesture. Detecting the gesture includes: detecting a contact on the touch-sensitive surface while a focus selector is over the graphical object, and detecting movement of the contact across the touch-sensitive surface. In response to detecting the gesture: in accordance with a determination that the contact meets predefined intensity criteria, the device removes the graphical object from the frame; and in accordance with a determination that the contact does not meet the predefined intensity criteria, the device adjusts an appearance of the graphical object inside of the frame.

27 Claims, 100 Drawing Sheets

Related U.S. Application Data

(60) Provisional application No. 61/778,156, filed on Mar. 12, 2013, provisional application No. 61/747,278, filed on Dec. 29, 2012, provisional application No. 61/688,227, filed on May 9, 2012.

(51) Int. Cl.
  *G06F 3/01* (2006.01)
  *G06F 3/0481* (2013.01)

(52) U.S. Cl.
  CPC ...... *G06F 3/04847* (2013.01); *G06F 3/04883* (2013.01); *G06F 3/04886* (2013.01); *G06F 3/04817* (2013.01); *G06F 2203/04105* (2013.01)

(56) References Cited

U.S. PATENT DOCUMENTS

| | | |
|---|---|---|
| 4,864,520 A | 9/1989 | Setoguchi et al. |
| 4,903,201 A | 2/1990 | Wagner |
| 5,038,284 A | 8/1991 | Kramer |
| 5,077,665 A | 12/1991 | Silverman et al. |
| 5,101,353 A | 3/1992 | Lupien et al. |
| 5,136,501 A | 8/1992 | Silverman et al. |
| 5,184,120 A | 2/1993 | Schultz |
| 5,270,922 A | 12/1993 | Higgins |
| 5,297,031 A | 3/1994 | Gutterman et al. |
| 5,297,032 A | 3/1994 | Trojan et al. |
| 5,374,787 A | 12/1994 | Miller et al. |
| 5,428,730 A | 6/1995 | Baker et al. |
| 5,455,965 A | 10/1995 | Shaughnessy et al. |
| 5,463,722 A | 10/1995 | Venolia |
| 5,510,813 A | 4/1996 | Makinwa et al. |
| 5,555,354 A | 9/1996 | Strasnick et al. |
| 5,559,301 A | 9/1996 | Bryan, Jr. et al. |
| 5,590,265 A | 12/1996 | Nakazawa |
| 5,627,914 A | 5/1997 | Pagallo |
| 5,689,651 A | 11/1997 | Lozman |
| 5,695,400 A | 12/1997 | Fennell, Jr. et al. |
| 5,710,896 A | 1/1998 | Seidl |
| 5,717,438 A | 2/1998 | Kim et al. |
| 5,717,725 A | 2/1998 | Campana, Jr. |
| 5,719,796 A | 2/1998 | Chen |
| 5,727,165 A | 3/1998 | Ordish et al. |
| 5,774,877 A | 6/1998 | Patterson, Jr. et al. |
| 5,775,996 A | 7/1998 | Othmer et al. |
| 5,793,301 A | 8/1998 | Patterson, Jr. et al. |
| 5,793,360 A | 8/1998 | Fleck et al. |
| 5,793,377 A | 8/1998 | Moore |
| 5,797,002 A | 8/1998 | Patterson, Jr. et al. |
| 5,801,692 A | 9/1998 | Muzio et al. |
| 5,805,144 A | 9/1998 | Scholder et al. |
| 5,805,167 A | 9/1998 | Van Cruyningen |
| 5,809,267 A | 9/1998 | Moran et al. |
| 5,819,293 A | 10/1998 | Comer et al. |
| 5,820,463 A | 10/1998 | O'Callaghan |
| 5,825,352 A | 10/1998 | Bisset et al. |
| 5,844,560 A | 12/1998 | Crutcher et al. |
| 5,845,266 A | 12/1998 | Lupien et al. |
| 5,872,922 A | 2/1999 | Hogan et al. |
| 5,880,733 A | 3/1999 | Horvitz et al. |
| 5,910,882 A | 6/1999 | Burrell |
| 5,915,245 A | 6/1999 | Patterson, Jr. et al. |
| 5,924,082 A | 7/1999 | Silverman et al. |
| 5,924,083 A | 7/1999 | Silverman et al. |
| 5,946,647 A | 8/1999 | Miller et al. |
| 5,946,667 A | 8/1999 | Tull, Jr. et al. |
| 5,953,708 A | 9/1999 | Midorikawa et al. |
| 5,963,923 A | 10/1999 | Garber |
| 6,002,397 A | 12/1999 | Jaaskelainen, Jr. |
| 6,012,046 A | 1/2000 | Lupien et al. |
| 6,014,643 A | 1/2000 | Minton |
| 6,031,989 A | 2/2000 | Cordell |
| 6,035,287 A | 3/2000 | Stallaert et al. |
| 6,072,488 A | 6/2000 | Mcfarland |
| 6,088,019 A | 7/2000 | Rosenberg |
| 6,088,027 A | 7/2000 | Konar et al. |
| 6,098,051 A | 8/2000 | Lupien et al. |
| 6,111,575 A | 8/2000 | Martinez et al. |
| 6,115,043 A | 9/2000 | Levine et al. |
| 6,121,960 A | 9/2000 | Carroll et al. |
| 6,131,087 A | 10/2000 | Luke et al. |
| 6,134,535 A | 10/2000 | Belzberg |
| 6,180,894 B1 | 1/2001 | Chao et al. |
| 6,195,647 B1 | 2/2001 | Martyn et al. |
| 6,208,329 B1 | 3/2001 | Ballare |
| 6,208,340 B1 | 3/2001 | Amin et al. |
| 6,219,034 B1 | 4/2001 | Elbing et al. |
| 6,227,743 B1 | 5/2001 | Robb |
| 6,229,542 B1 | 5/2001 | Miller |
| 6,243,080 B1 | 6/2001 | Molne |
| 6,247,000 B1 | 6/2001 | Hawkins et al. |
| 6,252,594 B1 | 6/2001 | Xia et al. |
| 6,266,684 B1 | 7/2001 | Kraus et al. |
| 6,272,474 B1 | 8/2001 | Garcia |
| 6,278,982 B1 | 8/2001 | Korhammer et al. |
| 6,282,521 B1 | 8/2001 | Howorka |
| 6,323,846 B1 | 11/2001 | Westerman et al. |
| 6,347,997 B1 | 2/2002 | Armstrong |
| 6,377,940 B2 | 4/2002 | Tilfors et al. |
| 6,396,523 B1 | 5/2002 | Segal et al. |
| 6,396,962 B1 | 5/2002 | Haffey et al. |
| 6,400,303 B2 | 6/2002 | Armstrong |
| 6,405,180 B2 | 6/2002 | Tilfors et al. |
| 6,408,282 B1 | 6/2002 | Buist |
| 6,411,998 B1 | 6/2002 | Bryant et al. |
| 6,429,846 B2 | 8/2002 | Rosenberg et al. |
| 6,448,977 B1 | 9/2002 | Braun et al. |
| 6,456,778 B2 | 9/2002 | Armstrong |
| 6,459,424 B1 | 10/2002 | Resman |
| 6,459,442 B1 | 10/2002 | Edwards et al. |
| 6,469,691 B1 | 10/2002 | Armstrong |
| 6,470,078 B1 | 10/2002 | Armstrong |
| 6,489,975 B1 | 12/2002 | Patil et al. |
| 6,489,978 B1 | 12/2002 | Gong et al. |
| 6,504,527 B1 | 1/2003 | Armstrong |
| 6,512,530 B1 | 1/2003 | Rzepkowski et al. |
| 6,512,761 B1 | 1/2003 | Schuster et al. |
| 6,532,000 B2 | 3/2003 | Armstrong |
| 6,551,357 B1 | 4/2003 | Madduri |
| 6,559,831 B1 | 5/2003 | Armstrong |
| 6,563,487 B2 | 5/2003 | Martin et al. |
| 6,567,102 B2 | 5/2003 | Kung |
| 6,570,557 B1 | 5/2003 | Westerman et al. |
| 6,583,798 B1 | 6/2003 | Hoek et al. |
| 6,590,568 B1 | 7/2003 | Astala et al. |
| 6,659,861 B1 | 12/2003 | Faris et al. |
| 6,661,438 B1 | 12/2003 | Shiraishi et al. |
| 6,670,952 B2 | 12/2003 | Jaeger et al. |
| 6,677,932 B1 | 1/2004 | Westerman |
| 6,735,307 B1 | 5/2004 | Volckers |
| 6,750,890 B1 | 6/2004 | Sugimoto |
| 6,772,132 B1 | 8/2004 | Kemp, II et al. |
| 6,822,635 B2 | 11/2004 | Shahoian et al. |
| 6,831,666 B1 | 12/2004 | Kreis |
| 6,891,551 B2 | 5/2005 | Keely et al. |
| 6,904,405 B2 | 6/2005 | Suominen |
| 6,906,697 B2 | 6/2005 | Rosenberg |
| 6,919,927 B1 | 7/2005 | Hyodo |
| 6,954,899 B1 | 10/2005 | Anderson |
| 7,036,088 B2 | 4/2006 | Tunney |
| 7,058,146 B2 | 6/2006 | Paulraj et al. |
| 7,114,091 B2 | 9/2006 | Vrancic |
| 7,134,093 B2 | 11/2006 | Etgen et al. |
| 7,138,983 B2 | 11/2006 | Wakai et al. |
| 7,159,189 B2 | 1/2007 | Weingart et al. |
| 7,259,752 B1 | 8/2007 | Simmons |
| 7,312,791 B2 | 12/2007 | Hoshino et al. |
| 7,346,855 B2 | 3/2008 | Hellyar et al. |
| 7,380,218 B2 | 5/2008 | Rundell |
| 7,411,575 B2 | 8/2008 | Hill et al. |
| 7,441,204 B2 | 10/2008 | Thomson et al. |
| 7,461,026 B2 | 12/2008 | Schluetter |

(56) References Cited

U.S. PATENT DOCUMENTS

| | | |
|---|---|---|
| 7,471,284 B2 | 12/2008 | Bathiche et al. |
| 7,479,949 B2 | 1/2009 | Jobs et al. |
| 7,492,720 B2 | 2/2009 | Pruthi et al. |
| 7,532,206 B2 | 5/2009 | Morrison et al. |
| 7,533,352 B2 | 5/2009 | Chew et al. |
| 7,552,397 B2 | 6/2009 | Holecek et al. |
| 7,577,167 B2 | 8/2009 | Kikuchi et al. |
| 7,577,530 B2 | 8/2009 | Vignalou-Marche |
| 7,581,186 B2 | 8/2009 | Dowdy et al. |
| 7,614,008 B2 | 11/2009 | Ording |
| 7,619,616 B2 | 11/2009 | Rimas Ribikauskas et al. |
| 7,629,966 B2 | 12/2009 | Anson |
| 7,633,076 B2 | 12/2009 | Huppi et al. |
| 7,653,883 B2 | 1/2010 | Hotelling et al. |
| 7,656,413 B2 | 2/2010 | Khan et al. |
| 7,657,849 B2 | 2/2010 | Chaudhri et al. |
| 7,663,607 B2 | 2/2010 | Hotelling et al. |
| 7,673,255 B2 | 3/2010 | Schechter et al. |
| 7,680,513 B2 | 3/2010 | Haitani et al. |
| 7,683,889 B2 | 3/2010 | Rimas-Ribikauskas et al. |
| 7,694,231 B2 | 4/2010 | Kocienda et al. |
| 7,694,236 B2 | 4/2010 | Gusmorino et al. |
| 7,739,604 B1 | 6/2010 | Lyons et al. |
| 7,743,348 B2 | 6/2010 | Robbins et al. |
| 7,752,115 B2 | 7/2010 | Schluetter |
| 7,757,185 B2 | 7/2010 | Paquette et al. |
| 7,760,187 B2 | 7/2010 | Kennedy |
| 7,787,026 B1 | 8/2010 | Flory et al. |
| 7,788,595 B2 | 8/2010 | Biwer et al. |
| 7,797,642 B1 | 9/2010 | Karam et al. |
| 7,801,796 B2 | 9/2010 | Friedman et al. |
| 7,801,950 B2 | 9/2010 | Eisenstadt et al. |
| 7,812,826 B2 | 10/2010 | Ording et al. |
| 7,817,568 B2 | 10/2010 | Paik et al. |
| 7,844,914 B2 | 11/2010 | Andre et al. |
| 7,880,728 B2 | 2/2011 | de los Reyes et al. |
| 7,890,862 B2 | 2/2011 | Kompe et al. |
| 7,903,090 B2 | 3/2011 | Soss et al. |
| 7,921,373 B2 | 4/2011 | Yamashita et al. |
| 7,952,566 B2 | 5/2011 | Poupyrev et al. |
| 7,956,847 B2 | 6/2011 | Christie |
| 7,957,762 B2 | 6/2011 | Herz et al. |
| 7,966,352 B2 | 6/2011 | Madan et al. |
| 7,973,778 B2 | 7/2011 | Chen |
| 8,001,189 B2 | 8/2011 | Nielsen et al. |
| 8,006,002 B2 | 8/2011 | Kalayjian et al. |
| 8,010,900 B2 | 8/2011 | Hart et al. |
| 8,020,028 B1 | 9/2011 | Luttter |
| 8,024,670 B1 | 9/2011 | Rahmatian et al. |
| 8,040,142 B1 | 10/2011 | Bokma et al. |
| 8,046,712 B2 | 10/2011 | Landman et al. |
| 8,059,104 B2 | 11/2011 | Shahoian et al. |
| 8,106,856 B2 | 1/2012 | Matas et al. |
| 8,125,440 B2 | 2/2012 | Guyot-Sionnest et al. |
| 8,125,492 B1 | 2/2012 | Wainwright et al. |
| RE43,448 E | 6/2012 | Kimoto et al. |
| 8,209,628 B1 | 6/2012 | Davidson |
| 8,214,768 B2 | 7/2012 | Boule et al. |
| 8,239,784 B2 | 8/2012 | Hotelling et al. |
| 8,271,900 B2 | 9/2012 | Walizaka et al. |
| 8,279,180 B2 | 10/2012 | Hotelling et al. |
| 8,325,398 B2 | 12/2012 | Satomi et al. |
| 8,363,020 B2 | 1/2013 | Li et al. |
| 8,381,135 B2 | 2/2013 | Hotelling et al. |
| 8,390,583 B2 | 3/2013 | Forutanpour et al. |
| 8,423,089 B2 | 4/2013 | Song et al. |
| 8,438,504 B2 | 5/2013 | Cranfill et al. |
| 8,446,376 B2 | 5/2013 | Levy et al. |
| 8,453,057 B2 | 5/2013 | Stallings et al. |
| 8,456,431 B2 | 6/2013 | Victor |
| 8,466,889 B2 | 6/2013 | Tong et al. |
| 8,479,122 B2 | 7/2013 | Hotelling et al. |
| 8,482,535 B2 | 7/2013 | Pryor |
| 8,508,494 B2 | 8/2013 | Moore |
| 8,542,205 B1 | 9/2013 | Keller |
| 8,553,092 B2 | 10/2013 | Tezuka et al. |
| 8,581,870 B2 | 11/2013 | Bokma et al. |
| 8,587,542 B2 | 11/2013 | Moore |
| 8,593,415 B2 | 11/2013 | Han et al. |
| 8,593,420 B1 | 11/2013 | Buuck |
| 8,625,882 B2 | 1/2014 | Backlund et al. |
| 8,638,311 B2 | 1/2014 | Kang et al. |
| 8,665,227 B2 | 3/2014 | Gunawan |
| 8,669,945 B2 | 3/2014 | Coddington |
| 8,674,932 B2 | 3/2014 | Armstrong |
| 8,698,765 B1 | 4/2014 | Keller |
| 8,698,845 B2 | 4/2014 | Lemay |
| 8,717,305 B2 | 5/2014 | Williamson et al. |
| 8,743,069 B2 | 6/2014 | Morton et al. |
| 8,769,431 B1 | 7/2014 | Prasad |
| 8,773,389 B1 | 7/2014 | Freed |
| 8,788,964 B2 | 7/2014 | Shin et al. |
| 8,793,577 B2 | 7/2014 | Schellingerhout et al. |
| 8,799,816 B2 | 8/2014 | Wells et al. |
| 8,806,369 B2 | 8/2014 | Khoe et al. |
| 8,816,989 B2 | 8/2014 | Nicholson et al. |
| 8,854,316 B2 | 10/2014 | Shenfield |
| 8,872,729 B2 | 10/2014 | Lyons et al. |
| 8,872,773 B2 | 10/2014 | Mak et al. |
| 8,875,044 B2 | 10/2014 | Ozawa et al. |
| 8,881,062 B2 | 11/2014 | Kim et al. |
| 8,914,732 B2 | 12/2014 | Jun et al. |
| 8,952,987 B2 | 2/2015 | Momeyer et al. |
| 8,959,430 B1 | 2/2015 | Spivak et al. |
| 8,976,128 B2 | 3/2015 | Moore |
| 9,026,932 B1 | 5/2015 | Dixon |
| 9,030,419 B1 | 5/2015 | Freed |
| 9,030,436 B2 | 5/2015 | Ikeda |
| 9,046,999 B1 | 6/2015 | Teller et al. |
| 9,058,186 B2 | 6/2015 | Chaudhri |
| 9,063,563 B1 | 6/2015 | Gray et al. |
| 9,069,460 B2 | 6/2015 | Moore |
| 9,086,755 B2 | 7/2015 | Cho et al. |
| 9,092,058 B2 | 7/2015 | Kasahara et al. |
| 9,098,188 B2 | 8/2015 | Kim |
| 9,116,571 B2 | 8/2015 | Zeliff et al. |
| 9,122,364 B2 | 9/2015 | Kuwabara et al. |
| 9,146,914 B1 | 9/2015 | Dhaundiyal |
| 9,148,618 B2 | 9/2015 | Matas et al. |
| 9,164,779 B2 | 10/2015 | Brakensiek et al. |
| 9,170,607 B2 | 10/2015 | Bose et al. |
| 9,170,649 B2 | 10/2015 | Ronkainen |
| 9,218,105 B2 | 12/2015 | Mansson et al. |
| 9,244,562 B1 | 1/2016 | Rosenberg et al. |
| 9,244,576 B1 | 1/2016 | Vadagave et al. |
| 9,244,601 B2 | 1/2016 | Kim et al. |
| 9,246,487 B2 | 1/2016 | Casparian et al. |
| 9,262,002 B2 | 2/2016 | Momeyer et al. |
| 9,304,668 B2 | 4/2016 | Rezende et al. |
| 9,307,112 B2 | 4/2016 | Molgaard et al. |
| 9,349,552 B2 * | 5/2016 | Huska .................... G06F 3/016 |
| 9,361,018 B2 | 6/2016 | Defazio et al. |
| 9,389,718 B1 | 7/2016 | Letourneur |
| 9,389,722 B2 | 7/2016 | Matsuki et al. |
| 9,400,581 B2 | 7/2016 | Bokma et al. |
| 9,405,367 B2 | 8/2016 | Jung et al. |
| 9,417,754 B2 | 8/2016 | Smith |
| 9,423,938 B1 | 8/2016 | Morris |
| 9,436,344 B2 | 9/2016 | Kuwabara et al. |
| 9,448,694 B2 | 9/2016 | Sharma et al. |
| 9,451,230 B1 | 9/2016 | Henderson et al. |
| 9,471,145 B2 | 10/2016 | Langlois et al. |
| 9,477,393 B2 | 10/2016 | Zambetti et al. |
| 9,542,013 B2 | 1/2017 | Dearman et al. |
| 9,547,525 B1 | 1/2017 | Trainor et al. |
| 9,569,093 B2 | 2/2017 | Lipman et al. |
| 9,600,114 B2 | 3/2017 | Milam et al. |
| 9,600,116 B2 | 3/2017 | Tao et al. |
| 9,612,741 B2 | 4/2017 | Brown et al. |
| 9,619,076 B2 | 4/2017 | Bernstein et al. |
| 9,671,943 B2 | 6/2017 | Van Der Velden |
| 9,733,716 B2 | 8/2017 | Shaffer |
| 9,760,241 B1 | 9/2017 | Lewbel |
| 2001/0024195 A1 | 9/2001 | Hayakawa et al. |

(56) References Cited

U.S. PATENT DOCUMENTS

| | | |
|---|---|---|
| 2001/0045965 A1 | 11/2001 | Orbanes et al. |
| 2002/0008691 A1 | 1/2002 | Hanajima et al. |
| 2002/0015024 A1 | 2/2002 | Westerman et al. |
| 2002/0015064 A1 | 2/2002 | Robotham et al. |
| 2002/0023038 A1 | 2/2002 | Fritsch et al. |
| 2002/0026321 A1 | 2/2002 | Faris et al. |
| 2002/0027957 A1 | 3/2002 | Paulraj et al. |
| 2002/0035534 A1 | 3/2002 | Buist et al. |
| 2002/0055899 A1 | 5/2002 | Williams |
| 2002/0073016 A1 | 6/2002 | Furbush et al. |
| 2002/0075289 A1 | 6/2002 | Hatori et al. |
| 2002/0077117 A1 | 6/2002 | Cloutier et al. |
| 2002/0107748 A1 | 8/2002 | Boies et al. |
| 2002/0109678 A1 | 8/2002 | Marmolin et al. |
| 2002/0120837 A1 | 8/2002 | Maxemchuk et al. |
| 2002/0138401 A1 | 9/2002 | Allen et al. |
| 2002/0140680 A1 | 10/2002 | Lu |
| 2002/0140740 A1 | 10/2002 | Chen |
| 2002/0149609 A1 | 10/2002 | Suzuki et al. |
| 2002/0149630 A1 | 10/2002 | Kitainik et al. |
| 2002/0161687 A1 | 10/2002 | Serkin et al. |
| 2002/0161693 A1 | 10/2002 | Greenwalk |
| 2002/0178102 A1 | 11/2002 | Scheinberg et al. |
| 2002/0180763 A1 | 12/2002 | Kung |
| 2002/0186257 A1 | 12/2002 | Cadiz et al. |
| 2003/0001869 A1* | 1/2003 | Nissen ............ G06F 3/0481 345/672 |
| 2003/0019158 A1 | 1/2003 | Watanabe |
| 2003/0074413 A1 | 4/2003 | Nielsen et al. |
| 2003/0086496 A1 | 5/2003 | Zhang et al. |
| 2003/0112269 A1 | 6/2003 | Lentz et al. |
| 2003/0117440 A1 | 6/2003 | Hellyar et al. |
| 2003/0119562 A1 | 6/2003 | Kokubo |
| 2003/0122779 A1 | 7/2003 | Martin et al. |
| 2003/0151589 A1 | 8/2003 | Bensen et al. |
| 2003/0177154 A1 | 9/2003 | Vrancic |
| 2003/0184574 A1 | 10/2003 | Phillips et al. |
| 2003/0189552 A1 | 10/2003 | Chuang et al. |
| 2003/0189647 A1 | 10/2003 | Kang |
| 2003/0206169 A1 | 11/2003 | Springer et al. |
| 2003/0222915 A1 | 12/2003 | Marion et al. |
| 2004/0015662 A1 | 1/2004 | Cummings |
| 2004/0021643 A1 | 2/2004 | Hoshino et al. |
| 2004/0025112 A1 | 2/2004 | Chasen et al. |
| 2004/0056849 A1 | 3/2004 | Lohbihler et al. |
| 2004/0085328 A1 | 5/2004 | Maruyama et al. |
| 2004/0108995 A1 | 6/2004 | Hoshino et al. |
| 2004/0138849 A1 | 7/2004 | Schmidt et al. |
| 2004/0150631 A1 | 8/2004 | Fleck et al. |
| 2004/0150644 A1 | 8/2004 | Kincaid et al. |
| 2004/0155908 A1 | 8/2004 | Wagner |
| 2004/0174398 A1 | 9/2004 | Luke et al. |
| 2004/0174399 A1 | 9/2004 | Wu et al. |
| 2004/0219969 A1 | 11/2004 | Casey et al. |
| 2004/0267877 A1 | 12/2004 | Shiparo et al. |
| 2005/0012723 A1 | 1/2005 | Pallakoff |
| 2005/0022138 A1 | 1/2005 | Tunney |
| 2005/0039141 A1 | 2/2005 | Burke et al. |
| 2005/0073961 A1 | 4/2005 | Paik et al. |
| 2005/0091604 A1 | 4/2005 | Davis |
| 2005/0110769 A1 | 5/2005 | DaCosta et al. |
| 2005/0114785 A1 | 5/2005 | Finnigan et al. |
| 2005/0125742 A1 | 6/2005 | Grotjohn et al. |
| 2005/0132297 A1 | 6/2005 | Milic-Frayling et al. |
| 2005/0134578 A1 | 6/2005 | Chambers et al. |
| 2005/0177798 A1 | 8/2005 | Thomson et al. |
| 2005/0183017 A1 | 8/2005 | Cain |
| 2005/0183035 A1 | 8/2005 | Ringel et al. |
| 2005/0184973 A1 | 8/2005 | Lum et al. |
| 2005/0190059 A1 | 9/2005 | Wehrenberg |
| 2005/0190280 A1 | 9/2005 | Haas et al. |
| 2005/0204295 A1 | 9/2005 | Voorhees et al. |
| 2005/0223338 A1 | 10/2005 | Partanen |
| 2005/0229112 A1 | 10/2005 | Clay et al. |
| 2005/0289476 A1 | 12/2005 | Tokkonen |
| 2006/0001650 A1 | 1/2006 | Robbins et al. |
| 2006/0001657 A1 | 1/2006 | Monney et al. |
| 2006/0017692 A1 | 1/2006 | Wehrenberg et al. |
| 2006/0022955 A1 | 2/2006 | Kennedy |
| 2006/0022956 A1 | 2/2006 | Lengeling et al. |
| 2006/0026535 A1 | 2/2006 | Hotelling et al. |
| 2006/0026536 A1 | 2/2006 | Hotelling et al. |
| 2006/0031776 A1 | 2/2006 | Glein et al. |
| 2006/0033724 A1 | 2/2006 | Chaudhri et al. |
| 2006/0036971 A1 | 2/2006 | Mendel et al. |
| 2006/0041846 A1 | 2/2006 | Masselle et al. |
| 2006/0055662 A1 | 3/2006 | Rimas-Ribikauskas et al. |
| 2006/0059436 A1 | 3/2006 | Nurmi |
| 2006/0067677 A1 | 3/2006 | Tokiwa et al. |
| 2006/0101347 A1 | 5/2006 | Runov et al. |
| 2006/0107226 A1 | 5/2006 | Matthews et al. |
| 2006/0109252 A1 | 5/2006 | Kolmykov-Zotov et al. |
| 2006/0109256 A1 | 5/2006 | Grant et al. |
| 2006/0119586 A1 | 6/2006 | Grant et al. |
| 2006/0132455 A1 | 6/2006 | Rimas-Ribikauskas et al. |
| 2006/0132456 A1 | 6/2006 | Anson |
| 2006/0132457 A1 | 6/2006 | Rimas-Ribikauskas et al. |
| 2006/0136834 A1 | 6/2006 | Cao et al. |
| 2006/0136845 A1 | 6/2006 | Rimas-Ribikauskas et al. |
| 2006/0161861 A1 | 7/2006 | Holecek et al. |
| 2006/0161868 A1 | 7/2006 | Van et al. |
| 2006/0161870 A1 | 7/2006 | Hotelling et al. |
| 2006/0190834 A1 | 8/2006 | Marcjan |
| 2006/0195438 A1 | 8/2006 | Galuten |
| 2006/0197753 A1 | 9/2006 | Hotelling |
| 2006/0212812 A1 | 9/2006 | Simmons et al. |
| 2006/0213754 A1 | 9/2006 | Jarrett et al. |
| 2006/0224986 A1 | 10/2006 | Lindsay et al. |
| 2006/0224989 A1 | 10/2006 | Pettiross et al. |
| 2006/0233248 A1 | 10/2006 | Rynderman et al. |
| 2006/0242602 A1 | 10/2006 | Schechter et al. |
| 2006/0265653 A1 | 11/2006 | Paasonen et al. |
| 2006/0274042 A1 | 12/2006 | Krah et al. |
| 2006/0274086 A1 | 12/2006 | Forstall et al. |
| 2006/0277469 A1 | 12/2006 | Chaudhri et al. |
| 2006/0282778 A1 | 12/2006 | Barsness et al. |
| 2006/0284858 A1 | 12/2006 | Rekimoto |
| 2006/0290681 A1 | 12/2006 | Ho et al. |
| 2007/0004451 A1 | 1/2007 | Anderson |
| 2007/0004461 A1 | 1/2007 | Bathina et al. |
| 2007/0024595 A1 | 2/2007 | Baker et al. |
| 2007/0024646 A1 | 2/2007 | Saarinen et al. |
| 2007/0070066 A1 | 3/2007 | Bakhash |
| 2007/0080953 A1 | 4/2007 | Lii |
| 2007/0113681 A1 | 5/2007 | Nishimura et al. |
| 2007/0115264 A1 | 5/2007 | Yu et al. |
| 2007/0120835 A1 | 5/2007 | Sato |
| 2007/0124699 A1 | 5/2007 | Michaels |
| 2007/0128899 A1 | 6/2007 | Mayer |
| 2007/0152959 A1 | 7/2007 | Peters |
| 2007/0152980 A1 | 7/2007 | Kocienda et al. |
| 2007/0157089 A1 | 7/2007 | Van Os et al. |
| 2007/0157173 A1 | 7/2007 | Klein et al. |
| 2007/0168369 A1 | 7/2007 | Bruns |
| 2007/0168890 A1 | 7/2007 | Zhao et al. |
| 2007/0176904 A1 | 8/2007 | Russo |
| 2007/0182999 A1 | 8/2007 | Anthony et al. |
| 2007/0186178 A1 | 8/2007 | Schiller |
| 2007/0220445 A1 | 9/2007 | Yach et al. |
| 2007/0222768 A1 | 9/2007 | Geurts et al. |
| 2007/0226327 A1 | 9/2007 | Redpath |
| 2007/0229455 A1 | 10/2007 | Martin et al. |
| 2007/0229464 A1* | 10/2007 | Hotelling ............ G06F 3/0414 345/173 |
| 2007/0236450 A1 | 10/2007 | Colgate et al. |
| 2007/0236477 A1 | 10/2007 | Ryu et al. |
| 2007/0245241 A1 | 10/2007 | Bertram et al. |
| 2007/0245249 A1 | 10/2007 | Weisberg |
| 2007/0257821 A1 | 11/2007 | Son et al. |
| 2007/0262964 A1 | 11/2007 | Zotov et al. |
| 2007/0270186 A1 | 11/2007 | Gulliksson et al. |
| 2007/0294295 A1 | 12/2007 | Finkelstein et al. |
| 2007/0294639 A1 | 12/2007 | Van Berkel et al. |
| 2007/0296333 A1 | 12/2007 | Kim et al. |

(56) References Cited

U.S. PATENT DOCUMENTS

| | | |
|---|---|---|
| 2007/0299923 A1 | 12/2007 | Skelly et al. |
| 2008/0001924 A1 | 1/2008 | dos los Reyes et al. |
| 2008/0024459 A1 | 1/2008 | Poupyrev et al. |
| 2008/0034306 A1 | 2/2008 | Ording |
| 2008/0034331 A1 | 2/2008 | Josephsoon et al. |
| 2008/0036743 A1 | 2/2008 | Westerman et al. |
| 2008/0051989 A1 | 2/2008 | Welsh |
| 2008/0052945 A1 | 3/2008 | Matas et al. |
| 2008/0066010 A1 | 3/2008 | Brodersen et al. |
| 2008/0094367 A1 | 4/2008 | Van De Ven et al. |
| 2008/0094368 A1 | 4/2008 | Ording et al. |
| 2008/0094398 A1 | 4/2008 | Ng et al. |
| 2008/0106523 A1 | 5/2008 | Conrad |
| 2008/0109753 A1 | 5/2008 | Karstens |
| 2008/0136790 A1 | 6/2008 | Hio |
| 2008/0155415 A1 | 6/2008 | Yoon et al. |
| 2008/0163119 A1 | 7/2008 | Kim et al. |
| 2008/0165144 A1 | 7/2008 | Forstall et al. |
| 2008/0165152 A1 | 7/2008 | Forstall et al. |
| 2008/0168379 A1 | 7/2008 | Forstall et al. |
| 2008/0168395 A1 | 7/2008 | Ording et al. |
| 2008/0168401 A1 | 7/2008 | Boule et al. |
| 2008/0168403 A1 | 7/2008 | Westerman et al. |
| 2008/0168404 A1 | 7/2008 | Ording |
| 2008/0202824 A1 | 8/2008 | Philipp et al. |
| 2008/0204424 A1 | 8/2008 | Jin et al. |
| 2008/0204427 A1 | 8/2008 | Heesemans et al. |
| 2008/0211959 A1 | 9/2008 | Balram et al. |
| 2008/0219493 A1 | 9/2008 | Tadmor |
| 2008/0222545 A1 | 9/2008 | Lemay et al. |
| 2008/0222569 A1 | 9/2008 | Champion et al. |
| 2008/0244448 A1 | 10/2008 | Goering et al. |
| 2008/0259046 A1 | 10/2008 | Carsanaro |
| 2008/0263452 A1 | 10/2008 | Tomkins |
| 2008/0270910 A1 | 10/2008 | Lukasik et al. |
| 2008/0284866 A1 | 11/2008 | Mizutani |
| 2008/0294984 A1 | 11/2008 | Ramsay et al. |
| 2008/0297475 A1 | 12/2008 | Woolf et al. |
| 2008/0303795 A1 | 12/2008 | Lowles et al. |
| 2008/0303799 A1 | 12/2008 | Schwesig et al. |
| 2008/0307335 A1 | 12/2008 | Chaudhri et al. |
| 2008/0307351 A1 | 12/2008 | Louch et al. |
| 2008/0307359 A1 | 12/2008 | Louch et al. |
| 2008/0307360 A1 | 12/2008 | Chaudhri et al. |
| 2008/0316183 A1 | 12/2008 | Westerman et al. |
| 2008/0317378 A1 | 12/2008 | Steinberg et al. |
| 2008/0320391 A1 | 12/2008 | Lemay et al. |
| 2008/0320419 A1 | 12/2008 | Matas et al. |
| 2009/0002392 A1 | 1/2009 | Hou et al. |
| 2009/0007017 A1 | 1/2009 | Anzures et al. |
| 2009/0036108 A1 | 2/2009 | Cho |
| 2009/0037846 A1 | 2/2009 | Spalink et al. |
| 2009/0046110 A1 | 2/2009 | Sadler et al. |
| 2009/0051667 A1 | 2/2009 | Park et al. |
| 2009/0058828 A1 | 3/2009 | Jiang et al. |
| 2009/0061837 A1 | 3/2009 | Chaudhri et al. |
| 2009/0066668 A1 | 3/2009 | Kim et al. |
| 2009/0073118 A1 | 3/2009 | Yamaji et al. |
| 2009/0083665 A1 | 3/2009 | Anttila et al. |
| 2009/0085878 A1 | 4/2009 | Heubel et al. |
| 2009/0085881 A1 | 4/2009 | Keam |
| 2009/0085886 A1 | 4/2009 | Huang et al. |
| 2009/0089293 A1 | 4/2009 | Garritano et al. |
| 2009/0094562 A1 | 4/2009 | Jeong et al. |
| 2009/0100343 A1 | 4/2009 | Lee et al. |
| 2009/0102804 A1 | 4/2009 | Wong et al. |
| 2009/0102805 A1 | 4/2009 | Meijer et al. |
| 2009/0140985 A1 | 6/2009 | Liu |
| 2009/0158198 A1 | 6/2009 | Hayter et al. |
| 2009/0160793 A1 | 6/2009 | Rekimoto |
| 2009/0160814 A1 | 6/2009 | Li et al. |
| 2009/0167507 A1 | 7/2009 | Maenpaa |
| 2009/0167508 A1 | 7/2009 | Fadell et al. |
| 2009/0167509 A1 | 7/2009 | Fadell et al. |
| 2009/0167704 A1 | 7/2009 | Terlizzi et al. |
| 2009/0167728 A1 | 7/2009 | Geaghan et al. |
| 2009/0169061 A1 | 7/2009 | Anderson et al. |
| 2009/0187824 A1 | 7/2009 | Hinckley et al. |
| 2009/0197635 A1 | 8/2009 | Kim et al. |
| 2009/0198767 A1 | 8/2009 | Jakobson et al. |
| 2009/0219294 A1 | 9/2009 | Young et al. |
| 2009/0225037 A1 | 9/2009 | Williamson et al. |
| 2009/0228842 A1 | 9/2009 | Westerman et al. |
| 2009/0237374 A1 | 9/2009 | Li et al. |
| 2009/0247112 A1 | 10/2009 | Lundy et al. |
| 2009/0247230 A1 | 10/2009 | Lundy et al. |
| 2009/0256947 A1* | 10/2009 | Ciurea .................. G06F 3/0488 348/333.12 |
| 2009/0259975 A1 | 10/2009 | Asai et al. |
| 2009/0267906 A1 | 10/2009 | Schroderus |
| 2009/0276730 A1 | 11/2009 | Aybes et al. |
| 2009/0280860 A1 | 11/2009 | Dahlke |
| 2009/0282360 A1 | 11/2009 | Park et al. |
| 2009/0288032 A1 | 11/2009 | Chang et al. |
| 2009/0293007 A1 | 11/2009 | Duarte et al. |
| 2009/0293009 A1 | 11/2009 | Meserth et al. |
| 2009/0295739 A1 | 12/2009 | Nagara |
| 2009/0303187 A1 | 12/2009 | Pallakoff |
| 2009/0307633 A1 | 12/2009 | Haughay, Jr. et al. |
| 2009/0322893 A1 | 12/2009 | Stallings et al. |
| 2010/0007926 A1 | 1/2010 | Imaizumi et al. |
| 2010/0011304 A1 | 1/2010 | Van Os |
| 2010/0013613 A1 | 1/2010 | Weston |
| 2010/0013777 A1 | 1/2010 | Baudisch et al. |
| 2010/0017710 A1 | 1/2010 | Kim et al. |
| 2010/0023858 A1 | 1/2010 | Ryu et al. |
| 2010/0026640 A1 | 2/2010 | Kim et al. |
| 2010/0026647 A1 | 2/2010 | Abe et al. |
| 2010/0039446 A1 | 2/2010 | Hillis et al. |
| 2010/0044121 A1 | 2/2010 | Simon et al. |
| 2010/0045619 A1 | 2/2010 | Birnbaum et al. |
| 2010/0057235 A1 | 3/2010 | Wang et al. |
| 2010/0058231 A1 | 3/2010 | Duarte et al. |
| 2010/0070908 A1 | 3/2010 | Mori et al. |
| 2010/0073329 A1 | 3/2010 | Raman et al. |
| 2010/0083116 A1 | 4/2010 | Akifusa et al. |
| 2010/0085302 A1 | 4/2010 | Fairweather et al. |
| 2010/0085314 A1 | 4/2010 | Kwok |
| 2010/0085317 A1 | 4/2010 | Park et al. |
| 2010/0088596 A1 | 4/2010 | Griffin et al. |
| 2010/0088628 A1 | 4/2010 | Flygh et al. |
| 2010/0088639 A1 | 4/2010 | Yach et al. |
| 2010/0090988 A1 | 4/2010 | Park |
| 2010/0110082 A1 | 5/2010 | Myrick et al. |
| 2010/0111434 A1 | 5/2010 | Madden |
| 2010/0125816 A1 | 5/2010 | Bezos |
| 2010/0127983 A1 | 5/2010 | Irani et al. |
| 2010/0128002 A1 | 5/2010 | Stacy et al. |
| 2010/0138776 A1 | 6/2010 | Korhonen |
| 2010/0146507 A1 | 6/2010 | Kang et al. |
| 2010/0148999 A1 | 6/2010 | Casparian et al. |
| 2010/0149096 A1 | 6/2010 | Migos et al. |
| 2010/0153879 A1 | 6/2010 | Rimas-Ribikauskas et al. |
| 2010/0156812 A1 | 6/2010 | Stallings et al. |
| 2010/0156813 A1 | 6/2010 | Duarte et al. |
| 2010/0156818 A1 | 6/2010 | Burrough et al. |
| 2010/0156823 A1 | 6/2010 | Paleczny et al. |
| 2010/0156825 A1 | 6/2010 | Sohn et al. |
| 2010/0171713 A1 | 7/2010 | Kwok et al. |
| 2010/0175023 A1 | 7/2010 | Gatlin et al. |
| 2010/0180225 A1 | 7/2010 | Chiba et al. |
| 2010/0194693 A1 | 8/2010 | Selin et al. |
| 2010/0199227 A1* | 8/2010 | Xiao ..................... G06F 3/0481 715/863 |
| 2010/0211872 A1 | 8/2010 | Rolston et al. |
| 2010/0214239 A1 | 8/2010 | Wu |
| 2010/0214257 A1 | 8/2010 | Wussler et al. |
| 2010/0225604 A1 | 9/2010 | Homma et al. |
| 2010/0228644 A1 | 9/2010 | Schluetter |
| 2010/0231534 A1 | 9/2010 | Chaudhri et al. |
| 2010/0235726 A1 | 9/2010 | Ording et al. |
| 2010/0235735 A1 | 9/2010 | Ording et al. |
| 2010/0235746 A1 | 9/2010 | Anzures |
| 2010/0251168 A1 | 9/2010 | Fujita et al. |

(56) References Cited

U.S. PATENT DOCUMENTS

| | | |
|---|---|---|
| 2010/0269039 A1 | 10/2010 | Pahlavan et al. |
| 2010/0271312 A1 | 10/2010 | Alameh et al. |
| 2010/0271500 A1 | 10/2010 | Park et al. |
| 2010/0277419 A1 | 11/2010 | Ganey et al. |
| 2010/0277496 A1 | 11/2010 | Kawanishi et al. |
| 2010/0281379 A1 | 11/2010 | Meaney et al. |
| 2010/0281385 A1 | 11/2010 | Meaney et al. |
| 2010/0289807 A1 | 11/2010 | Yu et al. |
| 2010/0299597 A1 | 11/2010 | Shin et al. |
| 2010/0302177 A1 | 12/2010 | Kim et al. |
| 2010/0302179 A1 | 12/2010 | Ahn et al. |
| 2010/0306702 A1 | 12/2010 | Warner |
| 2010/0308983 A1 | 12/2010 | Conte et al. |
| 2010/0309147 A1 | 12/2010 | Fleizach et al. |
| 2010/0313124 A1 | 12/2010 | Privault et al. |
| 2010/0313156 A1 | 12/2010 | Louch et al. |
| 2010/0313158 A1 | 12/2010 | Lee et al. |
| 2010/0313166 A1 | 12/2010 | Nakayama et al. |
| 2010/0315417 A1 | 12/2010 | Cho et al. |
| 2010/0315438 A1 | 12/2010 | Horodezky et al. |
| 2010/0321301 A1 | 12/2010 | Casparian et al. |
| 2010/0325578 A1 | 12/2010 | Mital et al. |
| 2011/0010626 A1 | 1/2011 | Fino et al. |
| 2011/0012851 A1 | 1/2011 | Ciesla et al. |
| 2011/0018695 A1 | 1/2011 | Bells et al. |
| 2011/0035145 A1 | 2/2011 | Yamasaki |
| 2011/0035662 A1 | 2/2011 | King et al. |
| 2011/0043652 A1 | 2/2011 | King et al. |
| 2011/0050576 A1 | 3/2011 | Forutanpour et al. |
| 2011/0050588 A1 | 3/2011 | Li et al. |
| 2011/0050591 A1 | 3/2011 | Kim et al. |
| 2011/0050594 A1 | 3/2011 | Kim et al. |
| 2011/0050629 A1 | 3/2011 | Homma et al. |
| 2011/0050630 A1 | 3/2011 | Ikeda |
| 2011/0050653 A1 | 3/2011 | Miyazawa et al. |
| 2011/0054837 A1 | 3/2011 | Ikeda |
| 2011/0055135 A1 | 3/2011 | Dawson et al. |
| 2011/0055741 A1 | 3/2011 | Jeon et al. |
| 2011/0057886 A1 | 3/2011 | Ng et al. |
| 2011/0057903 A1 | 3/2011 | Yamano et al. |
| 2011/0061029 A1 | 3/2011 | Yeh et al. |
| 2011/0063248 A1 | 3/2011 | Yoon |
| 2011/0069012 A1 | 3/2011 | Martensson |
| 2011/0069016 A1 | 3/2011 | Victor |
| 2011/0070342 A1 | 3/2011 | Wilkens |
| 2011/0074697 A1 | 3/2011 | Rapp et al. |
| 2011/0080350 A1 | 4/2011 | Almalki et al. |
| 2011/0084910 A1 | 4/2011 | Almalki et al. |
| 2011/0087982 A1 | 4/2011 | McCann et al. |
| 2011/0087983 A1 | 4/2011 | Shim |
| 2011/0093815 A1 | 4/2011 | Gobeil |
| 2011/0093817 A1 | 4/2011 | Song et al. |
| 2011/0096174 A1 | 4/2011 | King et al. |
| 2011/0102340 A1 | 5/2011 | Martin et al. |
| 2011/0102829 A1 | 5/2011 | Jourdan |
| 2011/0107272 A1 | 5/2011 | Aguilar |
| 2011/0115721 A1 | 5/2011 | Li et al. |
| 2011/0116716 A1 | 5/2011 | Kwon et al. |
| 2011/0122087 A1 | 5/2011 | Jang et al. |
| 2011/0126139 A1 | 5/2011 | Jeong et al. |
| 2011/0138295 A1 | 6/2011 | Momchilov et al. |
| 2011/0141031 A1 | 6/2011 | McCullough et al. |
| 2011/0141052 A1 | 6/2011 | Bernstein et al. |
| 2011/0144777 A1 | 6/2011 | Firkins et al. |
| 2011/0145068 A1 | 6/2011 | King et al. |
| 2011/0145752 A1 | 6/2011 | Fagans |
| 2011/0145753 A1 | 6/2011 | Prakash |
| 2011/0145759 A1 | 6/2011 | Leffert et al. |
| 2011/0145764 A1 | 6/2011 | Higuchi et al. |
| 2011/0149138 A1 | 6/2011 | Watkins |
| 2011/0163971 A1 | 7/2011 | Wagner et al. |
| 2011/0163978 A1 | 7/2011 | Park et al. |
| 2011/0164042 A1 | 7/2011 | Chaudhri |
| 2011/0167058 A1 | 7/2011 | Van Os |
| 2011/0167339 A1 | 7/2011 | Lemay |
| 2011/0167369 A1 | 7/2011 | van Os |
| 2011/0167382 A1 | 7/2011 | Van Os |
| 2011/0169765 A1 | 7/2011 | Aono |
| 2011/0175830 A1 | 7/2011 | Miyazawa et al. |
| 2011/0179368 A1 | 7/2011 | King et al. |
| 2011/0179381 A1 | 7/2011 | King |
| 2011/0181538 A1 | 7/2011 | Aono |
| 2011/0185299 A1* | 7/2011 | Hinckley ............ G06F 3/03545 715/769 |
| 2011/0185300 A1* | 7/2011 | Hinckley ............ G06F 3/03545 715/769 |
| 2011/0185316 A1 | 7/2011 | Reid et al. |
| 2011/0193788 A1 | 8/2011 | King et al. |
| 2011/0193809 A1 | 8/2011 | Walley et al. |
| 2011/0193881 A1 | 8/2011 | Rydenhag |
| 2011/0197160 A1 | 8/2011 | Kim et al. |
| 2011/0201387 A1 | 8/2011 | Paek et al. |
| 2011/0202834 A1 | 8/2011 | Mandryk et al. |
| 2011/0202853 A1 | 8/2011 | Mujkic |
| 2011/0202872 A1 | 8/2011 | Park |
| 2011/0202879 A1 | 8/2011 | Stovicek et al. |
| 2011/0205163 A1 | 8/2011 | Hinckley et al. |
| 2011/0209088 A1 | 8/2011 | Hinckley et al. |
| 2011/0209093 A1 | 8/2011 | Hinckley et al. |
| 2011/0209097 A1 | 8/2011 | Hinckley et al. |
| 2011/0209099 A1 | 8/2011 | Hinckley et al. |
| 2011/0209104 A1 | 8/2011 | Hinckley et al. |
| 2011/0210931 A1 | 9/2011 | Shai |
| 2011/0215914 A1 | 9/2011 | Edwards |
| 2011/0221684 A1 | 9/2011 | Rydenhag |
| 2011/0221776 A1 | 9/2011 | Shimotani et al. |
| 2011/0231789 A1 | 9/2011 | Bukurak et al. |
| 2011/0238690 A1 | 9/2011 | Arrasvuori et al. |
| 2011/0239110 A1 | 9/2011 | Garrett et al. |
| 2011/0242029 A1 | 10/2011 | Kasahara et al. |
| 2011/0246877 A1 | 10/2011 | Kwak et al. |
| 2011/0248916 A1 | 10/2011 | Griffin et al. |
| 2011/0248948 A1 | 10/2011 | Griffin et al. |
| 2011/0252346 A1 | 10/2011 | Chaudhri |
| 2011/0252357 A1 | 10/2011 | Chaudhri |
| 2011/0252362 A1 | 10/2011 | Cho et al. |
| 2011/0252376 A1 | 10/2011 | Chaudhri et al. |
| 2011/0258537 A1 | 10/2011 | Rives et al. |
| 2011/0258582 A1 | 10/2011 | Bang |
| 2011/0263298 A1 | 10/2011 | Park |
| 2011/0267530 A1 | 11/2011 | Chun |
| 2011/0279380 A1 | 11/2011 | Weber et al. |
| 2011/0279381 A1 | 11/2011 | Tong et al. |
| 2011/0279395 A1 | 11/2011 | Kuwabara et al. |
| 2011/0279852 A1 | 11/2011 | Oda et al. |
| 2011/0285656 A1 | 11/2011 | Yaksick et al. |
| 2011/0285659 A1 | 11/2011 | Kuwabara et al. |
| 2011/0291945 A1 | 12/2011 | Ewing, Jr. et al. |
| 2011/0291951 A1 | 12/2011 | Tong |
| 2011/0296333 A1 | 12/2011 | Bateman et al. |
| 2011/0296334 A1 | 12/2011 | Ryu et al. |
| 2011/0296351 A1 | 12/2011 | Ewing, Jr. et al. |
| 2011/0304559 A1 | 12/2011 | Pasquero |
| 2011/0304577 A1 | 12/2011 | Brown et al. |
| 2011/0307778 A1 | 12/2011 | Tsai et al. |
| 2011/0310049 A1 | 12/2011 | Homma et al. |
| 2012/0005622 A1 | 1/2012 | Park et al. |
| 2012/0011437 A1 | 1/2012 | James et al. |
| 2012/0013541 A1 | 1/2012 | Boka et al. |
| 2012/0013542 A1 | 1/2012 | Shenfield |
| 2012/0019448 A1 | 1/2012 | Pitkanen et al. |
| 2012/0026110 A1 | 2/2012 | Yamano |
| 2012/0036441 A1 | 2/2012 | Basir et al. |
| 2012/0036556 A1 | 2/2012 | LeBeau et al. |
| 2012/0038580 A1 | 2/2012 | Sasaki |
| 2012/0044153 A1 | 2/2012 | Arrasvuori et al. |
| 2012/0056837 A1 | 3/2012 | Park et al. |
| 2012/0056848 A1 | 3/2012 | Yamano et al. |
| 2012/0062564 A1 | 3/2012 | Miyashita et al. |
| 2012/0062604 A1 | 3/2012 | Lobo |
| 2012/0062732 A1 | 3/2012 | Marman et al. |
| 2012/0066630 A1 | 3/2012 | Kim et al. |
| 2012/0066648 A1 | 3/2012 | Rolleston et al. |
| 2012/0081375 A1 | 4/2012 | Robert et al. |

(56) References Cited

U.S. PATENT DOCUMENTS

| | | |
|---|---|---|
| 2012/0084689 A1 | 4/2012 | Ledet et al. |
| 2012/0084713 A1 | 4/2012 | Desai et al. |
| 2012/0089932 A1 | 4/2012 | Kano et al. |
| 2012/0089942 A1 | 4/2012 | Gammon |
| 2012/0089951 A1 | 4/2012 | Cassidy |
| 2012/0092355 A1 | 4/2012 | Yamamoto et al. |
| 2012/0096393 A1 | 4/2012 | Shim et al. |
| 2012/0096400 A1 | 4/2012 | Cho |
| 2012/0098780 A1 | 4/2012 | Fujisawa et al. |
| 2012/0102437 A1 | 4/2012 | Worley et al. |
| 2012/0105358 A1 | 5/2012 | Momeyer et al. |
| 2012/0105367 A1 | 5/2012 | Son et al. |
| 2012/0106852 A1 | 5/2012 | Khawand et al. |
| 2012/0113007 A1 | 5/2012 | Koch et al. |
| 2012/0113023 A1 | 5/2012 | Koch et al. |
| 2012/0126962 A1 | 5/2012 | Ujii et al. |
| 2012/0131495 A1 | 5/2012 | Goossens et al. |
| 2012/0139864 A1 | 6/2012 | Sleeman et al. |
| 2012/0146945 A1 | 6/2012 | Miyazawa et al. |
| 2012/0147052 A1 | 6/2012 | Homma et al. |
| 2012/0154328 A1 | 6/2012 | Kono |
| 2012/0154329 A1 | 6/2012 | Shinozaki |
| 2012/0159380 A1 | 6/2012 | Kocienda et al. |
| 2012/0169646 A1 | 7/2012 | Berkes et al. |
| 2012/0169716 A1 | 7/2012 | Mihara |
| 2012/0176403 A1 | 7/2012 | Cha et al. |
| 2012/0179967 A1 | 7/2012 | Hayes |
| 2012/0182226 A1 | 7/2012 | Tuli |
| 2012/0183271 A1 | 7/2012 | Forutanpour et al. |
| 2012/0206393 A1 | 8/2012 | Hillis et al. |
| 2012/0216114 A1 | 8/2012 | Privault et al. |
| 2012/0216139 A1 | 8/2012 | Ording et al. |
| 2012/0216143 A1 | 8/2012 | Shiplacoff et al. |
| 2012/0218203 A1 | 8/2012 | Kanki |
| 2012/0218304 A1 | 8/2012 | Anzures et al. |
| 2012/0235912 A1 | 9/2012 | Laubach |
| 2012/0240044 A1 | 9/2012 | Johnson et al. |
| 2012/0249575 A1 | 10/2012 | Krolczyk et al. |
| 2012/0249853 A1 | 10/2012 | Krolczyk et al. |
| 2012/0256846 A1 | 10/2012 | Mak |
| 2012/0256847 A1 | 10/2012 | Mak et al. |
| 2012/0256857 A1 | 10/2012 | Mak |
| 2012/0257071 A1 | 10/2012 | Prentice |
| 2012/0260220 A1 | 10/2012 | Griffin |
| 2012/0274591 A1 | 11/2012 | Rimas-Ribikauskas et al. |
| 2012/0274662 A1* | 11/2012 | Kim .................... G06F 3/0488 345/650 |
| 2012/0284673 A1 | 11/2012 | Lamb et al. |
| 2012/0293449 A1 | 11/2012 | Dietz |
| 2012/0293551 A1 | 11/2012 | Momeyer et al. |
| 2012/0297041 A1 | 11/2012 | Momchilov |
| 2012/0299859 A1 | 11/2012 | Kinoshita |
| 2012/0304108 A1 | 11/2012 | Jarrett et al. |
| 2012/0304132 A1 | 11/2012 | Sareen et al. |
| 2012/0304133 A1 | 11/2012 | Nan et al. |
| 2012/0306748 A1 | 12/2012 | Fleizach et al. |
| 2012/0306764 A1 | 12/2012 | Kamibeppu |
| 2012/0306765 A1 | 12/2012 | Moore |
| 2012/0306766 A1 | 12/2012 | Moore |
| 2012/0306772 A1 | 12/2012 | Tan et al. |
| 2012/0306778 A1 | 12/2012 | Weeldreyer et al. |
| 2012/0306927 A1 | 12/2012 | Lee et al. |
| 2012/0311429 A1 | 12/2012 | Decker et al. |
| 2012/0311437 A1 | 12/2012 | Weeldreyer et al. |
| 2012/0311498 A1 | 12/2012 | Kluttz et al. |
| 2013/0002561 A1 | 1/2013 | Wakasa |
| 2013/0016042 A1 | 1/2013 | Makinen et al. |
| 2013/0016122 A1 | 1/2013 | Bhatt et al. |
| 2013/0019174 A1 | 1/2013 | Gil et al. |
| 2013/0031514 A1 | 1/2013 | Gabbert |
| 2013/0036386 A1 | 2/2013 | Park et al. |
| 2013/0044062 A1 | 2/2013 | Bose et al. |
| 2013/0047100 A1 | 2/2013 | Kroeger et al. |
| 2013/0050131 A1 | 2/2013 | Lee et al. |
| 2013/0050143 A1 | 2/2013 | Kim et al. |
| 2013/0061172 A1 | 3/2013 | Huang et al. |
| 2013/0063389 A1 | 3/2013 | Moore |
| 2013/0067383 A1 | 3/2013 | Kataoka et al. |
| 2013/0067513 A1 | 3/2013 | Takami |
| 2013/0067527 A1 | 3/2013 | Ashbook et al. |
| 2013/0074003 A1 | 3/2013 | Dolenc |
| 2013/0077804 A1 | 3/2013 | Glebe et al. |
| 2013/0080923 A1 | 3/2013 | Anzures et al. |
| 2013/0082824 A1 | 4/2013 | Colley |
| 2013/0086056 A1 | 4/2013 | Dyor et al. |
| 2013/0093691 A1 | 4/2013 | Moosavi |
| 2013/0093764 A1 | 4/2013 | Andersson et al. |
| 2013/0097520 A1 | 4/2013 | Lewin et al. |
| 2013/0097521 A1 | 4/2013 | Lewin et al. |
| 2013/0097534 A1 | 4/2013 | Lewin et al. |
| 2013/0097539 A1 | 4/2013 | Mansson et al. |
| 2013/0097556 A1 | 4/2013 | Louch |
| 2013/0097562 A1 | 4/2013 | Kermoian et al. |
| 2013/0097564 A1 | 4/2013 | Kermoian et al. |
| 2013/0106766 A1 | 5/2013 | Yilmaz et al. |
| 2013/0111398 A1 | 5/2013 | Lu et al. |
| 2013/0113715 A1 | 5/2013 | Grant et al. |
| 2013/0113720 A1 | 5/2013 | Van Eerd et al. |
| 2013/0120278 A1 | 5/2013 | Cantrell |
| 2013/0120295 A1 | 5/2013 | Kim et al. |
| 2013/0120306 A1 | 5/2013 | Furukawa |
| 2013/0125039 A1 | 5/2013 | Murata |
| 2013/0135243 A1 | 5/2013 | Hirsch et al. |
| 2013/0135499 A1 | 5/2013 | Song |
| 2013/0141364 A1 | 6/2013 | Lynn et al. |
| 2013/0141396 A1 | 6/2013 | Lynn et al. |
| 2013/0145313 A1 | 6/2013 | Roh et al. |
| 2013/0154948 A1 | 6/2013 | Schediwy et al. |
| 2013/0154959 A1 | 6/2013 | Lindsay et al. |
| 2013/0155018 A1* | 6/2013 | Dagdeviren ........ G06F 3/03543 345/174 |
| 2013/0159893 A1 | 6/2013 | Lewis et al. |
| 2013/0162603 A1 | 6/2013 | Peng et al. |
| 2013/0162667 A1 | 6/2013 | Eskolin et al. |
| 2013/0169549 A1 | 7/2013 | Seymour et al. |
| 2013/0174049 A1 | 7/2013 | Townsend et al. |
| 2013/0174089 A1 | 7/2013 | Ki |
| 2013/0174094 A1 | 7/2013 | Heo et al. |
| 2013/0174179 A1 | 7/2013 | Park et al. |
| 2013/0179840 A1 | 7/2013 | Fisher et al. |
| 2013/0191791 A1 | 7/2013 | Rydenhag et al. |
| 2013/0194217 A1 | 8/2013 | Lee et al. |
| 2013/0198690 A1 | 8/2013 | Barsoum et al. |
| 2013/0212515 A1 | 8/2013 | Eleftheriou |
| 2013/0212541 A1 | 8/2013 | Dolenc et al. |
| 2013/0215079 A1 | 8/2013 | Johnson et al. |
| 2013/0222274 A1 | 8/2013 | Mori et al. |
| 2013/0222333 A1 | 8/2013 | Miles et al. |
| 2013/0222671 A1 | 8/2013 | Tseng et al. |
| 2013/0227419 A1 | 8/2013 | Lee et al. |
| 2013/0227450 A1 | 8/2013 | Na et al. |
| 2013/0232402 A1 | 9/2013 | Lu et al. |
| 2013/0232445 A1 | 9/2013 | Ording et al. |
| 2013/0234929 A1 | 9/2013 | Libin |
| 2013/0239057 A1 | 9/2013 | Ubillos et al. |
| 2013/0249814 A1 | 9/2013 | Zeng |
| 2013/0257793 A1 | 10/2013 | Zeliff et al. |
| 2013/0257817 A1 | 10/2013 | Yliaho |
| 2013/0265246 A1 | 10/2013 | Tae |
| 2013/0268875 A1 | 10/2013 | Han et al. |
| 2013/0278520 A1 | 10/2013 | Weng et al. |
| 2013/0305184 A1 | 11/2013 | Kim et al. |
| 2013/0307792 A1 | 11/2013 | Andres et al. |
| 2013/0314434 A1 | 11/2013 | Shetterly et al. |
| 2013/0321340 A1 | 12/2013 | Seo et al. |
| 2013/0321457 A1 | 12/2013 | Bauermeister et al. |
| 2013/0325342 A1 | 12/2013 | Pylappan et al. |
| 2013/0326420 A1 | 12/2013 | Liu et al. |
| 2013/0326421 A1 | 12/2013 | Jo |
| 2013/0328770 A1 | 12/2013 | Parham |
| 2013/0332836 A1 | 12/2013 | Cho |
| 2013/0332892 A1 | 12/2013 | Matsuki |
| 2013/0335373 A1 | 12/2013 | Tomiyasu |
| 2013/0339909 A1 | 12/2013 | Ha |

(56) References Cited

U.S. PATENT DOCUMENTS

| | | |
|---|---|---|
| 2014/0002355 A1 | 1/2014 | Lee et al. |
| 2014/0002374 A1 | 1/2014 | Hunt et al. |
| 2014/0002386 A1 | 1/2014 | Rosenberg et al. |
| 2014/0026098 A1 | 1/2014 | Gilman |
| 2014/0028571 A1 | 1/2014 | St. Clair |
| 2014/0028601 A1 | 1/2014 | Moore |
| 2014/0049491 A1 | 2/2014 | Nagar et al. |
| 2014/0055367 A1 | 2/2014 | Dearman et al. |
| 2014/0055377 A1 | 2/2014 | Kim |
| 2014/0059460 A1 | 2/2014 | Ho |
| 2014/0059485 A1 | 2/2014 | Lehrian et al. |
| 2014/0062956 A1 | 3/2014 | Ishizone et al. |
| 2014/0063316 A1 | 3/2014 | Lee et al. |
| 2014/0063541 A1 | 3/2014 | Yamazaki |
| 2014/0072281 A1 | 3/2014 | Cho et al. |
| 2014/0072283 A1 | 3/2014 | Cho et al. |
| 2014/0078318 A1 | 3/2014 | Alameh |
| 2014/0078343 A1 | 3/2014 | Dai et al. |
| 2014/0082536 A1 | 3/2014 | Costa et al. |
| 2014/0092025 A1 | 4/2014 | Pala et al. |
| 2014/0092030 A1 | 4/2014 | Van der Velden |
| 2014/0108936 A1 | 4/2014 | Khosropour et al. |
| 2014/0109016 A1 | 4/2014 | Ouyang et al. |
| 2014/0111456 A1 | 4/2014 | Kashiwa et al. |
| 2014/0111480 A1 | 4/2014 | Kim et al. |
| 2014/0111670 A1 | 4/2014 | Lord et al. |
| 2014/0118268 A1 | 5/2014 | Kuscher |
| 2014/0139456 A1 | 5/2014 | Wigdor et al. |
| 2014/0139471 A1 | 5/2014 | Matsuki |
| 2014/0152581 A1 | 6/2014 | Case et al. |
| 2014/0157203 A1 | 6/2014 | Jeon et al. |
| 2014/0160063 A1 | 6/2014 | Yairi et al. |
| 2014/0160073 A1 | 6/2014 | Matsuki |
| 2014/0164955 A1 | 6/2014 | Thiruvidam et al. |
| 2014/0164966 A1 | 6/2014 | Kim et al. |
| 2014/0165006 A1 | 6/2014 | Chaudhri et al. |
| 2014/0168093 A1 | 6/2014 | Lawrence |
| 2014/0168153 A1 | 6/2014 | Deichmann et al. |
| 2014/0173517 A1 | 6/2014 | Chaudhri |
| 2014/0184526 A1 | 7/2014 | Cho |
| 2014/0201660 A1 | 7/2014 | Clausen et al. |
| 2014/0208271 A1 | 7/2014 | Bell et al. |
| 2014/0210753 A1 | 7/2014 | Lee et al. |
| 2014/0210758 A1 | 7/2014 | Park et al. |
| 2014/0210760 A1 | 7/2014 | Aberg et al. |
| 2014/0210798 A1 | 7/2014 | Wilson |
| 2014/0223376 A1 | 8/2014 | Tarvainen et al. |
| 2014/0229888 A1 | 8/2014 | Ko et al. |
| 2014/0237408 A1 | 8/2014 | Ohlsson et al. |
| 2014/0245202 A1 | 8/2014 | Yoon et al. |
| 2014/0245367 A1 | 8/2014 | Sasaki et al. |
| 2014/0267114 A1 | 9/2014 | Lisseman et al. |
| 2014/0267135 A1 | 9/2014 | Chhabra |
| 2014/0267362 A1 | 9/2014 | Kocienda et al. |
| 2014/0282084 A1 | 9/2014 | Murarka et al. |
| 2014/0282214 A1 | 9/2014 | Shirzadi et al. |
| 2014/0300569 A1 | 10/2014 | Matsuki et al. |
| 2014/0304651 A1 | 10/2014 | Johansson et al. |
| 2014/0306897 A1 | 10/2014 | Cueto |
| 2014/0306899 A1 | 10/2014 | Hicks |
| 2014/0310638 A1 | 10/2014 | Lee et al. |
| 2014/0313130 A1 | 10/2014 | Yamano et al. |
| 2014/0333551 A1 | 11/2014 | Kim et al. |
| 2014/0333561 A1 | 11/2014 | Bull et al. |
| 2014/0344765 A1 | 11/2014 | Hicks et al. |
| 2014/0354845 A1 | 12/2014 | Molgaard et al. |
| 2014/0354850 A1 | 12/2014 | Kosaka et al. |
| 2014/0359438 A1 | 12/2014 | Matsuki |
| 2014/0359528 A1 | 12/2014 | Murata |
| 2014/0365945 A1 | 12/2014 | Karunamuni et al. |
| 2014/0380247 A1 | 12/2014 | Tecarro et al. |
| 2015/0015763 A1 | 1/2015 | Lee et al. |
| 2015/0020036 A1 | 1/2015 | Kim et al. |
| 2015/0026584 A1 | 1/2015 | Kobayakov et al. |
| 2015/0026592 A1 | 1/2015 | Mohammed et al. |
| 2015/0029149 A1 | 1/2015 | Andersson et al. |
| 2015/0033184 A1 | 1/2015 | Kim et al. |
| 2015/0042588 A1 | 2/2015 | Park |
| 2015/0046876 A1 | 2/2015 | Goldenberg |
| 2015/0049033 A1 | 2/2015 | Kim et al. |
| 2015/0058723 A1 | 2/2015 | Cieplinski et al. |
| 2015/0062046 A1 | 3/2015 | Cho et al. |
| 2015/0062052 A1 | 3/2015 | Bernstein et al. |
| 2015/0062068 A1 | 3/2015 | Shih et al. |
| 2015/0067495 A1 | 3/2015 | Bernstein et al. |
| 2015/0067496 A1 | 3/2015 | Missig et al. |
| 2015/0067497 A1 | 3/2015 | Cieplinski et al. |
| 2015/0067513 A1 | 3/2015 | Zambetti et al. |
| 2015/0067519 A1 | 3/2015 | Missig et al. |
| 2015/0067534 A1 | 3/2015 | Choi et al. |
| 2015/0067559 A1 | 3/2015 | Missig et al. |
| 2015/0067596 A1 | 3/2015 | Brown et al. |
| 2015/0067601 A1 | 3/2015 | Bernstein et al. |
| 2015/0067602 A1 | 3/2015 | Bernstein et al. |
| 2015/0067605 A1 | 3/2015 | Zambetti et al. |
| 2015/0071547 A1 | 3/2015 | Keating et al. |
| 2015/0116205 A1 | 4/2015 | Westerman et al. |
| 2015/0121218 A1 | 4/2015 | Kim et al. |
| 2015/0121225 A1 | 4/2015 | Somasundaram et al. |
| 2015/0067563 A1 | 5/2015 | Bernstein et al. |
| 2015/0128092 A1 | 5/2015 | Lee et al. |
| 2015/0135109 A1 | 5/2015 | Zambetti et al. |
| 2015/0138126 A1 | 5/2015 | Westerman |
| 2015/0138155 A1 | 5/2015 | Bernstein et al. |
| 2015/0139605 A1 | 5/2015 | Wiklof |
| 2015/0143273 A1 | 5/2015 | Bernstein et al. |
| 2015/0143284 A1 | 5/2015 | Bennett et al. |
| 2015/0149899 A1 | 5/2015 | Bernstein et al. |
| 2015/0149964 A1 | 5/2015 | Bernstein et al. |
| 2015/0149967 A1 | 5/2015 | Bernstein et al. |
| 2015/0153897 A1 | 6/2015 | Huang et al. |
| 2015/0153929 A1 | 6/2015 | Bernstein et al. |
| 2015/0160729 A1 | 6/2015 | Nakagawa |
| 2015/0185840 A1 | 7/2015 | Golyshko et al. |
| 2015/0193099 A1 | 7/2015 | Murphy |
| 2015/0193951 A1 | 7/2015 | Lee et al. |
| 2015/0205495 A1 | 7/2015 | Koide et al. |
| 2015/0234446 A1 | 8/2015 | Nathan et al. |
| 2015/0234493 A1 | 8/2015 | Parivar et al. |
| 2015/0253866 A1 | 9/2015 | Amm et al. |
| 2015/0268786 A1 | 9/2015 | Kitada |
| 2015/0268813 A1 | 9/2015 | Bos |
| 2015/0321607 A1 | 11/2015 | Cho et al. |
| 2015/0332107 A1 | 11/2015 | Paniaras |
| 2015/0378519 A1 | 11/2015 | Brown et al. |
| 2015/0378982 A1 | 12/2015 | McKenzie et al. |
| 2015/0381931 A1 | 12/2015 | Uhma et al. |
| 2016/0004373 A1 | 1/2016 | Huang |
| 2016/0004393 A1 | 1/2016 | Faaborg et al. |
| 2016/0004427 A1 | 1/2016 | Zambetti et al. |
| 2016/0004428 A1 | 1/2016 | Bernstein et al. |
| 2016/0004429 A1 | 1/2016 | Bernstein et al. |
| 2016/0004430 A1 | 1/2016 | Missig et al. |
| 2016/0004431 A1 | 1/2016 | Bernstein et al. |
| 2016/0004432 A1 | 1/2016 | Bernstein et al. |
| 2016/0011771 A1 | 1/2016 | Cieplinski |
| 2016/0019718 A1 | 1/2016 | Mukkamala et al. |
| 2016/0021511 A1 | 1/2016 | Jin et al. |
| 2016/0041750 A1 | 2/2016 | Cieplinski et al. |
| 2016/0048326 A1 | 2/2016 | Kim et al. |
| 2016/0062466 A1 | 3/2016 | Moussette et al. |
| 2016/0062619 A1 | 3/2016 | Reeve et al. |
| 2016/0070401 A1 | 3/2016 | Kim et al. |
| 2016/0132139 A1 | 5/2016 | Du et al. |
| 2016/0188181 A1 | 6/2016 | Smith |
| 2016/0196028 A1 | 7/2016 | Kenney et al. |
| 2016/0210025 A1 | 7/2016 | Bernstein et al. |
| 2016/0224220 A1 | 8/2016 | Ganguly |
| 2016/0259412 A1 | 9/2016 | Flint et al. |
| 2016/0259413 A1 | 9/2016 | Anzures et al. |
| 2016/0259495 A1 | 9/2016 | Butcher et al. |
| 2016/0259496 A1 | 9/2016 | Butcher et al. |
| 2016/0259497 A1 | 9/2016 | Foss et al. |
| 2016/0259498 A1 | 9/2016 | Foss et al. |

(56) References Cited

U.S. PATENT DOCUMENTS

| | | |
|---|---|---|
| 2016/0259499 A1 | 9/2016 | Kocienda et al. |
| 2016/0259516 A1 | 9/2016 | Kudurshian et al. |
| 2016/0259517 A1 | 9/2016 | Butcher et al. |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0259536 A1 | 9/2016 | Kudurshian et al. |
| 2016/0259548 A1 | 9/2016 | Ma |
| 2016/0274686 A1 | 9/2016 | Ruiz et al. |
| 2016/0274728 A1 | 9/2016 | Luo et al. |
| 2016/0274761 A1 | 9/2016 | Ruiz et al. |
| 2016/0283054 A1 | 9/2016 | Suzuki |
| 2016/0320906 A1 | 11/2016 | Bokma et al. |
| 2016/0334960 A1 | 11/2016 | Brown et al. |
| 2016/0357305 A1 | 12/2016 | Wells et al. |
| 2016/0357368 A1 | 12/2016 | Federighi et al. |
| 2016/0357389 A1 | 12/2016 | Dakin et al. |
| 2016/0357390 A1 | 12/2016 | Federighi et al. |
| 2016/0357404 A1 | 12/2016 | Alonso Ruiz et al. |
| 2016/0360116 A1 | 12/2016 | Penha et al. |
| 2017/0045981 A1 | 2/2017 | Karunamuni et al. |
| 2017/0046039 A1 | 2/2017 | Karunamuni et al. |
| 2017/0046058 A1 | 2/2017 | Karunamuni et al. |
| 2017/0046059 A1 | 2/2017 | Karunamuni et al. |
| 2017/0046060 A1 | 2/2017 | Karunamuni et al. |
| 2017/0075520 A1 | 3/2017 | Bauer et al. |
| 2017/0075562 A1 | 3/2017 | Bauer et al. |
| 2017/0075563 A1 | 3/2017 | Bauer et al. |
| 2017/0109011 A1 | 4/2017 | Jiang |
| 2017/0124699 A1 | 5/2017 | Lane |
| 2017/0139565 A1 | 5/2017 | Choi |
| 2018/0024681 A1 | 1/2018 | Bernstein et al. |
| 2018/0188920 A1 | 7/2018 | Bernstein et al. |

FOREIGN PATENT DOCUMENTS

| | | |
|---|---|---|
| CN | 1661556 | 8/2005 |
| CN | 1808362 A | 7/2006 |
| CN | 1955906 | 5/2007 |
| CN | 101102573 | 1/2008 |
| CN | 101118469 A | 2/2008 |
| CN | 101202866 A | 6/2008 |
| CN | 101222704 A | 7/2008 |
| CN | 101241397 A | 8/2008 |
| CN | 201107762 | 8/2008 |
| CN | 101320303 A | 12/2008 |
| CN | 100524183 | 8/2009 |
| CN | 101593077 A | 12/2009 |
| CN | 101650615 A | 2/2010 |
| CN | 101727268 | 6/2010 |
| CN | 101809526 A | 8/2010 |
| CN | 102004593 A | 4/2011 |
| CN | 102037435 | 4/2011 |
| CN | 102099776 | 6/2011 |
| CN | 102112946 A | 6/2011 |
| CN | 102160021 A | 8/2011 |
| CN | 102214038 A | 10/2011 |
| CN | 102349038 A | 2/2012 |
| CN | 102385478 A | 3/2012 |
| CN | 102438092 A | 5/2012 |
| CN | 102483677 A | 5/2012 |
| CN | 102646013 A | 8/2012 |
| CN | 102662573 A | 9/2012 |
| CN | 102841677 A | 12/2012 |
| CN | 103097992 A | 5/2013 |
| CN | 103186345 A | 7/2013 |
| CN | 103518176 A | 1/2014 |
| DE | 100 59 906 A1 | 6/2002 |
| DE | 21 2009 000 073 | 2/2011 |
| DE | 20 2009 018 283 | 8/2011 |
| DE | 11 2009 001 276 | 1/2012 |
| DE | 11 2009 001 281 | 1/2012 |
| EP | 0 388 162 A2 | 3/1990 |
| EP | 0 859 307 A1 | 3/1998 |
| EP | 0 880 090 A2 | 11/1998 |
| EP | 1 028 583 A1 | 8/2000 |
| EP | 1 067 471 A1 | 1/2001 |
| EP | 1406150 A1 | 4/2004 |
| EP | 1 571 549 A2 | 2/2005 |
| EP | 1 562 105 A2 | 8/2005 |
| EP | 1 568 966 A2 | 8/2005 |
| EP | 1 640 855 A2 | 3/2006 |
| EP | 1 674 977 A2 | 6/2006 |
| EP | 1 882 902 A1 | 1/2008 |
| EP | 2 000 896 A2 | 12/2008 |
| EP | 2 017 701 A1 | 1/2009 |
| EP | 2 028 583 A2 | 2/2009 |
| EP | 2 141 574 A2 | 1/2010 |
| EP | 2 175 357 A1 | 4/2010 |
| EP | 2 196 893 A2 | 6/2010 |
| EP | 2 214 087 A1 | 8/2010 |
| EP | 2 226 715 A2 | 9/2010 |
| EP | 2 286 324 | 2/2011 |
| EP | 2 286 325 | 2/2011 |
| EP | 2 299 351 A2 | 3/2011 |
| EP | 2 302 496 A1 | 3/2011 |
| EP | 2 375 309 A1 | 10/2011 |
| EP | 2 375 314 A1 | 10/2011 |
| EP | 2 386 935 A1 | 11/2011 |
| EP | 2 407 868 A1 | 1/2012 |
| EP | 2 420 924 A2 | 2/2012 |
| EP | 2 426 580 A2 | 3/2012 |
| EP | 2 447 818 A1 | 5/2012 |
| EP | 2 527 966 A2 | 11/2012 |
| EP | 2 530 677 A2 | 12/2012 |
| EP | 2 541 376 A1 | 1/2013 |
| EP | 2 555 500 A1 | 2/2013 |
| EP | 2 568 359 A2 | 3/2013 |
| EP | 2 615 535 A1 | 7/2013 |
| EP | 2 631 737 A1 | 8/2013 |
| EP | 2 674 846 A2 | 12/2013 |
| EP | 2 708 985 A1 | 3/2014 |
| EP | 2 733 578 A2 | 5/2014 |
| EP | 2 808 764 A1 | 12/2014 |
| EP | 2 809 058 A1 | 12/2014 |
| EP | 2 813 938 A1 | 12/2014 |
| GB | 2 350 991 | 12/2000 |
| GB | 2 366 630 A | 3/2002 |
| GB | 2 402 105 A | 12/2004 |
| GB | 2 492 709 A | 11/2009 |
| GB | 2 473 389 A | 3/2011 |
| GB | 2 474 153 A | 4/2011 |
| JP | 58-182746 | 10/1983 |
| JP | H06-161647 A | 6/1994 |
| JP | H07-98769 A | 4/1995 |
| JP | H07-104915 | 4/1995 |
| JP | H07-151512 A | 6/1995 |
| JP | H08-227341 A | 9/1996 |
| JP | H09-269883 A | 10/1997 |
| JP | H09-330175 A | 12/1997 |
| JP | H11-203044 A | 7/1999 |
| JP | 2000-148348 A | 5/2000 |
| JP | 2001-202192 A | 7/2001 |
| JP | 2001-306207 A | 11/2001 |
| JP | 2002-041023 A | 2/2002 |
| JP | 2002-149312 A | 5/2002 |
| JP | 2002-268867 A | 9/2002 |
| JP | 2002-286489 | 10/2002 |
| JP | 2003-084744 A | 3/2003 |
| JP | 2003-157131 A | 5/2003 |
| JP | 2003-186597 A | 7/2003 |
| JP | 2004-054861 A | 2/2004 |
| JP | 2004-062648 A | 2/2004 |
| JP | 2004-070492 A | 3/2004 |
| JP | 2004-086733 A | 3/2004 |
| JP | 2004-152169 A | 5/2004 |
| JP | 2005-031786 A | 2/2005 |
| JP | 2005-070777 A | 3/2005 |
| JP | 2005-092386 A | 4/2005 |
| JP | 2005-135106 A | 5/2005 |
| JP | 2005-157842 A | 6/2005 |
| JP | 2005-196810 A | 7/2005 |
| JP | 2005-222553 A | 8/2005 |

(56) References Cited

FOREIGN PATENT DOCUMENTS

| | | |
|---|---|---|
| JP | 2005-309933 A | 11/2005 |
| JP | 2006-185443 A | 7/2006 |
| JP | 2007-116384 A | 5/2007 |
| JP | 2007-517462 A | 6/2007 |
| JP | 2007-264808 A | 10/2007 |
| JP | 2008-009759 A | 1/2008 |
| JP | 2008-015890 A | 1/2008 |
| JP | 2008-017373 A | 1/2008 |
| JP | 2008-033739 A | 2/2008 |
| JP | 2008-076818 A | 4/2008 |
| JP | 2008-076853 A | 4/2008 |
| JP | 2008-516348 A | 5/2008 |
| JP | 2008-146453 A | 6/2008 |
| JP | 2008-537615 | 9/2008 |
| JP | 2008 305174 A | 12/2008 |
| JP | 2009-500761 | 1/2009 |
| JP | 2009-110243 A | 5/2009 |
| JP | 2009-129171 A | 6/2009 |
| JP | 2009-211704 A | 9/2009 |
| JP | 2009-217543 A | 9/2009 |
| JP | 2009-217815 A | 9/2009 |
| JP | 2010-009321 A | 1/2010 |
| JP | 2010-503130 A | 1/2010 |
| JP | 2010-055274 A | 3/2010 |
| JP | 2010-097353 A | 4/2010 |
| JP | 2010-146507 A | 7/2010 |
| JP | 2010-152716 A | 7/2010 |
| JP | 2010-176174 A | 8/2010 |
| JP | 2010-176337 A | 8/2010 |
| JP | 2010-181934 A | 8/2010 |
| JP | 2010-541071 A | 12/2010 |
| JP | 2011-501307 A | 1/2011 |
| JP | 2011-048666 A | 3/2011 |
| JP | 2011-048686 A | 3/2011 |
| JP | 2011-048762 A | 3/2011 |
| JP | 2011-048832 A | 3/2011 |
| JP | 2011-053831 A | 3/2011 |
| JP | 2011-053972 A | 3/2011 |
| JP | 2011-053973 A | 3/2011 |
| JP | 2011-053974 A | 3/2011 |
| JP | 2011-059821 A | 3/2011 |
| JP | 2011-070342 A | 4/2011 |
| JP | 2011-100290 A | 5/2011 |
| JP | 2011-107823 A | 6/2011 |
| JP | 2011-123773 A | 6/2011 |
| JP | 2011-141868 A | 7/2011 |
| JP | 2011 192179 A | 9/2011 |
| JP | 2011-192215 A | 9/2011 |
| JP | 2011-197848 A | 10/2011 |
| JP | 2011-221640 A | 11/2011 |
| JP | 2011-242386 A | 12/2011 |
| JP | 2011-253556 A | 12/2011 |
| JP | 2011-257941 A | 12/2011 |
| JP | 2011-530101 A | 12/2011 |
| JP | 2012-027940 A | 2/2012 |
| JP | 2012-043266 A | 3/2012 |
| JP | 2012-043267 A | 3/2012 |
| JP | 2012-053754 | 3/2012 |
| JP | 2012-053926 A | 3/2012 |
| JP | 2012-073873 A | 4/2012 |
| JP | 2012-509605 A | 4/2012 |
| JP | 2012-093820 A | 5/2012 |
| JP | 2012-123564 A | 6/2012 |
| JP | 2012-128825 A | 7/2012 |
| JP | 2013-030050 A | 2/2013 |
| JP | 2013-058149 A | 3/2013 |
| JP | 2013-080521 A | 5/2013 |
| JP | 2013-529339 A | 7/2013 |
| JP | 2013-542488 A | 11/2013 |
| JP | 2014-130567 A | 7/2014 |
| JP | 2014-140112 A | 7/2014 |
| JP | 2014-519109 A | 8/2014 |
| JP | 2015-153420 A | 8/2015 |
| KR | 2006-0071353 A | 6/2006 |
| KR | 2008-0045143 A | 4/2008 |
| KR | 2008-0054346 A | 6/2008 |
| KR | 2008-0078108 A | 8/2008 |
| KR | 2010-0010302 | 2/2010 |
| KR | 2010-0023637 | 3/2010 |
| KR | 2010-0034608 | 4/2010 |
| KR | 2010 0046087 | 6/2010 |
| KR | 2010 0133246 A | 12/2010 |
| KR | 2011 0086501 A | 7/2011 |
| KR | 20120103670 A | 9/2012 |
| KR | 2013 0099647 A | 9/2013 |
| KR | 2014 0016495 A | 2/2014 |
| KR | 2014 0043760 A | 4/2014 |
| KR | 2014 0079110 A | 6/2014 |
| KR | 20150021977 A | 3/2015 |
| RU | 2007145218 A | 7/2009 |
| WO | WO 90/10910 A1 | 9/1990 |
| WO | WO 90/11571 A1 | 10/1990 |
| WO | WO 91/14231 A1 | 9/1991 |
| WO | WO 95/26005 A1 | 9/1995 |
| WO | WO 98/49639 A1 | 11/1998 |
| WO | WO 99/19821 A1 | 4/1999 |
| WO | WO 99/30259 A1 | 6/1999 |
| WO | WO 99/53424 A1 | 10/1999 |
| WO | WO 00/11587 A1 | 3/2000 |
| WO | WO 00/50974 A2 | 8/2000 |
| WO | WO 00/52619 A1 | 9/2000 |
| WO | WO 00/62187 A2 | 10/2000 |
| WO | WO 00/65510 A1 | 11/2000 |
| WO | WO 01/16830 A1 | 3/2001 |
| WO | WO 01/16852 A2 | 3/2001 |
| WO | WO 01/22263 A2 | 3/2001 |
| WO | WO 01/22315 A2 | 3/2001 |
| WO | WO 01/88808 A1 | 11/2001 |
| WO | WO 00/62187 A3 | 12/2001 |
| WO | WO 01/22263 A3 | 1/2002 |
| WO | WO 01/22315 A3 | 1/2002 |
| WO | WO 02/07032 A1 | 1/2002 |
| WO | WO 02/15461 A2 | 2/2002 |
| WO | WO 01/16852 A8 | 6/2002 |
| WO | WO 2005/106637 A2 | 11/2005 |
| WO | WO 2006/013485 A2 | 2/2006 |
| WO | WO 2006/073020 A1 | 7/2006 |
| WO | WO 2006/094308 A2 | 9/2006 |
| WO | WO 2007/121557 A1 | 11/2007 |
| WO | WO 2008/030976 A2 | 3/2008 |
| WO | WO 2006/043209 A1 | 4/2008 |
| WO | WO 2008/064142 A2 | 5/2008 |
| WO | WO 2009/059062 A2 | 5/2009 |
| WO | WO 2009/143076 A2 | 11/2009 |
| WO | WO 2009/143294 A2 | 11/2009 |
| WO | WO 2009/148781 A2 | 12/2009 |
| WO | WO 2009/155981 A1 | 12/2009 |
| WO | WO 2009/158549 A2 | 12/2009 |
| WO | WO 2010/013876 A1 | 2/2010 |
| WO | WO 2010/090010 A1 | 8/2010 |
| WO | WO 2010/122813 A1 | 10/2010 |
| WO | WO 2011/024389 A1 | 3/2011 |
| WO | WO 2011/024465 A1 | 3/2011 |
| WO | WO 2011/093045 A1 | 8/2011 |
| WO | WO 2011/105009 A1 | 9/2011 |
| WO | WO 2011/108190 A1 | 9/2011 |
| WO | WO 2011/114630 A1 | 9/2011 |
| WO | WO 2011/115187 A1 | 9/2011 |
| WO | WO 2011/121375 A1 | 10/2011 |
| WO | WO 2012/021417 A1 | 2/2012 |
| WO | WO 2012/037664 | 3/2012 |
| WO | WO 2012/096804 A2 | 7/2012 |
| WO | WO 2012/108213 A1 | 8/2012 |
| WO | WO 2012/114760 A1 | 8/2012 |
| WO | WO 2012/150540 A2 | 11/2012 |
| WO | WO 2012/153555 A1 | 11/2012 |
| WO | WO 2013/169299 A1 | 11/2013 |
| WO | WO 2013/169300 A1 | 11/2013 |
| WO | WO 2013/169302 A1 | 11/2013 |
| WO | WO 2013/169845 A1 | 11/2013 |
| WO | WO 2013/169849 A2 | 11/2013 |
| WO | WO 2013/169851 A2 | 11/2013 |
| WO | WO 2013/169853 A1 | 11/2013 |
| WO | WO 2013/169854 A2 | 11/2013 |

(56) References Cited

FOREIGN PATENT DOCUMENTS

| | | | |
|---|---|---|---|
| WO | WO 2013/169870 A1 | 11/2013 |
| WO | WO 2013/169875 A2 | 11/2013 |
| WO | WO 2013/169877 A2 | 11/2013 |
| WO | WO 2013/169882 A2 | 11/2013 |
| WO | WO 2013/173838 A2 | 11/2013 |
| WO | WO 2014/105275 A1 | 7/2014 |
| WO | WO 2014/105276 A1 | 7/2014 |
| WO | WO 2014/105278 A1 | 7/2014 |
| WO | WO 2014/105279 A1 | 7/2014 |
| WO | WO 2014/129655 A1 | 8/2014 |
| WO | WO 2014/149473 A1 | 9/2014 |
| WO | WO 2014/200733 A1 | 12/2014 |
| WO | WO 2016/200584 A2 | 12/2016 |

OTHER PUBLICATIONS

Office Action, dated Aug. 10, 2015, received in Australian Patent Application No. 2013259637, which corresponds with U.S. Appl. No. 14/536,203, 3 pages.

Office Action, dated Aug. 18, 2015, received in Australian Patent Application No. 2013259642, which corresponds with U.S. Appl. No. 14/536,291, 3 pages.

Agarwal, "How to Copy and Paste Text on Windows Phone 8," Guiding Tech, http://web.archive.org/web20130709204246/http://www.guidingtech.com/20280/copy-paste-text-windows-phone-8/, Jul. 9, 2013, 10 pages.

Alzona, "Full Screen Maximization with RightZoom," http://www.brighhub.com/computing/mac-platform/articles/31024.aspx>, Mar. 31, 2009, 6 pages.

Apple Inc., "iPhone User Guide for iPhone and iPhone 3G," http://manuals.info.apple.com/en_US/iPhone_User_Guide.pdf, Jul. 11, 2008, 154 pages.

Ask.MetaFilte, "Enable Screen Resize?" ask. Metafilter.com, Jan. 29, 2006, http://ask.metafilter.com/31720/Enable-screen-resize, 4 pages.

Awduche et al., "Synchronized Broadcast in Cellular Networks," 2nd Telecommunications R&D Conference in Massachusetts. Mar. 1996, 12 pages.

Azundris, "A Fire in the Sky," http://web.archive.org/web/20140722062639/http://blog.azundrix.com/archives/168-A-fire-in-the-sky.html, Jul. 22, 2014, 8 pages.

CrackBerry Forums, Windows 8 Bezel Control and Gestures, http://wwwforums.crackberry.com/blackberry-playbook-f222/windows-8-bezel-control-gestures-705129/, Mar. 1, 2012, 8 pages.

Crook, "Microsoft Patenting Multi-Screen, Milti-Touch Gesures," http://techcrunch.com/2011/08/25/microsoft-awarded-patents-for-multi-screen-multi-touch-gestures/, Aug. 25, 2011, 8 pages.

cvil.lu—a design blog, Interesting Touch Interactions on Windows 8, http://cvil.ly/2011/06/04/interesting-touch-interactions-on-windows-8/, Jun. 4, 2011, 3 pages.

Deeter, "DigiStamp Signs Strategic Partnership with European Trust Center EuroSignCard to Safeguard Monetary Transactions in Financial Sector," http://proquest.umi.com/, Mar. 14, 2001, 2 pages.

Dilger, "Inside Apple's iPad: Multitasking," Appleinsider.com, <http://www.appleinsider.com/articles/10/02/18/inside_apples_ipad_multitasking.html>, Feb. 17, 2010, 3 pages.

Fahey, "The iPad Blows Up iPhone Apps Read Good," Kotaku http://kotaku.com/5458316/the-ipad-blows-up-iphone-apps-rel-good, Jan. 27, 2010, 3 pages.

Fehily, "Visual QuickStart Guide: Microsoft Windows 7," Peachpit Press, 9 pages.

Fenlon, "The Case for Bezel Touch Gestures on Apple's iPad," http://www.tested.com/tech/tablets/3104-the case-for-bezel-touch-gestures-on-apples-ipad/, Nov. 2, 2011, 6 pages.

Flowplayer, "Slowmotion: Flowplayer," https://web.archive.org/web/20150226191526/http://flash.flowplayer.org/plugins/streaming/slowmotion.html, Feb. 26, 2015, 4 pages.

Gorman, "Hands-on With Immersion HD Integrator Hi-Fi Haptics," http://www.engadget.com/2012/02/23/hands-on-with-immersion-hd-integrator-hi-fi-haptics/?utm_medium=referral&utm_source=pulsenews, Feb. 23, 2012, 10 pages.

Harris, "Windows 8 Consumer Preview: Product Demo," https://www.youtube.com/watch?feature=[;auer-embedded&v=jDYAQmQ-phX8, Feb. 28, 2012, 3 pages.

HTC, "HTC One (M7)," Wikipedia, the free encyclopedia, https://en.wikipedia.org/wiki/HTC_One_(M7), Mar. 2013, 20 pages.

HTC, "User Manual—PDA Phone—HTC_P3050 Touch," http://web.archive.org/web/20101228223033/http://www.comparecellular.com, Nov. 2, 2007, 154 pages.

iCIMS Recruiting Software, "Blackberry Playbook Review," http://www.tested.com/tech.tablets/5749-blackberry-playbook-review, 2015, 11 pages.

Jade et al., "Apple's iPhone 4.0 to Support Multitasking via Expose-like Interface," AppleInsider.com, Mar. 31, 2010 4 pages.

Jade et al., "Apple's iPhone 4.0 Software to Deliver Multitasking Support," AppleSider.com, Mar. 11, 2010, 3 pages.

Kishore, "Make the OS X Maximize Button Work like Windows," http://www.switchingtomac.com/making-the-switch/make-the-os-x-maximize-buttom-work-like-windows/, May 5, 2009, 11 pages.

MacRumors, "Fit to Screen Button Poll for Mac / Windows Users," http://forums.macrumors.com/showthread.php?t=615215>, Dec. 11, 2008, 15 pages.

MacRumors, "Window, Fit to Screen?," http://forums.macrumors.com/showthread.php?t=439783>, Feb. 22, 2008, 5 pages.

McRitchie, "Internet Explorer Right-Click Menus," http://web.archive.org/web-201405020/http:/dmcritchie.mvps.org/ie/rightie6.htm, May 2, 2014 10 pages.

MetaFilter Network Inc., "Enable Screen Resize?", http://ask.metafilter.com/31720/Enable-screen-resize>, Jan. 29, 2006, 4 pages.

Mick, "iPhone OS 4.0 Will Bring True Multitasking This Summer", Daily Tech, http:///www.dailytech.com/report+iphone+os+40+will+bring+true+multitasking+this+summer/article 17878.htm>, Mar. 11, 2010, 3 pages.

Moth, "Share Code—Write Code Once for Both Mobile and Desktop Apps," MSDN Magazine, Jul. 2007, http://msdn.microsoft.com/en-us/magazine/cc163387.aspx, 8 pages.

Newman "Sprint's HTC EVO 4G: 5 Killer Features," pcworld, http://www.pcworld.com/article/192286/sprints_htc_evo_4g_5_killer_features.html, Mar. 24, 2010, 3 pages.

Nickinson, "Review: The New HTC Sense Interface on Android Phones," Android Central, Feb. 22, 2010, http://www.androidcentral.com/review-new-htc-sense-android-phone, 10 pages.

Nilsson, "Design Guidelines for Mobile Applications," SINTEF ICT, Jun. 2008, 73 pages.

Nilsson et al., "Design Patterns for User Interface for Mobile Applications," Advances in Engineering Software, Elsevier Science, Oxford, GB vol. 40, No. 12, Dec. 1, 2009, 11 pages.

Pallenberg, "Wow, the new iPad had gestures," https://plus.google.com/+SaschaPallenberg/posts/aaJtJogu8ac, Mar. 7, 2012, 2 pages.

Pradeep, "Android App Development—Microsoft Awarded With Patents on Gestures Supported on Windows 8," http://mspoweruser.com/microsoft-awarded-with-patents-on-gestures-supported-on-windows-8/, Aug. 25, 2011, 16 pages.

Reiger, "Effective Design for Multiple Screen Sizes," mobiForge, http://mobiforge.com/designing/story/effective-design-multiple-screen-sizes, Jan. 2009, 12 pages.

Robertson et al., "The Task Gallery: A 3D Window Manager," Redmond, WA, Sep. 12, 1999, 8 pages.

Savoy, "HTC Enhances Sense with Leap and Friend Stream (updated with video)," Engadget, http://www.engadget.com/2010/02/16/htc-enhances-sense-with-leap-and-friend-stream/, Feb. 16, 2010, 4 pages.

Seffah et al., Multi-devices "Multiple" User Interfaces: Development Models and Research Opportunities, The Journal of Systems Software, www.sciencedirect.com, Dec. 25, 2003, 14 pages.

Siracusa, "Antacid Tablet," http://arstechnica.com/staff/2010/01/antacid-tablet/>, Jan. 1, 2010, 3 pages.

Sony, "Sony Xperia Z1", Wikipedia, the free encyclopedia, https://en.wikipedia.org/wiki/Sony_Xperia_Z1, Sep. 2013, 10 pages.

Tidwell, "Designing Interfaces," O'Reilly Media, Inc., USA, Nov. 2005, 348 pages.

(56) References Cited

OTHER PUBLICATIONS

Viana et al., "XMobile. A MB-UID Environment for Semi-Automatic Generation of Adaptive Applications for Mobile Devices," The Journal of Systems and Software, www.sciencedirect.com, Jun. 9, 2007, 13 pages.
Windows, "Stupid Geek Tricks: Tile or Cascade Multiple Windows in Windows 7," How to Geek, Feb. 18, 2010, 3 pages.
YouTube, "Blackberry Playbook bezel interation," http://www.youtube.com/watch?v=YGkzFqnOwXI, Jan. 10, 2011, 2 pages.
Office Action, dated May 22, 2012, received in U.S. Appl. No. 12/888,381, 18 pages.
Final Office Action, dated Nov. 19, 2012, received in U.S. Appl. No. 12/888,381, 14 pages.
Office Action, dated Dec. 10, 2013, received in U.S. Appl. No. 12/888,381, 13 pages.
Notice of Allowance, dated Oct. 21, 2014, received in U.S. Appl. No. 12/888,381, 8 pages.
Notice of Allowance, dated Feb. 17, 2015, received in U.S. Appl. No. 12/888,381, 5 pages.
Notice of Allowance (corrected), dated Apr. 9, 2015, received in U.S. Appl. No. 12/888,381, 2 pages.
Office Action, dated Aug. 8, 2013, received in Australian Patent Application No. 2010350740, 3 pages.
Office Action, dated Aug. 28, 2012, received in Chinese Patent Application No. 201010602688.2, which corresponds with U.S. Appl. No. 12/888,381, 6 pages.
Office Action, dated May 24, 2013, received in Chinese Patent Application No. 201010602688.2, which corresponds with U.S. Appl. No. 12/888,381, 7 pages.
Office Action, dated Aug. 6, 2013, received in European Patent Application No. 10760867.1, which corresponds with U.S. Appl. No. 12/888,381, 4 pages.
Office Action, dated Dec. 6, 2013, received in Japanese Patent Application No. 2013-503722, which corresponds with U.S. Appl. No. 12/888,381, 2 pages.
Office Action, dated Nov. 29, 2013, received in Korean Patent Application No. 2012-7029281, which corresponds with U.S. Appl. No. 12/888,381, 4 pages.
Office Action, dated May 10, 2012, received in U.S. Appl. No. 12/888,382, 9 pages.
Final Office Action, dated Nov. 15, 2012, received in U.S. Appl. No. 12/888,382, 11 pages.
Office Action, dated Dec. 10, 2013, received in U.S. Appl. No. 12/888,382, 12 pages.
Notice of Allowance, dated Oct. 31, 2014, received in U.S. Appl. No. 12/888, 5 pages.
Notice of Allowance, dated Feb. 13, 2015, received in U.S. Appl. No. 12/888,382, 6 pages.
Office Action, dated May 17, 2012, received in U.S. Appl. No. 12/888,384, 15 pages.
Final Office Action, dated Nov. 7, 2012, received in U.S. Appl. No. 12/888,384, 14 pages.
Office Action, dated May 16, 2012, received in U.S. Appl. No. 12/888,386, 12 pages.
Final Office Action, dated Nov. 8, 2012, received in U.S. Appl. No. 12/888,386, 13 pages.
Office Action, dated Jan. 23, 2013, received in U.S. Appl. No. 12/888,389, 11 pages.
Final Office Action, dated Sep. 12, 2013, received in U.S. Appl. No. 12/888,389, 10 pages.
Notice of Allowance, dated Sep. 8, 2014, received in U.S. Appl. No. 12/888,389, 13 pages.
Notice of Allowance, dated Feb. 11, 2015, received in U.S. Appl. No. 12/888,389, 13 pages.
Notice of Allowance, dated Jun. 15, 2012, received in U.S. Appl. No. 12/888,391, 23 pages.
Office Action, dated Jun. 28, 2013, received in U.S. Appl. No. 13/077,524, 17 pages.
Office Action, dated Apr. 4, 2013, received in U.S. Appl. No. 12/789,426, 8 pages.
Office Action, dated Feb. 12, 2014, received in U.S. Appl. No. 13/077,524, 13 pages.
Notice of Allowance, dated May 27, 2015, received in U.S. Appl. No. 13/077,524, 9 pages.
Notice of Allowance, dated Sep. 15, 2015, received in U.S. Appl. No. 13/077,524, 9 pages.
Office Action, dated Mar. 19, 2013, received in U.S. Appl. No. 13/333,909, 18 pages.
Final Office Action, dated Dec. 5, 2013, received in U.S. Appl. No. 13/333,909, 24 pages.
Notice of Allowance, dated Mar. 31, 2014, received in U.S. Appl. No. 13/333,909, 20 pages.
Office Action, dated Apr. 5 2016 received in Korean Patent Application No. 10-2015-7018851, which corresponds with U.S. Appl. No. 14/536,426, 7 pages.
Office Action, dated Dec. 17, 2015, received in U.S. Appl. No. 14/536,426, 28 pages.
Office Action, dated Nov. 18, 2015, received in Australian Patent Application No. 2015101231, which corresponds with U.S. Appl. No. 14/536,426, 3 pages.
Office Action, dated Mar. 4, 2016, received in Japanese Patent Application No. 2015-511644, which corresponds with U.S. Appl. No. 14/536,426, 3 pages.
Office Actibn, dated Feb. 1, 2016, received in Australian Patent Application No. 2013368441, which corresponds with U.S. Appl. No. 14/608,926, 3 pages.
Notice of Allowance, dated Mar. 30, 2016, received in Australian Patent Application No. 2013368441, which corresponds with U.S. Appl. No. 14/608,926, 1 page.
Office Action, dated Mar. 14, 2016, received in Japanese Patent Application No. 2015-549392, which corresponds with U.S. Appl. No. 14/608,926, 4 pages.
Office Action, dated Nov. 12, 2015, received in European Patent Application No. 13724102.2, which corresponds with U.S. Appl. No. 14/536,646, 6 pages.
Office Action, dated Feb. 29, 2016, received in Japanese Patent Application No. 2015-511645, which corresponds with U.S. Appl. No. 14/536,646, 5 pages.
Office Action, dated Jan. 7, 2016, received in European Patent Application No. 13726053.5, which corresponds with U.S. Appl. No. 14/536,141, 10 pages.
Office Action, dated Feb. 29, 2016, received in Japanese Patent Application No. 2015-511646, which corresponds with U.S. Appl. No. 14/536,141, 3 pages.
Office Action, dated Jan. 29, 2016, received in Australian Patent Application No. 2013368443, which corresponds with U.S. Appl. No. 14/536,141, 3 pages.
Notice of Allowance, dated Mar. 11, 2016, received in Australian Patent Application No. 2013368443, which corresponds with U.S. Appl. No. 14/536,141, 2 pages.
Office Action dated Apr. 5, 2016, received in Korean Patent Application No. 10-2015-7018448, which corresponds with U.S. Appl. No. 14/536,141, 6 pages.
Office Action, dated Nov. 11, 2015, received in European Patent Application No. 13724104.8 which corresponds with U.S. Appl. No. 14/536,203, 5 pages.
Office Action, dated Feb. 15, 2016, received in Japanese Patent Applicaton No. 2015-511650, which corresponds with U.S. Appl. No. 14/536,203, 5 pages.
Office Action, dated Dec. 4, 2015, received in Korean Patent Application No. 2014-7034520, which corresponds with U.S. Appl. No. 14/536,203, 4 pages.
Office Action, dated Jan. 29, 2016, received in Japanese Patent Application No. 2015-511652, which corresponds with U.S. Appl. No. 14/536,267, 3 pages.
Office Action, Dec. 4, 2015, received in Korean Patent Application No. 2014-7034530, which corresponds with U.S. Appl. No. 14/536,267, 3 pages.
Office Action, dated Jan. 7, 2016, received in European Patent Application No. 13724107.1, which corresponds with U.S. Appl. No. 14/052,515, 11 pages.

(56) References Cited

OTHER PUBLICATIONS

Office Action, dated Mar. 8, 2016, received in Japanese Patent Application No. 2015-511655 which corresponds with U.S. Appl. No. 14/536,291, 4 pages.
Office Action, dated Jan. 15, 2016, received in Australian Patent Application No. 2013368445, which corresponds with U.S. Appl. No. 14/608,985, 3 pages.
Office Action, dated Nov. 23, 2015, received in U.S. Appl. No. 14/18,316, 17 pages.
Office Action, dated Jul. 7, 2015, received in U.S. Appl. No. 14/183,347, 14 pages.
Final Office Action, dated Dec. 18, 2015, received in U.S. Appl. No. 14/183,347, 6 pages.
Notice of Allowance, dated Apr. 6, 2016, received in U.S. Appl. No. 14/183,347, 7 pages.
Notice of Allowance (corrected), dated Apr. 19, 2016, received in U.S. Appl. No. 14/183,347, 3 pages.
Office Action, dated Mar. 31, 2016, received in U.S. Appl. No. 14/864,737, 17 pages.
Certificate of Grant, dated Apr. 7, 2016, received in Australian Patent Application No. 2016100293, which corresponds with U.S. Appl. No. 14/864,737, 1 page.
Office Acton, dated Apr. 5, 2016, received in Danish Patent Application No. 201500577, which corresponds with U.S. Appl. No. 14/864,737, 7 pages.
Certificate of Grant, dated Mar. 24, 2016, received in Australian Patent Application No. 2016100254, which corresponds with U.S. Appl. No. 14/866,981, 1 page.
Office Action, dated Mar. 18, 2016, received in Danish Patent Application No. 201500575, which corresponds with U.S. Appl. No. 14/866,981, 9 pages.
Certificate of Grant, dated Mar. 24, 2016, received in Australian Patent Application No. 2016100251, which corresponds with U.S. Appl. No. 14/866,159, 1 page.
Office Action, dated Mar. 9, 2016, received in Danish Patent Application No. 201500574, which corresponds with U.S. Appl. No. 14/866,159, 11 pages.
Certificate of Grant, dated Mar. 24, 2016, received in Australian Patnet Application No. 2016100247, which corresponds with U.S. Appl. No. 14/868,078, 1 page.
Office Action, dated Mar. 30, 2016, received in Danish Patent Application No. 201500588, which corresponds with U.S. Appl. No. 14/868,078, 9 pages.
Office Action, dated Apr. 4, 2016, received in Danish Patent Application No. 201500582, which corresponds with U.S. Appl. No. 14/863,432, 10 pages.
Office Action, dated Mar. 22, 2016, received in Danish Patent Application No. 201500576, which corresponds with U.S. Appl. No. 14/866,989, 10 pages.
Office Action, dated Mar. 28, 2016, received in U.S. Appl. No. 14/869,899, 17 pages.
Office Action, dated Feb. 3, 2016, received in Danish Patent Application No. 201500592, which corresponds with U.S. Appl. No. 14/869,899, 9 pages.
Office Action, dated Mar. 4, 2016, received in U.S. Appl. No. 14/866,992, 30 pages.
Office Action, dated Mar. 18, 2016, received in Danish Patent Application No. 201500593, which corresponds with U.S. Appl. No. 14/866,992, 10 pages.
Office Action, dated Nov. 30, 2015, received in U.S. Appl. No. 14/845,217, 24 pages.
Final Office Action, dated Apr. 22, 2016, received in U.S. Appl. No. 14/845,217, 36 pages.
Office Action, dated Feb. 3, 2016, received in U.S. Appl. No. 14/856,517, 36 pages.
Office Action, dated Feb. 11, 2016, received in U.S. Appl. No. 14/856,519, 34 pages.
Office Action, dated Feb. 1, 2016, received in U.S. Appl. No. 14/857,645, 15 pages.

Office Action, dated Jan. 25, 2016, received in U.S. Appl. No. 14,864,580, 29 pages.
Office Action, dated Apr. 8, 2016, received in Danish Patent Application No. 201500584, which corresponds with U.S. Appl. No. 14/864,580, 9 pages.
Office Action, dated Apr. 19, 2016, received in U.S. Appl. No. 14/864,627, 9 pages.
Office Action, dated Apr. 8, 2016, received in Danish Patent Application No. 201500585, which corresponds with U.S. Appl. No. 14/864,627, 9 pages.
Office Action, dated Mar. 29, 2016, received in U.S. Appl. No. 14/866,361, 22 pages.
Office Action, dated Apr. 7, 2016, received in Danish Patent Application No. 201500579, which corresponds with U.S. Appl. No. 14/866,361, 10 pages.
Office Action, dated Mar. 22, 2016, received in Danish Patent Application No. 201500587, which corresponds with U.S. Appl. No. 14/866,987, 8 pages.
Office Action, dated Apr. 1, 2016, received in Danish Patent Application No. 201500589, which corresponds with U.S. Appl. No. 14/866,989, 8 pages.
Office Action, dated Apr. 11, 2016, received in U.S. Appl. No. 14/871,236, 23 pages.
Office Action, dated Apr. 8, 2016, received in Danish Patent Application No. 201500595, which corresponds with U.S. Appl. No. 14/871,236, 12 pages.
Office Action, dated Apr. 6, 2016, received in Danish Patent Application No. 201500596, which corresponds with U.S. Appl. No. 14/870,82, 7 pages.
Office Action, dated Apr. 7, 2016, received in Danish Patent Application No. 201500597, which corresponds with U.S. Appl. No. 14/871,227, 7 pages.
Office Action, dated Apr. 18, 2016, received in Danish Patent Application No. 201500601, which corresponds with U.S. Appl. No. 14/871,336, 8 pages.
Notice of Allowance, dated Apr. 18, 2016, received in Danish Patent Application No. 201500600, which corresponds with U.S. Appl. No. 14/871,462, 7 pages.
Office Action, dated Mar. 18, 2016, received in Danish Patent Application No. 201500594, which corresponds with U.S. Appl. No. 14/867,823, 10 pages.
Office Action, dated Mar. 21, 2016, received in Danish Patent Application No. 201500598, which corresponds with U.S. Appl. No. 14/867,892, 9 pages.
Certificate of Grant, dated Mar. 24, 2016, received in Australian Patent Application No. 20161002253, which corresponds with U.S. Appl. No. 14/867,990, 1 page.
Office Action, dated Mar. 18, 2016, received in Danish Patent Application No. 201500581, which corresponds with U.S. Appl. No. 14/867,990, 9 pages.
International Search Report and Written Opinion, dated Dec. 10, 2010, received in International Patent Application No. PCT/US2010/050057, which corresponds with U.S. Appl. No. 12/888,381, 9 pages.
International Preliminary Search Report on Patentability, dated Oct. 9, 2012, received in International Patent Application No. PCT/US2010/050057, which corresponds with U.S. Appl. No. 12/888,381, 6 pages.
Extended European Search Report, dated Nov. 6, 2015, received in European Patent Application No. 15183980.0, which corresponds with U.S. Appl. No. 14/536,426, 7 pages.
International Preliminary Report on Patentability, dated Jun. 30, 2015, received in International Patent Application No. PCT/US2013/069479, which corresponds with U.S. Appl. No. 14/608,926, 11 pages.
B-log—betriebsraum weblog, "Extremely Efficient Menu Selection: Marking Menus for the Flash Platform," http://www.betriebsraum.de/blog/2009/12/11/extremely-efficient-menu-selection-marking-for-the-flash-platform, Dec. 11, 2009, 9 pages.
Clark, "Global Moxie, Touch Means a Renaissance for Radial Menus," http://globalmoxie.com/blog/radial-menus-for-touch-ui~print.shtml, Jul. 17, 2012, 7 pages.

(56) References Cited

OTHER PUBLICATIONS

Cohen, Cinemagraphs are Animated Gifs for Adults, http://www.tubefilter.com/2011/07/10/cinemagraph, Jul. 10, 2011, 3 pages.
Drinkwater, "Glossary: Pre/Post Alarm Image Buffer," http://www.networkwebcams.com/ip-camera-learning-center/2008/07/17/glossary-prepost-alarm-image-buffer/, Jul. 17, 2008, 1 page.
Flixel, "Cinemagraph Pro for Mac", https://flixel.com/products/mac/cinemagraph-pro, 2014, 7 pages.
Flock, "Cinemagraphics: What It Looks Like When a Photo Moves," http://www.washingtonpost.com/blogs/blowpost/post/cinemagraphs-what-it-looks-like-when-a-photo-moves/2011/07-08/gl@AONez3H.blog.html, Jul. 12, 2011, 3 pages.
IBM et al., "Pressure-Sensitive Icons", IBM Technical Disclosure Bulletin, vol. 33, No. 1B, Jun. 1, 1990, 3 pages.
Kaaresoja, "Snap-Crackle-Pop: Tactile Feedback for Mobile Touch Screens," Nokia Research Center, Helsinki, Finland, Proceedings of Eurohaptics vol. 2006, Jul. 3, 2006, 2 pages.
Kronfli, "HTC Zoe Comes to Google Play, Here's Everthing You Need to Know," Know Your Mobile, http://www.knowyourmobile.com/htc/htc-one/19550/what-htc-zoe, Aug. 14, 2014, 5 pages.
Laurie, "The Power of the Right Click," http://vlaurie.com/right-click/customize-context-menu.html, 2002-2016, 3 pages.
Microsoft, "Use Radial Menus to Display Commands in OneNote for Windows 8," https://support.office.com/en-us/article/Use-radial-menues-to-display-OneNote-commands-Od75f03f-cde7-493a-a8a0b2ed6f99fbe2, 2016, 5 pages.
Nikon, "Scene Recognition System and Advanced SRS," http://www.nikonusa.com/en.Learn-And-Explore/Article/ftlzi4rr/Scene-Recognition-System.html, Jul. 22, 2015, 2 pages.
PoliceOne.com, "COBAN Technologies Pre-Event Buffer & Fail Safe Feature," http://www.policeone.com/police-products/police-technology/mobile-computures/videos/5955587-COBAN-Technologies-Pre-Event, Nov. 11, 2010, 2 pages.
"Quickly Preview Songs in Windows Media Player 12 in Windows 7," Quickly Preview Songs in Windows Media Player 12 in Windows 7. How-to Geek, Apr. 28, 2010, Web. May 8, 2010, http://web.archive.org/web/20100502013134/http://www.howtogeek.com/howto/16157/quickly-preview-songs-in-windows-media-center-12-in-windows-7>, 6 pages.
Sony, "Intelligent Scene Recognition," https://www.sony-asia.com/article/252999/section/product/product/dsc-t77, downloaded on May 20, 2016, 5 pages.
Stross, "Wearing a Badge, and a Video Camera," The New York Times, http://www.nytimes.com/2013/04/07/business/wearable-video-cameras-for-police-offers.html? R=0, Apr. 6, 2013, 4 pages.
Taser, "Taser Axon Body Camera User Manual," https://www.taser.com/images/support/downloads/product-resourses/axon_body_product_manual.pdf, Oct. 1, 2013, 24 pages.
Wikipedia, "AirDrop,", Wikipedia, the free encyclopedia, http://en.wikipedia.org/wiki/AirDrop, May 17, 2016, 5 pages.
Wikipedia, "Cinemagraph," Wikipedia, the free encyclopedia, http://en.wikipedia.org/wiki/Cinemagraph, Last Modified Mar. 16, 2016, 2 pages.
Wikipedia, "Context Menu," Wikipedia, the free encyclopedia https://en.wikipedia.org/wiki/Context menu, Last Modified May 15, 2016, 4 pages.
Wikipedia, "Mobile Ad Hoc Network," Wikipedia, the free encyclopedia, http://en.wikipedia.org/wiki/Mobile_ad_hoc_network, May 20, 2016, 4 pages.
Wikipedia, "Pie Menu," Wikipedia, the free encyclopedia, http://en.wikipedia.org/wiki/Pie_menu, Last Modified Jun. 4, 2016, 3 pages.
Wikipedia, "Quick Look," from Wikipedia, the free encyclopedia, https://en.wikipedia.org/wiki/Quick_Look, Last Modified Jan. 15, 2016, 3 pages.
Office Action, dated Jul. 21, 2016, received in European Patent Application No. 13795391.5, which corresponds with U.S. Appl. No. 14/536,426, 9 pages.
Final Office Action, dated May 6, 2016, received in U.S. Appl. No. 14/536,426, 23 pages.
Notice of Allowance, dated May 23, 2016, received in Australian Patent Application No. 2013259606, which corresponds with U.S. Appl. No. 14/536,426, 3 pages.
Decision to Grant, dated Jul. 14, 2016, received in European Patent Application No. 13724100.6, which corresponds with U.S. Appl. No. 14/536,426, 1 page.
Letters Patent, dated Aug. 10, 2016, received in European Patent Application No. 13724100.6, which corresponds with U.S. Appl. No. 14/536,426, 1 page.
Certificate of Grant, dated Jul. 29, 2016, received in Australian Patent Application No. 2013368441, which corresponds with U.S. Appl. No. 14/608,926, 1 page.
Office Action, dated Apr. 21, 2016, received in European Patent Application No. 13795392.3, which corresponds with U.S. Appl. No. 14/608,926, 6 pages.
Office Action, dated May 6, 2016, received in European Patent Application No. 13795392.3, which corresponds with U.S. Appl. No. 14/608,926, 6 pages.
Office Action, dated May 12, 2016, received in Korean Patent Application No. 10-2015-7018853, which corresponds with U.S. Appl. No. 14/608,926, 4 pages.
Office Action, dated May 31, 2016, received in Australian Patent Application No. 2013259613, which corresponds with U.S. Appl. No. 14/536,646, 4 pages.
Notice of Allowance, dated Jul. 5, 2016, received in Australian Patent Application No. 2013259613, which corresponds with U.S. Appl. No. 14/536,646, 3 pages.
Office Action, dated May 31, 2016, received in European Patent Application No. 13724102.2, which corresponds with U.S. Appl. No. 14/536,646, 5 pages.
Notice of Allowance, dated Aug. 15, 2016, received in Australian Patent Application No. 2013259614, which corresponds with U.S. Appl. No. 14/536,141, 1 page.
Certificate of Grant, dated Jul. 7, 2016, received in Australian Patent Application No. 2013368443, which corresponds with U.S. Appl. No. 14/536,141, 3 pages.
Office Action, dated Jul. 4, 2016, received in Japanese Patent Application No. 2015-549393, which corresponds with U.S. Appl. No. 14/536,141, 4 pages.
Office Action, dated Aug. 1, 2016, received in U.S. Appl. No. 14/536,203, 14 pages.
Notice of Allowance, dated Jun. 15, 2016, received in Australian Patent Applicatin No. 2013259630, which corresponds with U.S. Appl. No. 14/536,203, 3 pages.
Office Action, dated May 31, 2016, received in European Patent Application No. 13724104.8, which corresponds with U.S. Appl. No. 14/536,203, 5 pages.
Notice of Allowance, dated Aug. 5, 2016, received in Japanese Patent Application No. 2015-511650, which corresponds with U.S. Appl. No. 14/536,203, 4 pages.
Office Action, dated Jul. 22, 2016, received in European Office Action No. 13798465.4, which corresponds with U.S. Appl. No. 14/608,965, 8 pages.
Notice of Allowance, dated Jun. 28, 2016, received in Australian Patent Application No. 2013259637, which corresponds with U.S. Appl. No. 14/536,267, 3 pages.
Office Action, dated Jul. 25, 2016, received in Australian Patent Application No. 2013259642, which corresponds with U.S. Appl. No. 14/536,291, 3 pages.
Office Action, dated Aug. 10, 2016, received in Australian Patent Application No. 2013259642, which corresponds with U.S. Appl. No. 14/536,291, 4 pages.
Office Action, dated Aug. 22, 2016, received in European Patent Application No. 13724107.1, which corresponds with U.S. Appl. No. 14/536,291, 7 pages.
Office Action, dated Jul. 25, 2016, received in Japanese Patent Application No. 13811032.5, which corresponds with U.S. Appl. No. 14/608,985, 8 pages.
Office Action, dated Apr. 25, 2016, received in Japanese Patent Application No. 2015-550384, which corresponds with U.S. Appl. No. 14/608,985, 4 pages.

(56) References Cited

OTHER PUBLICATIONS

Notice of Allowance, dated Jul. 1, 2016, received in Chinese Patent Application No. 201620214376.7, which correresponds with U.S. Appl. No. 14/864,737, 3 pages.
Patent, dated Aug. 3, 2016, received in Chinese Patent Application No. 201620214376.7, which corresponds with U.S. Appl. No. 14/864,737, 5 pages.
Certificate of Registration, dated Jun. 20, 2016, received in German Patent Application No. 202016001845.1, which corresponds with U.S. Appl. No. 14/864,737, 3 pages.
Office Action, dated Apr. 5, 2016, received in Danish Patent Application No. 201500577, which corresponds with U.S. Appl. No. 14/864,737, 7 pages.
Intention to Grant, dated Aug. 2, 2016, received in Danish Patent Application No. 201500577, which corresponds with U.S. Appl. No. 14/864,737, 2 pages.
Office Action, dated Jun. 27, 2016, received in U.S. Appl. No. 14/866,981, 22 pages.
Office Action, dated May 10, 2016, received in Australian Patent Application No. 2016100254, which corresponds with U.S. Appl. No. 14/866,981, 6 pages.
Notice of Allowance, dated Jul. 27, 2016, received in Chinese Patent Application No. 201620176169.7, which corresponds with U.S. Appl. No. 14/866,981, 3 pages.
Certificate of Registration, dated Jun. 20, 2016, received in German Patent Application No. 202016001514.2, which corresponds with U.S. Appl. No. 14/864,737, 3 pages.
Office Action, dated Mar. 18, 2016, received in Danish Patent Application No. 2016100254, which corresponds with U.S. Appl. No. 14/866,981, 9 pages.
Office Action, dated May 19, 2016, received in Australian Patent Application No. 2016100251, which corresponds with U.S. Appl. No. 14,866,159, 5 pages.
Certificate of Registration, dated Jun. 16, 2016, received in German Patent No. 202016001483.9, which corresponds with U.S. Appl. No. 14,866,159, 3 pages.
Innovation Patent Certificate, dated Aug. 4, 2016, received in Australian Patent Application No. 2016101201, which corresponds with U.S. Appl. No. 14/686,078, 1 page.
Certificate of Registration, dated Jun. 30, 2016, received in German Patent Application No. 20201600156.9, which corresponds with U.S. Appl. No. 14/868,078, 3 pages.
Office Action, dated Mar. 30, 2016, received in Australian Patent Application No. 201500588, which corresponds with U.S. Appl. No. 14/868,078, 9 pages.
Office Action, dated May 9, 2016, received in U.S. Appl. No. 14/863,432, 26 pages.
Office Action, dated Aug. 19, 2016, received in Australian Patent Application No. 2016100647, which corresponds with U.S. Appl. No. 14/863,432, 5 pages.
Patent, dated Aug. 8, 2016, received in Australian Patent Application 2016100653, corresponds with U.S. Appl. No. 14/866,511, 1 page.
Office Action, dated Mar. 22, 2016, received in Danish Patent Application No. 201500576, which corresponds with U.S. Appl. No. 14/866,511, 10 pages.
Notice of Allowance, dated Jun. 8, 2016, received in Danish Patent Application No. 201500576, which corresponds with U.S. Appl. No. 14/866,511, 2 pages.
Notice of Allowance, dated Aug. 26, 2016, received in Danish Patent Application No. 201500576, which corresponds with U.S. Appl. No. 14/866,511, 2 pages.
Office Action, dated May 10, 2016, received in U.S. Appl. No. 14/866,489, 15 pages.
Office Action, dated Jun. 28, 2016, received in U.S. Appl. No. 14/869,899, 5 pages.
Final Office Action, dated Jul. 29, 2016, received in U.S. Appl. No. 14/866,992, 35 pages.
Office Action, dated Jun. 27, 2016, received in Danish Patent Application No. 201500593, which corresponds with U.S. Appl. No. 14/866,992, 7 pages.
Notice of Allowance, dated Aug. 26, 2016, received in U.S. Appl. No. 14/845,217, 5 pages.
Final Office Action, dated Jul. 13, 2016, received in U.S. Appl. No. 14/856,517, 30 pages.
Final Office Action, dated Jul. 15, 2016, received in U.S. Appl. No. 14/856,519, 31 pages.
Final Office Action, dated Jun. 16, 2016, received in U.S. Appl. No. 14/857,645, 12 pages.
Notice of Allowance, dated May 23, 2016, received in U.S. Appl. No. 14/864,580, 9 pages.
Corrected Notice of Allowability, dated Jun. 16, 2016, received in U.S. Appl. No. 14/864,580, 2 pages.
Notice of Allowance, dated Aug. 4, 2016, received in U.S. Appl. No. 14/864,580, 9 pages.
Office Action, dated Aug. 19, 2016, received in Australian Patent Application No. 2016100648, which corresponds with U.S. Appl. No. 14/864,580, 6 pages.
Notice of Allowance, dated Jul. 19, 2016, received in U.S. Appl. No. 14/866,361, 8 pages.
Office Action, dated Jun. 10, 2016, received in Australian Patent Application No. 2016100292, which corresponds with U.S. Appl. No. 14/866,361, 4 pages.
Notice of Allowance/Grant, dated Jul. 1, 2016, received in Chinese Patent Application No. 201620251706.X, which corresponds with U.S. Appl. No. 14/866,361, 3 pages.
Letters Patent, dated Aug. 3, 2016, received in Chinese Patent Application No. 201620251706.X, which corresponds with U.S. Appl. No. 14/866,361, 3 pages.
Certificate of Registration, dated Jun. 24, 2016, received in German Patent Application No. 202016001819.2, which corresponds with U.S. Appl. No. 14/866,361, 3 pages.
Patent, dated Aug. 8, 2016, received in Australian Patent Application No. 2016100649, which corresponds with U.S. Appl. No. 14/866,987, 1 page.
Notice of Allowance, dated Jun. 10, 2016, received in Danish Patent Application No. 201500587, which corresponds with U.S. Appl. No. 14/866,987, 2 pages.
Certificate of Exam, dated Jul. 21, 2016, received in Australian Patent Application No. 2016100652, which corresponds with U.S. Appl. No. 14/866,989, 1 page.
Notice of Allowance, dated Jun. 10, 2016, received in Danish Patent Application No. 201500589, which corresponds with U.S. Appl. No. 14/866,989, 2 pages.
Office Action, dated Jun. 28, 2016, received in U.S. Appl. No. 14/871,236, 21 pages.
Office Action, dated May 26, 2016, received in Danish Patent Application No. 201500595, which corresponds with U.S. Appl. No. 14/871,236, 14 pages.
Office Action, dated Jun. 9, 2016, received in Danish Patent Application No. 201500596, which corresponds with U.S. Appl. No. 14/870,882, 9 pages.
Notice of Allowance, dated Jun. 21, 2016, received in Danish Patent Application No. 201500597, which corresponds with U.S. Appl. No. 14/871,227, 2 pages.
Office Action, dated Apr. 29, 2016, received in U.S. Appl. No. 14/867,823, 28 pages.
Office Action, dated May 10, 2016, received in U.S. Appl. No. 14/867,892, 28 pages.
Office Action, dated May 23, 2016, received in Australian Patent Application No. 2016100253, which corresponds with U.S. Appl. No. 14/867,990, 5 pages.
Certificate of Registration, dated Jun. 16, 2016, received in German Patent No. 202016001489.8, which corresponds with U.S. Appl. No. 14/867,990, 3 pages.
International Search Report and Written Opinion, dated Apr. 25, 2016, received in International Patent Application No. PCT/US2016/018758, which corresponds with U.S. Appl. No. 14/866,159, 15 pages.

(56) References Cited

OTHER PUBLICATIONS

International Search Report and Written Opinion, dated Jul. 21, 2016, received in International Patent Application No. PCT/US2016/019913, which corresponds with U.S. Appl. No. 14/868,078, 16 pages.
Angelov, "Sponsor Flip Wall With Jquery & CSS", Tutorialzine. N.p., Mar. 24, 2010. Web. http://tutorialzine.com/2010/03/sponsor-wall-slip-jquery-css/, Mar. 24, 2010, 8 pages.
Anonymous, "Notifications, Android 4.4 and Lower", Android Developers, https://developer.android.com/design/patterns/notifications_k.html, May 24, 2015, 9 pages.
Dzyre, "10 Android Notification Features You Can Fiddle With", http://www.hongkiat.com/blog/android-notification-features, Mar. 10, 2014, 10 pages.
Elliot, "Mac System 7", YouTube. Web. Mar. 8, 2017, http://www.youtube.com/watch?v=XLv22hfuuik, Aug. 3, 2011, 1 page.
Gonzalo et al., "Zliding: Fluid Zooming and Sliding for High Precision Parameter Manipulation", Department of Computer Science, University of Toronto, Seattle, Washington, Oct. 23, 2005, 10 pages.
Grant, "Android's Notification Center", https://www.objc.io/issues/11-android/android-notifications, Apr. 30, 2014, 26 pages.
iPhoneOperator, "Wasser Liveeffekt für Homescreen & Lockscreen—Aquaboard (Cydia)", http://www.youtube.com/watch?v=fG9YMF-mB0Q, Sep. 22, 2012, 3 pages.
Kost, "LR3-Deselect All Images But One", Julieanne Kost's Blog, blogs.adobe.com/jkost/2011/12/lr3-deselect-all-images-but-one.html, Dec. 22, 2011, 1 page.
Microsoft, "Lumia—How to Personalize Your Start Screen", https://www.youtube.com/watch?v=6Gl5Z3TrSEs, Nov. 11, 2014, 3 pages.
Office Action, dated Mar. 15, 2017, received in U.S. Appl. No. 14/535,671, 13 pages.
Notice of Allowance, dated Dec. 20, 2016, received in Australian Patent Application No. 2013368440, which corresponds with U.S. Appl. No. 14/536,426, 3 pages.
Office Action, dated Feb. 24, 2017, received in Korean Patent Application No. 10-2015-7018851, which corresponds with U.S. Appl. No. 14/536,426, 3 pages.
Office Action, dated Apr. 5, 2017, received in U.S. Appl. No. 14/536,367, 16 pages.
Office Action, dated Jan. 20, 2017, received in European Patent Application No. 15183980.0, which corresponds with U.S. Appl. No. 14/536,426, 5 pages.
Office Action, dated Feb. 6, 2017, received in Japanese Patent Application No. 2015-511644, which corresponds with U.S. Appl. No. 14/536,426, 6 pages.
Office Action, dated Mar. 9, 2017, received in U.S. Appl. No. 14/536,464, 21 pages.
Office Action, dated Jan. 3, 2017, received in Australian Patent Application No. 2016201451, which corresponds with U.S. Appl. No. 14/608,926, 3 pages.
Office Action, dated May 4, 2017, received in Chinese Patent Application No. 201380068414.1, which corresponds with U.S. Appl. No. 14/608,926, 5 pages.
Notice of Allowance, dated Jan. 17, 2017, received in Japanese Patent Application No. 2015-549392, which corresponds with U.S. Appl. No. 14/608,926, 2 pages.
Patent, dated Feb. 17, 2017, received in Japanese Patent Application No. 2015-549392, which corresponds with U.S. Appl. No. 14/608,926, 3 pages.
Notice of Allowance, dated Mar. 31, 2017, received in Korean Patent Application No. 2015-7018853, which corresponds with U.S. Appl. No. 14/608,926, 4 pages.
Office Action, dated Dec. 1, 2016, received in Chinese Patent Application No. 2013800362059, which corresponds with U.S. Appl. No. 14/536,646, 3 pages.
Notice of Allowance, dated Jan. 4, 2017, received in European Patent Application No. 13724102.2, which corresponds with U.S. Appl. No. 14/536,646, 5 pages.

Notice of Allowance, dated Dec. 22, 2016, received in Japanese Patent Application No. 2015-511645, which corresponds with U.S. Appl. No. 14/536,646, 2 pages.
Office Action, dated Apr. 3, 2017, received in U.S. Appl. No. 14/536,141, 11 pages.
Office Action, dated Mar. 3, 2017, received in Chinese Patent Application No. 201380035893.7, which corresponds with U.S. Appl. No. 14/536,646, 8 pages.
Notice of Allowance, dated May 12, 2017, received in U.S. Appl. No. 14/608,942, 10 pages.
Office Action, dated Mar. 29, 2017, received in Australian patent Application No. 2016201303, which corresponds with U.S. Appl. No. 14/608,942, 3 pages.
Office Action, dated Oct. 7, 2016, received in European Patent Application No. 13798464.7, which corresponds with U.S. Appl. No. 14/608,942, 7 pages.
Office Action, dated Feb. 24, 2017, received in Korean Patent Application No. 2015-7018448, which corresponds with U.S. Appl. No. 14/608,942, 4 pages.
Notice of Allowance, dated Feb. 1, 2017, received in U.S. Appl. No. 14/536,203, 9 pages.
Office Action, dated Feb. 6, 2017, received in Korean Patent Application No. 2016-7033834, which corresponds with U.S. Appl. No. 14/536,203, 4 pages.
Final Office Action, dated Mar. 24, 2017, received in U.S. Appl. No. 14/536,247, 14 pages.
Office Action, dated Mar. 24, 2017, received in U.S. Appl. No. 14/536,267, 12 pages.
Office Action, dated Mar. 24, 2017, received in Australian Patent Application No. 2016204411, which corresponds with U.S. Appl. No. 14/536,267, 3 pages.
Office Action, dated Dec. 9, 2016, received in Chinese Patent Application No. 2016120601564130, which corresponds with U.S. Appl. No. 14/536,267, 4 pages.
Office Action, dated Mar. 3, 2017, received in Japanese Patent Application No. 2016-125839, which corresponds with U.S. Appl. No. 14/536,267, 6 pages.
Office Action, dated Jan. 5, 2017, received in Korean Patent Application No. 2016-7029533, which corresponds with U.S. Appl. No. 14/536,267, 2 pages.
Office Action, dated Apr. 7, 2017, received in U.S. Appl. No. 14/536,291, 11 pages.
Office Action, dated Mar. 23, 2017, received in European Patent Application No. 13724107.1, which corresponds with U.S. Appl. No. 14/536,291, 8 pages.
Final Office Action, dated Dec. 22, 2016, received in Japanese Patent Application No. 2015-511655, which corresponds with U.S. Appl. No. 14/536,291, 3 pages.
Notice of Allowance, dated Jan. 18, 2017, received in Australian Patent Application No. 2013368445, which corresponds with U.S. Appl. No. 14/608,985, 3 pages.
Office Action, dated Feb. 27, 2017, received in European Patent Application No. 13811032.5, which corresponds with U.S. Appl. No. 14/608,985, 6 pages.
Notice of Allowance, dated Jan. 24, 2017, received in Japanese Patent Application No. 2015-550384, which corresponds with U.S. Appl. No. 14/608,985, 5 pages.
Patent, dated Feb. 24, 2017, received in Japanese Patent Application No. 2015-550384, which corresponds with U.S. Appl. No. 14/608,985, 2 pages.
Office Action, dated Mar. 24, 2017, received in U.S. Appl. No. 14/609,006, 13 pages.
Office Action, dated Apr. 19, 2017, received in U.S. Appl. No. 14/536,296, 12 pages.
Office Action, dated Jan. 19, 2017, received in U.S. Appl. No. 14/609,042, 12 pages.
Notice of Allowance, dated Feb. 27, 2017, received in U.S. Appl. No. 14/864,737, 9 pages.
Notice of Allowance, dated Feb. 10, 2017, received in U.S. Appl. No. 14/866,981, 5 pages.
Office Action, dated Dec. 5, 2016, received in Danish Patent Application No. 201500575, which corresponds with U.S. Appl. No. 14/866,981, 3 pages.

(56) References Cited

OTHER PUBLICATIONS

Office Action, dated Mar. 14, 2017, received in Danish Patent Application No. 201500574, which corresponds with U.S. Appl. No. 14/866,159, 5 pages.
Notice of Allowance, dated Jan. 30, 2017, received in received in Danish Patent Application No. 201500588, which corresponds with U.S. Appl. No. 14/868,078, 2 pages.
Notice of Allowance, dated May 2, 2017, received in received in Danish Patent Application No. 201500588, which corresponds with U.S. Appl. No. 14/868,078, 2 pages.
Notice of Allowance, dated Apr. 27, 2017, received in U.S. Appl. No. 14/863,432, 7 pages.
Notice of Allowance, dated Jan. 12, 2017, received in Chinese Patent Application No. 201620470063.8, which corresponds with U.S. Appl. No. 14/863,432, 1 page.
Final Office Action, dated Jan. 27, 2017, received in U.S. Appl. No. 14/866,511, 26 pages.
Notice of Allowance, dated Jan. 12, 2017, received in Chinese Patent Application No. 201620470281.1, which corresponds with U.S. Appl. No. 14/866,511, 1 page.
Patent, dated Jan. 23, 2017, received in Danish Patent Application No. 201500576, which corresponds with U.S. Appl. No. 14/866,511, 3 pages.
Notice of Allowance, dated Apr. 27, 2017, received in U.S. Appl. No. 16/866,489, 27 pages.
Notice of Allowance, dated Feb. 28, 2017, received in U.S. Appl. No. 14/869,899, 9 pages.
Office Action, dated Apr. 13, 2017, received in U.S. Appl. No. 14/866,992, 34 pages.
Office Action, dated Feb. 7, 2017, received in Australian Patent Application No. 2016101418, which corresponds with U.S. Appl. No. 14/866,992, 5 pages.
Office Action, dated Feb. 6, 2017, received in Danish Patent Application No. 201500593, which corresponds with U.S. Appl. No. 14/866,992, 4 pages.
Notice of Allowance, dated Jan. 4, 2017, received in U.S. Appl. No. 14/845,217, 5 pages.
Office Action, dated May 2, 2017, received in U.S. Appl. No. 14/856,517, 34 pages.
Office Action, dated Mar. 31, 2017, received in U.S. Appl. No. 14/857,700, 14 pages.
Notice of Allowance, dated Dec. 28, 2016, received in U.S. Appl. No. 14/864,580, 8 pages.
Office Action, dated May 5, 2017, received in Danish Patent Application No. 201500584, which corresponds with U.S. Appl. No. 14/864,580, 3 pages.
Notice of Allowance, dated Apr. 20, 2017, received in U.S. Appl. No. 14/864,601, 13 pages.
Notice of Allowance, dated Jan. 31, 2017, received in U.S. Appl. No. 14/864,627, 7 pages.
Office Action, dated May 4, 2017, received in Danish Patent Application No. 201500585, which corresponds with U.S. Appl. No. 14/864,627, 4 pages.
Certificate of Examination, dated Dec. 8, 2016, received in Australian Patent Application No. 2016100292, which corresponds with U.S. Appl. No. 14/866,361, 1 page.
Patent, dated May 3, 2017, received in Chinese Patent Application No. 2016201470246.X, which corresponds with U.S. Appl. No. 14/866,987, 2 pages.
Patent, dated Sep. 19, 2016, received in German Patent Application No. 202016002908.9, which corresponds with U.S. Appl. No. 14/866,987, 3 pages.
Office Action, dated Jan. 31, 2017, received in Danish Patent Application No. 201670463, which corresponds with U.S. Appl. No. 14/866,987, 3 pages.
Office Action, dated Apr. 19, 2017, received in Danish Patent Application No. 201670463, which corresponds with U.S. Appl. No. 14/866,987, 3 pages.
Notice of Allowance, dated Feb. 28, 2017, received in U.S. Appl. No. 14/871,236, 9 pages.
Office Action, dated Apr. 13, 2017, received in Australian Patent Application No. 2016101431, which corresponds with U.S. Appl. No. 14/871,227, 4 pages.
Office Action, dated Mar. 24, 2017, received in Japanese Patent Application No. 2016-533201, which corresponds with U.S. Appl. No. 14/871,227, 6 pages.
Office Action, dated Apr. 11, 2017, received in Australian Patent Application No. 2016101437, which corresponds with U.S. Appl. No. 14/871,336, 4 pages.
Notice of Allowance, dated Mar. 23, 2017, received in Danish Patent Application No. 201500601, which corresponds with U.S. Appl. No. 14/871,336, 2 pages.
Office Action, dated Mar. 13, 2017, received in Japanese Patent Application No. 2016-183289, which corresponds with U.S. Appl. No. 14/871,462, 5 pages.
Office Action, dated May 11, 2017, received in U.S. Appl. No. 14/867,823, 42 pages.
Office Action, dated May 4, 2017, received in Danish Patent Application No. 201500598, which corresponds with U.S. Appl. No. 14/867,892, 4 pages.
Office Action, dated Mar. 1, 2017, received in U.S. Appl. No. 14/869,855, 14 pages.
Office Action, dated Feb. 9, 2017, received in U.S. Appl. No. 14/869,873, 17 pages.
Office Action, dated May 3, 2017, received in Danish Patent Application No. 201500581, which corresponds with U.S. Appl. No. 14/867,990, 5 pages.
Final Office Action, dated May 1, 2017, received in U.S. Appl. No. 15/136,782, 18 pages.
Office Action, dated Jan. 20, 2017, received in U.S. Appl. No. 15/231,745, 21 pages.
Office Action (Search Report), dated Dec. 14, 2016, received in Danish Patent Application No. 201670590, which corresponds with U.S. Appl. No. 15/231,745, 9 pages.
Office Action, dated Jan. 5, 2017, received in Danish Patent Application No. 201670592, which corresponds with U.S. Appl. No. 15/231,745, 3 pages.
Extended European Search Report, dated Mar. 15, 2017, received in European Patent Application No. 17153418.3, which corresponds with U.S. Appl. No. 14/536,648, 7 pages.
International Search Report and Written Opinion, dated Jan. 12, 2017, received in International Patent No. PCT/US2016/046419, which corresponds with U.S. Appl. No. 14/866,992, 23 pages.
International Search Report and Written Opinion, dated Dec. 15, 2016, received in International Patent Application No. PCT/US2016/046403, which corresponds with U.S. Appl. No. 15/009,661, 17 pages.
International Search Report and Written Opinion, dated Feb. 27, 2017, received in International Patent Application No. PCT/US2016/046407, which corresponds with U.S. Appl. No. 15/009,688, 30 pages.
Extended European Search Report, dated Dec. 21, 2016, received in European Patent Application No. 16189790.5, which corresponds with U.S. Appl. No. 14/871,462, 8 pages.
International Search Report and Written Opinion, dated Jan. 3, 2017, received in International Patent Application No. PCT/US2016/046214, which corresponds with U.S. Appl. No. 15/231,745, 25 pages.
Patent, dated May 12, 2017, received in Japanese Patent Application No. 2015-547948, which corresponds with U.S. Appl. No. 14/536,426, 3 pages.
Office Action, dated May 15, 2017, received in Australian Patent Application No. 2016216580, which corresponds with U.S. Appl. No. 14/536,426, 3 pages.
Patent, dated May 26, 2017, received in European Patent Application No. 13724102.2, which corresponds with U.S. Appl. No. 14/536,646, 1 page.
Notice of Allowance, dated May 12, 2017, received in Japanese Patent Application No. 2015-549393, which corresponds with U.S. Appl. No. 14/608,942, 5 pages.
Office Action, dated May 19, 2017, received in Chinese Patent Application No. 201380068399.0, which corresponds with U.S. Appl. No. 14/608,985, 5 pages.

(56) References Cited

OTHER PUBLICATIONS

Office Action, dated May 15, 2017, received in Japanese Patent Application No. 2016-558331, which corresponds with U.S. Appl. No. 14/864,737, 5 pages.
Office Action, dated May 18, 2017, received in Dutch Patent Application No. 2016452, which corresponds with U.S. Appl. No. 14/864,737, 22 pages.
Office Action, dated May 18, 2017, received in Dutch Patent Application No. 2016801, which corresponds with U.S. Appl. No. 14/863,432, 34 pages.
Office Action, dated May 18, 2017, received in U.S. Appl. No. 14/856,519, 35 pages.
Office Action, dated Apr. 20, 2017, received in Chinese Patent Application No. 201621044346.2, which corresponds with U.S. Appl. No. 14/871,462, 3 pages.
Office Action, dated May 15, 2017, received in Danish Patent Application No. 201500594, which corresponds with U.S. Appl. No. 14/867,823, 4 pages.
Final Office Action, dated Jun. 2, 2017, received in U.S. Appl. No. 15/081,771, 17 pages.
Office Action, dated May 23, 2017, received in Danish Patent Application No. 201770190, which corresponds with U.S. Appl. No. 15/136,782, 7 pages.
Extended European Search Report, dated Jun. 8, 2017, received in European Patent Application No. 16189425.8, which corresponds with U.S. Appl. No. 14/866,989, 8 pages.
Minsky, "Computational Haptics the Sandpaper System for Synthesizing Texture for a Force-Feedback Display," Massachusetts Institute of Technology, Jun. 1978, 217 pages.
Office Action, dated Jul. 15, 2015, received in Australian Patent Application No. 2013259606, which corresponds with U.S. Appl. No. 14/536,426, 3 pages.
Office Action, dated Jul. 17, 2015, received in Australian Patent Application No. 2013259613, which corresponds with U.S. Appl. No. 14/536,646, 5 pages.
Office Action, dated Jul. 9, 2015, received in Australian Patent Application No. 2013259630, which corresponds with U.S. Appl. No. 14/536,203, 3 pages.
International Preliminary Report on Patentability, dated Jun. 30, 2015, received in International Patent Application No. PCT/US2013/069472, which corresponds with U.S. Appl. No. 14/608,895, 18 pages.
International Preliminary Report on Patentability, dated Jun. 30, 2015, received in International Application No. PCT/2013/069483, which corresponds to U.S. Appl. No. 14/608,942, 13 pages.
International Preliminary Report on Patentability, dated Jun. 30, 2015, received in International Patent Application No. PCT/US2013/069484, which corresponds with U.S. Appl. No. 14/608,965, 12 pages.
International Preliminary Report on Patentability, dated Jun. 30, 2015, received in International Patent Application No. PCT/US2013/069486, which corresponds with U.S. Appl. No. 14/608,985, 19 pages.
International Preliminary Report on Patentability, dated Jun. 30, 2015, received in International Patent Application No. PCT/US2013/069489, which corresponds with U.S. Appl. No. 14/609,006, 10 pages.
Bautista, "Microsoft Mathematics Tutorial 7—The Ink Input", <URL:http://mathandmultimedia.com/2012/05/23/microsoft-math-tutorial-7-ink>, May 23, 2012, 3 pages.
Davidson, et al., "Extending 2D Object Arrangement with Pressure-Sensitive Layering Cues", Proceedings of the 21st Annual ACM Symposium on User Interface Software and Technology, Oct. 19, 2008, 4 pages.
Dinwiddie, et al., "Combined-User Interface for Computers, Television, Video Recorders, and Telephone, Etc", ip.com Journal, Aug. 1, 1990, 3 Pages.
Forlines, et al., "Glimpse: a Novel Input Model for Multi-level Devices", Chi '05 Extended Abstracts on Human Factors in Computing Systems, Apr. 2, 2005, 4 pages.
Harrison, "Stylus-Based Interface with Full Mouse Emulation", IBM Technical Disclosure Bulletin, vol. 34, No. 10B, Mar. 1, 1992, 3 pages.
International Preliminary Report on Patentability dated Nov. 20, 2014, received in International Application No. PCT/US2013/040053, which corresponds to U.S. Appl. No. 14/535,671, 26 pages.
International Preliminary Report on Patentability dated Nov. 20, 2014, received in International Application No. PCT/US2013/040054, which corresponds to U.S. Appl. No. 14/536,235, 11 pages.
International Preliminary Report on Patentability dated Nov. 20, 2014, received in International Application No. PCT/US2013/040056, which corresponds to U.S. Appl. No. 14/536,367, 11 pages.
International Preliminary Report on Patentability dated Nov. 20, 2014, received in International Application No. PCT/US2013/040058, which corresponds to U.S. Appl. No. 14/536,426, 11 pages.
International Preliminary Report on Patentability dated Nov. 20, 2014, received in International Application No. PCT/US2013/040061, which corresponds to U.S. Appl. No. 14/536,464, 26 pages.
International Preliminary Report on Patentability dated Nov. 20, 2014, received in International Application No. PCT/US2013/040067, which corresponds to U.S. Appl. No. 14/536,644, 36 pages.
International Preliminary Report on Patentability dated Nov. 20, 2014, received in International Application No. PCT/US2013/040070, which corresponds to U.S. Appl. No. 14/535,646, 10 pages.
International Preliminary Report on Patentability dated Nov. 20, 2014, received in International Application No. PCT/US2013/040072, which corresponds to U.S. Appl. No. 14/536,141, 32 pages.
International Preliminary Report on Patentability dated Nov. 20, 2014, received in International Application No. PCT/2013/040087, which corresponds to U.S. Appl. No. 14/536,166, 29 pages.
International Preliminary Report on Patentability dated Nov. 20, 2014, received in International Application No. PCT/2013040093, which corresponds to U.S. Appl. No. 14,536,203, 9 pages.
International Preliminary Report on Patentability dated Nov. 20, 2014, received in International Application No. PCT/2013/040098, which corresponds to U.S. Appl. No. 14/536,247, 27 pages.
International Preliminary Report on Patentability dated Nov. 20, 2014, received in International Application No. PCT/2013/040101, which corresponds to U.S. Appl. No. 14/536,267, 24 pages.
International Preliminary Report on Patentability dated Nov. 20, 2014, received in International Application No. PCT/2013/040108, which corresponds to U.S. Appl. No. 14/536,291, 25 pages.
International Search Report and Written Opinion dated Aug. 6, 2013, received in International Application No. PCT/US2013/040058, which corresponds to U.S. Appl. No. 14/536,426, 12 pages.
International Search Report and Written Opinion dated Aug. 7, 2013, received in International Application No. PCT/US2013/040054, which corresponds to U.S. Appl. No. 14/536,235, 12 pages.
International Search Report and Written Opinion dated Aug. 7, 2013, received in International Application No. PCT/US2013/040056, which corresponds to U.S. Appl. No. 14/536,367, 12 pages.
International Search Report and Written Opinion dated Aug. 7, 2013, received in International Application No. PCT/US2013/040070, which corresponds to U.S. Appl. No. 14/535,646, 12 pages.
International Search Report and Written Opinion dated Aug. 7, 2013, received in International Application No. PCT/US2013/040093, which corresponds to U.S. Appl. No. 14/536,203, 11 pages.
International Search Report and Written Opinion dated Jan. 8, 2014, received in International Application No. PCT/US2013/040108, 30 pages.
International Search Report and Written Opinion dated Jan. 27, 2014, received in International Application No. PCT/US2013/040101, 30 pages.
International Search Report and Written Opinion dated Feb. 5, 2014, received in International Application No. PCT/US2013/040061, which corresponds to U.S. Appl. No. 14/536,464, 30 pages.
International Search Report and Written Opinion dated Feb. 5, 2014, received in International Application No. PCT/US2013/040098, which corresponds to U.S. Appl. No. 14/536,247, 35 pages.
International Search Report and Written Opinion dated Mar. 3, 2014, received in International Application No. PCT/US2013/040087, which corresponds to U.S. Appl. No. 14/536,166, 35 pages.

(56) References Cited

OTHER PUBLICATIONS

International Search Report and Written Opinion dated Mar. 6, 2014, received in International Application No. PCT/US2013/069489, 12 pages.
International Search Report and Written Opinion dated Mar. 12, 2014, received in International Application No. PCT/US2013/069479, 14 pages.
International Search Report and Written Opinion dated Apr. 7, 2014, received in International Application No. PCT/US2013/040072, which corresponds to U.S. Appl. No. 14/536,141, 38 pages.
International Search Report and Written Opinion dated Apr. 7, 2014, received in International Application No. PCT/US2013/069483, 18 pages.
International Search Report and Written Opinion dated May 8, 2014, received in International Application.No. PCT/US2013/040067, which corresponds to U.S. Appl. No. 14/536,644, 45 pages.
International Search Report and Written Opinion dated Apr. 7, 2014, received in International Application No. PCT/US2013/069472, 24 pages.
International Search Report and Written Opinion dated May 26, 2014, received in International Application No. PCT/US2013/040053, which corresponds to U.S. Appl. No. 14/535,671, 32 pages.
International Search Report and Written Opinion dated Jun. 2, 2014, received in International Application No. PCT/US2013/069486, 7 pages.
International Search Report and Written Opinion dated Jul. 9, 2014, received in International Application No. PCT/US2013/069484, 17 pages.
International Search Report and Written Opinion dated Sep. 30, 2014, received in International Application No. PCT/US2014/047303, 10 pages.
Invitation to Pay Additional Fees dated Aug. 7, 2013, received in International Application No. PCT/US2013/040101, which corresponds to U.S. Appl. No. 14/536,267, 7 pages.
Invitation to Pay Additional Fees dated Aug. 7, 2013, received in International Application No. PCT/US2013/040108, which corresponds to U.S. Appl. No. 14/536,291, 6 pages.
Invitation to Pay Additional Fees dated Sep. 25, 2013, received in International Application No. PCT/US2013/040061, which corresponds to U.S. Appl. No. 14/536,464, 6 pages.
Invitation to Pay Additional Fees dated Sep. 25, 2013, received in International Application No. PCT/US2013/040098, which corresponds to U.S. Appl. No. 14/536,247, 8 pages.
Invitation to Pay Additional Fees dated Oct. 8, 2013, received in International Application No. PCT/US2013/040067, which corresponds to U.S. Appl. No. 14/536,644, 8 pages.
Invitation to Pay Additional Fees dated Oct. 28, 2013, received in International Application No. PCT/US2013/040072, which corresponds to U.S. Appl. No. 14/536,141, 7 pages.
Invitation to Pay Additional Fees dated Oct. 28, 2013, received in International Application No. PCT/US2013/040087, which corresponds to U.S. Appl. No. 14/536,166, 8 pages.
Invitation to Pay Additional Fees dated Feb. 10, 2014, received in International Application No. PCT/US2013/069472, 6 pages.
Invitation to Pay Additional Fees dated Feb. 14, 2014, received in International Application No. PCT/US2013/069483, 7 pages.
Invitation to Pay Additional Fees dated Apr. 1, 2014, received in International Application No. PCT/US2013/069486, 7 pages.
Invitation to Pay Additional Fees dated Apr. 17, 2014, received in International Application No. PCT/US2013/069484, 7 pages.
Kaaresoja, et al., "Snap-Crackle-Pop: Tactile Feedback for Mobile Touch Screens", Proceedings of Eurohaptics vol. 2006, Jul. 3, 2006, 2 pages.
O'Hara, et al., "Pressure-Sensitive Icons", ip.com Journal, Jun. 1, 1990, 2 Pages.
Quinn, et al., "Zoofing! Faster List Selections with Pressure-Zoom-Flick-Scrolling", Proceedings of the 21st Annual Conference of the Australian Computer-Human Interaction Special Interest Group on Design, Nov. 23, 2009, ACM Press, vol. 411, 8 pages.
Rekimoto, et al., "PreSense: Interaction Techniques for Finger Sensing Input Devices", Proceedings of the 16th Annual ACM Symposium on User Interface Software and Technology, Nov. 30, 2003, 10 pages.
Rekimoto, et al., "PreSensell: Bi-directional Touch and Pressure Sensing Interactions with Tactile Feedback", Conference on Human Factors in Computing Systems Archive, ACM, Apr. 22, 2006, 6 pages.
Song, et al., "Grips and Gestures on a Multi-Touch Pen," The ACM CHI Conference on Human Factors in Computing Systems, <URL:research.microsoft.com/pubs/.../gripsandgenstures%20mtpenchi201>, May 7-12, 2011,10 pages.
Anonymous, "Nokia 808 PureView screenshots", retrieved from Internet; no URL, Nov. 12, 2012, 8 pages.
Anonymous, "Nokia 808 PureView User Guide," http://download-fds.webapps.microsoft.com/supportFiles/phones/files/pdf_guides/devices/808/Nokia_808_UG_en_APAC.pdf, Jan. 1, 2012, 144 pages.
Bolluyt, "5 Apple Watch Revelations from Apple's New WatchKit", http://www.cheatsheet.com/tecnology/5-apple-watch-revelations-from-apples-new-watchkit.html/?a=viewall, Nov. 22, 2014, 3 pages.
Farshad, "SageThumbs—Preview and Convert Pictures From Windows Context Menu", https://web.addictivetips.com/windows-tips/sagethumbs-preview-and-convert-photos-from-windows-context-menu, Aug. 8, 2011, 5 pages.
Flaherty, "Is Apple Watch's Pressure-Sensitive Screen a Bigger Deal Than the Gadget Itself?", http://www.wired.com/2014/09/apple-watchs-pressure-sensitive-screen-bigger-deal-gadget, Sep. 15, 2014, 3 pages.
Gardner, "Recenz—Recent Apps in One Tap", You Tube, https://www.youtube.com/watch?v-qailSHRgsTo, May 15, 2015, 1 page.
iPodHacks 142: "Water Ripple Effects on the Home and Lock Screen: AquaBoard Cydia Tweak Review", YouTube, https://www.youtube.comwatch?v-Auu_uRaYHJs, Sep. 24, 2012, 3 pages.
Kiener, "Force Touch on iPhone", https://www.youtube.com/watch?v=CEMmnsU5fC8, Aug. 4, 2015, 4 pages.
Kumar, "How to Enable Ripple Effect on Lock Screen of Galaxy S2", YouTube, http, http://www.youtube.com/watch?v+B9-4M5abLXA, Feb. 12, 2013, 3 pages.
Matthew, "How to Preview Photos and Images From Right-Click Context Menue in Windows [Tip]", https://dottech.org/159009/add-image-preview-in-windows-context-menu-tip, Jul. 4, 2014, 5 pages.
Mitroff, "Google Android 5.0 Lollipop," http://www.cnet.com/products/google-android-5-0-lollipop, Mar. 12, 2015, 5 pages.
Mohr, "Do Not Disturb—The iPhone Feature You Should Be Using", http.www.wonderoftech.com/do-not-disturb-iphone, Jul. 14, 2014, 30 pages.
Nacca, "NiLS Lock Screen Notifications / Floating Panel—Review", https://www.youtube.com/watch?v=McT4QnS9TDY, Feb. 3, 2014, 4 pages.
Phonebuff, "How to Pair Bluetooth on the iPhone", https://www.youtube.com/watch?v=LudNwEar9A8, Feb. 8, 2012, 3 pages.
VGJFeliz, "How to Master Android Lollipop Notifications in Four Minutes!", https://www.youtube.com/watch?v=S-zBRG7GJgs, Feb. 8, 2015, 5 pages.
Office Action, dated Oct. 18, 2016, received in Australian Patent Application No. 2013368440, which corresponds with U.S. Appl. No. 14/536,426, 3 pages.
Office Action, dated Sep. 13, 2016, received in Japanese Patent Application No. 2015-547948, which corresponds with U.S. Appl. No. 14/536,426, 5 pages.
Certificate of Grant, dated Sep. 15, 2016, received in Australian Patent Australian Patent Application No. 2013259606, which corresponds with U.S. Appl. No. 14/536,426, 1 page.
Office Action, dated Nov. 11, 2016, received in European Patent Application No. 13795392.3, which corresponds with U.S. Appl. No. 14/608,926, 6 pages.
Office Action, dated Aug. 31, 2016, received in European Patent Application No. 13726053.5, which corresponds with U.S. Appl. No. 14/536,141, 10 pages.
Office Action, dated Oct. 25, 2016, received in Japanese Patent Application No. 2015-511646, which corresponds with U.S. Appl. No. 14/536,141, 6 pages.

(56) References Cited

OTHER PUBLICATIONS

Certificate of Grant, dated Oct. 21, 2016, received in Australian Patent Application No. 2013259630, which corresponds with U.S. Appl. No. 14/536,203, 3 pages.
Certificate of Patent, dated Sep. 9, 2016, received in Japanese Patent Application No. 2015-511650, which corresponds with U.S. Appl. No. 14/536,203, 3 pages.
Notice of Allowance, dated Sep. 1, 2016, received in Korean Patent Application No. 2014-7034520, which corresponds with U.S. Appl. No. 14/536,203, 5 pages.
Office Action, dated Oct. 20, 2016, received in U.S. Appl. No. 14/536,247, 10 pages.
Certificate of Grant, dated Oct. 21, 2016, received in Australian Patent Application No. 2013259637, which corresponds with U.S. Appl. No. 14/536,267, 3 pages.
Notice of Allowance, dated Sep. 26, 2016, received in Japanese Patent Application No. 2015-511652, which corresponds with U.S. Appl. No. 14/536,267, 5 pages.
Notice of Allowance, dated Sep. 1, 2016, received in Korean Patent Application No. 2014-7034530, which corresponds with U.S. Appl. No. 14/536,267, 3 pages.
Office Action, dated Sep. 29, 2016, received in Australian Patent Application No. 2016101481, which corresponds with U.S. Appl. No. 14/536,291, 3 pages.
Office Action, dated Nov. 4, 2016, received in Korean Patent Application No. 10-2015-7019984, which corresponds with U.S. Appl. No. 14/608,985, 8 pages.
Notice of Allowance, dated Oct. 24, 2016, received in U.S. Appl. No. 14/866,981, 7 pages.
Patent, dated Nov. 2, 2016, received in Australian Patent Application No. 2016100254, which corresponds with U.S. Appl. No. 14/866,981, 1 page.
Patent, dated Sep. 28, 2016, received in Chinese Patent Application No. 201620176169.7, which corresponds with U.S. Appl. No. 14/866,981, 4 pages.
Office Action, dated Jul. 5, 2016, received in Chinese Patent Application No. 201620186008.6, which corresponds with U.S. Appl. No. 14/866,159, 3 pages.
Office Action, dated Sep. 27, 2016, received in Danish Patent Application No. 201500574, which corresponds with U.S. Appl. No. 14/866,159, 4 pages.
Office Action, dated Oct. 12, 2016, received in Australian Patent Application No. 2016101201, which corresponds with U.S. Appl. No. 14/686,078, 3 pages.
Notice of Allowance, dated Oct. 1, 2016, received in Chinese Patent Application No. 201620175847.8, which corresponds with U.S. Appl. No. 14/686,078, 1 page.
Office Action, dated Sep. 2, 2016, received in Australian Patent Application No. 201500588, which corresponds with U.S. Appl. No. 14/868,078, 4 pages.
Notice of Allowance, dated Nov. 14, 2016, received in U.S. Appl. No. 14/863,432, 7 pages.
Office Action and Additional Search Report, dated Oct. 7, 2016, received in Danish Patent Application No. 201500582, which corresponds with U.S. Appl. No. 14/863,432, 6 pages.
Office Action, dated Oct. 13, 2016, received in U.S. Appl. No. 14/866,511, 27 pages.
Final Office Action, dated Sep. 16, 2016, received in U.S. Appl. No. 14/866,489, 24 pages.
Final Office Action, dated Sep. 2, 2016, received in U.S. Appl. No. 14/869,899, 22 pages.
Innovation (Unexamined) Patent, dated Aug. 25, 2016, received in Australian Patent Application No. 2016101438, which corresponds with U.S. Appl. No. 14/869,899, 1 page.
Certificate of Examination, dated Oct. 11, 2016, received in Australian Patent Application No. 2016101438, which corresponds with U.S. Appl. No. 14/869,899, 1 page.
Office Action, dated Oct. 7, 2016, received in Danish Patent Application No. 201500592, which corresponds with U.S. Appl. No. 14/869,899, 6 pages.
Office Action, dated Nov. 22, 2016, received in Danish Patent Application No. 201670594, which corresponds with U.S. Appl. No. 14/869,899, 9 pages.
Innovation Patent, dated Sep. 22, 2016, received in Australian Patent Application No. 2016101418, which corresponds with U.S. Appl. No. 14/866,992, 1 page.
Office Action, dated Nov. 22, 2016, received in Australian Patent Application No. 2016101418, which corresponds with U.S. Appl. No. 14/866,992, 7 pages.
Notice of Allowance, dated Oct. 24, 2016, received in U.S. Appl. No. 14/857,645, 6 pages.
Notice of Allowance, dated Nov. 8, 2016, received in Chinese Patent Application No. 201620470247.4, which corresponds with U.S. Appl. No. 14/864,580, 3 pages.
Certificate of Registration, dated Oct. 14, 2016, received in German Patent Application No. 20201600003234.9, which corresponds with U.S. Appl. No. 14/864,580, 3 pages.
Office Action, dated Oct. 7, 2016, received in Danish Patent Application No. 201500584, which corresponds with U.S. Appl. No. 14/864,580, 3 pages.
Notice of Allowance, dated Nov. 23, 2016, received in U.S. Appl. No. 14/864,601, 12 pages.
Office Action, dated Oct. 7, 2016, received in Danish Patent Application No. 201500585, which corresponds with U.S. Appl. No. 14/864,627, 3 pages.
Office Action, dated Oct. 28, 2016, received in Danish Patent Application No. 201500579, which corresponds with U.S. Appl. No. 14/866,361, 3 pages.
Office Action, dated Oct. 19, 2016, received in Chinese Patent Application No. 2016201470246.X, which corresponds with U.S. Appl. No. 14/866,987, 4 pages.
Notice of Allowance, dated Nov. 1, 2016, received in Danish Patent Application No. 201500587, which corresponds with U.S. Appl. No. 14/866,987, 2 pages.
Office Action and Search Report, dated Sep. 9, 2016, received in Danish Patent Application No. 201670463, which corresponds with U.S. Appl. No. 14/866,987, 7 pages.
Notice of Allowance, dated Nov. 1, 2016, received in Danish Patent Application No. 201500589, which corresponds with U.S. Appl. No. 14/866,989, 2 pages.
Final Office Action, dated Nov. 4, 2016, received in U.S. Appl. No. 14/871,236, 24 pages.
Innovation (Unexamined) Patent, dated Aug. 25, 2016, received in Australian Patent Application No. 2016101433, which corresponds with U.S. Appl. No. 14/871,236, 1 page.
Office Action, dated Oct. 14, 2016, received in Australian Patent Application No. 2016101433, which corresponds with U.S. Appl. No. 14/871,236, 3 pages.
Office Action and Additional Search Report, dated Sep. 30, 2016, received in Danish Patent Application No. 201500595, which corresponds with U.S. Appl. No. 14/871,236, 10 pages.
Innovation (Unexamined) Patent, dated Aug. 25, 2016, received in Australian Patent Application No. 2016101436, which corresponds with U.S. Appl. No. 14/871,236, 1 pages.
Office Action, dated Oct. 31, 2016, received in Australian Patent Application No. 2016101438, which corresponds with U.S. Appl. No. 14/871,236, 6 pages.
Office Action, dated Oct. 17, 2016, received in Australian Patent Application No. 2016203040, which corresponds with U.S. Appl. No. 14/871,227, 7 pages.
Office Action, dated Oct. 18, 2016, received in Australian Patent Application No. 2016101431, which corresponds with U.S. Appl. No. 14/871,227, 3 pages.
Patent, dated Sep. 26, 2016, received in Danish Patent Application No. 201500597, which corresponds with U.S. Appl. No. 14/871,227, 7 pages.
Office Action, dated Oct. 14, 2016, received in Australian Patent Application No. 2016101437, which corresponds with U.S. Appl. No. 14/871,336, 2 pages.
Office Action, dated Oct. 18, 2016, received in Australian Patent Application No. 201500601, which corresponds with U.S. Appl. No. 14/871,336, 3 pages.

(56) References Cited

OTHER PUBLICATIONS

Innovation Patent, dated Aug. 25, 2016, received in Australian Patent Application No. 2016101435, which corresponds with U.S. Appl. No. 14/871,462, 1 page.
Office Action, dated Oct. 4, 2016, received in Australian Patent Application No. 2016101435, which corresponds with U.S. Appl. No. 14/871,462, 3 pages.
Office Action, dated Oct. 4, 2016, received in Australian Patent Application No. 2016231505, which corresponds with U.S. Appl. No. 14/871,462, 3 pages.
Grant, dated Aug. 30, 2016, received in Danish Patent Application No. 201500600, which corresponds with U.S. Appl. No. 14/871,462, 2 pages.
Final Office Action, dated Sep. 28, 2016, received in U.S. Appl. No. 14/867,823, 31 pages.
Office Action, dated Sep. 7, 2016, received in Danish Patent Application No. 201500594, which corresponds with U.S. Appl. No. 14/867,823, 4 pages.
Final Office Action, dated Nov. 2, 2016, received in U.S. Appl. No. 14/867,892, 48 pages.
Office Action, Sep. 14, 2016, received in Danish Patent Application No. 201500598, which corresponds with U.S. Appl. No. 14/867,892, 4 pages.
Office Action, dated Jul. 5, 2016, received in Chinese Patent Application No. 201620176221.9, which corresponds with U.S. Appl. No. 14/867,990, 4 pages.
Office Action, dated Oct. 25, 2016, received in Chinese Patent Application No. 201620176221.9, which corresponds with U.S. Appl. No. 14/867,990, 7 pages.
Office Action, dated Sep. 26, 2016, received in Danish Patent Application No. 201500581, which corresponds with U.S. Appl. No. 14/867,990, 5 pages.
Office Action, dated Nov. 25, 2016, received in U.S. Appl. No. 15/081,771, 17 pages.
Office Action and Search Report, dated Oct. 17, 2016, received in Danish Patent Application No. 201670587, which corresponds with U.S. Appl. No. 15/231,745, 9 pages.
Office Action and Search Report, dated Oct. 12, 2016, received in Danish Patent Application No. 201670593, which corresponds with U.S. Appl. No. 15/231,745, 7 pages.
Office Action (Search Report), dated Nov. 10, 2016, received in Danish Patent Application No. 201670591, which corresponds with U.S. Appl. No. 15/231,745, 12 pages.
Office Action and Search Report, dated Oct. 26, 2016, received in Danish Patent Application No. 201670592, which corresponds with U.S. Appl. No. 15/231,745, 8 pages.
Extended European Search Report, dated Oct. 7, 2016, received in European Patent Application No. 16177863.4, which corresponds with U.S. Appl. No. 14/536,267, 12 pages.
International Search Report and Written Opinion, dated Oct. 14, 2016, received in International Patent Application No. PCT/US2016/020697, which corresponds with U.S. Appl. No. 14/866,981, 21 pages.
International Search Report and Written Opinion, dated Oct. 31, 2016, received in International Patent Application No. PCT/US2016/033578, which corresponds with U.S. Appl. No. 14/863,432, 36 pages.
International Search Report and Written Opinion, dated Nov. 14, 2016, received in International Patent Application No. PCT/US2016/033541, which corresponds with U.S. Appl. No. 14/866,511, 29 pages.
International Search Report and Written Opinion, dated Aug. 29, 2016, received in International Patent Application No. PCT/US2016/021400, which corresponds with U.S. Appl. No. 14/869,899, 48 pages.
Brownlee, "Android 5.0 Lollipop Feature Review!", https//www.youtube.com/watch?v=pEDQ1z1-PvU, Oct. 27, 2014, 5 pages.
Google-Chrome, "Android 5.0 Lollipop", http://androidlover.net/android-os/android-5-0-lollipop/android-5-0-lollipop-recent-apps-card-google-search.html, Oct. 19, 2014, 10 pages.
YouTube, "How to Master Android Lollipop Notifications in Four Minutes!", Video Gadgets Journal (VGJFelix), https://www.youtube.com/watch?v=S-zBRG7GGJgs, Feb. 8, 2015, 4 pages.
Office Action, dated Jun. 29, 2017, received in U.S. Appl. No. 14/608,895, 30 pages.
Patent, dated May 26, 2017, received in Korean Patent Application No. 2015-7018851, which corresponds with U.S. Appl. No. 14/536,426, 3 pages.
Office action, dated Aug. 3, 2017, received in U.S. Appl. No. 14/536,426, 10 pages.
Office Action, dated Jul. 4, 2017, received in European Patent Application No. 13795392.3, which corresponds with U.S. Appl. No. 14/608,926, 4 pages.
Patent, dated Jun. 30, 2017, received in Korean Patent Application No. 2015-7018853, which corresponds with U.S. Appl. No. 14/608,926, 3 pages.
Office Action, dated Jul. 21, 2017, received in Australian Patent Application No. 2016262773, which corresponds with U.S. Appl. No. 14/536,141, 3 pages.
Notice of Allowance, dated Jun. 30, 2017, received in Japanese Patent Application No. 2015-511646, which corresponds with U.S. Appl. No. 14/536,141, 5 pages.
Office Action, dated Jun. 16, 2017, received in Chinese Patent Application No. 201380068295.X, which corresponds with U.S. Appl. No. 14/608,942, 6 pages.
Patent, dated Jun. 16, 2017, received in Japanese Patent Application No. 2015-549393, which corresponds with U.S. Appl. No. 14/608,942, 3 pages.
Office Action, dated Jul. 17, 2017, received in U.S. Appl. No. 14/536,166, 19 pages.
Office Action, dated Jul. 4, 2017, received in Australian Patent Application No. 2016238917, which corresponds with U.S. Appl. No. 14/536,203, 5 pages.
Office Action, dated Jun. 23, 2017, received in Japanese Patent Application No. 2016173113, which corresponds with U.S. Appl. No. 14/536,203, 5 pages.
Office Action, dated Jul. 21, 2017, received in Australian Patent Application No. 2016216658, which corresponds with U.S. Appl. No. 14/536,291, 3 pages.
Patent, dated May 18, 2017, received in Australian Patent Application No. 2013368445, which corresponds with U.S. Appl. No. 14/608,985, 1 page.
Office Action, dated Jul. 21, 2017, received in Australian Patent Application No. 2016247194, which corresponds with U.S. Appl. No. 14/536,648, 3 pages.
Notice of Allowance, dated Jul. 10, 2017, received in U.S. Appl. No. 14/609,042, 8 pages.
Notice of Allowance, dated Jun. 19, 2017, received in U.S. Appl. No. 14/864,737, 8 pages.
Notice of Allowance, dated Jun. 23, 2017, received in Japanese Patent Application No. 2016-558331, which corresponds with U.S. Appl. No. 14/864,737, 5 pages.
Office Action, dated Jul. 7, 2017, received in Danish Patent Application No. 201500575, 4 pages.
Office Action, dated Jul. 6, 2017, received in Danish Patent Application No. 201500574, which corresponds with U.S. Appl. No. 14/866,159, 3 pages.
Office Action, dated Jun. 12, 2017, received in Danish Patent Application No. 201500582, which corresponds with U.S. Appl. No. 14/863,432, 5 pages.
Grant, dated Jul. 21, 2016, received in Dutch Patent Application No. 2016801, which corresponds with U.S. Appl. No. 14/871,227, 8 pages.
Office Action, dated Jun. 9, 2017, received in Japanese Patent Application No. 2016558214, which corresponds with U.S. Appl. No. 14/866,511, 6 pages.
Notice of Allowance, dated Jul. 14, 2017, received in Japanese Patent Application No. 2016558214, which corresponds with U.S. Appl. No. 14/866,511, 5 pages.
Notice of Allowance, dated Jul. 6, 2017, received in U.S. Appl. No. 14/866,489, 12 pages.

(56) References Cited

OTHER PUBLICATIONS

Office Action, dated Jul. 3, 2017, received in Danish Patent Application No. 201500592, which corresponds with U.S. Appl. No. 14/869,899, 5 pages.
Office Action, dated Jun. 9, 2017, received in U.S. Appl. No. 14/856,520, 36 pages.
Office Action, dated Jun. 30, 2017, received in U.S. Appl. No. 14/856,522, 22 pages.
Notice of Allowance, dated Jun. 16, 2017, received in in U.S. Appl. No. 14/857,645, 5 pages.
Office Action, dated Jun. 15, 2017, received in Danish Patent Application No. 201500579, which corresponds with U.S. Appl. No. 14/866,361, 2 pages.
Office Action, dated Jul. 31, 2017, received in Japanese Patent Application No. 2017126445, which corresponds with U.S. Appl. No. 14/866,987, 6 pages.
Office Action, dated Jun. 16, 2017, received in Japanese Patent Application No. 2016-233450, which corresponds with U.S. Appl. No. 14/866,989, 6 pages.
Office Action, dated Jun. 15, 2017, received in Danish Patent Application No. 201500595, which corresponds with U.S. Appl. No. 14/871,236, 4 pages.
Office Action, dated Aug. 4, 2017, received in Japanese Patent Application No. 2016-533201, which corresponds with U.S. Appl. No. 14/871,227, 6 pages.
Office Action, dated Jul. 6, 2017, received in U.S. Appl. No. 14/867,892, 55 pages.
Office Action, dated Jun. 29, 2017, received in Danish Patent Application No. 201670587, which corresponds with U.S. Appl. No. 15/231,745, 4 pages.
Office Action, dated Jul. 6, 2017, received in Danish Patent Application No. 201670590, which corresponds with U.S. Appl. No. 15/231,745, 3 pages.
Office Action, dated Jul. 27, 2017, received in Australian Patent Application No. 2017100535, which corresponds with U.S. Appl. No. 15/272,341, 4 pages.
Office Action, dated Aug. 4, 2017, received in Danish Patent Application No. 201770377, 9 pages.
Search Report, dated Jun. 22, 2017, received in Dutch Patent Application No. 2016375, which corresponds with U.S. Appl. No. 14/866,981, 17 pages.
Search Report, dated Jun. 19, 2017, received in Dutch Patent Application No. 2016377, which corresponds with U.S. Appl. No. 14/866,159, 13 pages.
Extended European Search Report, dated Jun. 22, 2017, received in European Patent Application No. 16189421.7, which corresponds with U.S. Appl. No. 14/866,987, 7 pages.
Extended European Search Report, dated Jul. 25, 2017, received in European Patent Application No. 17171972.7, which corresponds with U.S. Appl. No. 14/870,882, 12 pages.
Extended European Search Report, dated Jul. 25, 2017, received in European Patent Application No. 17172266.3, which corresponds with U.S. Appl. No. 14/871,336, 9 pages.
Kurdi, "XnView Shell Extension: A Powerful Image Utility Inside the Context Menu", http://www.freewaregenius.com/xnview-shell-extension-a-powerful-image-utility-inside-the-context-menu, Jul. 30, 2008, 4 pages.
MacKenzie et al., "The Tactile Touchpad", Chi '97 Extended Abstracts on Human Factors in Computing Systems Looking to the Future, Chi '97, Mar. 22, 1997, 5 pages.
VisioGuy, "Getting a Handle on Selecting and Subselecting Visio Shapes", http://www.visguy.com/2009/10/13/getting-a-handle-on-selecting-and-subselecting-visio-shapes/, Oct. 13, 2009, 18 pages.
YouTube, "HTC One Favorite Camera Features", http://www.youtube.com/watch?v=sUYHfcjl4RU, Apr. 28, 2013, 3 pages.
Office Action, dated Nov. 30, 2017, received in U.S. Appl. No. 14/535,671, 21 pages.
Office Action, dated Dec. 18, 2015, received in Australian Patent Application No. 2013368440, which corresponds with U.S. Appl. No. 14/536,426, 3 pages.
Office Action, dated Nov. 6, 2017, received in Chinese Patent Application No. 201380068493.6, which corresponds with U.S. Appl. No. 14/608,895, 5 pages.
Notice of Allowance, dated Nov. 30, 2017, received in U.S. Appl. No. 14/536,367, 9 pages.
Office Action, dated Aug. 21, 2017, received in European Patent Application No. 15183980.0, which corresponds with U.S. Appl. No. 14/536,426, 3 pages.
Certificate of Grant, dated Nov. 10, 2017, received in Hong Kong Patent Application No. 15107535.0, which corresponds with U.S. Appl. No. 14/536,426, 2 pages.
Notice of Allowance, dated Dec. 8, 2017, received in Japanese Patent Application No. 2015-511644, which corresponds with U.S. Appl. No. 14/536,426, 6 pages.
Patent, dated Jan. 12, 2018, received in Japanese Patent Application No. 2015-511644, which corresponds with U.S. Appl. No. 14/536,426, 3 pages.
Office Action, dated Oct. 19, 2017, received in U.S. Appl. No. 14/608,926, 14 pages.
Notice of Acceptance, dated Dec. 20, 2017, received in Australian Patent Application No. 2016201451, which corresponds with U.S. Appl. No. 14/608,926, 3 pages.
Notice of Allowance, dated Dec. 29, 2017, received in Korean Patent Application No. 2017-7018250, which corresponds with U.S. Appl. No. 14/608,926, 3 pages.
Notice of Allowance, dated Oct. 9, 2017, received in Chinese Patent Application No. 2013800362059, which corresponds with U.S. Appl. No. 14/536,646, 3 pages.
Office Action, dated Oct. 19, 2017, received in U.S. Appl. No. 14/536,646, 21 pages.
Office Action, dated Dec. 8, 2016, received in U.S. Appl. No. 14/608,942, 9 pages.
Office Action, dated Oct. 25, 2017, received in Chinese Patent Application No. 201380035977.0, which corresponds with U.S. Appl. No. 14/536,203, 5 pages.
Office Action, dated Dec. 6, 2017, received in European Patent Application No. 13724104.8, which corresponds with U.S. Appl. No. 14/536,203, 9 pages.
Notice of Allowance, dated Jan. 12, 2018, received in Japanese Patent Application No. 2016173113, which corresponds with U.S. Appl. No. 14/536,203, 5 pages.
Notice of Allowance, dated Oct. 30, 2017, received in Korean Patent Application No. 2016-7033834, which corresponds with U.S. Appl. No. 14/536,203, 5 pages.
Patent, dated Jan. 23, 2018, received in Korean Patent Application No. 2016-7033834, which corresponds with U.S. Appl. No. 14/536,203, 4 pages.
Office Action, dated Oct. 20, 2017, received in U.S. Appl. No. 14/608,965, 14 pages.
Office action, dated Oct. 11, 2017, received in Chinese Patent Application No. 201380074060.1, which corresponds with U.S. Appl. No. 14/608,965, 5 pages.
Notice of Allowance, dated Nov. 22, 2017, received in U.S. Appl. No. 14/536,247, 6 pages.
Notice of Allowance, dated Nov. 9, 2017, received in U.S. Appl. No. 14/536,267, 8 pages.
Office Action, dated Jan. 25, 2018, received in European Patent Application No. 13724106.3, which corresponds with U.S. Appl. No. 14/536,267, 5 pages.
Notice of Allowance, dated Nov. 17, 2017, received in Japanese Patent Application No. 2016-125839, which corresponds with U.S. Appl. No. 14/536,267, 5 pages.
Patent, dated Dec. 1, 2017, received in Korean Patent Application No. 2016-7029533, which corresponds with U.S. Appl. No. 14/536,267, 2 pages.
Notice of Allowance, dated Dec. 1, 2017, received in U.S. Appl. No. 14/536,291, 19 pages.
Innovation Patent, dated Sep. 1, 2016, received in Australian Patent Application No. 2016101481, which corresponds with U.S. Appl. No. 14/536,291, 1 page.
Office Action, dated Oct. 23, 2017, received in Chinese Patent Application No. 201380035986.X, which corresponds with U.S. Appl. No. 14/536,291, 9 pages.

(56) References Cited

OTHER PUBLICATIONS

Patent, dated Dec. 8, 2017, received in Chinese Patent Application No. 201380068399.0, which corresponds with U.S. Appl. No. 14/608,985, 4 pages.
Summons, dated Oct. 6, 2017, received in European Patent Application No. 13811032.5, which corresponds with U.S. Appl. No. 14/608,985, 6 pages.
Patent, dated Dec. 19, 2017, received in Korean Patent Application No. 2015-7019984, which corresponds with U.S. Appl. No. 14/608,985, 3 pages.
Final Office Action, dated Nov. 2, 2017, received in U.S. Appl. No. 14/536,296, 13 pages.
Office Action, dated Nov. 1, 2017, received in U.S. Appl. No. 14/536,648, 22 pages.
Office Action, dated Dec. 15, 2017, received in U.S. Appl. No. 14/866,159, 35 pages.
Office Action, dated Jan. 10, 2018, received in Danish Patent Application No. 201500574, which corresponds with U.S. Appl. No. 14/866,159, 2 pages.
Office Action, dated Oct. 6, 2017, received in U.S. Appl. No. 14/868,078, 40 pages.
Certificate of Grant, dated Jan. 3, 2018, received in Australian Patent Application No. 2016229421, which corresponds with U.S. Appl. No. 14/868,078, 1 page.
Office Action, dated Nov. 24, 2017, received in European Patent Application No. 16727900.9, which corresponds with U.S. Appl. No. 14/866,511, 5 pages.
Office Action, dated Dec. 14, 2017, received in Danish Patent Application No. 201670594, which corresponds with U.S. Appl. No. 14/869,899, 3 pages.
Office Action, dated Jan. 29, 2018, received in U.S. Appl. No. 14/866,992, 44 pages.
Office Action, dated Jan. 19, 2018, received in Australian Patent Application No. 201761478, which corresponds with U.S. Appl. No. 14/866,992, 6 pages.
Office Action, dated Jan. 18, 2018, received in U.S. Appl. No. 15/009,676, 21 Pages.
Final Office Action, dated Nov. 15, 2017, received in U.S. Appl. No. 14/856,519, 31 pages.
Notice of Allowance, dated Jan. 31, 2018, received in U.S. Appl. No. 14/856,519, 9 pages.
Office Action, dated Nov. 30, 2017, received in U.S. Appl. No. 14/857,636, 19 pages.
Office Action, dated Jan. 17, 2018, received in Australian Patent Application No. 2017202816, which corresponds with U.S. Appl. No. 14/857,636, 3 pages.
Office Action, dated Dec. 1, 2017, received in U.S. Appl. No. 14/857,663, 15 pages.
Final Office Action, dated Oct. 11, 2017, received in U.S. Appl. No. 14/857,700, 13 pages.
Office Action, dated Dec. 15, 2017, received in Danish Patent Application No. 201500584, which corresponds with U.S. Appl. No. 14/864,580, 4 pages.
Office Action, dated Dec. 15, 2017, received in Danish Patent Application No. 201500585, which corresponds with U.S. Appl. No. 14/864,627, 5 pages.
Office Action, dated Jan. 4, 2018, received in Danish Patent Application No. 201500579, which corresponds with U.S. Appl. No. 14/866,361, 2 pages.
Office Action, dated Jan. 22, 2018, received in U.S. Appl. No. 14/866,987, 22 pages.
Patent, dated Nov. 6, 2017, received in Danish Patent Application No. 201670463, which corresponds with U.S. Appl. No. 14/866,987, 6 pages.
Patent, dated Oct. 27, 2017, received in Japanese Patent Application No. 2016-233449, which corresponds with U.S. Appl. No. 14/866,987, 3 pages.
Office Action, dated Nov. 29, 2017, received in U.S. Appl. No. 14/866,989, 31 pages.
Office Action, dated Nov. 14, 2017, received in U.S. Appl. No. 14/870,882, 25 pages.
Notice of Allowance, dated Oct. 31, 2017, received in Danish Patent Application No. 201500596, which corresponds with U.S. Appl. No. 14/870,882, 2 pages.
Office Action, dated Nov. 22, 2017, received in U.S. Appl. No. 14/871,227, 24 pages.
Office Action, dated Oct. 16, 2017, received in Australian Patent Application No. 2016203040, which corresponds with U.S. Appl. No. 14/871,227, 5 pages.
Notice of Allowance, dated Jan. 4, 2018, received in Japanese Patent Application No. 2016-533201, which corresponds with U.S. Appl. No. 14/871,227, 4 pages.
Office Action, dated Oct. 26, 2017, received in U.S. Appl. No. 14/871,336, 22 pages.
Office Action, dated Oct. 16, 2017, received in U.S. Appl. No. 14/871,462, 26 pages.
Innovation Patent, dated Oct. 11, 2017, received in Australian Patent Application No. 2016231505, which corresponds with U.S. Appl. No. 14/871,462, 1 page.
Office Action, dated Nov. 13, 2017, received in Japanese Patent Application No. 2016-183289, which corresponds with U.S. Appl. No. 14/871,462, 5 pages.
Final Office Action, dated Nov. 29, 2017, received in U.S. Appl. No. 14/867,823, 47 pages.
Office Action, dated Jan. 23, 2018, received in Danish Patent Application No. 201500594, which corresponds with U.S. Appl. No. 14/867,823, 8 pages.
Final Office Action, dated Dec. 14, 2017, received in U.S. Appl. No. 14/867,892, 53 pages.
Office Action, dated Oct. 31, 2017, received in Danish Patent Application No. 201500598, which corresponds with U.S. Appl. No. 14/867,892, 2 pages.
Final Office Action, dated Oct. 10, 2017, received in U.S. Appl. No. 14/869,855, 16 pages.
Office Action, dated Jan. 23, 2018, received in U.S. Appl. No. 14/869,855, 24 pages.
Office Action, dated Jan. 18, 2018, received in U.S. Appl. No. 14/869,873, 25 pages.
Office Action, dated Jan. 11, 2018, received in U.S. Appl. No. 14/869,997, 17 pages.
Notice of Allowance, dated Jan. 17, 2018, received in U.S. Appl. No. 14/867,990, 12 pages.
Office Action, dated Dec. 12, 2017, received in U.S. Appl. No. 15/009,668, 32 pages.
Notice of Allowance, dated Dec. 4, 2017, received in U.S. Appl. No. 15/081,771, 10 pages.
Office Action, dated Feb. 1, 2018, received in Australian Patent Application No. 2017202058, which corresponds with U.S. Appl. No. 15/081,771, 4 pages.
Office Action, dated Jan. 26, 2018, received in Japanese Patent Application No. 2017-086460, which corresponds with U.S. Appl. No. 15/081,771, 6 pages.
Notice of Allowance, dated Oct. 20, 2017, received in U.S. Appl. No. 15/136,782, 9 pages.
Office Action, dated Jan. 8, 2018, received in Danish Patent Application No. 201770190, which corresponds with U.S. Appl. No. 15/136,782, 2 pages.
Office Action, dated Jan. 10, 2018, received in Danish Patent Application No. 201670590, which corresponds with U.S. Appl. No. 15/231,745, 2 pages.
Patent, dated Oct. 30, 2017, received in Danish Patent Application No. 201670593, which corresponds with U.S. Appl. No. 15/231,745, 3 pages.
Office Action, dated Oct. 16, 2017, received in Danish Patent Application No. 201770710, 10 pages.
Office Action, dated Oct. 31, 2017, received in U.S. Appl. No. 15/723,069, 7 pages.
Notice of Allowance, dated Dec. 21, 2017, received in U.S. Appl. No. 15/723,069, 7 pages.
Extended European Search Report, dated Nov. 24, 2017, received in European Patent Application No. 17186744.3, which corresponds with U.S. Appl. No. 14/536,291, 10 pages.

(56) References Cited

OTHER PUBLICATIONS

Extended European Search Report, dated Oct. 17, 2017, received in European Patent Application No. 17184437.6, Which corresponds with U.S. Appl. No. 14/868,078, 8 pages.
Search Report, dated Apr. 13, 2017, received in Dutch Patent Application No. 2016376, which corresponds with U.S. Appl. No. 14/868,078, 15 pages.
Extended European Search Report, dated Oct. 10, 2017, received in European Patent Application No. 17188507.2, which corresponds with U.S. Appl. No. 14/866,361, 9 pages.
Anonymous, "Google Android 5.0 Release Date, Specs and Editors Hands on Review—CNET", http://www.cnet.com/products/google-an-android-5-0-lollipop/, Mar. 12, 2015, 10 pages.
Sood, "MultitaskingGestures", http://cydia.saurik.com/package/org.thebigboxx.multitaskinggestures/, Mar. 3, 2014, 2 pages.
YouTube, "Multitasking Gestures: Zephyr Like Gestures on iOS", https://www.youtube.com/watch?v=Jcod-f7Lw0l, Jan. 27, 2014, 3 pages.
YouTube, "Recentz—Recent Apps in a Tap", https://www.youtube.com/watch?v=qailSHRgsTo, May 15, 2015, 1 page.
Certificate of Grant, dated Apr. 29, 2017, received in Australian Patent Application No. 2013368440, which corresponds with U.S. Appl. No. 14/536,426, 3 pages.
Office Action, dated Sep. 19, 2017, received in Chinese Patent Application No. 201380035982.1, which corresponds with U.S. Appl. No. 14/536,426, 5 pages.
Office Action, dated Sep. 20, 2017, received in Chinese Patent Application No. 201510566550.4, which corresponds with U.S. Appl. No. 14/536,426, 11 pages.
Final Office Action, dated Aug. 25, 2017, received in U.S. Appl. No. 14/536,464, 30 pages.
Office Action, dated Sep. 25, 2017, received in U.S. Appl. No. 14/536,644, 29 pages.
Office Action, dated Aug. 22, 2017, received in Korean Patent Application No. 2017-7018250, which corresponds with U.S. Appl. No. 14/608,926, 2 pages.
Notice of Allowance, dated Sep. 20, 2017, received in U.S. Appl. No. 14/536,141, 10 pages.
Patent, dated Jul. 28, 2017, received in Japanese Patent Application No. 2015-511646, which corresponds with U.S. Appl. No. 14/536,141, 3 pages.
Office Action, dated Sep. 13, 2017, received in European Patent Application No. 16177863.4, which corresponds with U.S. Appl. No. 14/536,267, 6 pages.
Notice of Allowance, dated Sep. 1, 2017, received in Korean Patent Application No. 2016-7029533, which corresponds with U.S. Appl. No. 14/536,267, 4 pages.
Notice of Allowance, dated Sep. 19, 2017, received in Chinese Patent Application No. 201380068399.0, which corresponds with U.S. Appl. No. 14/608,985, 3 pages.
Office Action, dated Sep. 19, 2017, received in Korean Patent Application No. 2015-7019984, which corresponds with U.S. Appl. No. 14/608,985, 4 pages.
Final Office Action, dated Sep. 21, 2017, received in U.S. Appl. No. 14/609,006, 17 pages.
Patent, dated Jul. 28, 2017, received in Japanese Patent Application No. 2016-558331, which corresponds with U.S. Appl. No. 14/864,737, 3 pages.
Patent, dated Jul. 12, 2017, received in Dutch Patent Application No. 2016452, which corresponds with U.S. Appl. No. 14/864,737, 2 pages.
Patent, dated Sep. 7, 2017, received in Dutch Patent Application No. 2016377, which corresponds with U.S. Appl. No. 14/866,159, 4 pages.
Notice of Allowance, dated Sep. 1, 2017, received in Korean Patent Application No. 2016229421, which corresponds with U.S. Appl. No. 14/868,078, 3 pages.
Patent, dated Sep. 11, 2017, received in Danish Patent Application No. 201500588, which corresponds with U.S. Appl. No. 14/868,078, 5 pages.
Patent, dated Jul. 12, 2017, received in Dutch Patent Application No. 2016376, which corresponds with U.S. Appl. No. 14/868,078, 2 pages.
Notice of Allowance, dated Sep. 18, 2017, received in U.S. Appl. No. 14/863,432, 8 pages.
Notice of Allowance, dated Oct. 4, 2017, received in U.S. Appl. No. 14/866,511, 37 pages.
Patent, dated Aug. 18, 2017, received in Japanese Patent Application No. 2016558214, which corresponds with U.S. Appl. No. 14/866,511, 3 pages.
Final Office Action, dated Oct. 3, 2017, received in U.S. Appl. No. 14/866,992, 37 pages.
Office Action, dated Sep. 5, 2017, received in Danish Patent Application No. 201500593, which corresponds with U.S. Appl. No. 14/866,992, 6 pages.
Final Office Action, dated Oct. 4, 2017, received in U.S. Appl. No. 14/856,517, 33 pages.
Office Action, dated Sep. 22, 2017, received in Japanese Patent Application No. 2017-029201, which corresponds with U.S. Appl. No. 14/857,636 8 pages.
Notice of Allowance, dated Sep. 29, 2017, received in Danish Patent Application No. 201670463, which corresponds with U.S. Appl. No. 14/866,987, 2 pages.
Notice of Allowance, dated Sep. 22, 2017, received in Japanese Patent Application No. 2016-233449, which corresponds with U.S. Appl. No. 14/866,987, 5 pages.
Office Action, dated Sep. 1, 2017, received in U.S. Appl. No. 14/870,754, 22 pages.
Office Action, dated Sep. 1, 2017, received in U.S. Appl. No. 14/870,988, 14 pages.
Office Action, dated Sep. 29, 2017, received in Australian Patent Application No. 2016231505, which corresponds with U.S. Appl. No. 14/871,462, 5 pages.
Final Office Action, dated Aug. 18, 2017, received in U.S. Appl. No. 14/869,873, 20 pages.
Office Action, dated Aug. 29, 2017, received in Korean Patent Application No. 2017-7014536, which corresponds with U.S. Appl. No. 15/081,771, 5 pages.
Notice of Allowance, dated Jul. 6, 2017, received in U.S. Appl. No. 15/231,745, 18 pages.
Office Action, dated Aug. 30, 2017, received in U.S. Appl. No. 15/655,749, 22 pages.
Extended European Search Report, dated Sep. 11, 2017, received in European Patent Application No. 17163309.2, which corresponds with U.S. Appl. No. 14/866,987, 8 pages.
Office Action, dated Feb. 12, 2018, received in U.S. Appl. No. 14/536,464, 33 pages.
Office Action, dated Feb. 2, 2018, received in Chinese Patent Application No. 201380035893.7, which corresponds with U.S. Appl. No. 14/536,141, 5 pages.
Notice of Allowance, dated Jan. 29, 2018, received in Chinese Patent Application No. 201380035968.1, which corresponds with U.S. Appl. No. 14/536,267, 3 pages.
Office Action, dated Oct. 19, 2017, received in U.S. Appl. No. 14/608,985, 13 pages.
Office Action, dated Feb. 14, 2018, received in Korean Patent Application No. 2017-7030129, which corresponds with U.S. Appl. No. 14/864,737, 17 pages.
Office Action, dated Jan. 29, 2018, received in Danish Patent Application No. 201500592, which corresponds with U.S. Appl. No. 14/869,899, 2 pages.
Office Action, dated Feb. 12, 2018, received in U.S. Appl. No. 15/009,661, 36 pages.
Notice of Allowance, dated Feb. 9, 2018, received in U.S. Appl. No. 14/856,522, 9 pages.
Notice of Allowance, dated Feb. 12, 2018, received in U.S. Appl. No. 14/857,700, 13 pages.
Notice of Allowance, dated Feb. 5, 2018, received in Japanese Patent Application No. 2016-233450, which corresponds with U.S. Appl. No. 14/866,989, 5 pages.
Office Action, dated Jan. 29, 2018, received in Danish Patent Application No. 201500595, which corresponds with U.S. Appl. No. 14/871,236, 2 pages.

(56) References Cited

OTHER PUBLICATIONS

Patent, dated Jan. 29, 2018, received in Danish Patent Application No. 201500596, which corresponds with U.S. Appl. No. 14/870,882, 4 pages.
Final Office Action, dated Feb. 16, 2018, received in U.S. Appl. No. 14/870,988, 18 pages.
Patent, dated Oct. 30, 2017, Danish Patent Application No. 201500601, which corresponds with U.S. Appl. No. 14/871,336, 5 pages.
Notice of Allowance, dated Jan. 26, 2018, received in Danish Patent Application No. 201500598, which corresponds with U.S. Appl. No. 14/867,892, 2 pages.
Office Action, dated Jan. 30, 2018, received in Danish Patent Application No. 201670592, which corresponds with U.S. Appl. No. 15/231,745, 2 pages.
Office Action, dated Feb. 7, 2018, received in Danish Patent Application No. 201770709, 2 pages.
Search Report, dated Feb. 15, 2018, received in Dutch Patent Application No. 2019215, which corresponds with U.S. Appl. No. 14/864,529, 13 pages.
Search Report, dated Feb. 15, 2018, received in Dutch Patent Application No. 2019214, which corresponds with U.S. Appl. No. 14/864,601, 12 pages.
Easton-Ellett, "Three Free Cydia Utilities to Remove iOS Notification Badges", http://www.ijailbreak.com/cydia/three-free-cydia-utilities-to-remove-ios-notification-badges, Apr. 14, 2012, 2 pages.
iPhoneHacksTV, "Confero allows you to easily manage your Badge notifications—iPhone Hacks", youtube, https://wwwyoutube.com/watch?v=JCk61pnL4SU, Dec. 26, 2014, 3 pages.
Mandi, Confero now available in Cydia, brings a new way to manage Notification badges [Jailbreak Tweak], http://www.iphonehacks.com/2015/01/confero/tweak-manage-notification-badges.html, Jan. 1, 2015, 2 pages.
Ritchie, "How to see all the unread message notifications on your iPhone, all at once, all in the same place | iMore", https://www.imore.com/how-see-all-unread-message-notifications-your-iphone-all-once-all-same-place, Feb. 22, 2014, 2 pages.
YouTube, "Android Lollipop Lock-Screen Notification Tips", https://www.youtube.com/watch?v=LZTxHBOwzIU, Nov. 13, 2014, 3 pages.
Final Office Action, dated Feb. 22, 2018, received in U.S. Appl. No. 14/608,895, 20 pages.
Office Action, dated Mar. 9, 2018, received in European Patent Application No. 13795391.5, which corresponds with U.S. Appl. No. 14/536,426, 4 pages.
Notice of Allowance, dated May 16, 2018, received in U.S. Appl. No. 14/536,367, 5 pages.
Office Action, dated May 8, 2018, received in Australian Patent Application No. 2016216580, which corresponds with U.S. Appl. No. 14/536,426, 5 pages.
Notice of Allowance, dated May 10, 2018, received in Chinese Patent Application No. 201380035982.1, which corresponds with U.S. Appl. No. 14/536,426, 2 pages.
Intention to Grant, dated Mar. 9, 2018, received in European Patent Application No. 15183980.0, which corresponds with U.S. Appl. No. 14/536,426, 5 pages.
Final Office Action, dated May 3, 2018, received in U.S. Appl. No. 14/536,644, 28 pages.
Certificate of Grant, dated May 3, 2018, received n Australian Patent Application No. 2016201451, which corresponds with U.S. Appl. No. 14/608,926, 1 page.
Notice of Allowance, dated Feb. 8, 2018, received in Chinese Patent Application No. 201380068414.1, which corresponds with U.S. Appl. No. 14/608,926, 2 pages.
Patent, dated May 4, 2018, received in Chinese Patent Application No. 201380068414.1, which corresponds with U.S. Appl. No. 14/608,926, 4 pages.
Oral Summons, dated Feb. 13, 2017, received in European Patent Application No. 13795392.3, which corresponds with U.S. Appl. No. 14/608,926, 11 pages.
Patent, dated Apr. 27, 2018, received in Japanese Patent Application No. 2017-024234, which corresponds with U.S. Appl. No. 14/608,926, 3 pages.
Office Action, dated Apr. 9, 2018, received in European Patent Application No. 13726053.5, which corresponds with U.S. Appl. No. 14/536,141, 9 pages.
Notice of Acceptance, dated Mar. 7, 2018, received in Australian patent Application No. 2016201303, which corresponds with U.S. Appl. No. 14/608,942, 3 pages.
Office Action, dated Mar. 28, 2018, received in Chinese Patent Application No. 201380068295.X, which corresponds with U.S. Appl. No. 14/608,942, 5 pages.
Notice of Allowance, dated Feb. 28, 2018, received in U.S. Appl. No. 14/536,166, 5 pages.
Notice of Allowance, dated Apr. 4, 2018, received in Chinese Patent Application No. 201380035977.0, which corresponds with U.S. Appl. No. 14/536,203, 3 pages.
Patent, dated Feb. 16, 2018, received in Japanese Patent Application No. 2016173113, which corresponds with U.S. Appl. No. 14/536,203, 3 pages.
Oral Proceedings, dated Mar. 7, 2018, received in European Office Action No. 13798465.4, which corresponds with U.S. Appl. No. 14/608,965, 5 pages.
Notice of Acceptance, dated Feb. 27, 2018, received in Australian Patent Application No. 2016204411, which corresponds with U.S. Appl. No. 14/536,267, 3 pages.
Patent, dated Apr. 20, 2018, received in Chinese Patent Application No. 201380035968.1, which corresponds with U.S. Appl. No. 14/536,267, 4 pages.
Notice of Allowance, dated May 20, 2018, received in U.S. Appl. No. 14/536,291, 5 pages.
Office Action, dated Mar. 20, 2018, received in U.S. Appl. No. 14/609,006, 13 pages.
Notice of Allowance, dated Mar. 14, 2018, received in U.S. Appl. No. 14/536,296, 8 pages.
Office Action, dated Apr. 27, 2018, received in Japanese Patent Application No. 2017-008764, which corresponds with U.S. Appl. No. 14/536,648, 5 pages.
Office Action, dated Apr. 16, 2018, received in Australian Patent Application No. 2016233792, which corresponds with U.S. Appl. No. 14/864,737, 2 pages.
Decision to grant, dated Mar. 29, 2018, received in European Patent Application No. 16710871.1, which corresponds with U.S. Appl. No. 14/864,737, 2 pages.
Patent, Nov. 16, 2017, received in Dutch Patent Application No. 2016375, which corresponds with U.S. Appl. No. 14/866,981, 2 pages.
Notice of Allowance, dated May 18, 2018, received in U.S. Appl. No. 14/866,159, 8 pages.
Notice of Allowance, dated Mar. 21, 2018, received in Danish Patent Application No. 201500574, which corresponds with U.S. Appl. No. 14/866,159, 2 pages.
Notice of Allowance, dated May 24, 2018, received in U.S. Appl. No. 14/868,078, 6 pages.
Office Action, dated Apr. 25, 2018, received in European Patent Application No. 16708916.8, which corresponds with U.S. Appl. No. 14/868,078, 6 pages.
Notice of Allowance, dated Apr. 24, 2018, received in Danish Patent Application No. 201500592, which corresponds with U.S. Appl. No. 14/869,899, 2 pages.
Office Action, dated May 1, 2018, received in Danish Patent Application No. 201670594, which corresponds with U.S. Appl. No. 14/869,899, 2 pages.
Office Action, dated Mar. 26, 2018, received in Australian Patent Application No. 2016304890, which corresponds with U.S. Appl. No. 14/866,992, 3 pages.
Office Action, dated Mar. 13, 2018, received in U.S. Appl. No. 15/009,688, 10 pages.
Notice of Allowance, dated May 2, 2018, received in U.S. Appl. No. 14/856,519, 10 pages.
Final Office Action, dated Nov. 16, 2017, received in U.S. Appl. No. 14/856,520, 41 pages.

(56) References Cited

OTHER PUBLICATIONS

Notice of Allowance, dated Apr. 9, 2018, received in U.S. Appl. No. 14/857,700, 7 pages.
Notice of Allowance, dated Apr. 19, 2018, received in U.S. Appl. No. 14/864,529, 11 pages.
Grant of Patent, dated Apr. 16, 2018, received in Dutch Patent Application No. 2019215, 2 pages.
Notice of Allowance, dated Mar. 16, 2018, received in Danish Patent Application No. 201500579, which corresponds with U.S. Appl. No. 14/866,361, 2 pages.
Office Action, dated May 7, 2018, received in European Patent Application No. 16189421.7, which corresponds with U.S. Appl. No. 14/866,987, 5 pages.
Notice of Allowance, dated Mar. 6, 2018, received in Japanese Patent Application No. 2017-126445, which corresponds with U.S. Appl. No. 14/866,987, 5 pages.
Patent, dated Apr. 6, 2018, received in Japanese Patent Application No. 2017-126445, which corresponds with U.S. Appl. No. 14/866,987, 3 pages.
Office Action, dated Feb. 26, 2018, received in Australian Patent Application No. 2017201079, which corresponds with U.S. Appl. No. 14/866,989, 6 pages.
Patent, dated Mar. 9, 2018, received in Japanese Patent Application No. 2016-233450, which corresponds with U.S. Appl. No. 14/866,989, 4 pages.
Notice of Allowance, dated Apr. 26, 2018, received in Danish Patent Application No. 201500595, which corresponds with U.S. Appl. No. 14/871,236, 2 pages.
Final Office Action, dated Mar. 9, 2018, received in U.S. Appl. No. 14/870,754, 19 pages.
Final Office Action, dated Apr. 20, 2018, received in U.S. Appl. No. 14/870,882, 7 pages.
Patent, dated Feb. 9, 2018, received in Japanese Patent Application No. 2016533201, which corresponds with U.S. Appl. No. 14/871,227, 4 pages.
Office Action, dated Feb. 20, 2018, received in Korean Patent Application No. 2016-7019816, which corresponds with U.S. Appl. No. 14/871,227, 8 pages.
Final Office Action, dated Mar. 15, 2018, received in U.S. Appl. No. 14/871,336, 23 pages.
Office Action, dated Apr. 2, 2018, received in Japanese Patent Application No. 2018-020324, which corresponds with U.S. Appl. No. 14/874,336, 4 pages.
Notice of Allowance, dated Apr. 18, 2018, received in U.S. Appl. No. 14/867,823, 10 pages.
Office Action, dated Apr. 24, 2018, received in U.S. Appl. No. 14/867,892, 63 pages.
Office Action, dated Feb. 28, 2018, received in U.S. Appl. No. 14/869,261, 26 pages.
Final Office Action, dated May 23, 2018, received in U.S. Appl. No. 14/869,873, 18 pages.
Notice of Allowance, dated Mar. 30, 3018, received in U.S. Appl. No. 14/867,990, 5 pages.
Office Action, dated Feb. 19, 2018, received in Danish Patent Application No. 201500581, which corresponds with U.S. Appl. No. 14/867,990, 4 pages.
Office Action, dated Apr. 19, 2018, received in U.S. Appl. No. 14/869,703, 19 pages.
Office Action, dated May 4, 2018, received in Australian Patent Application No. 2018202855, which corresponds with U.S. Appl. No. 15/136,782, 3 pages.
Notice of Allowance, dated Mar. 19, 2018, received in Danish Patent Application No. 201770190, which corresponds with U.S. Appl. No. 15/136,782, 2 pages.
Office Action, dated Feb. 22, 2018, received in Danish Patent Application No. 201670587, which corresponds with U.S. Appl. No. 15/231,745, 4 pages.
Office Action, dated Apr. 11, 2018, received in Danish Patent Application No. 201670591, which corresponds with U.S. Appl. No. 15/231,745, 3 pages.
Notice of Allowance, dated Mar. 27, 2018, received in Danish Patent Application No. 201670592, which corresponds with U.S. Appl. No. 15/231,745, 2 pages.
Notice of Acceptance, dated Mar. 2, 2018, received in Australian Patent Application No. 2018200705, which corresponds with U.S. Appl. No. 15/272,327, 3 pages.
Notice of Acceptance, dated Mar. 2, 2018, received in Australian Patent Application No. 2016304832, which corresponds with U.S. Appl. No. 15/272,345, 3 pages.
Office Action, dated Apr. 20, 2018, received in European Patent Application No. 16756862.5, which corresponds with U.S. Appl. No. 15/272,345, 15 pages.
Office Action, dated Mar. 7, 2018, received in U.S. Appl. No. 15/482,618, 7 pages.
Office Action, dated Apr. 23, 2018, received in U.S. Appl. No. 15/499,691, 29 pages.
Final Office Action, dated May 10, 2018, received in U.S. Appl. No. 15/655,749, 19 pages.
Extended European Search Report, dated Mar. 2, 2018, received in European Patent Application No. 17206374.5, which corresponds with U.S. Appl. No. 15/272,343, 11 pages.
Anonymous, "1-Click Installer for Windows Media Taskbar Mini-Player for Windows 7, 8, 8.1 10", http://metadataconsulting.blogspot.de/2014/05/installer-for-windows-media-taskbar.htm, May 5, 2014, 6 pages.
Anonymous, "[new] WMP12 with Taskbar Toolbar for Windows 7—Windows Customization—WinMatrix", http://www.winmatrix.com/forums/index/php?/topic/25528-new-wmp12-with-taskbar-toolbar-for-windows-7, Jan. 27, 2013, 6 pages.
Anonymous, "Taskbar Extensions", https://web.archive.org/web/20141228124434/http://msdn.microsoft.com:80/en-us/library/windows/desktop/dd378460(v=vs.85).aspx, Dec. 28, 2014, 8 pages.
Oh, et al., "Moving Objects with 2D Input Devices in CAD Systems and Destop Virtual Environments", Proceedings of Graphics Interface 2005, 8 pages, May 2005.
Stewart, et al., "Characteristics of Pressure-Based Input for Mobile Devices", Proceedings of the SIGCHI Conference on Human Factors in Computing Systems, Apr. 2010, 10 pages.
Notice of Allowance, dated Jun. 26, 2018, received in U.S. Appl. No. 14/608,895, 9 pages.
Intention to Grant, dated Jul. 6, 2018, received in European Patent Application No. 13795391.5, which corresponds with U.S. Appl. No. 14/536,426, 5 pages.
Notice of Allowance, dated May 17, 2018, received in Australian Patent Application No. 2016216580, which corresponds with U.S. Appl. No. 14/536,426, 3 pages.
Final Office Action, dated Jun. 22, 2018, received in U.S. Appl. No. 14/536,464, 32 pages.
Final Office Action, dated Jun. 6, 2018, received in U.S. Appl. No. 14/608,926, 19 pages.
Certificate of Grant, dated Jul. 5, 2018, received in Australian patent Application No. 2016201303, which corresponds with U.S. Appl. No. 14/608,942, 4 pages.
Notice of Acceptance, dated Jul. 19, 2018, received in Australian Patent Application No. 2016238917, which corresponds with U.S. Appl. No. 14/536,203, 3 pages.
Patent, dated Jul. 6, 2018, received in Chinese Patent Application No. 201380035977.0, which corresponds with U.S. Appl. No. 14/536,203, 4 pages.
Office Action, dated Jul. 2, 2018, received in U.S. Appl. No. 14/608,965, 16 pages.
Notice of Allowance, dated Jun. 1, 2018, received in U.S. Appl. No. 14/536,267, 5 pages.
Certificate of Grant, dated Jun. 28, 2018, received in Australian Patent Application No. 2016204411, which corresponds with U.S. Appl. No. 14/536,267, 4 pages.
Office Action, dated Jun. 13, 2018, received in Chinese Patent Application No. 201810332044.2, which corresponds with U.S. Appl. No. 14/536,267, 2 pages.
Intention to Grant, dated Jun. 27, 2018, received in European Patent Application No. 13724106.3, which corresponds with U.S. Appl. No. 14/536,267, 5 pages.

(56) References Cited

OTHER PUBLICATIONS

Office Action, dated Jun. 29, 2018, received in Japanese Patent Application No. 2017-083027, which corresponds with U.S. Appl. No. 14/536,291, 5 pages.
Notice of Allowance, dated Apr. 20, 2018, received in U.S. Appl. No. 14/608,985, 5 pages.
Grant Certificate, dated Apr. 25, 2018, received in European Patent Application No. 16710871.1, which corresponds with U.S. Appl. No. 14/864,737, 2 pages.
Office Action, dated Jun. 5, 2018, received in Chinese Patent Application No. 201610137839.9, which corresponds with U.S. Appl. No. 14/866,159, 11 pages.
Patent, dated May 22, 2018, received in Danish Patent Application No. 201500574, which corresponds with U.S. Appl. No. 14/866,159, 2 pages.
Office Action, dated May 24, 2018, received in European Patent Application No. 16727900.9, which corresponds with U.S. Appl. No. 14/866,511, 7 pages.
Patent, dated May 28, 2018, received in Danish Patent Application No. 201500592, which corresponds with U.S. Appl. No. 14/869,899, 2 pages.
Notice of Allowance, dated Jun. 29, 2018, received in U.S. Appl. No. 14/856,517, 11 pages.
Office Action, dated Jun. 25, 2018, received in Japanese Patent Application No. 2017-029201, which corresponds with U.S. Appl. No. 14/857,636, 4 pages.
Patent, dated May 22, 2018, received in Danish Patent Application No. 201500579, which corresponds with U.S. Appl. No. 14/866,361, 2 pages.
Office Action, dated Jun. 11, 2018, received in European Patent Application No. 17188507.2, which corresponds with U.S. Appl. No. 14/866,361, 10 pages.
Final Office Action, dated Jul. 3, 2018, received in U.S. Appl. No. 14/866,989, 17 pages.
Patent, dated Jun. 18, 2018, received in Danish Patent Application No. 201500595, which corresponds with U.S. Appl. No. 14/871,236, 3 pages.
Notice of Allowance, dated Jul. 2, 2018, received in U.S. Appl. No. 14/870,754, 9 pages.
Notice of Allowance, dated Jul. 12, 2018, received in U.S. Appl. No. 14/870,882, 5 pages.
Notice of Allowance, dated Jun. 11, 2018, received in U.S. Appl. No. 14/871,227, 11 pages.
Notice of Allowance, dated May 31, 2018, received in U.S. Appl. No. 14/869,855, 10 pages.
Final Office Action, dated Jul. 3, 2018, received in U.S. Appl. No. 15/009,668, 19 pages.
Notice of Allowance, dated Jun. 28, 2018, received in Korean Patent Application No. 2017-7014536, which corresponds with U.S. Appl. No. 15/081,771, 4 pages.
Patent, dated May 22, 2018, received in Danish Patent Application No. 201770190, which corresponds with U.S. Appl. No. 15/136,782, 2 pages.
Office Action, dated Jun. 1, 2018, received in Japanese Patent Application No. 2018-062161, which corresponds with U.S. Appl. No. 15/136,782, 5 pages.
Patent, dated May 28, 2018, received in Danish Patent Application No. 201670590, which corresponds with U.S. Appl. No. 15/231,745, 2 pages.
Patent, dated May 28, 2018, received in Danish Patent Application No. 201670592, which corresponds with U.S. Appl. No. 15/231,745, 2 pages.
Certificate of Grant, dated Jun. 28, 2018, received in Australian Patent Application No. 2018200705, which corresponds with U.S. Appl. No. 15/272,327, 4 pages.
Certificate of Grant, dated Jun. 28, 2018, received in Australian Patent Application No. 2016304832, which corresponds with U.S. Appl. No. 15/272,345, 4 pages.
International Preliminary Report on Patentability, dated Sep. 12, 2017, received in International Patent Application No. PCT/US2016/021400, which corresponds with U.S. Appl. No. 14/869,899, 39 pages.
International Preliminary Report on Patentability, dated Feb. 13, 2018, received in International Patent Application No. PCT/US2016/046407, which corresponds with U.S. Appl. No. 15/009,688, 20 pages.
Extended European Search Report, dated May 30, 2018, received in International Patent Application No. 18155939.4, which corresponds with U.S. Appl. No. 15/272,327, 8 pages.
Notice of Allowance, dated Sep. 5, 2018, received in U.S. Appl. No. 14/535,671 (5448), 5 pages.
Final Office Action, dated Aug. 28, 2018, received in U.S. Appl. No. 14/866,992 (7310), 52 pages.
Final Office Action, dated Sep. 19, 2018, received in U.S. Appl. No. 15/009,661 (7311), 28 pages.
Notice of Allowance, dated Aug. 16, 2018, received in U.S. Appl. No. 14/857,636 (7322), 5 pages.
Notice of Allowance, dated Aug. 16, 2018, received in U.S. Appl. No. 14/857,663 (7323), 5 pages.
Notice of Allowance, dated Aug. 27, 2018, received in U.S. Appl. No. 14/870,988 (7340), 11 pages.
Office Action, dated Sep. 7, 2018, received in U.S. Appl. No. 14/869,997 (7351), 23 pages.
Notice of Allowance, dated Aug. 15, 2018, received in U.S. Appl. No. 15/482,618 (7491), 7 pages.
Anonymous, "Android—What Should Status Bar Toggle Button Behavior Be?", https://ux.stackechange.com/questions/34814, Jan. 15, 2015, 2 pages.
Anonymous, "How Do I Add Contextual Menu to My Apple Watch App?", http://www.tech-recipes.com/rx/52578/how-do-i-add-contexual-menu-to-my-apple-watch-app, Jan. 13, 2015, 3 pages.
Kleinman, "iPhone 6s Said to Sport Force Touch Display, 2GB of RAM", https://www.technobuffalo.com/2015/01/15/iphone-6s-said-to-sport-force-touch-display-2gb-of-ram, Jan. 15, 2015, 2 pages.
YouTube, "How to Use 3D Touch Multitasking on iPhone", https://www.youtube.com/watch?v=kDq05uRdrCg, Sep. 29, 2015, 1 page.
Patent, dated Aug. 17, 2018, received in Chinese Patent Application No. 201380035982.1 (5842CN), which corresponds with U.S. Appl. No. 14/536,426, 4 pages.
Notice of Allowance, dated Aug. 8, 2018, received in Chinese Patent Application No. 201510566550.4 (5842CN01), which corresponds with U.S. Appl. No. 14/536,426, 3 pages.
Intention to Grant, dated Aug. 14, 2018, received in European Patent Application. No. 15183980.0 (5842EP01), which corresponds with U.S. Appl. No. 14/536,426, 5 pages.
Notice of Allowance, dated Aug. 31, 2018, received in Chinese Patent Application No. 201380035893.7 (5847CN), which corresponds with U.S. Appl. No. 14/536,141, 6 pages.
Office Action, dated Aug. 13, 2018, received in Japanese Patent Application No. 2017-141953 (5847JP01), which corresponds with U.S. Appl. No. 14/536,141, 6 pages.
Office Action, dated Aug. 24, 2018, received in Japanese Patent Application No. 2017-113598 (5859JP), which corresponds with U.S. Appl. No. 14/609,042, 6 pages.
Office Action, dated Sep. 11, 2018, received in Chinese Patent Application No. 201610159295.6 (7246CN), which corresponds with U.S. Appl. No. 14/864,737, 6 pages.
Office Action, dated Aug. 20, 2018, received in Chinese Patent Application No. 01610130348.1 (7267CN), which corresponds with U.S. Appl. No. 14/868,078, 6 pages.
Notice of Acceptance, dated Aug. 23, 2018, received in Australian Patent Application No. 2018204611 (7309AU01), which corresponds with U.S. Appl. No. 14/869,899, 3 pages.
Office Action, dated Aug. 31, 2018, received in Australian Patent Application No. 2016276030 (7331AU), which corresponds with U.S. Appl. No. 14/864,601, 3 pages.
Extended European Search Report, dated Aug. 17, 2018, received in European Patent Application No. 18175195.9 (7309EP01), which corresponds with U.S. Appl. No. 14/869,899, 13 pages.

(56) References Cited

OTHER PUBLICATIONS

Extended European Search Report, dated Aug. 24, 2018, received in European Patent Application No. 18171453.6 (7339EP), which corresponds with U.S. Appl. No. 15/136,782, 9 pages.
Notice of Allowance, dated Aug. 9, 2018, received in U.S. Appl. No. 14/536,646 (5846), 5 pages.
Notice of Acceptance, dated Jul. 19, 2018, received in Australian Patent Application No. 2016262773 (5847AU01), which corresponds with U.S. Appl. No. 14/536,141, 3 pages.
Office action, dated Aug. 1, 2018, received in Chinese Patent Application No. 201380074060.1 (5851CN), which corresponds with U.S. Appl. No. 14/608,965, 5 pages.
Notice of Acceptance, dated Jul. 19, 2018, received in Australian Patent Application No. 2016216658 (5854AU01), which corresponds with U.S. Appl. No. 14/536,291, 3 pages.
Certificate of Grant, dated Jun. 29, 2018, received in Hong Kong Patent Application No. 15112851.6 (5855HK), which corresponds with U.S. Appl. No. 14/608,985, 2 pages.
Final Office Action, dated Aug. 7, 2018, received in U.S. Appl. No. 14/536,648 (5858), 14 pages.
Notice of Acceptance, dated Jul. 19, 2018, received in Australian Patent Application No. 2016247194 (5858AU), which corresponds with U.S. Appl. No. 14/536,648, 3 pages.
Notice of Allowance, dated Aug. 3, 2018, received in U.S. Appl. No. 15/009,676 (7312), 6 pages.
Office Action, dated Jul. 19, 2018, received in Russian Patent Application No. 2017131408 (7337RU), which corresponds with U.S. Appl. No. 14/871,236, 8 pages.
Notice of Allowance, dated Aug. 7, 2018, received in U.S. Appl. No. 14/867,823 (7344), 8 pages.
Notice of Allowance, dated Jul. 30, 2018, received in U.S. Appl. No. 14/869,873 (7348), 8 pages.
Notice of Allowance, dated Jul. 30, 2018, received in Japanese Patent Application No. 2018-506989 (7429JP), which corresponds with U.S. Appl. No. 15/272,327, 4 pages.
Extended European Search Report, dated Jul. 30, 2018, received in European Patent Application No. 18180503.7 (5842EP02), which corresponds with U.S. Appl. No. 14/536,426, 7 pages.
Extended European Search Report, dated Aug. 2, 2018, received in European Patent Application No. 18168941.5 (7337EP), which corresponds with U.S. Appl. No. 14/871,236, 11 pages.

\* cited by examiner

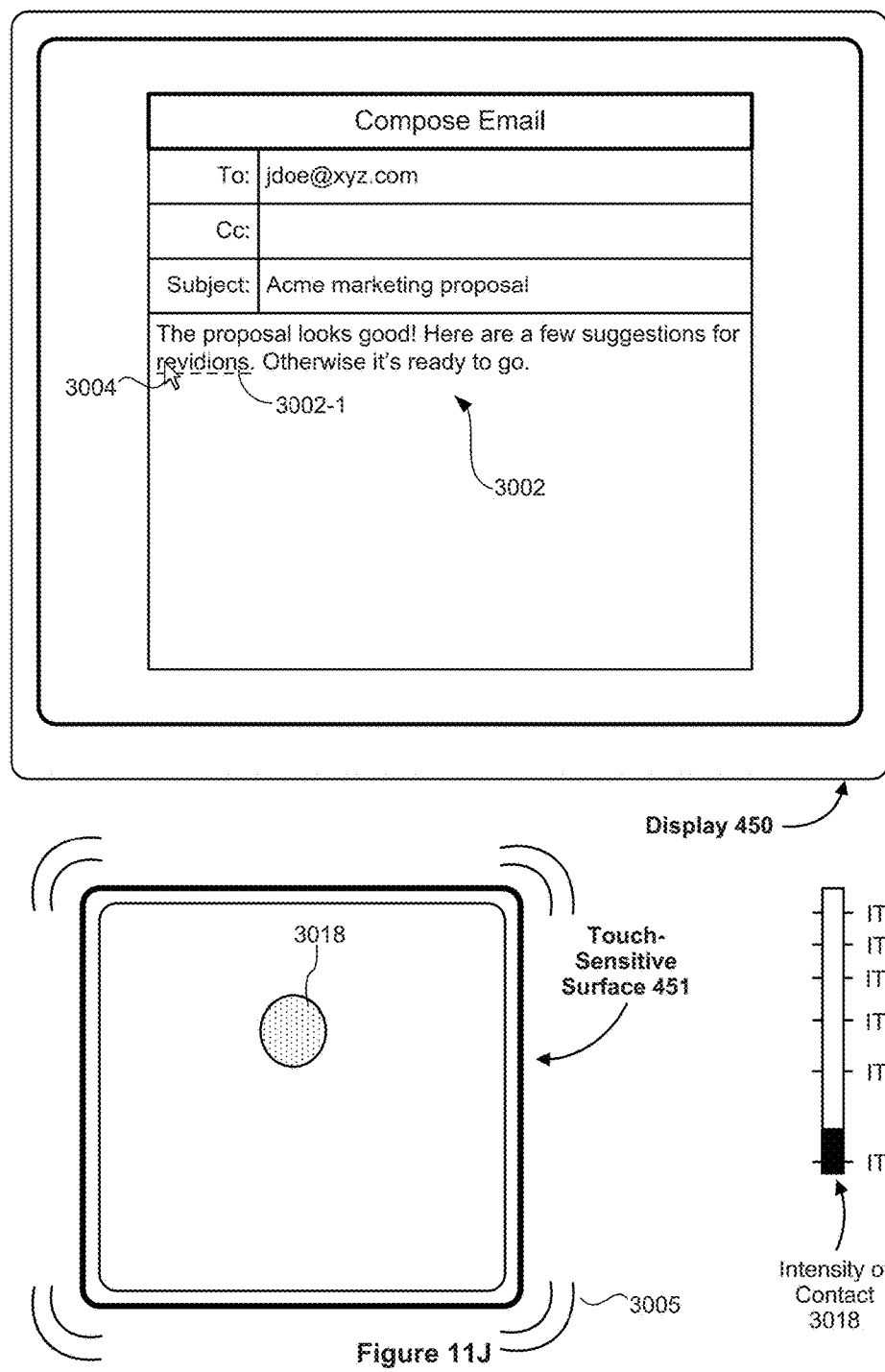

3100

- 3102 Display a plurality of words on a display, where the plurality of words include a misspelled word

- 3104 Prior to detecting the gesture, display a visual indication that performing the gesture on the misspelled word will cause the misspelled word to be corrected

- 3106 Provide a haptic indication that performing the gesture on the misspelled word will cause the misspelled word to be corrected

- 3108 While a focus selector is at a location corresponding to the misspelled word, detect a gesture that includes a contact on a touch-sensitive surface

- 3110 While detecting the gesture:

- 3112 Determine that the contact has exceeded a first intensity threshold

- 3114 In response to determining that the contact has exceeded the first intensity threshold, display a preview of a first correction for the misspelled word

- 3116 Determine that the contact has exceeded a second intensity threshold, wherein the second intensity threshold is higher than the first intensity threshold

- 3118 In response to determining that the contact has exceeded the second intensity threshold, display a preview of a second correction for the misspelled word, where the second correction is different from the first correction

Display a document that includes text and a user interface object on the display. Text proximate to the user interface object is displayed in accordance with first text wrapping properties of the user interface object. — 6402

While a focus selector is over the user interface object, detect a respective press input from a contact on the touch-sensitive surface with intensity above a predefined activation threshold — 6404

In response to detection of the respective press input, change the text wrapping properties of the user interface object to second text wrapping properties, distinct from the first text wrapping properties, and display text proximate to the user interface object in accordance with the second text wrapping properties of the user interface object — 6406

The first text wrapping properties indicate that the user interface object is to be displayed on top of the text.

The second text wrapping properties indicate that the user interface object is to be displayed within the text. — 6408

The first text wrapping properties indicate that the user interface object is to be displayed within the text.

The second text wrapping properties indicate that the user interface object is to be displayed underneath the text — 6410

The first text wrapping properties indicate that the user interface object is to be displayed on top the text.

The second text wrapping properties indicate that the user interface object is to be displayed underneath the text. — 6412

The first text wrapping properties indicate that the user interface object is to be displayed underneath the text.

The second text wrapping properties indicate that the user interface object is to be displayed on top of the text. — 6414

DEVICE, METHOD, AND GRAPHICAL USER INTERFACE FOR MANIPULATING FRAMED GRAPHICAL OBJECTS

RELATED APPLICATIONS

This application is a Continuation of PCT Patent Application Serial No. PCT/US2013/040054, filed on May 8, 2013, entitled "Device, Method, and Graphical User Interface for Manipulating Framed Graphical Objects," which claims the benefit of and priority to U.S. Provisional Patent Application Ser. No. 61/778,156, filed on Mar. 12, 2013, entitled "Device, Method, and Graphical User Interface for Manipulating Framed Graphical Objects;" U.S. Provisional Patent Application No. 61/747,278, filed Dec. 29, 2012, entitled "Device, Method, and Graphical User Interface for Manipulating User Interface Objects with Visual and/or Haptic Feedback;" and U.S. Provisional Patent Application No. 61/688,227, filed May 9, 2012, entitled "Device, Method, and Graphical User Interface for Manipulating User Interface Objects with Visual and/or Haptic Feedback," which applications are incorporated by reference herein in their entireties.

This application is also related to the following: U.S. Provisional Patent Application Ser. No. 61/778,092, filed on Mar. 12, 2013, entitled "Device, Method, and Graphical User Interface for Selecting Object within a Group of Objects;" U.S. Provisional Patent Application Ser. No. 61/778,125, filed on Mar. 12, 2013, entitled "Device, Method, and Graphical User Interface for Navigating User Interface Hierarchies;" U.S. Provisional Patent Application Ser. No. 61/778,179, filed on Mar. 12, 2013, entitled "Device, Method, and Graphical User Interface for Scrolling Nested Regions;" U.S. Provisional Patent Application Ser. No. 61/778,171, filed on Mar. 12, 2013, entitled "Device, Method, and Graphical User Interface for Displaying Additional Information in Response to a User Contact;" U.S. Provisional Patent Application Ser. No. 61/778,191, filed on Mar. 12, 2013, entitled "Device, Method, and Graphical User Interface for Displaying User Interface Objects Corresponding to an Application;" U.S. Provisional Patent Application Ser. No. 61/778,211, filed on Mar. 12, 2013, entitled "Device, Method, and Graphical User Interface for Facilitating User Interaction with Controls in a User Interface;" U.S. Provisional Patent Application Ser. No. 61/778,239, filed on Mar. 12, 2013, entitled "Device, Method, and Graphical User Interface for Forgoing Generation of Tactile Output for a Multi-Contact Gesture;" U.S. Provisional Patent Application Ser. No. 61/778,284, filed on Mar. 12, 2013, entitled "Device, Method, and Graphical User Interface for Providing Tactile Feedback for Operations Performed in a User Interface;" U.S. Provisional Patent Application Ser. No. 61/778,287, filed on Mar. 12, 2013, entitled "Device, Method, and Graphical User Interface for Providing Feedback for Changing Activation States of a User Interface Object;" U.S. Provisional Patent Application Ser. No. 61/778,363, filed on Mar. 12, 2013, entitled "Device, Method, and Graphical User Interface for Transitioning between Touch Input to Display Output Relationships;" U.S. Provisional Patent Application Ser. No. 61/778,367, filed on Mar. 12, 2013, entitled "Device, Method, and Graphical User Interface for Moving a User Interface Object Based on an Intensity of a Press Input;" U.S. Provisional Patent Application Ser. No. 61/778,265, filed on Mar. 12, 2013, entitled "Device, Method, and Graphical User Interface for Transitioning between Display States in Response to a Gesture;" U.S. Provisional Patent Application Ser. No. 61/778,373, filed on Mar. 12, 2013, entitled "Device, Method, and Graphical User Interface for Managing Activation of a Control Based on Contact Intensity;" U.S. Provisional Patent Application Ser. No. 61/778,412, filed on Mar. 13, 2013, entitled "Device, Method, and Graphical User Interface for Displaying Content Associated with a Corresponding Affordance;" U.S. Provisional Patent Application Ser. No. 61/778,413, filed on Mar. 13, 2013, entitled "Device, Method, and Graphical User Interface for Selecting User Interface Objects;" U.S. Provisional Patent Application Ser. No. 61/778,414, filed on Mar. 13, 2013, entitled "Device, Method, and Graphical User Interface for Moving and Dropping a User Interface Object;" U.S. Provisional Patent Application Ser. No. 61/778,416, filed on Mar. 13, 2013, entitled "Device, Method, and Graphical User Interface for Determining Whether to Scroll or Select Content;" and U.S. Provisional Patent Application Ser. No. 61/778,418, filed on Mar. 13, 2013, entitled "Device, Method, and Graphical User Interface for Switching between User Interfaces," which are incorporated herein by reference in their entireties.

This application is also related to the following: U.S. Provisional Patent Application Ser. No. 61/645,033, filed on May 9, 2012, entitled "Adaptive Haptic Feedback for Electronic Devices;" U.S. Provisional Patent Application Ser. No. 61/665,603, filed on Jun. 28, 2012, entitled "Adaptive Haptic Feedback for Electronic Devices;" and U.S. Provisional Patent Application Ser. No. 61/681,098, filed on Aug. 8, 2012, entitled "Adaptive Haptic Feedback for Electronic Devices," which are incorporated herein by reference in their entireties.

TECHNICAL FIELD

This relates generally to electronic devices with touch-sensitive surfaces, including but not limited to electronic devices with touch-sensitive surfaces that detect inputs for manipulating user interfaces.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include adjusting the position and/or size of one or more user interface objects or activating buttons or opening files/applications represented by user interface objects, as well as associating metadata with one or more user interface objects or otherwise manipulating user interfaces. Exemplary user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture or iPhoto from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But existing methods for performing these manipulations are cumbersome and inefficient. In addition, existing methods take longer than necessary, thereby wasting energy. This latter consideration is particularly important in battery-operated devices.

SUMMARY

Accordingly, there is a need for electronic devices with faster, more efficient methods and interfaces for manipulating user interfaces. Such methods and interfaces optionally complement or replace conventional methods for manipulating user interfaces. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

There is a need for electronic devices with faster, more efficient methods and interfaces for manipulating framed graphical objects. Such methods and interfaces may complement or replace conventional methods for manipulating framed graphical objects. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface and one or more sensors to detect intensity of contacts with the touch-sensitive surface. The method includes: displaying a graphical object inside of a frame on the display; detecting a gesture, wherein detecting the gesture includes: detecting a contact on the touch-sensitive surface while a focus selector is over the graphical object; and detecting movement of the contact across the touch-sensitive surface; and in response to detecting the gesture: in accordance with a determination that the contact meets predefined intensity criteria, removing the graphical object from the frame; and in accordance with a determination that the contact does not meet the predefined intensity criteria, adjusting an appearance of the graphical object inside of the frame.

In accordance with some embodiments, an electronic device includes a display unit configured to display a graphical object inside of a frame, a touch-sensitive surface unit configured to receive user gestures, one or more sensor units configured to detect intensity of contacts with the touch-sensitive surface unit, and a processing unit coupled to the display unit, the touch-sensitive surface unit, and the sensor units. The processing unit is configured to: detect a gesture, wherein detecting the gesture includes detecting a contact on the touch-sensitive surface unit while a focus selector is over the graphical object and detecting movement of the contact across the touch-sensitive surface unit; and in response to detecting the gesture: in accordance with a determination that the contact meets predefined intensity criteria, remove the graphical object from the frame; and in accordance with a determination that the contact does not meet the predefined intensity criteria, adjust an appearance of the graphical object inside of the frame.

Thus, electronic devices with displays, touch-sensitive surfaces and one or more sensors to detect intensity of contacts with the touch-sensitive surface are provided with faster, more efficient methods and interfaces for manipulating framed graphical objects, thereby increasing the effectiveness, efficiency, and user satisfaction with such devices. Such methods and interfaces may complement or replace conventional methods for manipulating framed graphical objects.

There is a need for electronic devices with faster, more efficient methods and interfaces for manipulating images and masked images. Such methods and interfaces may complement or replace conventional methods for manipulating images and masked images. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface and one or more sensors to detect intensity of contacts with the touch-sensitive surface. The method includes displaying a masked image, where the masked image corresponds to an original image that is at least partially hidden in accordance with a corresponding image mask, and detecting a gesture that includes a contact on the touch-sensitive surface while a focus selector is over the masked image, and movement of the contact across the touch-sensitive surface. In response to detecting the gesture, in accordance with a determination that the contact has a maximum intensity that is below a respective intensity threshold during the gesture, modifying the masked image in accordance with the gesture, where modifying the masked image includes concurrently modifying the image mask and the original image; and in accordance with a determination that the contact reaches an intensity during the gesture that is above the respective intensity threshold, adjusting the original image relative to the image mask in accordance with the gesture.

In accordance with some embodiments, an electronic device includes a display unit configured to display a masked image, where the masked image corresponds to an original image that is at least partially hidden in accordance with a corresponding image mask, a touch-sensitive surface unit configured to receive user gestures, one or more sensor units configured to detect intensity of contacts with the touch-sensitive surface unit, and a processing unit coupled to the display unit, the touch-sensitive surface unit, and the sensor units. The processing unit is configured to detect a gesture that includes: a contact on the touch-sensitive surface unit while a focus selector is over the masked image, and movement of the contact across the touch-sensitive surface unit. The processing unit is further configured to respond to detecting the gesture, in accordance with a determination that the contact has a maximum intensity that is below a respective intensity threshold during the gesture, by modifying the masked image in accordance with the gesture, where modifying the masked image includes concurrently modifying the image mask and the original image; and in accordance with a determination that the contact reaches an intensity during the gesture that is above the respective intensity threshold, by adjusting the original image relative to the image mask in accordance with the gesture.

Thus, electronic devices with displays, touch-sensitive surfaces and one or more sensors to detect intensity of contacts with the touch-sensitive surface are provided with faster, more efficient methods and interfaces for manipulating images and masked images, thereby increasing the effectiveness, efficiency, and user satisfaction with such devices. Such methods and interfaces may complement or replace conventional methods for manipulating images and masked images.

There is a need for electronic devices with faster, more efficient methods and interfaces for word spelling correction. Such methods and interfaces may complement or replace conventional methods for word spelling correction. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface and one or more sensors to detect intensity of contacts with the touch-sensitive surface. The method includes displaying a plurality of words on the display, where the plurality of words include a misspelled word; and while a focus selector is at a location corresponding to the misspelled word, detecting a gesture that includes a contact on the touch-sensitive surface. The method further includes, in response to detecting the gesture: in accordance with a determination that the contact met predefined intensity criteria, correcting the misspelled word, and in accordance with a determination that the contact did not meet the predefined intensity criteria, displaying a user interface for interacting with the misspelled word within the plurality of words on the display.

In accordance with some embodiments, an electronic device includes a display unit configured to display a plurality of words, where the plurality of words include a misspelled word; a touch-sensitive surface unit configured to receive gestures, the gestures including contacts; one or more sensor units to detect intensity of contacts with the touch-sensitive surface unit; and a processing unit coupled to the display unit, the touch-sensitive surface unit and the sensor units. The processing unit is configured to: while a focus selector is at a location corresponding to the misspelled word, detect a gesture that includes a contact on the touch-sensitive surface unit. The processing unit is further configured to, in response to detecting the gesture: in accordance with a determination that the contact met predefined intensity criteria, correct the misspelled word; and in accordance with a determination that the contact did not meet the predefined intensity criteria, enable display of a user interface for interacting with the misspelled word within the plurality of words on the display unit.

Thus, electronic devices with displays, touch-sensitive surfaces and one or more sensors to detect intensity of contacts with the touch-sensitive surface are provided with faster, more efficient methods and interfaces for word spelling correction, thereby increasing the effectiveness, efficiency, and user satisfaction with such devices. Such methods and interfaces may complement or replace conventional methods for word spelling correction.

There is a need for electronic devices with faster, more efficient methods and interfaces for editing a field in a sheet of an electronic document. Such methods and interfaces may complement or replace conventional methods for manipulating user interface objects. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface and one or more sensors to detect intensity of contacts with the touch-sensitive surface. The method includes: displaying a respective sheet of an electronic document having a plurality of sheets, where the respective sheet includes a plurality of fields for inserting content; and the respective sheet is linked to a template that controls default properties of a respective field of the plurality of fields. The method further includes, while a focus selector is over the respective field, detecting a gesture that includes a press input from a contact on the touch-sensitive surface; and, in response to detecting the gesture on the touch-sensitive surface: in accordance with a determination that the press input had a maximum intensity during the gesture that was below a respective intensity threshold, entering a sheet editing mode for editing content of the respective field in the respective sheet; and in accordance with a determination that the press input reached an intensity during the gesture that was above the respective intensity threshold, entering a template editing mode for editing default properties of the respective field in the template.

In accordance with some embodiments, an electronic device includes a display unit configured to display displaying a respective sheet of an electronic document having a plurality of sheets, where the respective sheet includes a plurality of fields for inserting content; and the respective sheet is linked to a template that controls default properties of a respective field of the plurality of fields; a touch-sensitive surface unit configured to detect a gesture that includes a press input from a contact; one or more sensor units configured to detect intensity of contacts with the touch-sensitive surface unit; and a processing unit coupled to the display unit, the touch-sensitive surface unit, and the one or more sensor units. The processing unit is configured to: while a focus selector is over the respective field, detect a gesture that includes a press input from a contact on the touch-sensitive surface; and, in response to detecting the gesture on the touch-sensitive surface: in accordance with a determination that the press input had a maximum intensity during the gesture that was below a respective intensity threshold, enter a sheet editing mode for editing content of the respective field in the respective sheet; and in accordance with a determination that the press input reached an intensity during the gesture that was above the respective intensity threshold, enter a template editing mode for editing default properties of the respective field in the template.

Thus, electronic devices with displays, touch-sensitive surfaces and one or more sensors to detect intensity of contacts with the touch-sensitive surface are provided with faster, more efficient methods and interfaces for editing a field in a sheet of an electronic document, thereby increasing the effectiveness, efficiency, and user satisfaction with such devices. Such methods and interfaces may complement or replace conventional methods for editing electronic documents.

There is a need for electronic devices with faster, more efficient methods and interfaces for changing text wrapping properties of a user interface object in accordance with intensity of a contact on a touch-sensitive surface. Such methods and interfaces may complement or replace conventional methods for changing text wrapping properties of a user interface object. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface and one or more sensors to detect intensity of contacts with the touch-sensitive surface. The method includes: displaying a document that includes text and a user interface object on the display, where text proximate to the user interface object is displayed in accordance with first text wrapping properties of the user interface object, and while a focus selector is over the user interface object, detecting a respective press input corresponding to from a contact on the touch-sensitive surface with intensity above a predefined activation threshold. The method further includes, in response to detecting the respective press input, changing the text wrapping properties of the user interface object to second text wrapping properties, distinct from the first text wrapping properties, and displaying text proximate to the user interface object in accordance with the second text wrapping properties of the user interface object.

In accordance with some embodiments, an electronic device includes a display unit configured to display a document that includes text and a user interface object on the display unit, where text proximate to the user interface object is displayed in accordance with first text wrapping properties of the user interface object; a touch-sensitive surface unit configured to detect a respective press input from a contact on the touch-sensitive surface unit; one or more sensor units configured to detect intensity of contacts with the touch-sensitive surface unit; and a processing unit coupled to the display unit, the touch-sensitive surface unit, and the one or more sensor units. The processing unit is configured to, while a focus selector is over the user interface object, detect the respective press input from the contact on the touch-sensitive surface unit with intensity above a predefined activation threshold. The processing unit is further configured to, in response to detection of the respective press input, change the text wrapping properties of the user interface object to second text wrapping properties, distinct from the first text wrapping properties, and display text proximate to the user interface object in accordance with the second text wrapping properties of the user interface object.

Thus, electronic devices with displays, touch-sensitive surfaces and one or more sensors to detect intensity of contacts with the touch-sensitive surface are provided with faster, more efficient methods and interfaces for changing text wrapping properties of a user interface object in accordance with intensity of a contact on a touch-sensitive surface, thereby increasing the effectiveness, efficiency, and user satisfaction with such devices. Such methods and interfaces may complement or replace conventional methods for changing text wrapping properties of a user interface object.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing the operations of any of the methods referred to in the fifth paragraph of the Description of Embodiments. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods referred to in the fifth paragraph of the Description of Embodiments, which are updated in response to inputs, as described in any of the methods referred to in the fifth paragraph of the Description of Embodiments. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform the operations of any of the methods referred to in the fifth paragraph of the Description of Embodiments . In accordance with some embodiments, an electronic device includes: a display, a touch-sensitive surface, and optionally one or more sensors to detect intensity of contacts with the touch-sensitive surface; and means for performing the operations of any of the methods referred to in the fifth paragraph of the Description of Embodiments. In accordance with some embodiments, an information processing apparatus, for use in an electronic device with a display and a touch-sensitive surface, optionally one or more sensors to detect intensity of contacts with the touch-sensitive surface, includes means for performing the operations of any of the methods referred to in the fifth paragraph of the Description of Embodiments.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 12A-12D are flow diagrams illustrating a method of word spelling correction in accordance with some embodiments.

FIGS. 18A-18B are flow diagrams illustrating a method changing for text wrapping properties of user interface objects in accordance with some embodiments.

DESCRIPTION OF EMBODIMENTS

Figure 1A:
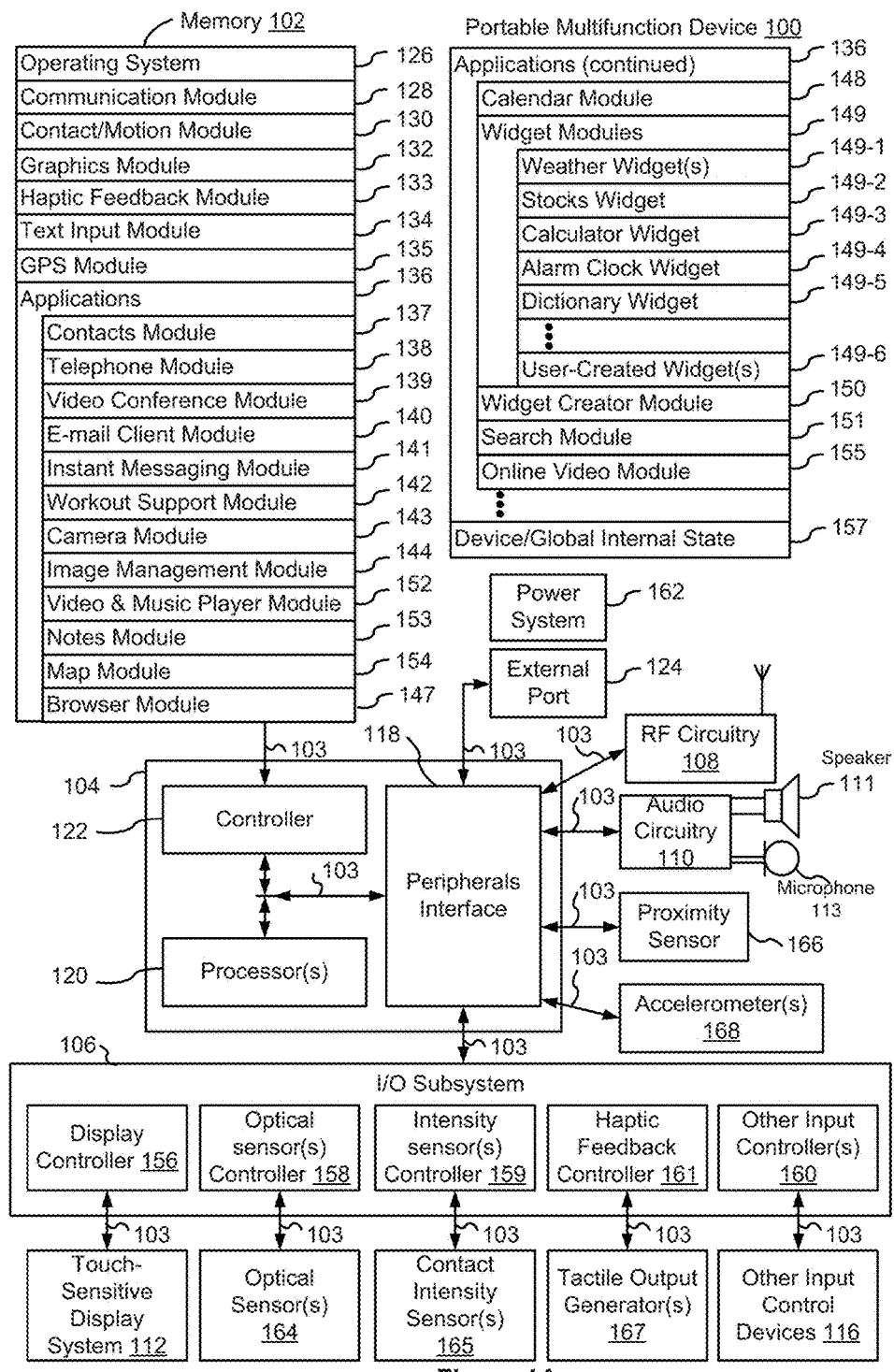
FIG. 1A is a block diagram illustrating a portable multifunction device with a touch-sensitive display in accordance with some embodiments.

The methods, devices and GUIs described herein provide visual and/or haptic feedback that makes manipulation of user interface objects more efficient and intuitive for a user. For example, in a system where the clicking action of a trackpad is decoupled from the contact intensity (e.g., contact force, contact pressure, or a substitute therefore) that is needed to reach an activation threshold, the device can generate different tactile outputs (e.g., "different clicks") for different activation events (e.g., so that clicks that accomplish a particular result are differentiated from clicks that do not produce any result or that accomplish a different result from the particular result). Additionally, tactile outputs can be generated in response to other events that are not related to increasing intensity of a contact, such as generating a tactile output (e.g., a "detent") when a user interface object is moved to a particular position, boundary or orientation, or when an event occurs at the device.

Additionally, in a system where a trackpad or touch-screen display is sensitive to a range of contact intensity that includes more than one or two specific intensity values (e.g., more than a simple on/off, binary intensity determination), the user interface can provide responses (e.g., visual or tactile cues) that are indicative of the intensity of the contact within the range. In some implementations, a pre-activation-threshold response and/or a post-activation-threshold response to an input are displayed as continuous animations. As one example of such a response, a preview of an operation is displayed in response to detecting an increase in contact intensity that is still below an activation threshold for performing the operation. As another example of such a response, an animation associated with an operation continues even after the activation threshold for the operation has been reached. Both of these examples provide a user with a continuous response to the force or pressure of a user's contact, which provides a user with visual and/or haptic feedback that is richer and more intuitive. More specifically, such continuous force responses give the user the experience of being able to press lightly to preview an operation and/or press deeply to push "past" or "through" a predefined user interface state corresponding to the operation.

Additionally, for a device with a touch-sensitive surface that is sensitive to a range of contact intensity, multiple contact intensity thresholds can be monitored by the device and different functions can be mapped to different contact intensity thresholds. This serves to increase the available "gesture space" providing easy access to advanced features for users who know that increasing the intensity of a contact at or beyond a second "deep press" intensity threshold will cause the device to perform a different operation from an operation that would be performed if the intensity of the contact is between a first "activation" intensity threshold and the second "deep press" intensity threshold. An advantage of assigning additional functionality to a second "deep press" intensity threshold while maintaining familiar functionality at a first "activation" intensity threshold is that inexperienced users who are, in some circumstances, confused by the additional functionality can use the familiar functionality by just applying an intensity up to the first "activation" intensity threshold, whereas more experienced users can take advantage of the additional functionality by applying an intensity at the second "deep press" intensity threshold.

Additionally, for a device with a touch-sensitive surface that is sensitive to a range of contact intensity, the device can provide additional functionality by allowing users to perform complex operations with a single continuous contact. For example, when selecting a group of objects, a user can move a continuous contact around the touch-sensitive surface and can press while dragging (e.g., applying an intensity greater than a "deep press" intensity threshold) to add additional elements to a selection. In this way, a user can intuitively interact with a user interface where pressing harder with a contact causes objects in the user interface to be "stickier."

A number of different approaches to providing an intuitive user interface on a device where a clicking action is decoupled from the force that is needed to reach an activation threshold and/or the device is sensitive to a wide range of contact intensities are described below. Using one or more of these approaches (optionally in conjunction with each other) helps to provide a user interface that intuitively provides users with additional information and functionality, thereby reducing the user's cognitive burden and improving the human-machine interface. Such improvements in the human-machine interface enable users to use the device faster and more efficiently. For battery-operated devices, these improvements conserve power and increase the time between battery charges. For ease of explanation, systems, methods and user interfaces for including illustrative examples of some of these approaches are described below, as follows:

Many electronic devices have graphical user interfaces that include various graphical objects and frames that are controlled by a confusing set of overlapping and sometimes conflicting inputs. The embodiments described below provide a fast, efficient, and convenient way for users to manipulate the graphical objects inside, outside, and between frames using inputs that are differentiated in accordance with an intensity of the inputs. In particular, FIGS. 5A-5F illustrate exemplary user interfaces for manipulating framed graphical objects using gestures on a touch-sensitive surface. FIGS. 6A-6B are flow diagrams illustrating a method of manipulating framed graphical objects using gestures on a touch-sensitive surface. The user interfaces in FIGS. 5A-5F are further used to illustrate the processes described below with reference to FIGS. 6A-6B.

Figure 8A:
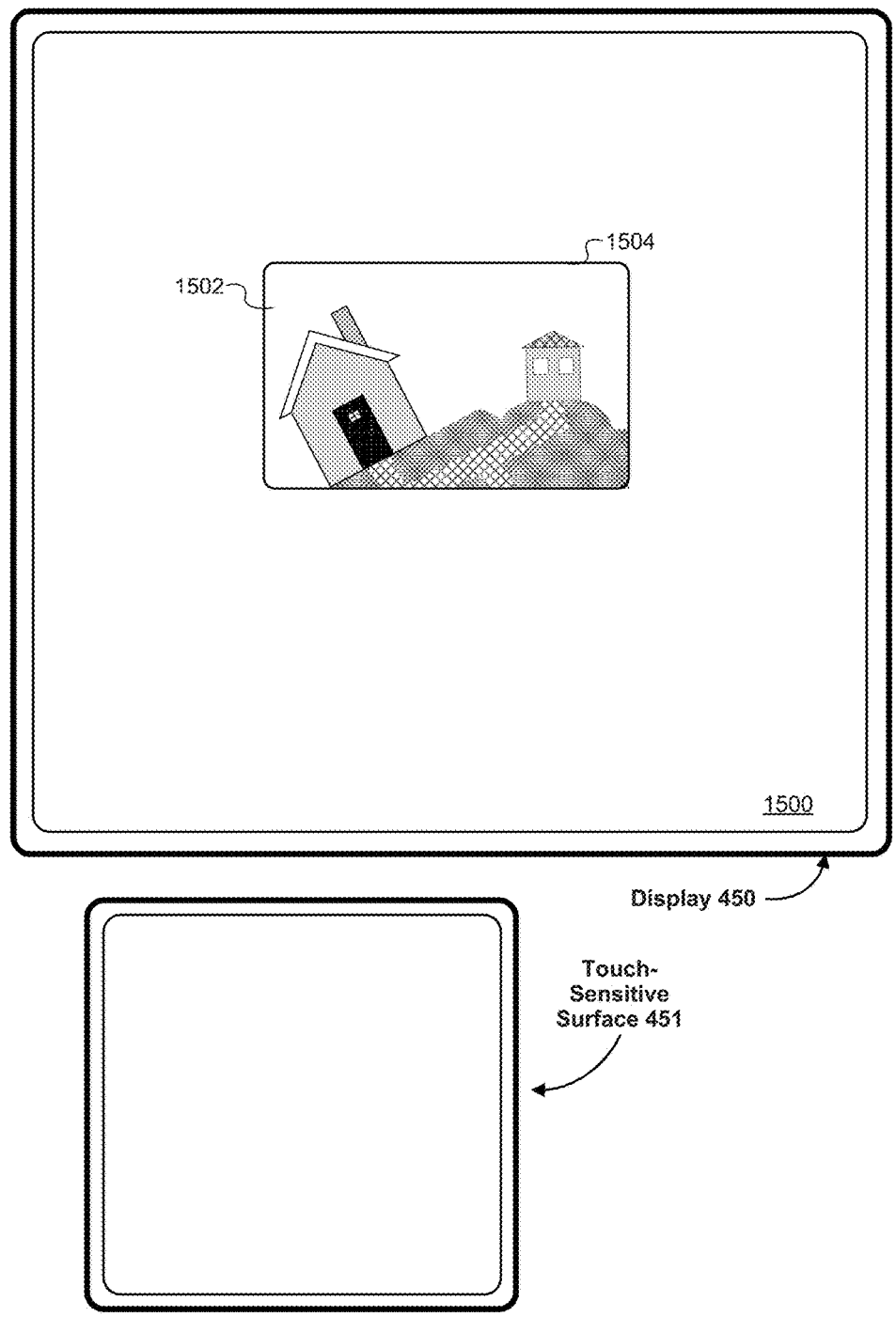
FIGS. 8A-8N illustrate exemplary user interfaces for manipulating images and masked images in accordance with some embodiments.

Many electronic devices have graphical user interfaces that include various masked images that are controlled by a confusing set of overlapping and sometimes conflicting inputs. The embodiments described below provide a fast, efficient, and convenient way for users to transition between modifying the masked image (the image mask and the original image concurrently) and modifying the original image corresponding to the masked image using inputs that are differentiated in accordance with an intensity of the inputs. In particular, FIGS. 8A-8N illustrate exemplary user interfaces for manipulating images and masked images. FIGS. 9A-9C are flow diagrams illustrating a method of manipulating images and masked images. The user interfaces in FIGS. 8A-8N are further used to illustrate the processes described below with reference to FIGS. 9A-9C.

When a user is editing text in an electronic document, the user may wish to correct spelling of a misspelled word in the text, some applications have separate spelling correction interfaces that are accessed through a complex sequence of gestures or other inputs however these interfaces are cumbersome and inefficient for correcting spelling errors. The embodiments described below provide efficient and intuitive methods of correcting misspelled words in response to detecting a gesture with contact that meets predefined intensity criteria while a focus selector is located over the misspelled word. In particular, FIGS. 11A-11DD illustrate exemplary user interfaces for word spelling correction. FIGS. 12A-12D are flow diagrams illustrating a method of word spelling correction. The user interfaces in FIGS. 11A-11DD are used to illustrate the processes in FIGS. 12A-12D.

Figure 14A:
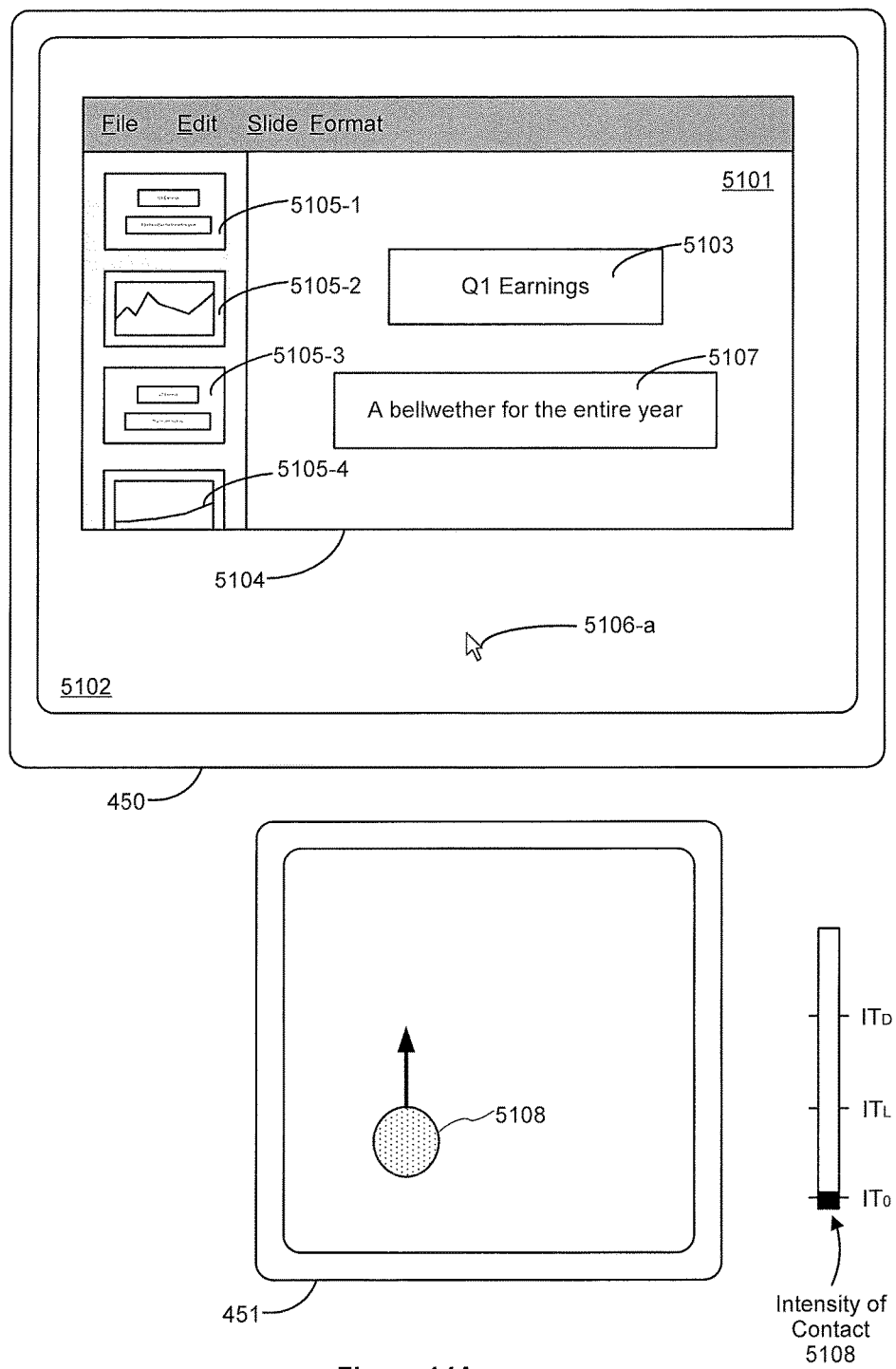
FIGS. 14A-14N illustrate exemplary user interfaces for editing a field in a sheet of an electronic document in accordance with some embodiments.
Figure 14N:
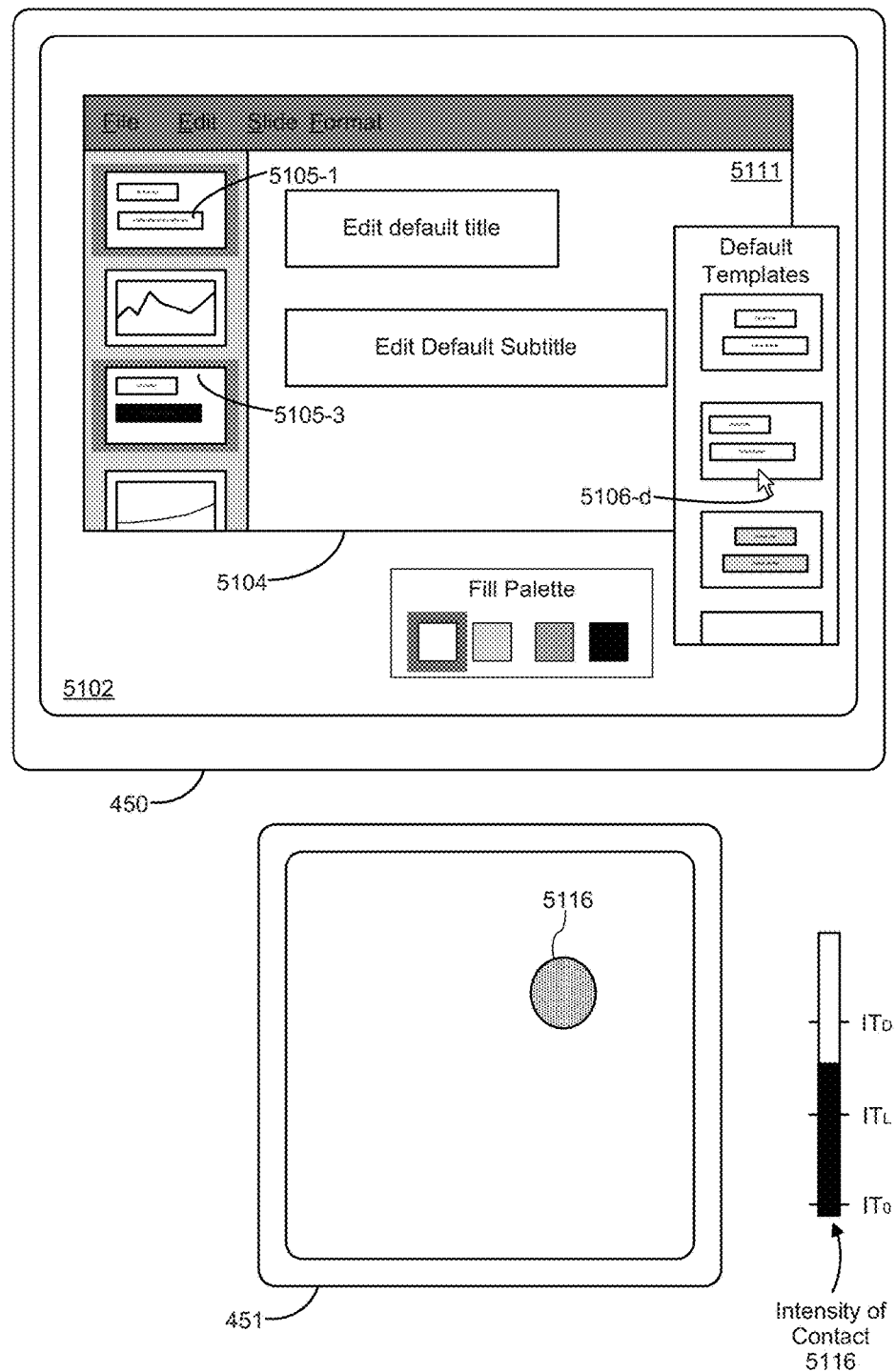
Figure 15A:
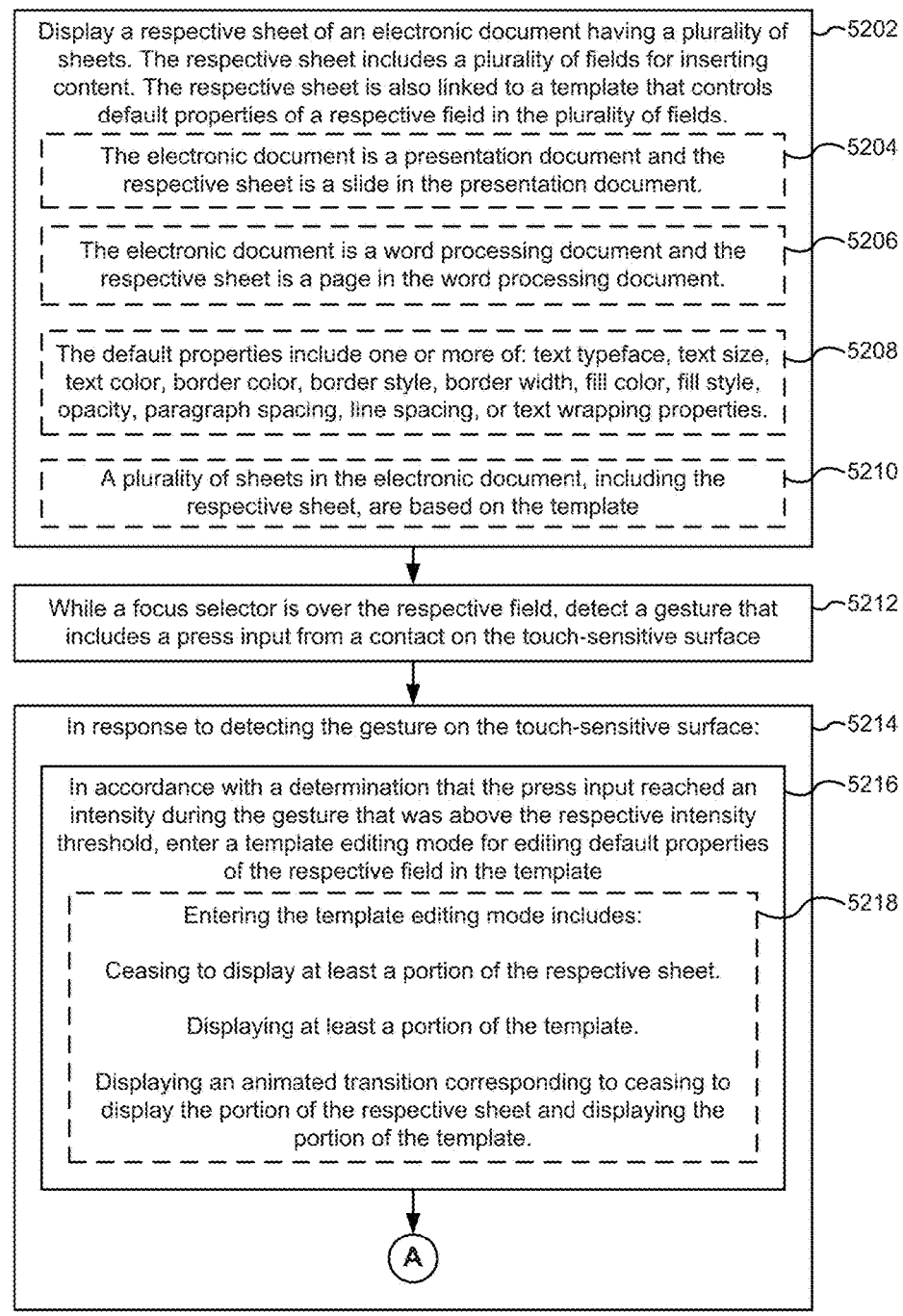
FIGS. 15A-15C are flow diagrams illustrating a method of editing a field in a sheet of an electronic document in accordance with some embodiments.
Figure 15B:
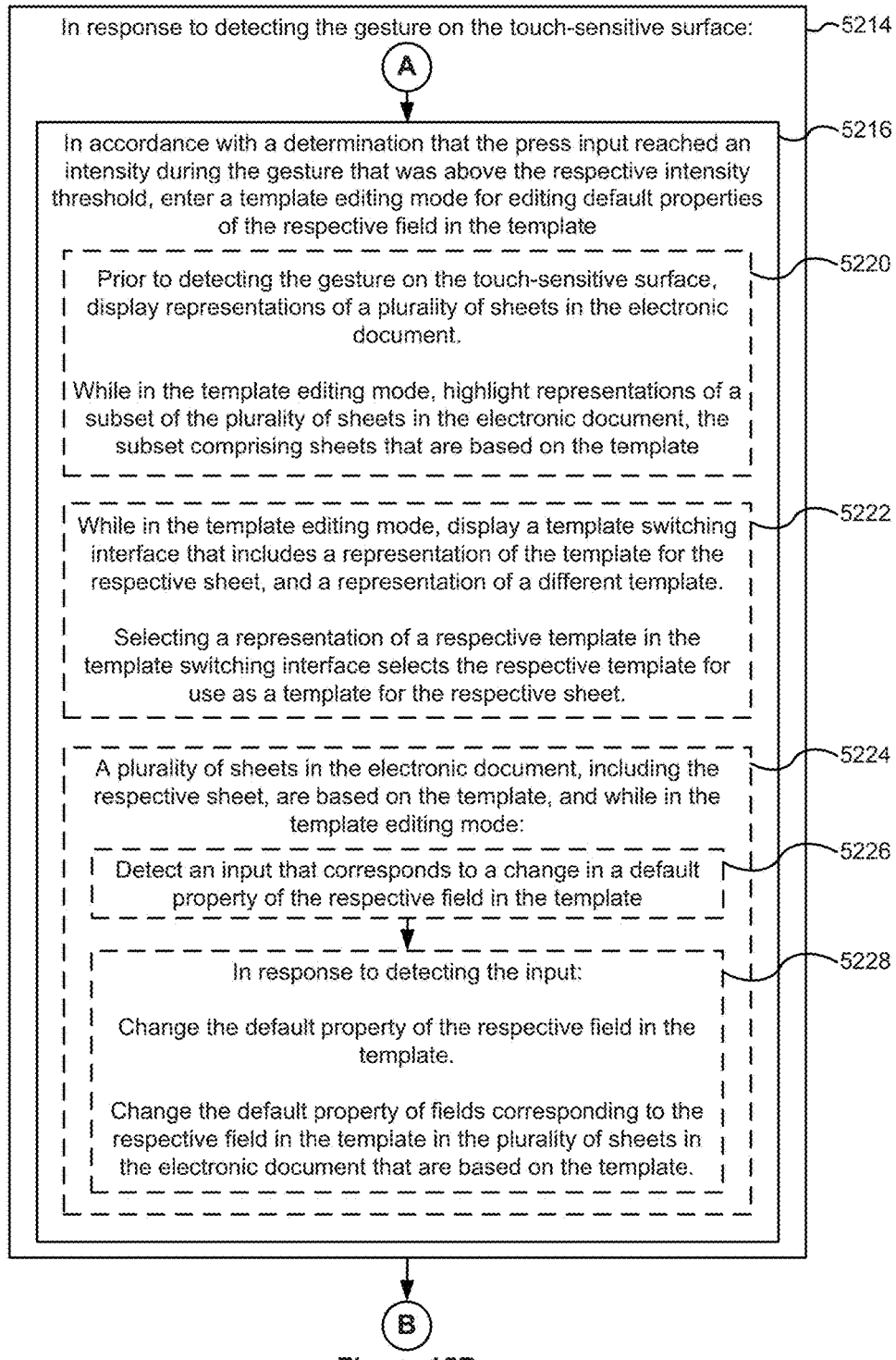
Figure 15C:
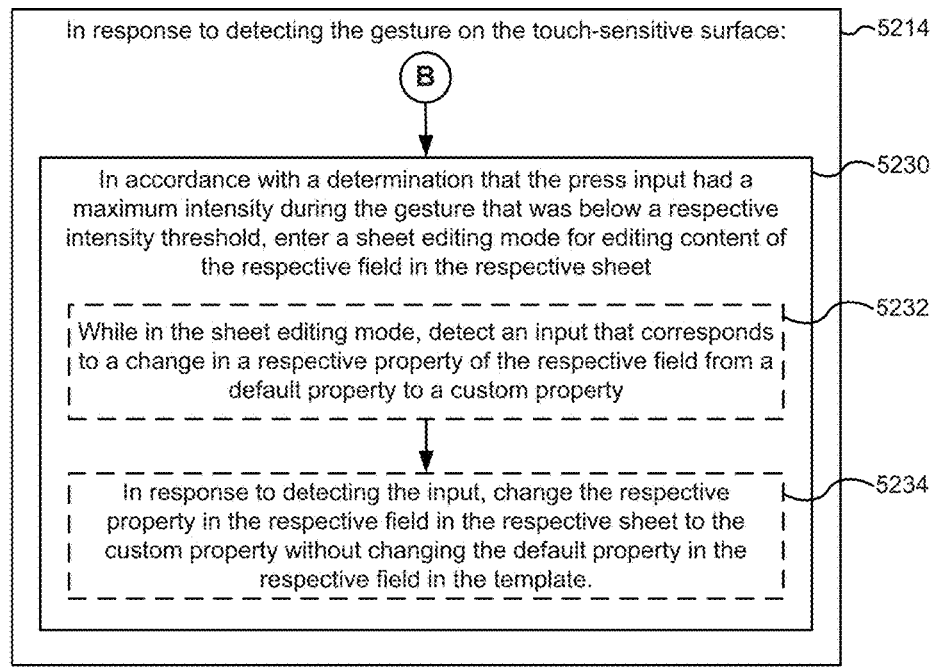

Many electronic devices use graphical user interfaces to display electronic documents, some of which include sheets (e.g., sheets of a spreadsheet, or pages of a word processing document) however switching between editing the electronic document and templates for the electronic document sometimes takes a large number of distinct inputs that can be confusing and inefficient for the user. The embodiments described below provide a fast, efficient, convenient manner in which to determine whether to edit content of a field in a sheet or to edit default properties of the field in a template for the sheet based on an intensity of a contact while a focus selector is over the field. In particular, FIGS. 14A-14N illustrate exemplary user interfaces for editing a field in a sheet of an electronic document. FIGS. 15A-15C are flow diagrams illustrating a method of editing a field in a sheet of an electronic document. The user interfaces in FIGS. 14A-14N are used to illustrate the processes in FIGS. 15A-15C.

Figure 17A:
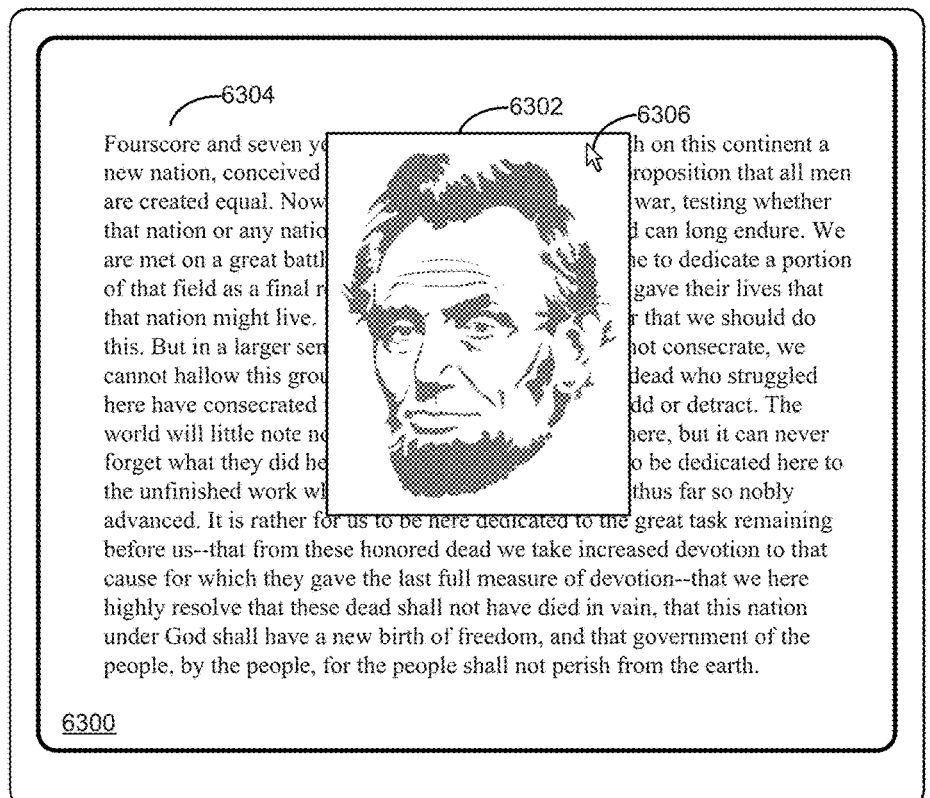
FIGS. 17A-17K illustrate components of an electronic device with exemplary user interfaces for changing text wrapping properties of user interface objects in accordance with some embodiments.
Figure 17A:
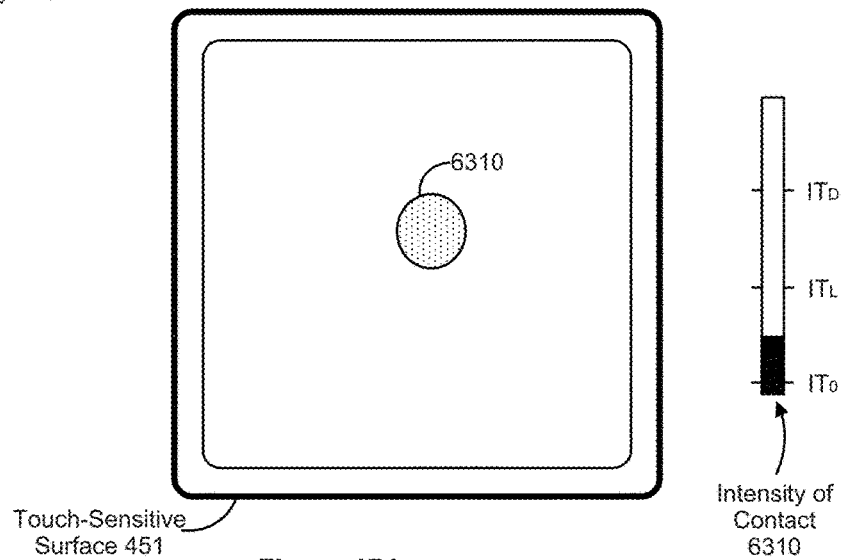
Figure 17B:
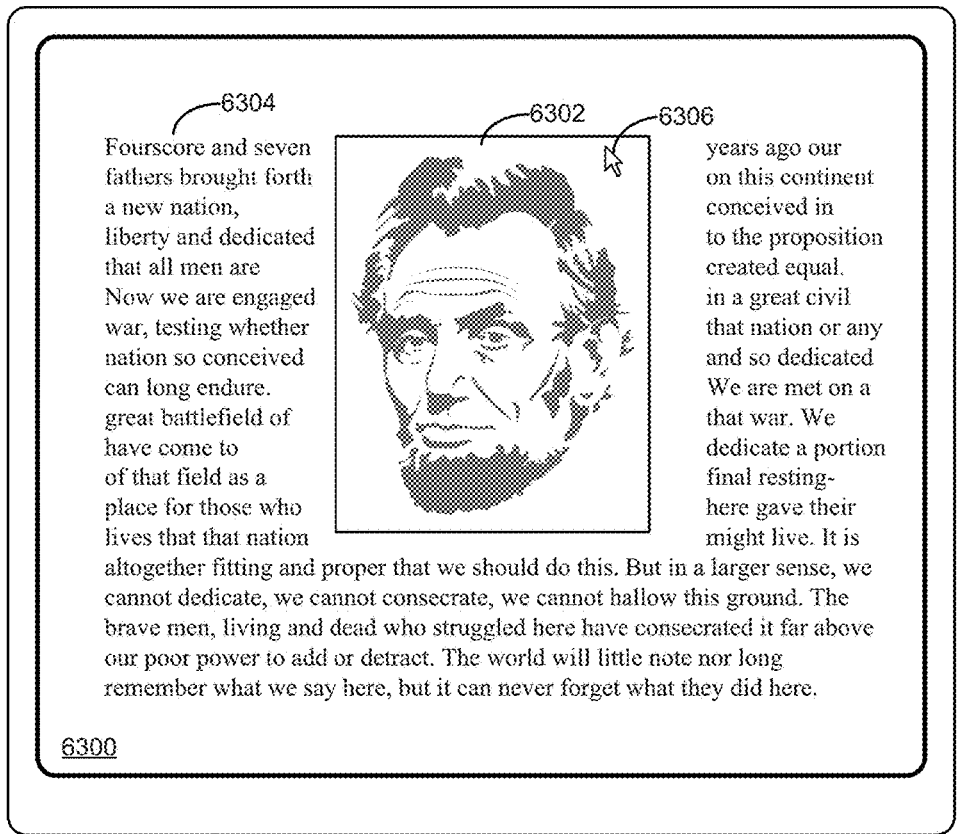
Figure 17B:
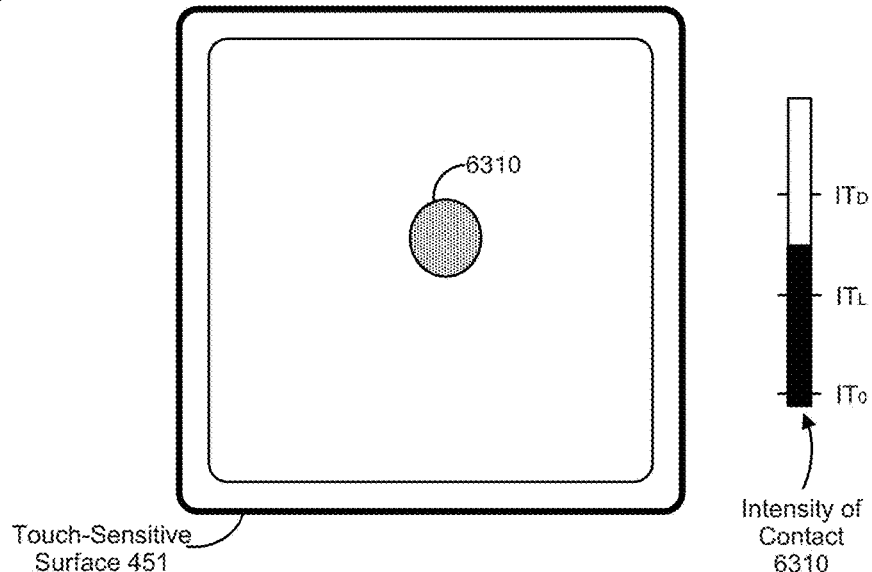
Figure 17C:
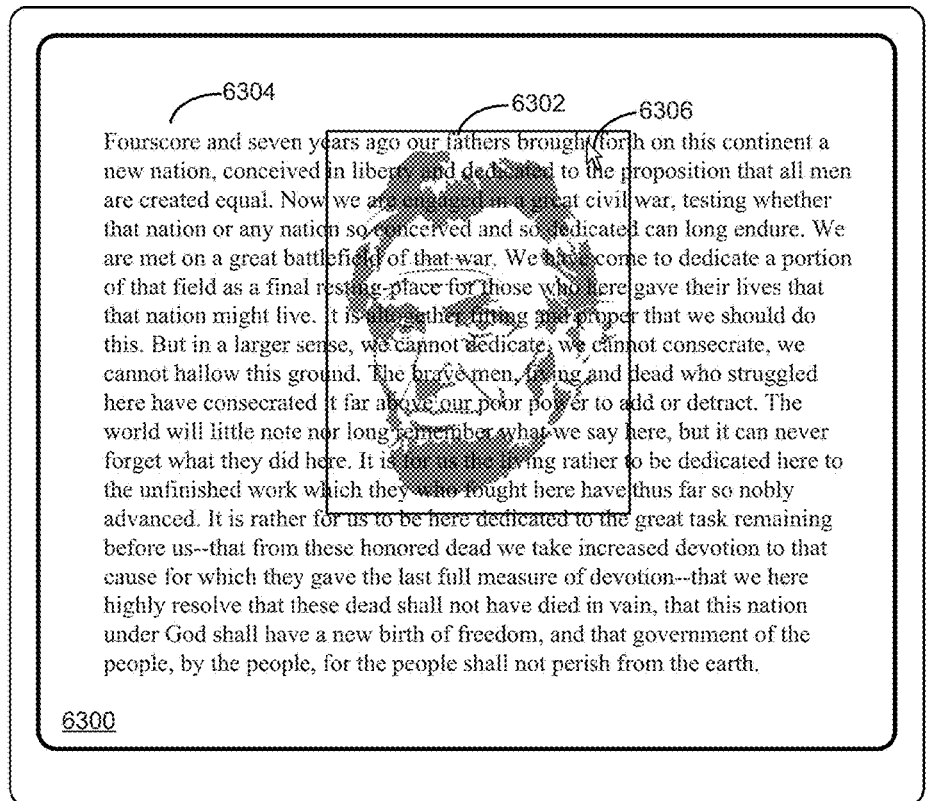
Figure 17C:
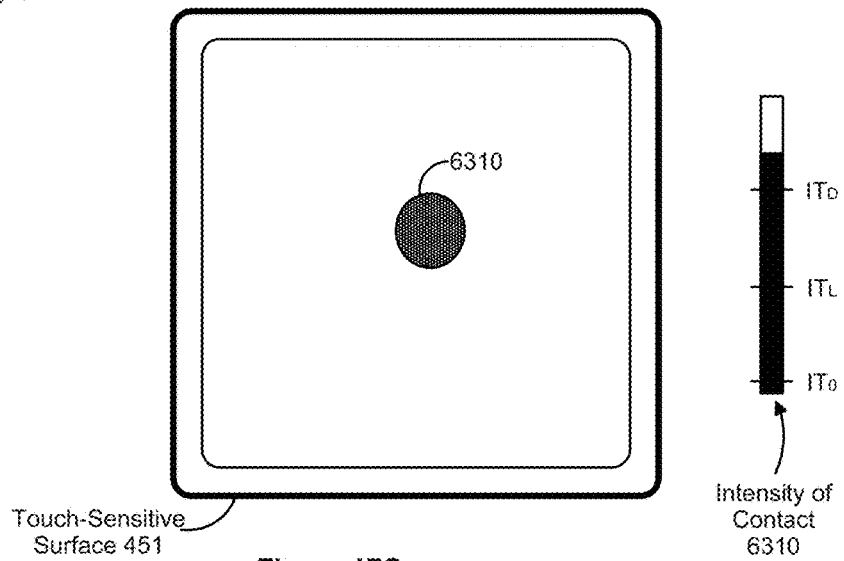

Many electronic devices use graphical user interfaces to display user interface objects. Often, these objects are displayed according to a particular relationships relative to one another (e.g., z-order or text wrapping properties) however changing the text wrapping properties of a user interface object sometimes takes a large number of distinct inputs that can be confusing and inefficient for the user. The embodiments described below provide methods and user interfaces for changing text wrapping properties of a user interface objects in a fast, efficient, and convenient way based on an intensity of a contact while a focus selector is over the user interface object. In particular, FIGS. 17A-17K illustrate exemplary user interfaces for changing text wrapping properties of a user interface object in accordance with intensity of a contact on a touch-sensitive surface. FIGS. 18A-18B are flow diagrams illustrating a method of changing text wrapping properties of a user interface object in accordance with intensity of a contact on a touch-sensitive surface. The user interfaces in FIGS. 17A-17K are used to illustrate the processes in FIGS. 18A-18B.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including,"

"comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
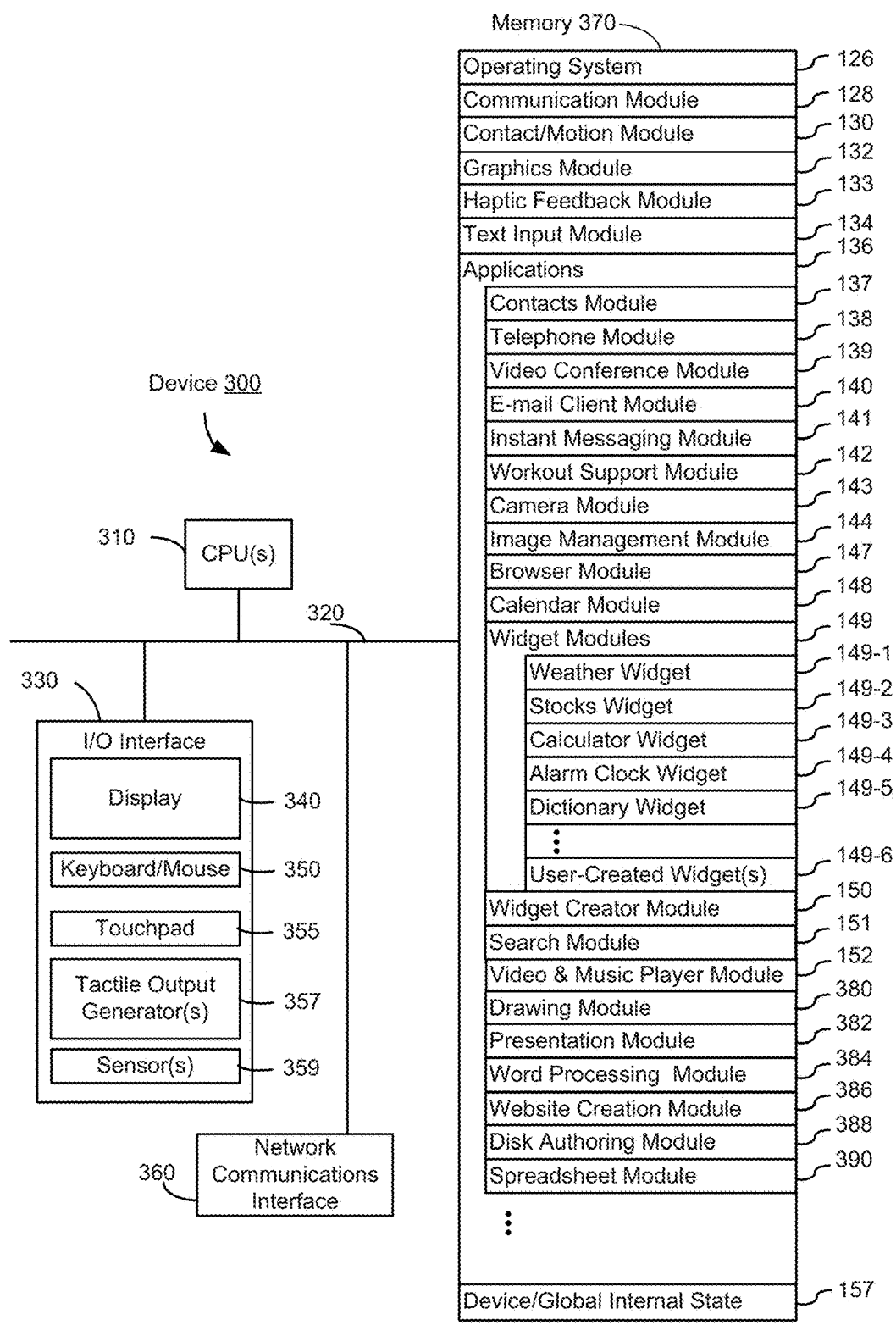
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns and intensities. Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:

contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
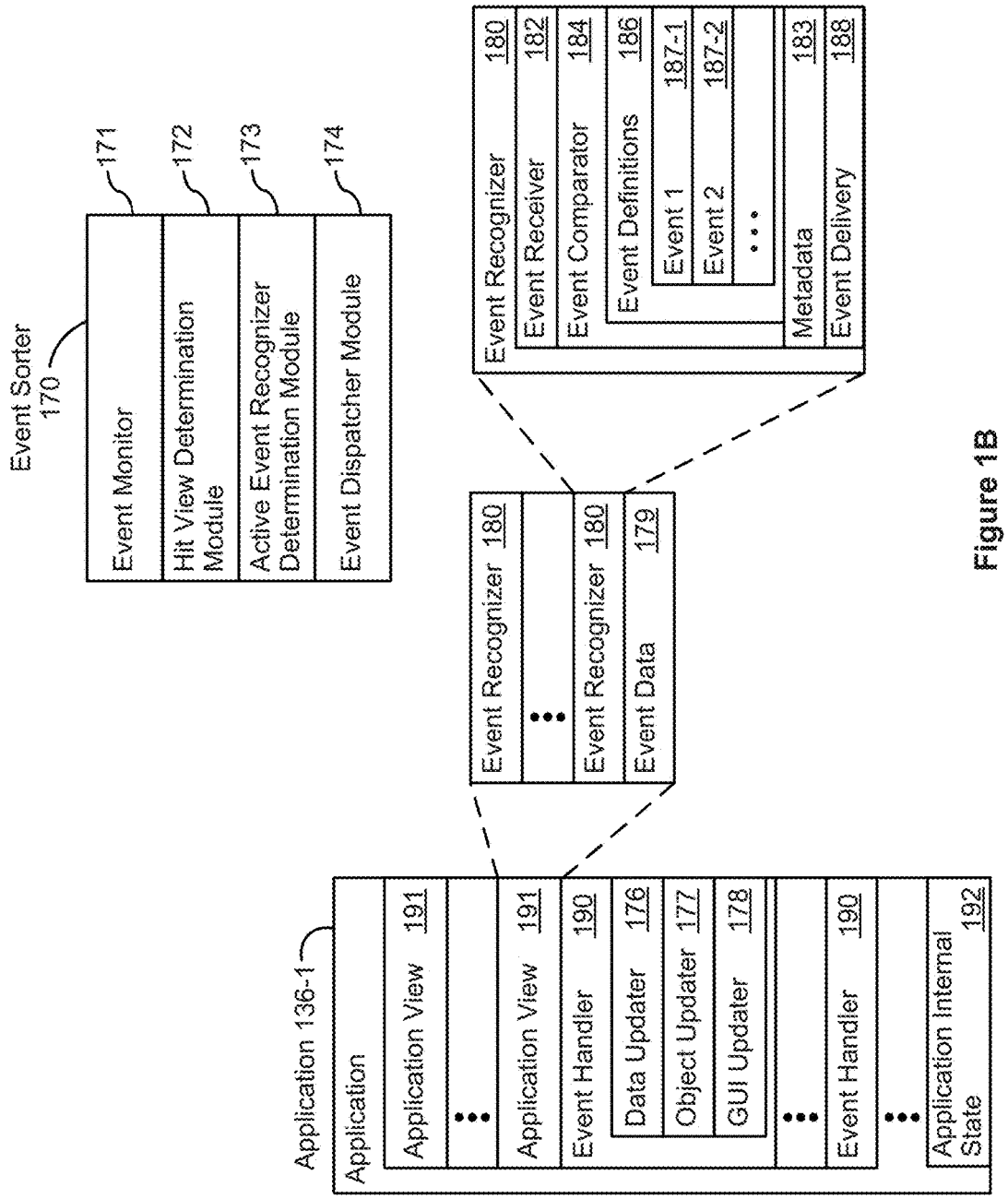
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
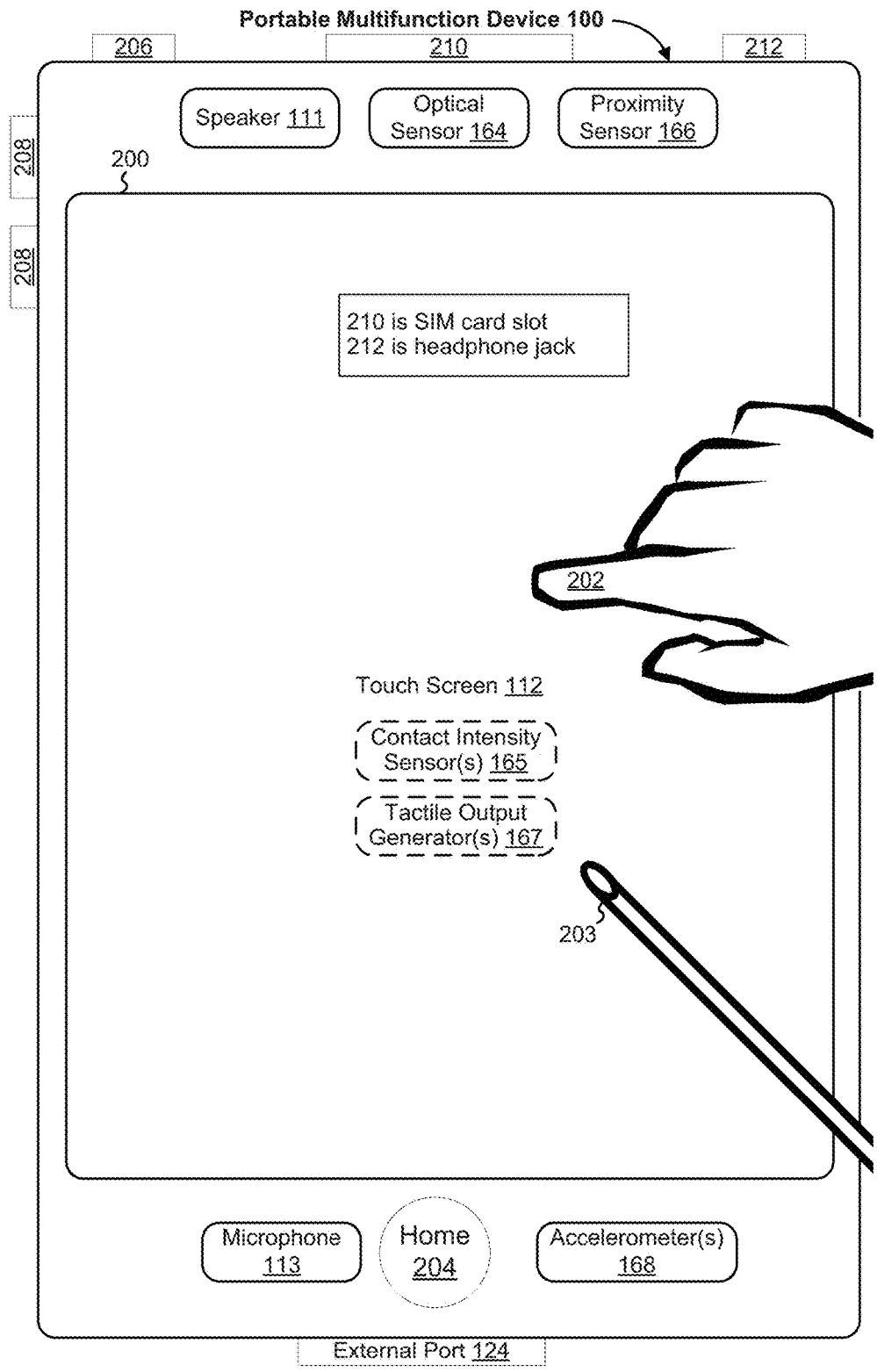
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
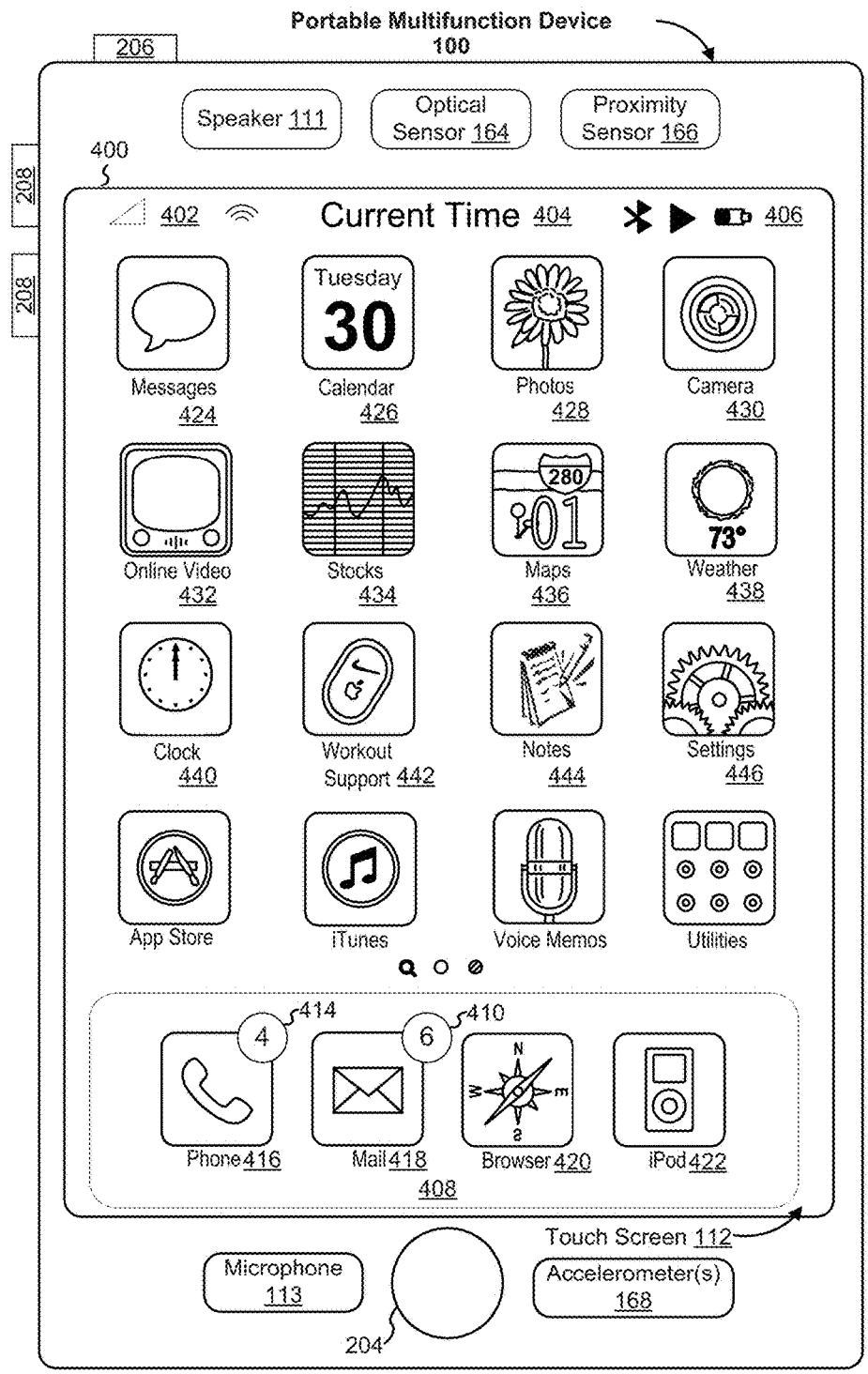
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Text;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video"
  - Icon 434 for stocks widget 149-2, labeled "Stocks;"
  - Icon 436 for map module 154, labeled "Map;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
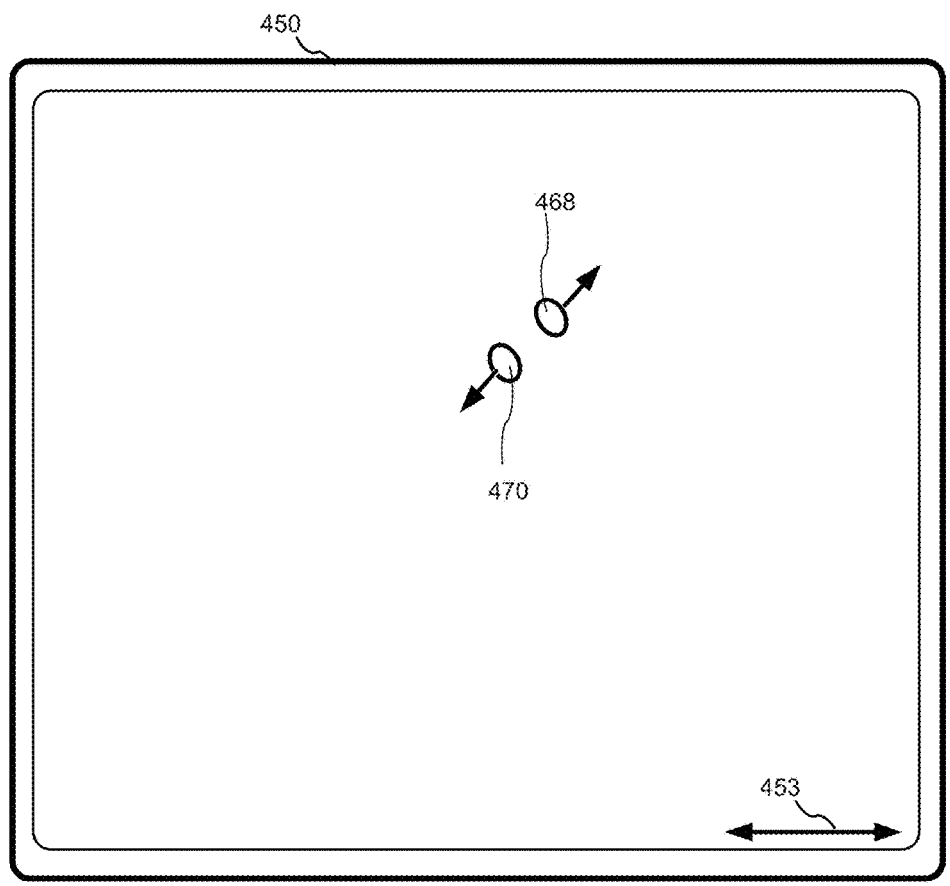
FIG. 4B illustrates an exemplary user interface for a multifunction device with a touch-sensitive surface that is separate from the display in accordance with some embodiments.
Figure 4B:
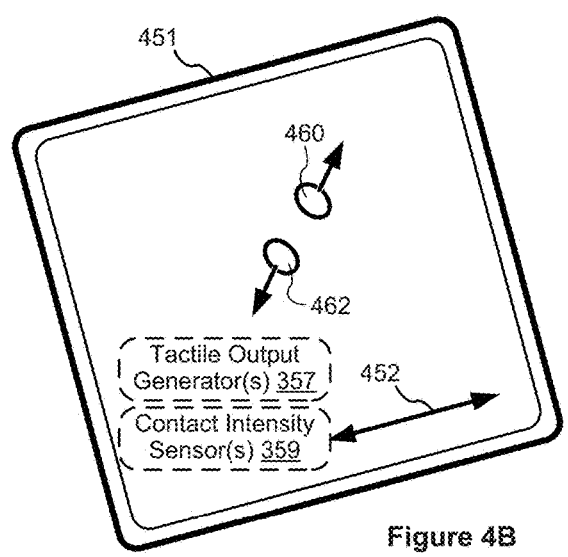

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

The user interface figures described below include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$, and/or one or more other intensity thresholds). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with an intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of intensity of the contact from an intensity below the light press intensity threshold $IT_L$ to an intensity between the light press intensity threshold $IT_L$ and the deep press intensity threshold $IT_D$ is sometimes referred to as a "light press" input. An increase of intensity of the contact from an intensity below the deep press intensity threshold $IT_D$ to an intensity above the deep press intensity threshold $IT_D$ is sometimes referred to as a "deep press" input. An increase of intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of intensity of the contact from an intensity above the contact-detection intensity threshold $IT_0$ to an intensity below the contact intensity threshold $IT_0$ is sometimes referred to as detecting liftoff of the contact from the touch-surface. In some embodiments $IT_0$ is zero. In some embodiments $IT_0$ is greater than zero. In some illustrations a shaded circle or oval is used to represent intensity of a contact on the touch-sensitive surface. In some illustrations a circle or oval without shading is used represent a respective contact on the touch-sensitive surface without specifying the intensity of the respective contact.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

User Interfaces and Associated Processes

Manipulating Framed Graphical Objects

Many electronic devices have graphical user interfaces that include various graphical objects and frames that are controlled by a confusing set of overlapping and sometimes conflicting inputs. For example, photo album software allows a user to arrange and customize pictures to be displayed or printed at a later time. In this example, customizing the pictures may include selecting which frame to put a picture in and adjusting the picture's appearance within the frame. There is a need to provide a fast, efficient, and convenient way for users to manipulate the pictures (or other graphical objects) inside, outside, and between frames. The embodiments described below provide a fast, efficient, and convenient way for users to manipulate the graphical objects inside, outside, and between frames using inputs that are differentiated in accordance with an intensity of the inputs.

FIGS. 5A-5F illustrate exemplary user interfaces for manipulating framed graphical objects using gestures on a touch-sensitive surface in accordance with some embodiments. The user interfaces in these figures are used to illustrate the processes described below, including the processes described below with reference to FIGS. 6A-6B. FIGS. 5C-5F include intensity diagrams that show the current intensity of the contact on the touch-sensitive surface relative to a plurality of intensity thresholds including a respective threshold (e.g., "$IT_D$"). In some embodiments, operations similar to those described below with reference to $IT_D$ are performed with reference to a different intensity threshold (e.g., "$IT_L$").

Figure 5A:
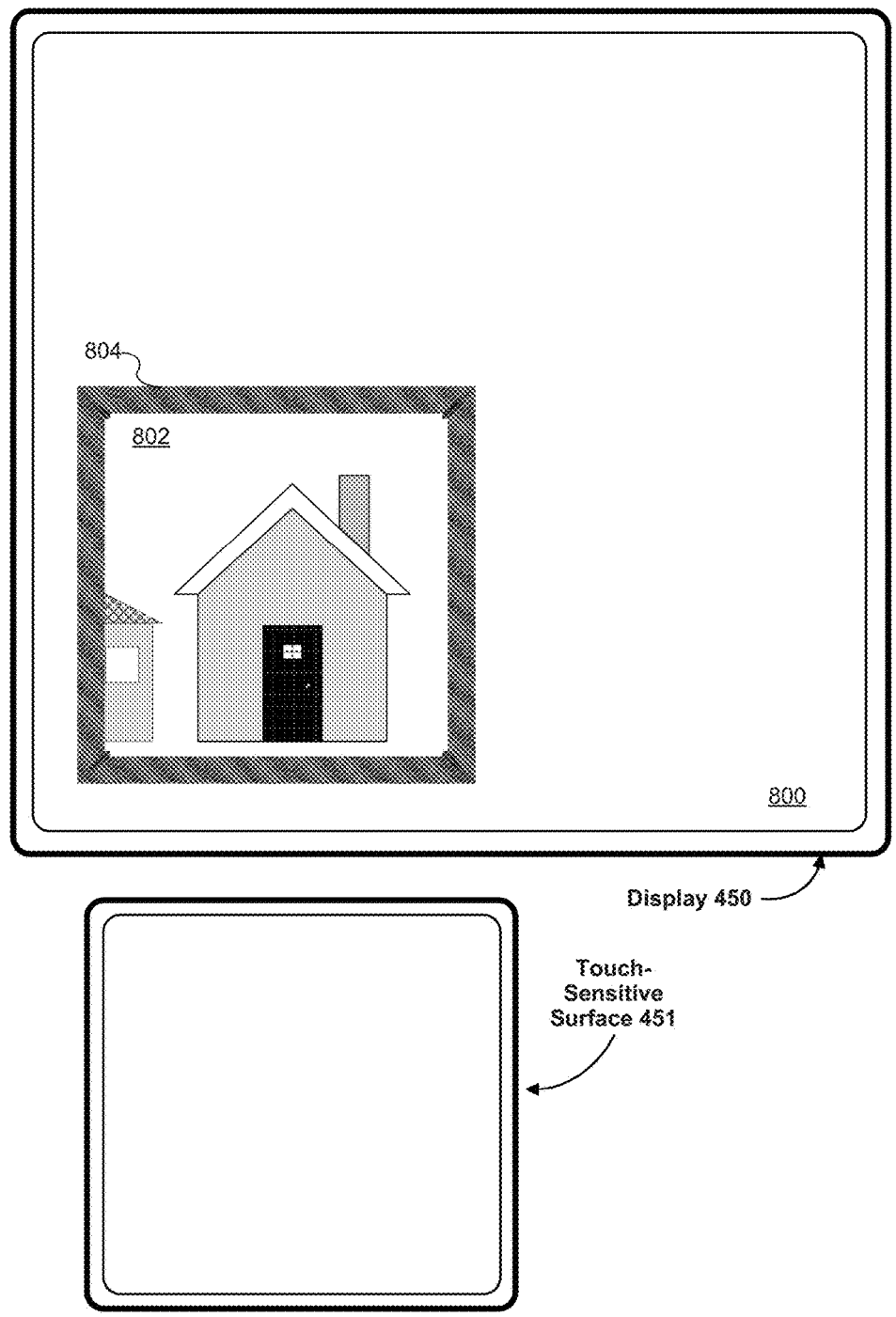
FIGS. 5A-5F illustrate exemplary user interfaces for manipulating framed graphical objects in accordance with some embodiments.
Figure 6A:
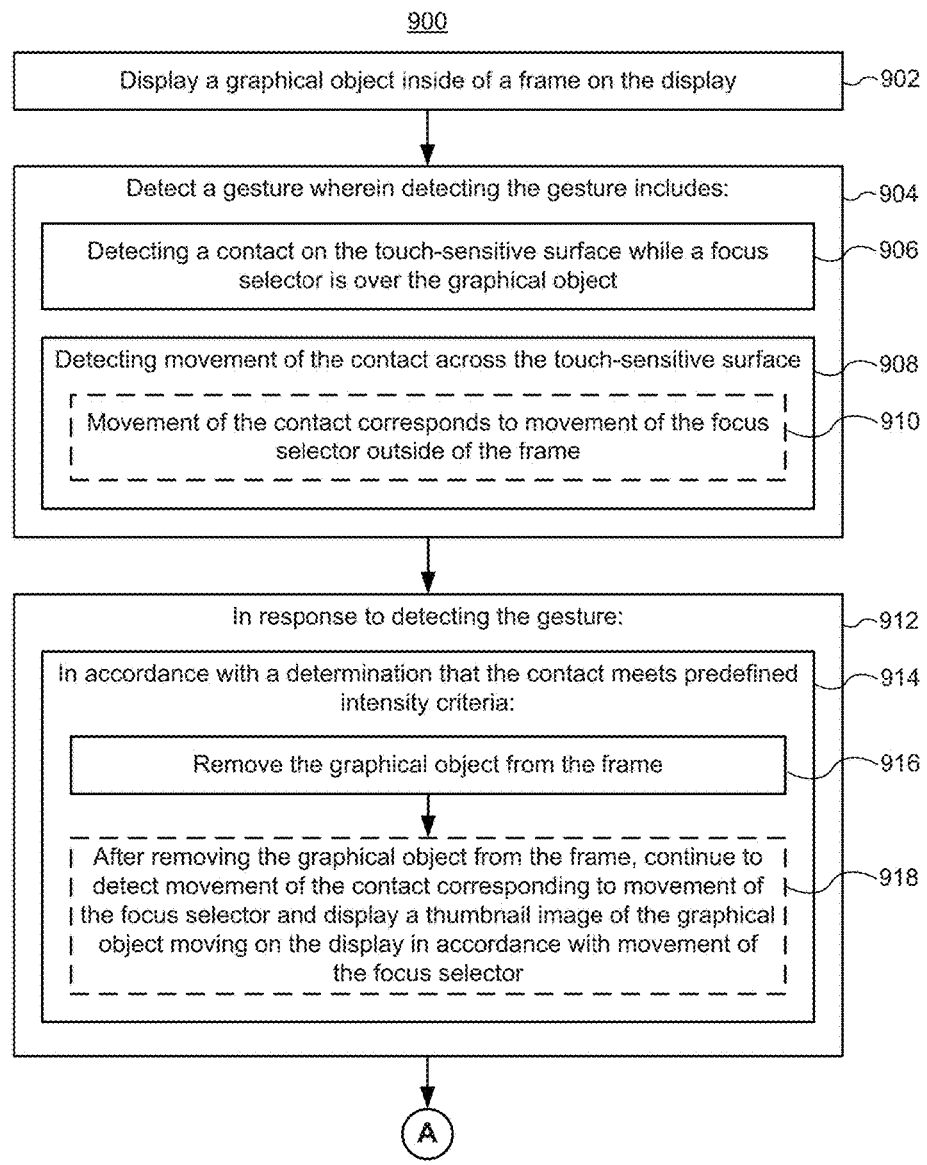
FIGS. 6A-6B are flow diagrams illustrating a method of manipulating framed graphical objects in accordance with some embodiments.
Figure 6B:
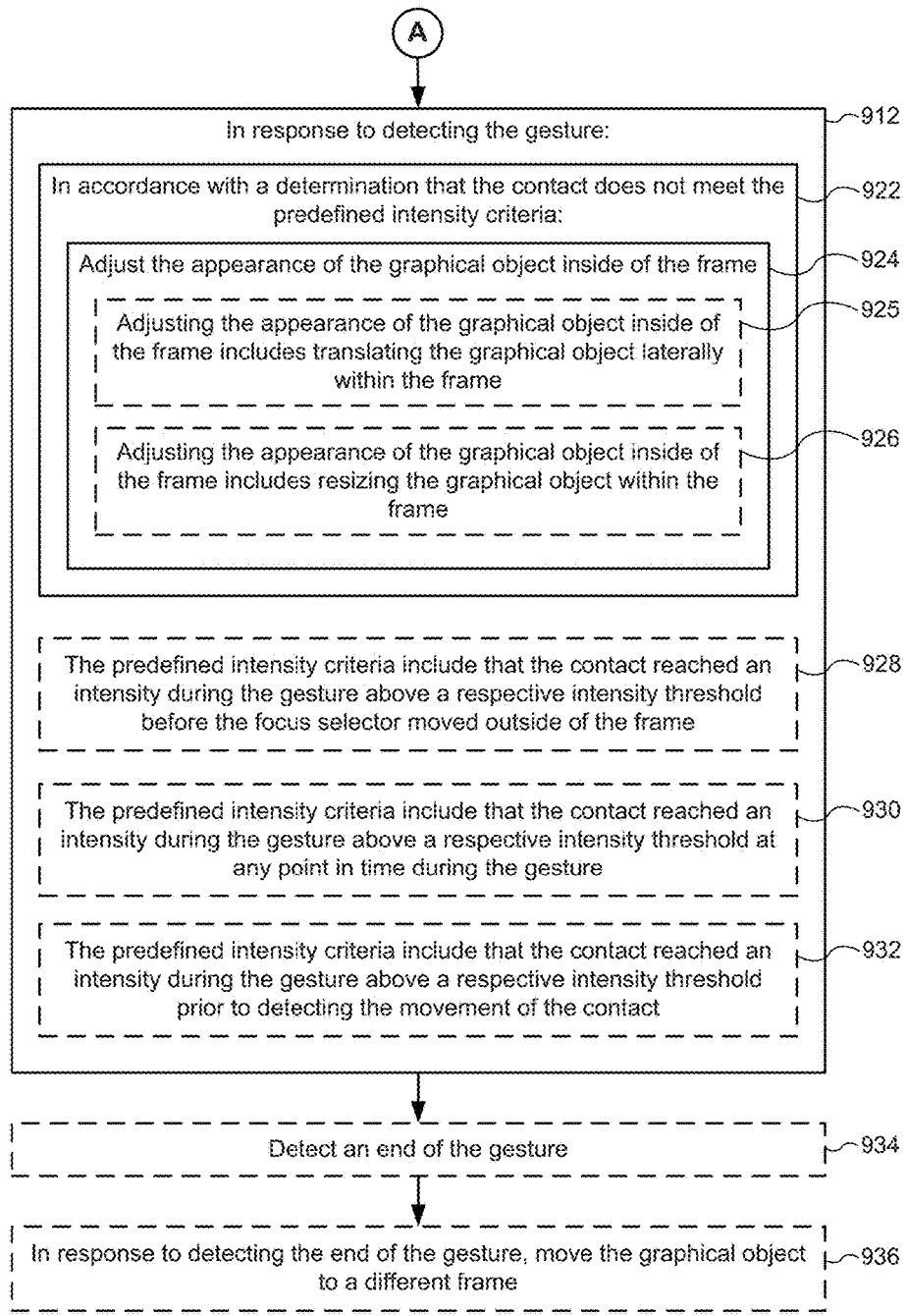

FIG. 5A illustrates an example of a user interface that includes a framed graphical object. User interface 800 is displayed on display 450 of a device (e.g., device 300) and is responsive to gestures on touch-sensitive surface 451. User interface 800 includes graphical object 802 displayed within frame 804.

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 5A-5F and 6A-6B will be discussed with reference to display 450 and a separate touch-sensitive surface 451, however analogous operations are, optionally, performed on a device with a touch-sensitive display system 112 in response to detecting the contacts described in FIGS. 5A-5F on the touch-sensitive display system 112 while displaying the user interfaces shown in FIGS. 5A-5F on the touch-sensitive display system 112; in such embodiments, the focus selector is, optionally: a respective contact, a representative point corresponding to a contact (e.g., a centroid of a respective contact or a point associated with a respective contact), or a centroid of two or more contacts detected on the touch-sensitive display system 112, in place of cursor 806

Figure 5B:
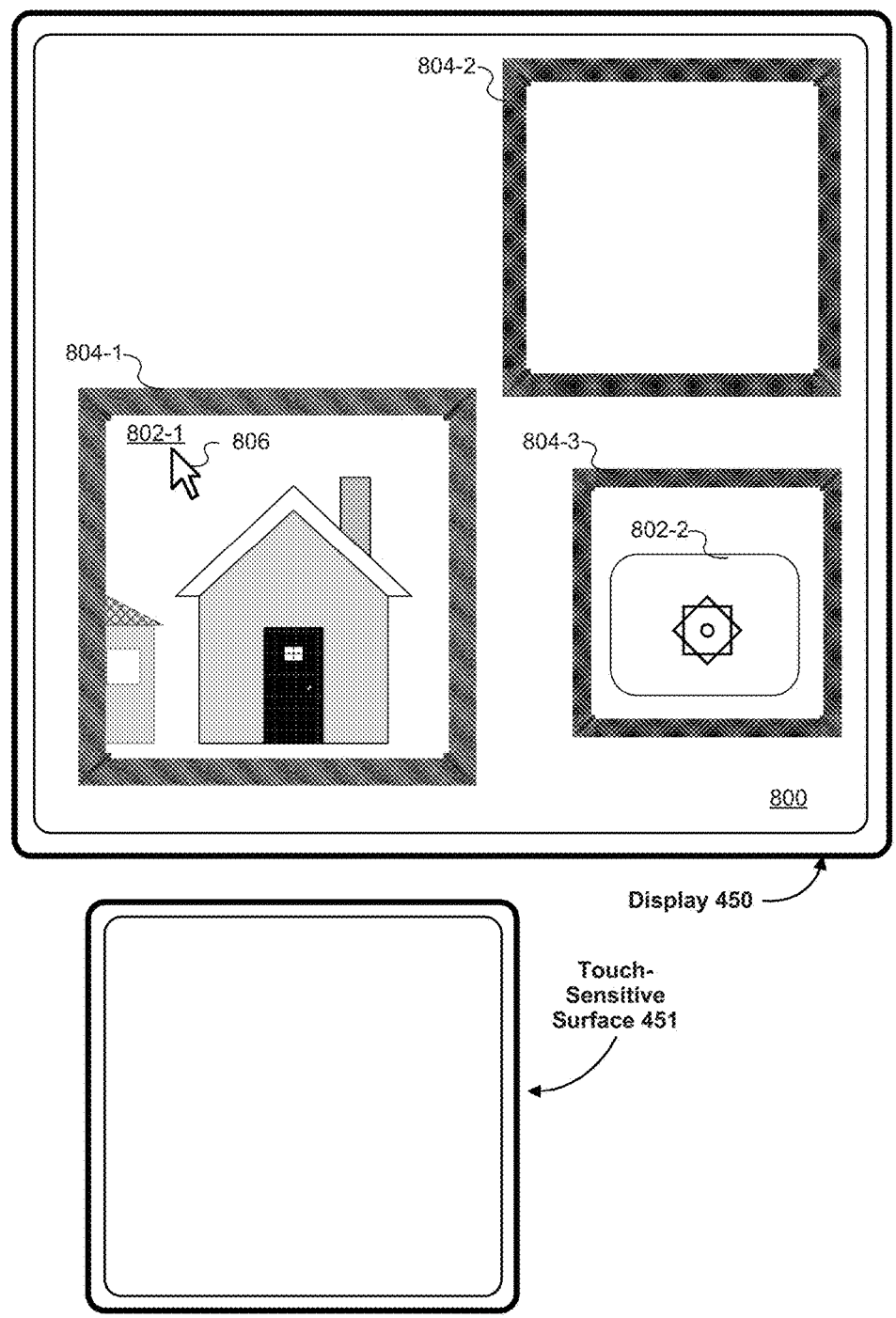

FIG. 5B illustrates another example of a user interface. In FIG. 5B, user interface 800 includes a plurality of frames 804-1 through 804-3 and a plurality of graphical objects 802-1 through 802-2. Per some embodiments, graphical user interface 800 in FIG. 5B also includes a displayed representation of focus selector 806 (e.g., a cursor), responsive to gestures on touch-sensitive surface 451. As shown in FIG. 5B, a frame may be empty (e.g., frame 804-2). Alternatively, a frame may contain one or more graphical objects (e.g., frame 804-1 contains graphical object 802-1 such as a picture or chart). In the examples described below with reference to FIGS. 5A-5F, the graphical objects 802 are pictures, and there is no more than one graphical object in a respective frame 804 at a time. However, in some embodiments, multiple graphical objects can be placed in a single frame (e.g., multiple shapes or icons on a canvas of a drawing application), and the multiple graphical objects are configured to be moved/resized relative to each other within the frame and moved in and out of respective frames independently of each other.

In some implementations, a displayed representation of focus selector 806 is a cursor with a position on display 450 that is determined in accordance with contacts received by touch-sensitive surface 451. In other implementations the focus selector has a different displayed representation (e.g., a magnifying glass). Alternatively, in some implementations a representation of the focus selector is not displayed. For example, in implementations using a touch-sensitive display system, the position of the focus selector corresponds to the location on the display of a contact or gesture. Further, the focus selector is herein defined to be "over" a user interface object when the position of the focus selector corresponds to the location on the display of the user interface object.

Figure 5C:
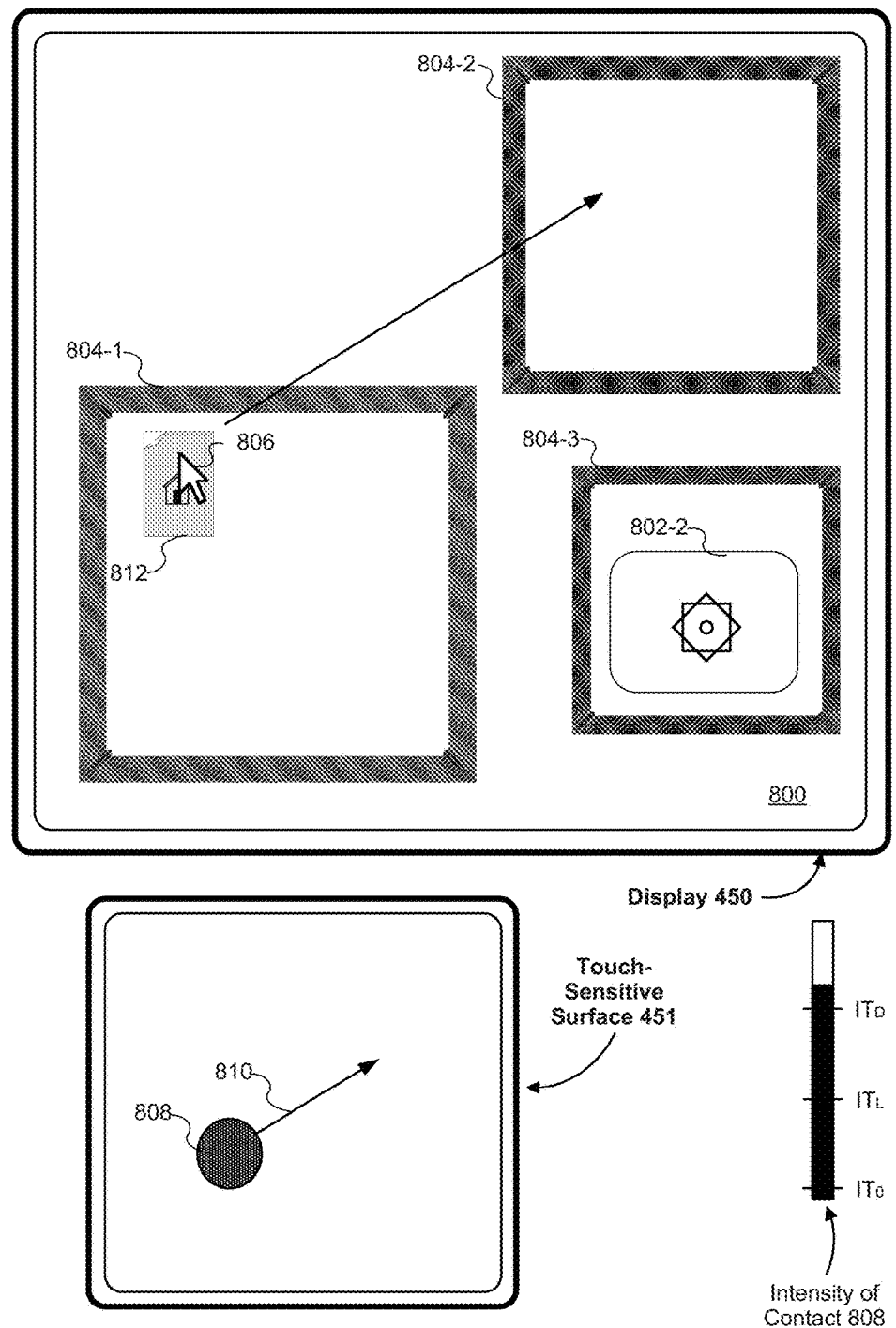
Figure 5D:
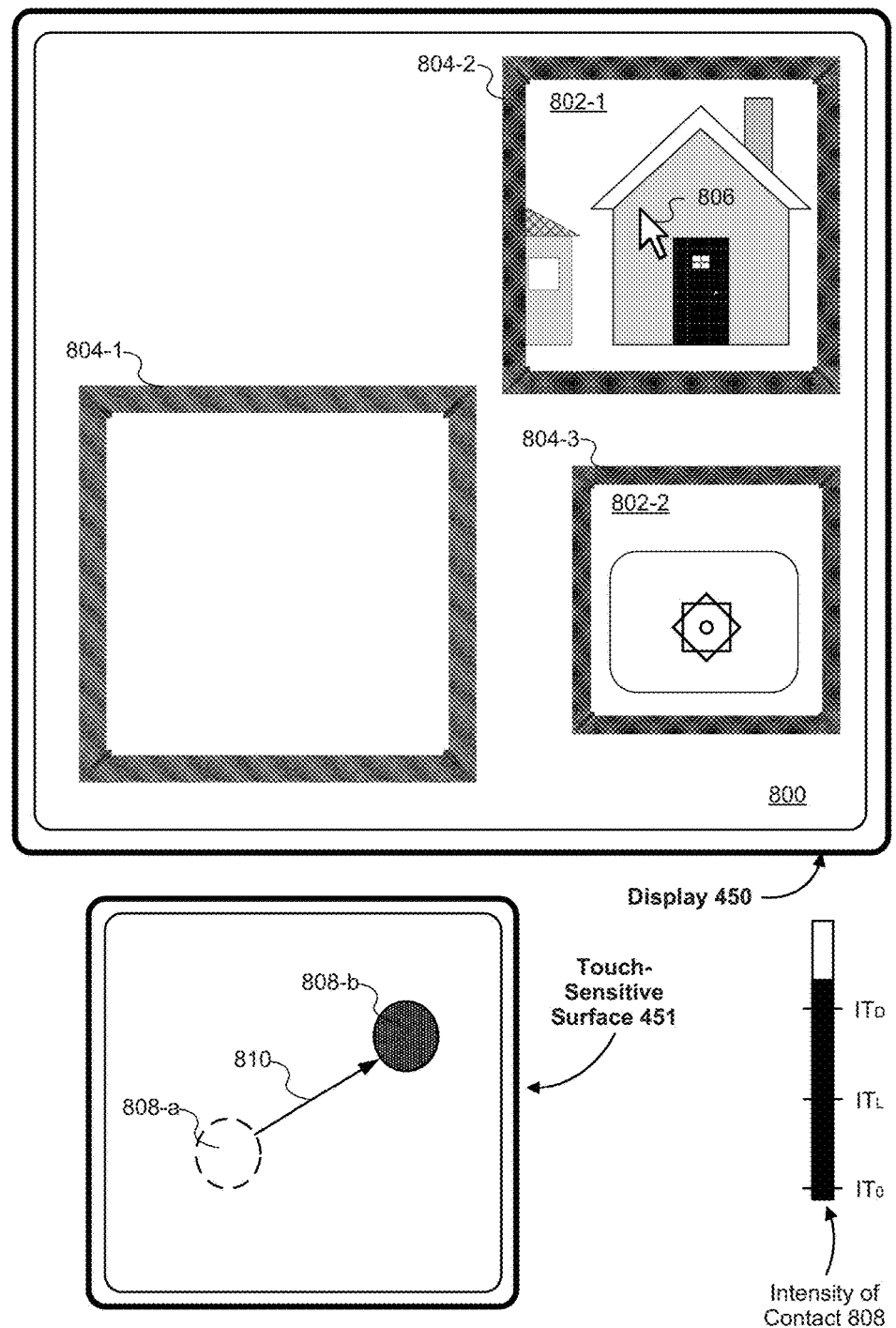

FIG. 5C illustrates an example of removing a graphical object from a frame. In this example, graphical object 802-1 is initially within frame 804-1, as shown in FIG. 5B. In response to detecting a gesture, graphical object 802-1 is removed from frame 804-1 in accordance with a determination that contact 808 on the touch-sensitive surface meets predefined intensity criteria (with the intensity represented by a dense patterned background in contact 808 and the intensity meter showing that the intensity of contact 808 is above a respective intensity threshold $IT_D$). In some embodiments, as shown in FIG. 8C, an icon or thumbnail image 812 of the graphical object is displayed at or near a location of the focus selector (e.g., cursor 806) in response to detecting the increase in intensity of contact 808 (e.g., in conjunction with or after ceasing to display the graphical object from the frame). FIGS. 5C-5D further illustrate movement 810 of the contact on the touch-sensitive surface 451 that corresponds to movement of focus selector 806 outside of frame 804-1. In some embodiments, thumbnail image 812 of the graphical object moves in accordance with movement of focus selector 806.

As shown in FIG. 5C, a user gesture on touch-sensitive surface 451 includes contact 808 while focus selector 806 is over a graphical object 802 and movement 810 of the contact across touch-sensitive surface 451. In some embodiments, the predetermined intensity criteria include that the contact reaches an intensity during the gesture above a respective intensity threshold at any point in time during the gesture. In some embodiments, the predefined intensity criteria include that the contact reaches an intensity during the gesture above a respective intensity threshold before the focus selector moves outside of the frame. In some embodiments, the predefined intensity criteria include that the contact reaches an intensity during the gesture above a respective intensity threshold prior to detecting the movement of the contact.

In some embodiments, the graphical object is removed from the frame in response to detecting the increase in intensity of the contact to an intensity that is greater than a respective intensity threshold (e.g., $IT_D$). In some embodiments, after the graphical object has been removed from the frame, the graphical object continues to be removed from the frame even if the intensity of the contact decreases below the respective intensity threshold (e.g., $IT_D$). For example, after the graphical object has been picked up/selected the selection of the graphical object is maintained (e.g., a representation of the graphical object is not dropped and the graphical object is not returned to the frame) when the intensity of the contact decreases to an intensity below $IT_D$, and the graphical object is dropped in a different frame and/or returned to the frame when the intensity of the contact is reduced below $IT_L$. As another example, after the graphical object has been picked up/selected the selection of the graphical object is maintained (e.g., a representation of the graphical object is not dropped and the graphical object is not returned to the frame) when the intensity of the contact decreases to an intensity below $IT_D$, and the graphical object is dropped in a different frame and/or returned to the frame when the contact is lifted off of the touch-sensitive surface (e.g., the intensity of the contact is reduced below $IT_0$). Thus, in some embodiments, in response to detecting a press input on the touch-sensitive surface that includes a contact with an intensity above $IT_D$, the device enters an object-movement mode in which the graphical object that was in the frame is moved to a location corresponding to a focus selector (e.g., a frame or portion of a user interface over which the focus selector is located) when the device exits the object-movement mode without regard to whether or not the intensity of the contact was above $IT_D$ while the device was in the object-movement mode. In some embodiments, the device exits the object-movement mode in response to detecting a decrease in intensity of the contact below a different intensity threshold (e.g., $IT_L$) such as $IT_L$. In some embodiments, the device exits the object-movement mode in response to detecting liftoff of the contact from the touch-sensitive surface (e.g., a decrease in intensity of the contact below $IT_0$). In some embodiments, the device exits the object-movement mode in response to detecting an increase in intensity of the contact from an intensity below a different intensity threshold (e.g., $IT_L$) to an intensity above the respective intensity threshold (e.g. $IT_D$).

FIGS. 5B and 5D illustrate an example of moving a graphical object from one frame to another frame. In this example, graphical object 802-1 is initially within frame 804-1, as shown in FIG. 5B. In response to detecting a gesture, graphical object 802-1 is removed from frame 804-1 in accordance with a determination that contact 808 meets the predefined intensity criteria (with the intensity represented by a dense patterned background in contact 808). FIG. 5D further illustrates the contact having an initial position 808-a and movement of the contact 810 to a final position 808-b on the touch-sensitive surface. In response to detecting an end of the gesture (e.g., liftoff of contact 808 from the touch-sensitive surface 451) at contact position 808-b, graphical object 802-1 is moved to frame 804-2. In some embodiments, graphical object 802-1 is moved to frame 804-2 in response to detecting liftoff contact 808-b. In some embodiments, graphical object 802-1 is moved to frame 804-2 in response to detecting a reduction in intensity of contact 808-b to an intensity below $IT_L$.

Figure 5E:
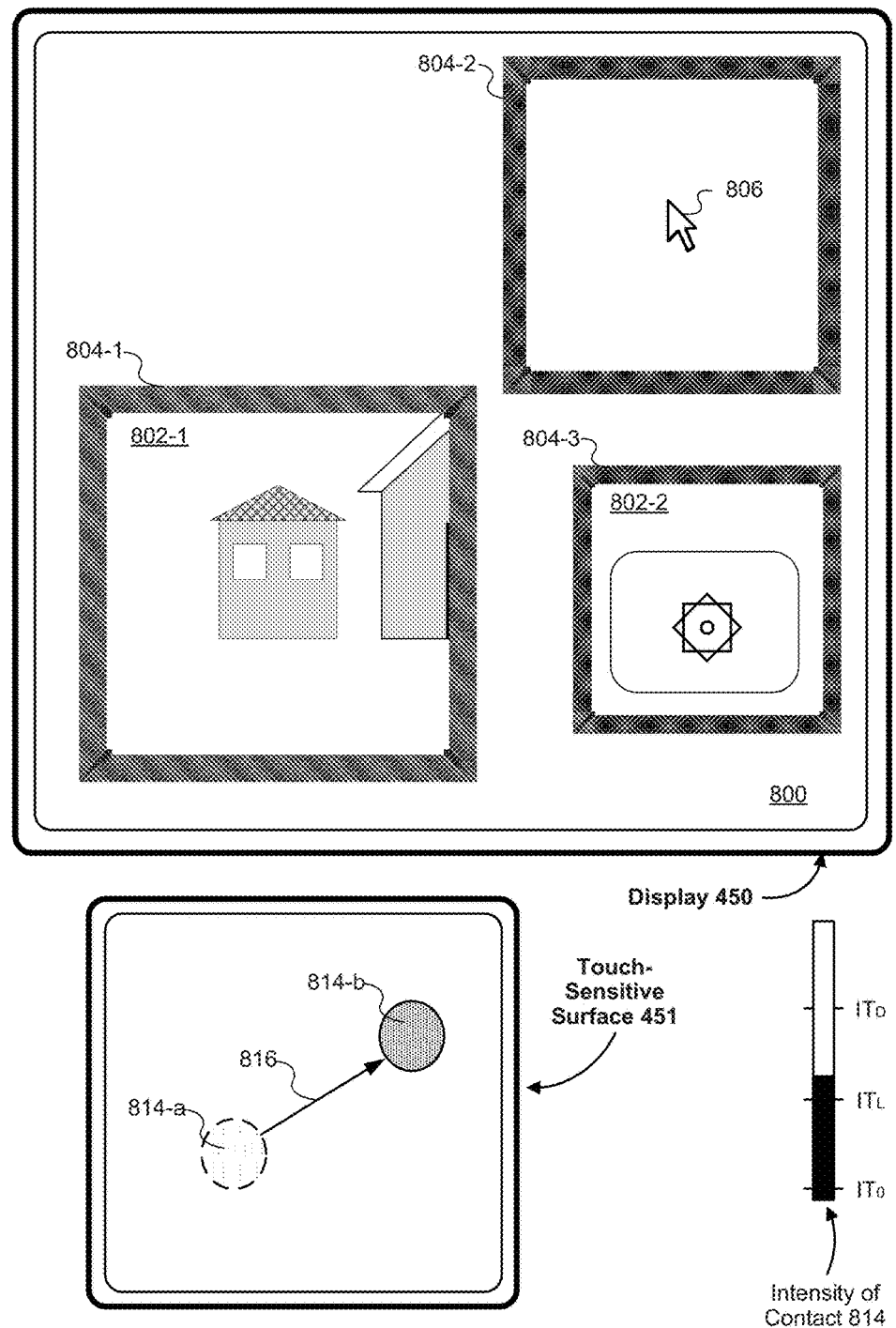

FIGS. 5B and 5E illustrate an example of adjusting the appearance of a graphical object within a frame. The appearance of graphical object 802-1 is adjusted inside of frame 804-1, in accordance with a determination that the contact does not meet the predefined intensity criteria (with the intensity represented by a sparse patterned background in contact 808 and the intensity meter showing that the intensity of contact 814 is above a respective intensity threshold $IT_D$). Graphical object 802-1 has an initial appearance in frame 804-1 as shown in FIG. 5B and, in this example, adjusting the appearance of graphical object 802-1 includes translating it laterally within frame 804-1 (e.g., moving the graphical object vertically, horizontally, or diagonally within the frame). Although focus selector 806 moves outside of frame 804-1, graphical object 802-1 is not removed from frame 804-1 because the contact intensity does not exceed the respective intensity threshold (e.g., "$IT_D$" in FIG. 5E).

Figure 5F:
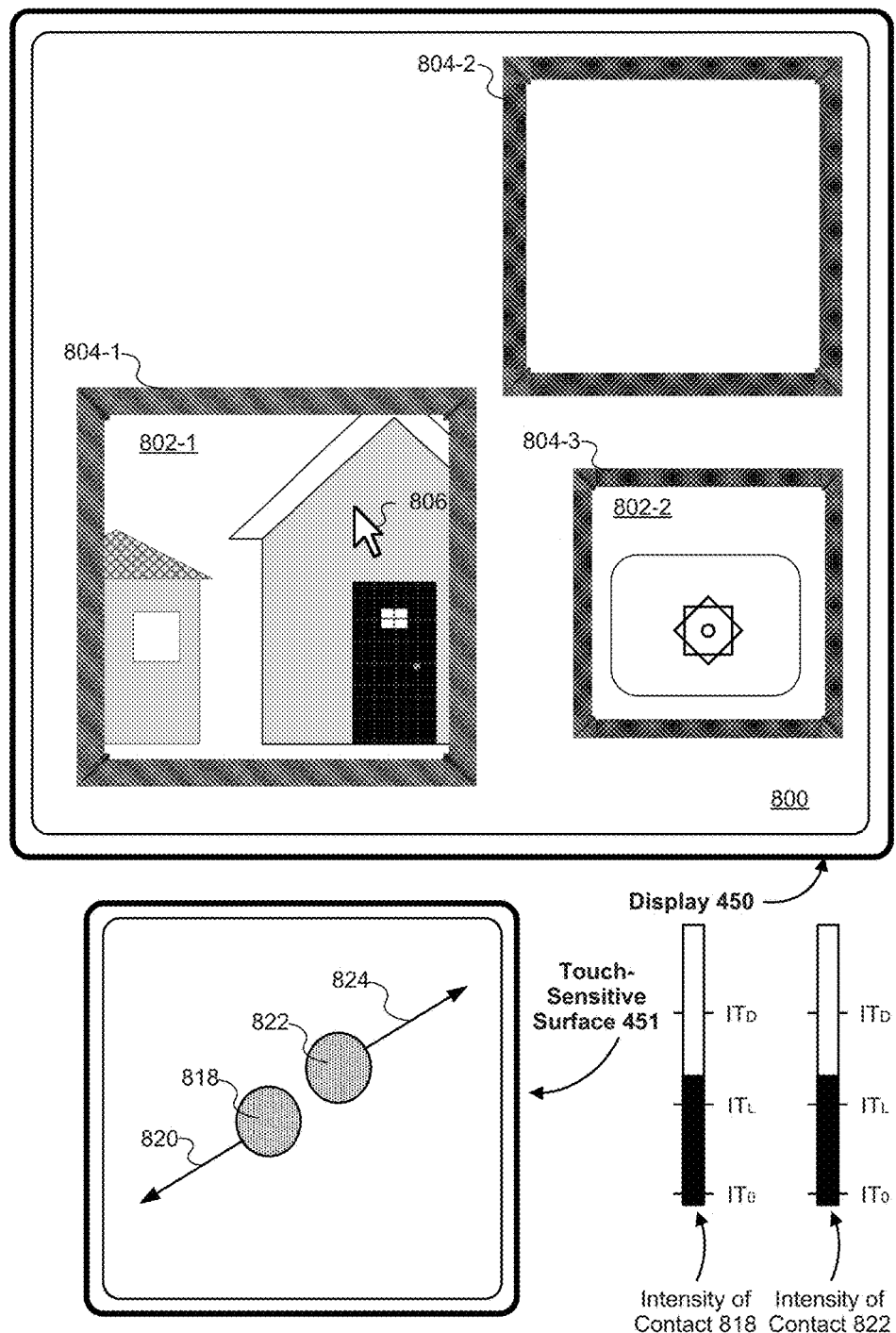

FIGS. 5B and 5F also illustrate an example of adjusting the appearance of a graphical object within a frame, rather than removing the graphical object from the frame. The appearance of graphical object 802-1 is adjusted inside of frame 804-1, in accordance with a determination that contacts 818 and 822 do not meet the predefined intensity criteria (represented by a sparse patterned background in contacts 818 and 822 and the intensity meters for the respective contacts that show that the respective intensities of the respective contacts are below the respective intensity threshold $IT_D$ and above intensity threshold $IT_L$). FIG. 5F further illustrates detecting a gesture that includes a plurality of contacts 818 and 822 and the respective movement 820 and 824 of the contacts. Graphical object 802-1 has an initial appearance in frame 804-1 as shown in FIG. 5B and, in this example, adjusting the appearance of graphical object 802-1 in accordance with the movement of the plurality of contacts 818 and 822, includes resizing graphical object 802-1 within frame 804-1.

FIGS. 6A-6B are flow diagrams illustrating a method 900 of manipulating framed graphical objects in accordance with some embodiments. The method 900 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 900 are, optionally, combined and/or the order of some operations are, optionally, changed.

As described below, the method 900 provides an intuitive way to manipulate framed graphical objects. The method reduces the cognitive burden on a user when manipulating a framed graphical object, thereby creating a more efficient human-machine interface. For battery-operated electronic devices, enabling a user to manipulate framed graphical objects faster and more efficiently conserves power and increases the time between battery charges.

The device displays (902) a graphical object inside of a frame on the display. FIG. 5A, for example, shows graphical object 802 and frame 804, displayed in graphical user interface 800.

The device detects (904) a gesture that includes detecting (906) a contact on the touch-sensitive surface while a focus selector is over the graphical object and detecting (908) movement of the contact across the touch-sensitive surface. Thus, in some embodiments, the gesture includes detecting a contact on the touch-sensitive surface and then detecting subsequent movement of the contact on the touch-sensitive surface. As shown in FIG. 5C, for example, contact 808 and movement 810 of the contact is detected on touch-sensitive surface 451. In some embodiments, movement of the contact corresponds to movement of the focus selector outside of the frame (910). In FIGS. 5C-5E, for example, focus selector 806 moves outside of frame 804-1 during movement 810 of the contact on touch-sensitive surface 451.

In response to detecting the gesture (912), in accordance with a determination that the contact meets predefined intensity criteria (914), the device removes the graphical object from the frame (916). For example, FIG. 5C shows contact 808 having an intensity above the respective intensity threshold (e.g., "$IT_D$"), and removing graphical object 802-1 from frame 804-1. In some embodiments, after removing the graphical object from the frame, the device continues to detect movement of the contact, where the movement of the contact corresponds to movement of the focus selector, and the device displays a thumbnail image of the graphical object moving on the display in accordance with movement of the focus selector (918). For example, FIG. 5C shows frame 804-1 as being empty (graphical object 802-1 has been removed) and thumbnail 812 moving in accordance with movement of focus selector 806.

Conversely, in response to detecting the gesture (912), in accordance with a determination that the contact does not meet (922) the predefined intensity criteria (e.g., the contact had a maximum intensity during the gesture below the respective intensity threshold), the device adjusts (924) the appearance of the graphical object inside of the frame. For example FIG. 5E shows a gesture that includes contact 814 and movement 816 of the contact from 814-a to 814-b, contact 814 having an intensity below the respective intensity threshold (e.g., contact with intensity below $IT_D$ and, optionally, above $IT_L$). For example FIG. 5F shows a depinch gesture that includes contacts 818 and 822 with movements 820 and 824, respectively, with contacts 818 and 822 having intensities below the respective intensity threshold (e.g., contacts with intensities below $IT_D$ and, optionally, above $IT_L$). The appearance of graphical object 802-1 is adjusted within frame 804-1 in both examples in response to detecting the respective gestures, rather than removing graphical object 802-1 from the frame. In some embodiments, in response to detecting a gesture with a contact having an intensity below a lower intensity threshold (e.g., "$IT_L$") while the focus selector is over frame 804-1, the device moves the focus selector away from frame 804-1 without adjusting the appearance of graphical object 802-1 within the frame and without removing the graphical object 802-1 from frame 804-1 (e.g., without moving graphical object 802-1 to a different frame).

In some embodiments, adjusting the appearance of the graphical object inside of the frame includes translating the graphical object laterally within the frame (925). FIG. 5E, for example, shows graphical object 802-1 shifted (translated laterally) within frame 804-1. In some embodiments, adjusting the appearance of the graphical object inside of the frame includes resizing the graphical object within the frame (926). For example, FIG. 5F shows graphical object 802-1 enlarged (resized) within frame 804-1.

In some embodiments, the predefined intensity criteria include that (928) the contact reached an intensity during the gesture above a respective intensity threshold before the focus selector moved outside of the frame. In these embodiments, in FIG. 5D, contact 808 reaches an intensity above the respective intensity threshold before the focus selector 806 moved outside of frame 804-1 in accordance with movement 810 of the contact on the touch-sensitive surface.

In some embodiments, the predefined intensity criteria include that (930) the contact reached an intensity during the gesture above a respective intensity threshold (e.g., "$IT_D$") at any point in time during the gesture (e.g., before or after the focus selector moves outside of the frame). In these embodiments, in FIG. 5D, contact 808 reached an intensity above the respective intensity at any point in time during movement of the contact through the end of the gesture at position 808-b.

In some embodiments, the predefined intensity criteria include that (932) the contact reached an intensity during the gesture above a respective intensity threshold (e.g., "$IT_D$") prior to detecting the movement of the contact. Thus, in some embodiments, the mode of interacting with the graphical object (e.g., constrained-within-frame or unconstrained) is determined before the contact starts to move. In these embodiments, in FIG. 5D, contact 808 reached an intensity above the respective intensity threshold at initial position 808-*a* before movement 810 of the contact.

In some embodiments, after the graphical object has been removed from the frame, the device detects (934) an end of the gesture (e.g., liftoff of contact 808 from the touch-sensitive surface), and in response to detecting the end of the gesture, the device moves (936) the graphical object to a different frame. For example, in FIG. 5D an end of the gesture made with contact 808 is detected and graphical object 802-1 is displayed within frame 804-2.

It should be understood that the particular order in which the operations in FIGS. 6A-6B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 900 described above with respect to FIGS. 6A-6B. For example, the gestures, contacts, intensity thresholds, graphical objects, frames, focus selectors, and thumbnails described above with reference to method 900 may have one or more of the characteristics of the gestures, contacts, intensity thresholds, graphical objects, frames, focus selectors, and thumbnails described herein with reference to other methods described herein (e.g., those listed in the fifth paragraph of the Description of Embodiments). For brevity, these details are not repeated here.

Figure 7:
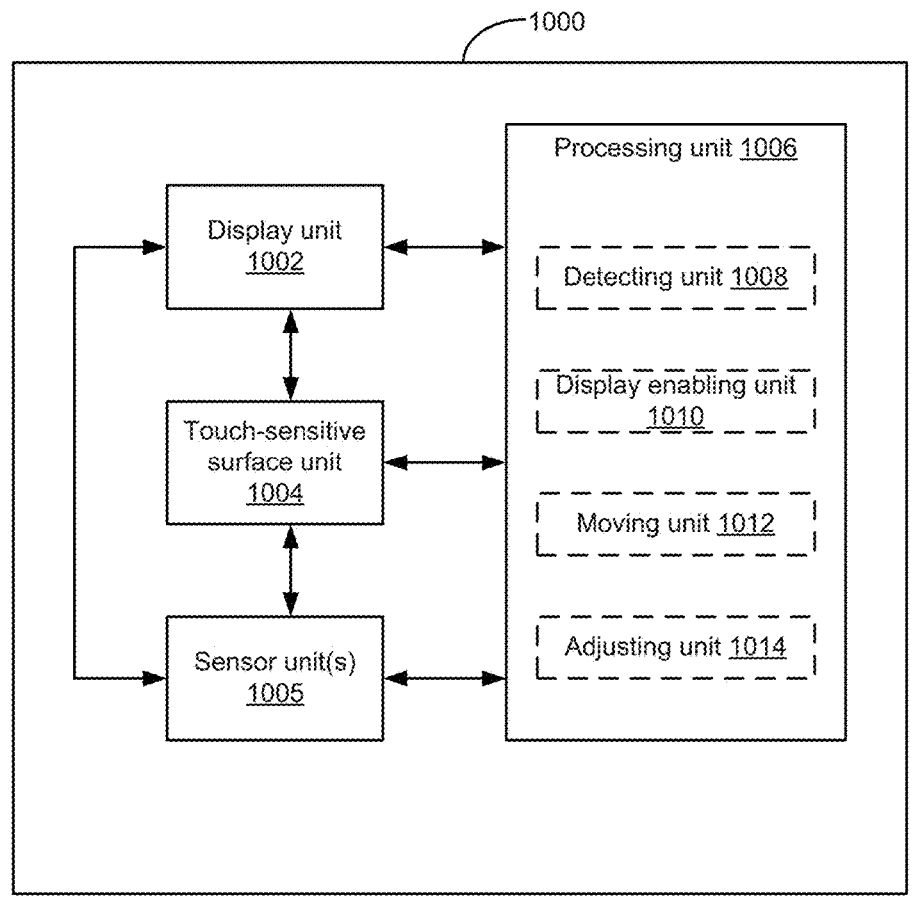
FIG. 7 is a functional block diagram of an electronic device in accordance with some embodiments.

In accordance with some embodiments, FIG. 7 shows a functional block diagram of an electronic device 1000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 7 are, optionally, combined or separated into sub-blocks to implement the principles of the various described embodiments. Therefore, the description herein optionally supports any possible combination or separation or further definition of the functional blocks described herein. As shown in FIG. 7, an electronic device 1000 includes a display unit 1002 configured to display a graphical object inside of a frame; a touch-sensitive surface unit 1004 configured to receive user gestures; one or more sensor units 1005 configured to detect intensity of contacts with the touch-sensitive surface unit; and a processing unit 1006 coupled to the display unit 1002, the touch-sensitive surface unit 1004, and the sensor units 1005. In some embodiments, the processing unit includes a detecting unit 1008, a display enabling unit 1010, a moving unit 1012, and an adjusting unit 1014.

The processing unit 1006 is configured to: detect a gesture (e.g., with the detecting unit 1008), wherein detecting the gesture includes: detecting a contact on the touch-sensitive surface unit 1004 while a focus selector is over the graphical object; and detecting movement of the contact across the touch-sensitive surface unit 1004; and in response to detecting the gesture: in accordance with a determination that the contact met predefined intensity criteria, remove the graphical object from the frame (e.g., with the moving unit 1012); and in accordance with a determination that the contact did not meet the predefined intensity criteria, adjust an appearance of the graphical object inside of the frame (e.g., with the adjusting unit 1014).

In some embodiments, the movement of the contact corresponds to movement of the focus selector outside of the frame.

In some embodiments, the predefined intensity criteria include that the contact reached an intensity during the gesture above a respective intensity threshold before the focus selector moved outside of the frame.

In some embodiments, the predefined intensity criteria include that the contact reached an intensity during the gesture above a respective intensity threshold at any point in time during the gesture.

In some embodiments, the predefined intensity criteria include that the contact reached an intensity during the gesture above a respective intensity threshold prior to detecting the movement of the contact.

In some embodiments, adjusting the appearance of the graphical object inside of the frame (e.g., with the adjusting unit 1014) includes translating the graphical object laterally within the frame on the display unit 1002.

In some embodiments, adjusting the appearance of the graphical object inside of the frame (e.g., with the adjusting unit 1014) includes resizing the graphical object within the frame on the display unit 1002.

In some embodiments, the processing unit 1006 is further configured to continue to detect movement of the contact (e.g., with the detecting unit 1008), wherein the movement of the contact corresponds to movement of the focus selector; and enable display of (e.g., with the display enabling unit 1010) a thumbnail image of the graphical object moving on the display unit 1002 in accordance with movement of the focus selector after removing the graphical object from the frame.

In some embodiments, the processing unit 1006 is further configured to detect an end of the gesture; and respond to detecting the end of the gesture by moving (e.g., with the moving unit 1012) the graphical object to a different frame on the display unit 1002.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6B are, optionally, implemented by components depicted in FIGS. 1A-1B or FIG. 7. For example, detection operation 906, removing operation 916, adjusting operation 924 and moving operation 936 are, optionally implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Manipulating Images and Masked Images

Many electronic devices have graphical user interfaces that include various masked images that are controlled by a confusing set of overlapping and sometimes conflicting inputs. For example, masking an image is often useful when preparing a document for presentation. In this example, a user will often want to display only part of a larger image or the user will want to adjust the orientation of the image for presentation. Utilizing image masks allows the user to perform these tasks without modifying the original image. However modifying an image mask or an original image that is masked by the image mask sometimes requires multiple steps including navigating through multiple menus to locate controls for modifying the image mask or the original image. There is often a need to provide a fast, efficient, and convenient way for users to transition between modifying the masked image (the image mask and the original image concurrently) and modifying the original image corresponding to the masked image. The embodiments described below provide a fast, efficient, and convenient way for users to transition between modifying the masked image (the image mask and the original image concurrently) and modifying the original image corresponding to the masked image using inputs that are differentiated in accordance with an intensity of the inputs.

FIGS. 8A-8N illustrate exemplary user interfaces for manipulating images and masked images using gestures on a touch-sensitive surface in accordance with some embodiments. The user interfaces in these figures are used to illustrate the processes described below with reference to FIGS. 9A-9C. FIGS. 8A-8N include intensity diagrams that show the current intensity of the contact on the touch-sensitive surface relative to a plurality of intensity thresholds including a respective threshold (e.g., "$IT_D$"). In some embodiments, operations similar to those described below with reference to $IT_D$ are performed with reference to a different intensity threshold (e.g., "$IT_L$").

FIG. 8A illustrates an example of a user interface that includes a masked image. User interface 1500 is displayed on display 450 of a device (e.g., device 300) and is responsive to gestures on touch-sensitive surface 451. User interface 1500 includes masked image 1502 displayed within image mask 1504.

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 8A-8N and 9A-9C will be discussed with reference to display 450 and a separate touch-sensitive surface 451, however analogous operations are, optionally, performed on a device with a touch-sensitive display system 112 in response to detecting the contacts described in FIGS. 8A-8N on the touch-sensitive display system 112 while displaying the user interfaces shown in FIGS. 8A-8N on the touch-sensitive display system 112; in such embodiments, the focus selector is, optionally: a respective contact, a representative point corresponding to a contact (e.g., a centroid of a respective contact or a point associated with a respective contact), or a centroid of two or more contacts detected on the touch-sensitive display system 112, in place of cursor 1506.

Figure 8B:
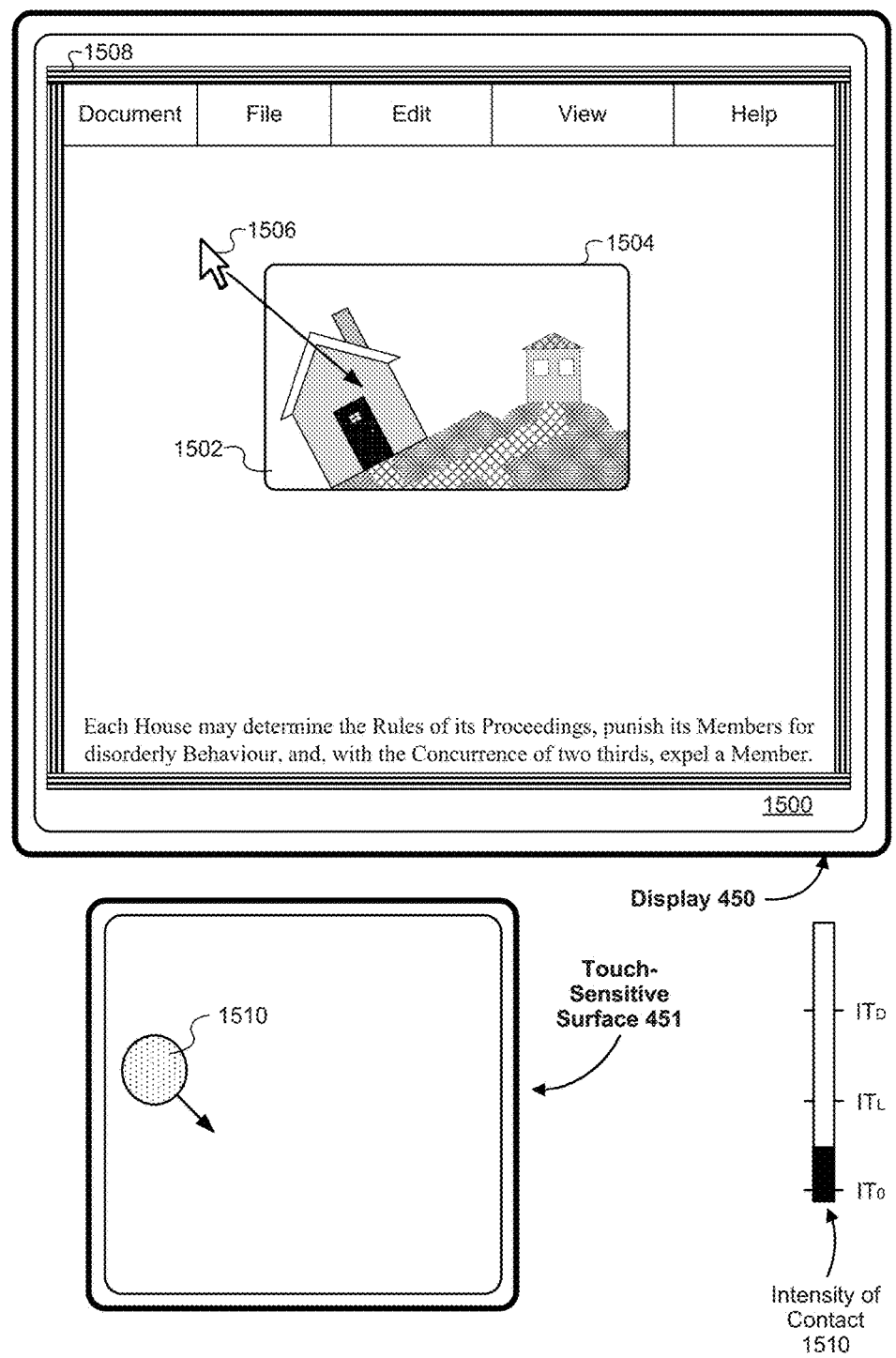
Figure 8C:
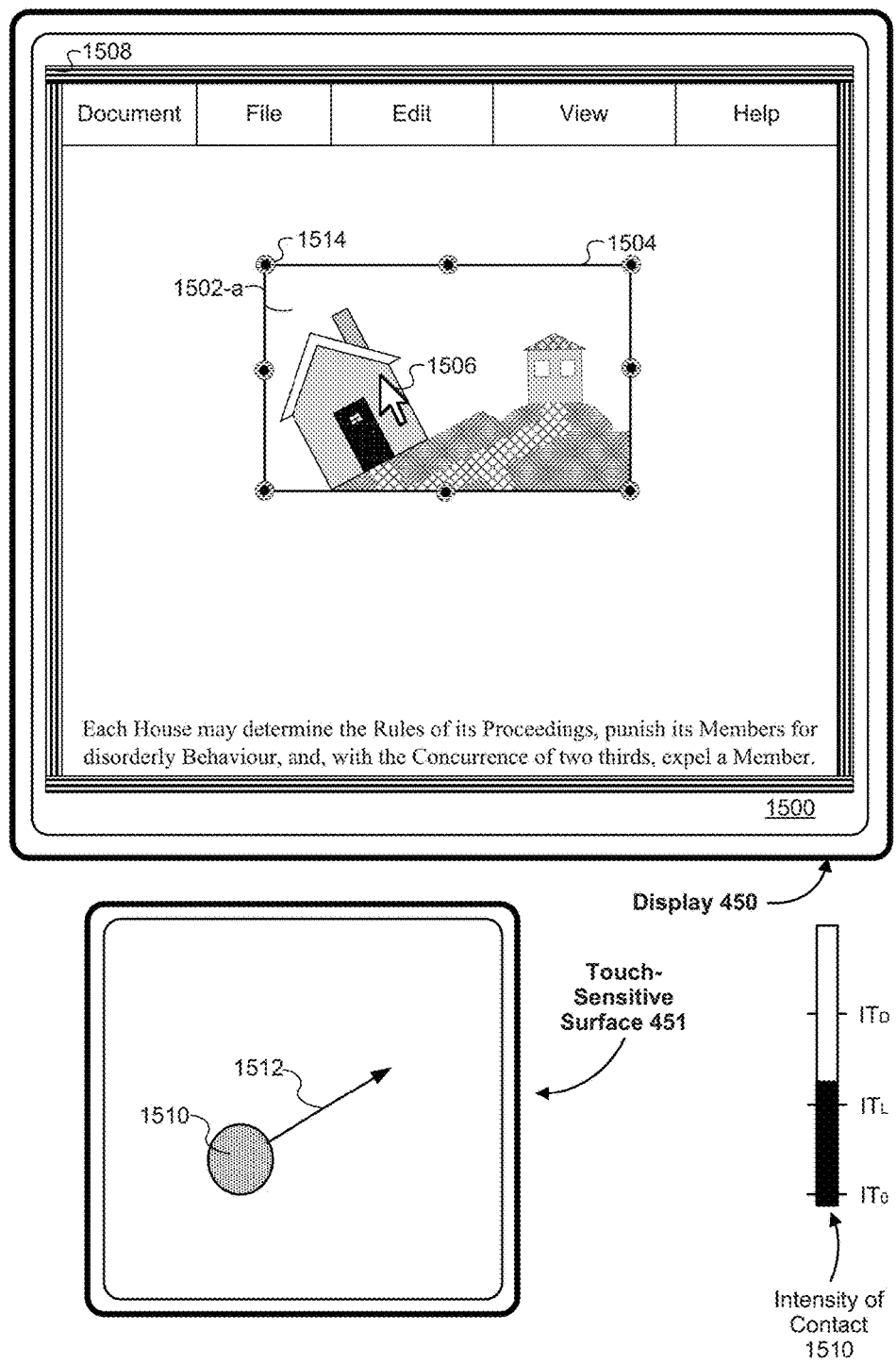

FIG. 8B illustrates another example of a user interface. In FIG. 8B, user interface 1500 includes masked image 1502 displayed within image mask 1504. In this example, masked image 1502 is displayed within electronic document 1508 on user interface 1500, per some embodiments. In some embodiments, graphical user interface 1500 in FIG. 8B also includes a displayed representation of focus selector 1506, which is displayed on a portion of the user interface that does not include masked image 1502. Focus selector 1506 is responsive to gestures on touch-sensitive surface 451. For example, in FIG. 8B, the device detects movement of contact 1510 down and to the right on the touch-sensitive surface 451 while an intensity of contact 1510 is between a contact-detection intensity threshold (e.g., "$IT_0$") and a light press intensity threshold (e.g., "$IT_L$") and in response to detecting the movement of contact 1510, focus selector 1506 is moved down and to the right on display 450 to a position on the display 450 that is over masked image 1502 (e.g., as shown in FIG. 8C).

In some embodiments, a displayed representation of focus selector 1506 is a cursor with a position on display 450 in accordance with contacts received by touch-sensitive surface 451. In other embodiments the focus selector has a different displayed representation (e.g., a magnifying glass). Alternatively, in some embodiments a representation of the focus selector is not displayed. For example, in embodiments using a touch-sensitive display system, the position of the focus selector corresponds to the location on the display of a contact or gesture. Further, the focus selector is herein defined to be "over" a user interface object when the position of the focus selector corresponds to the location on the display of the user interface object. It should be appreciated that the focus selector can be any component of an electronic device that determines the position of a gesture within a user interface.

Figure 8D:
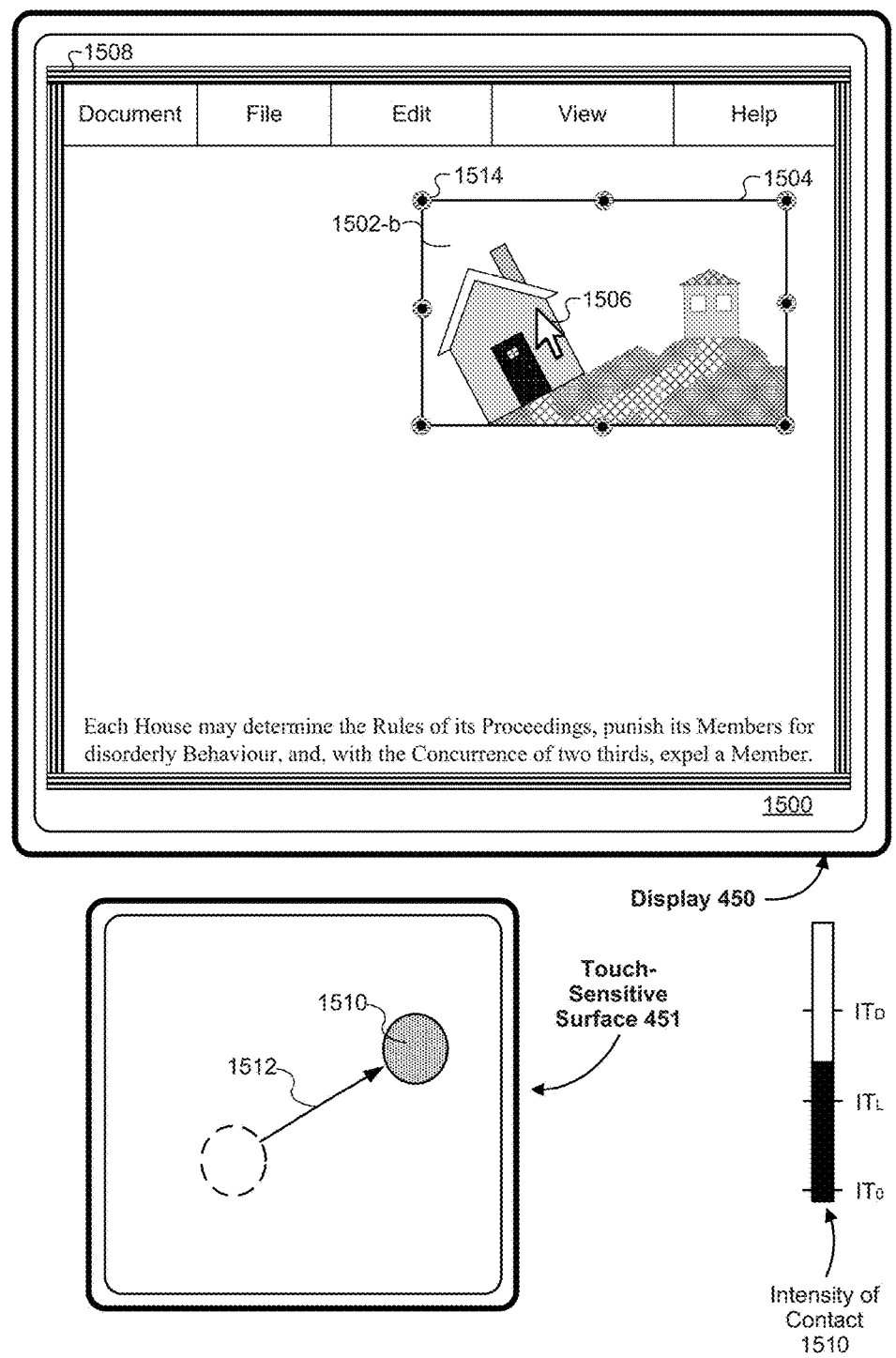

FIGS. 8C-8D illustrate an example of modifying a masked image. In this example, masked image 1502 is displayed at an initial position 1502-a within electronic document 1508, as shown in FIG. 8C. In FIG. 8D, masked image 1502 has been moved to position 1502-b. The movement of masked image 1502 from initial position 1502-a to position 1502-b corresponds to movement of focus selector 1506 in accordance with movement 1512 of the contact 1510 on touch-sensitive surface 451. In some embodiments, FIGS. 8C-8D further illustrate displaying a current selection indicator that indicates a user interface object that will be adjusted in accordance with the gesture. In this instance, current selection indicator 1514 comprises handles (eight graphical dots) around the border of masked image 1502. In this example, contact 1510, corresponding to focus selector 1506, has a maximum intensity below a respective intensity threshold (e.g., "$IT_D$").

As shown in FIG. 8D, a user gesture on touch-sensitive surface 451 includes contact 1510 while focus selector 1506 is over masked image 1502 and movement 1512 of the contact across touch-sensitive surface 451, and in response to detecting the gesture, the device moves masked image 1502 up and to the right on display 450, as shown in FIG. 8D.

Figure 8E:
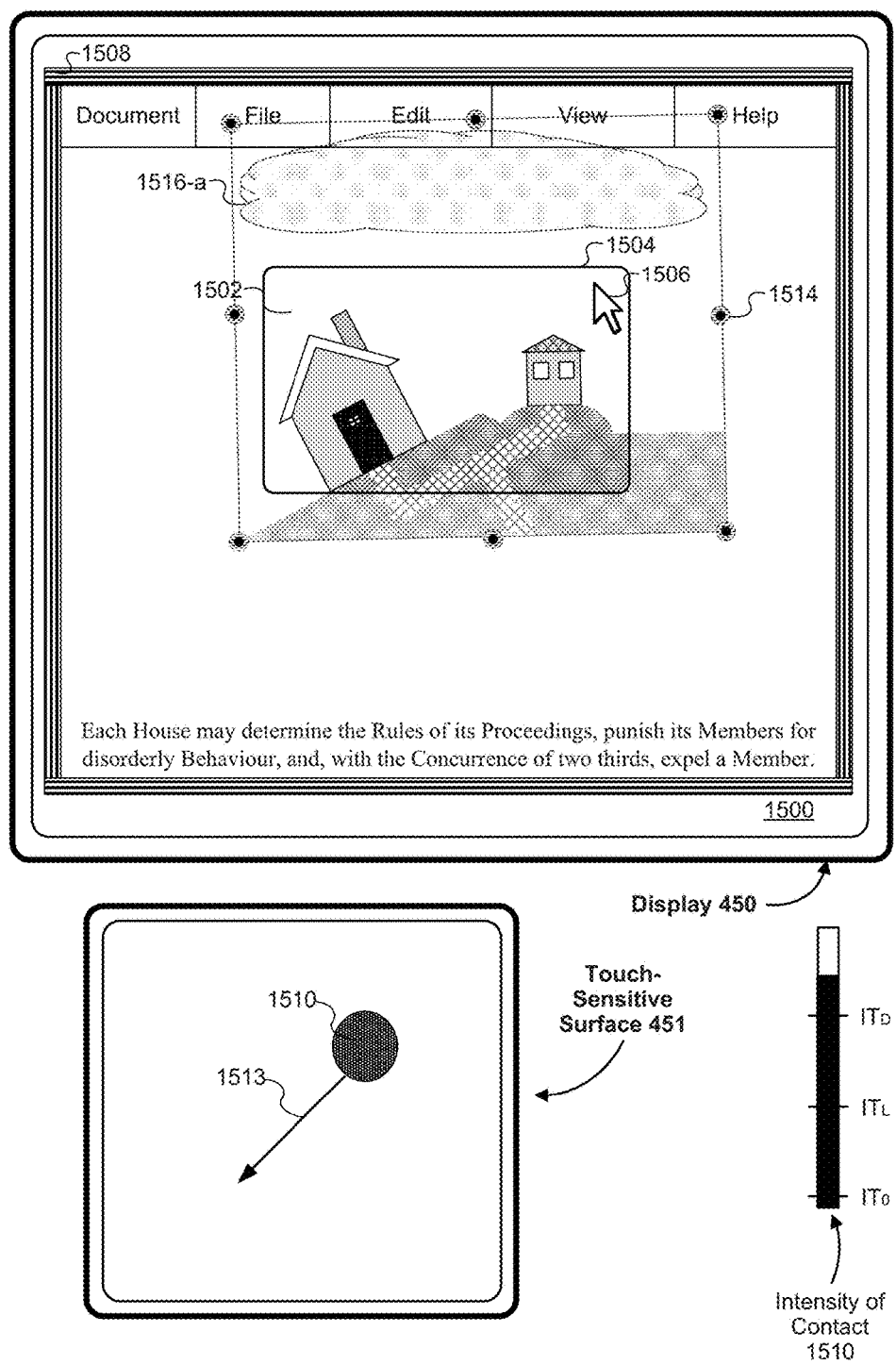
Figure 8F:
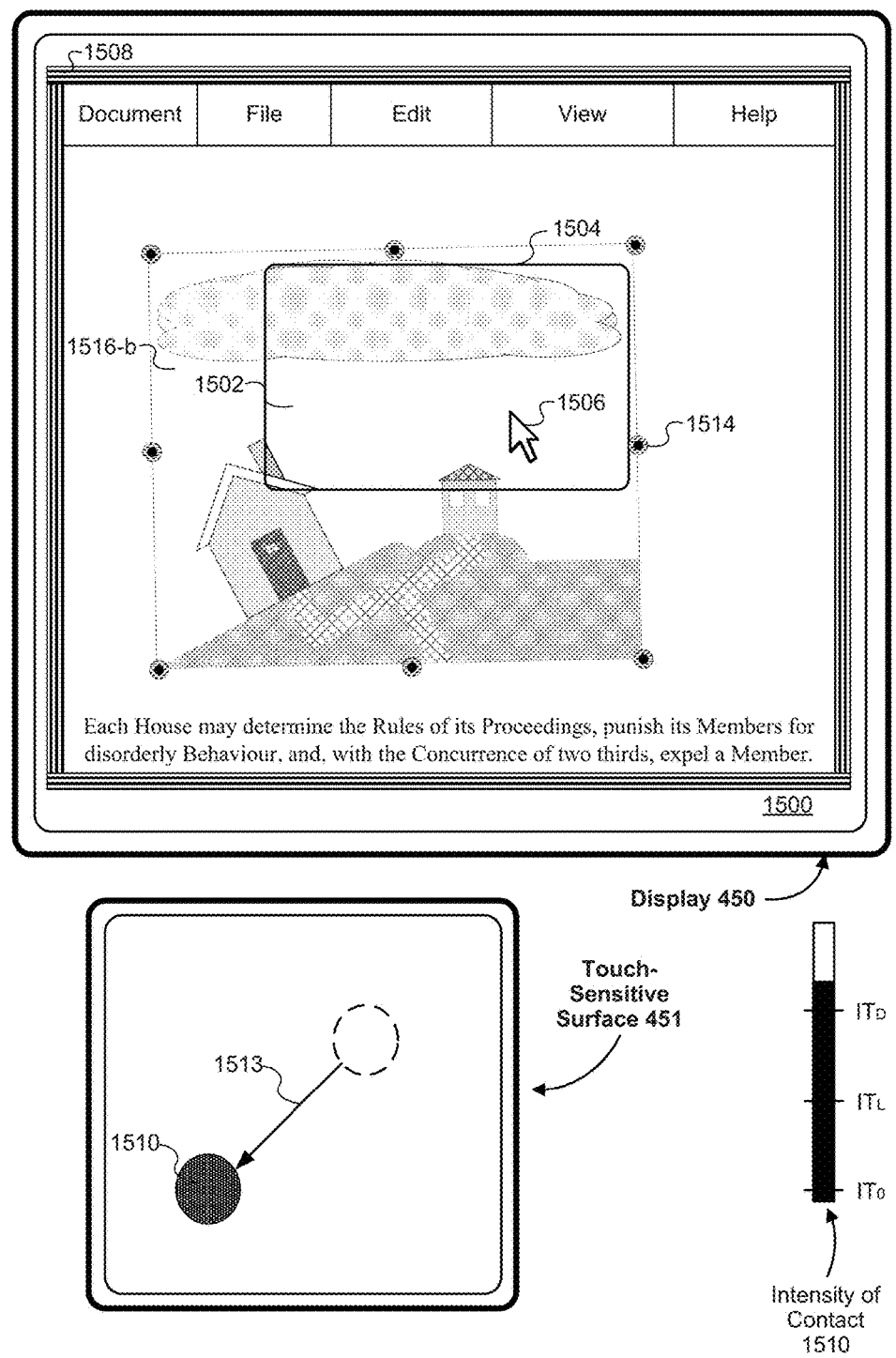

FIGS. 8E-8F illustrate an example of modifying an original image corresponding to a masked image relative to an image mask. In this example, contact 1510 has a maximum intensity that is above a respective intensity threshold (e.g., "$IT_D$"). Original image 1516, corresponding to masked image 1502, is revealed at initial position 1516-*a*, as shown in FIG. 8E. The movement of original image 1516 from initial position 1516-*a* to position 1516-*b* (as shown in FIG. 8F) corresponds to movement of focus selector 1506 in accordance with movement 1513 of contact 1510 on touch-sensitive surface 451. FIGS. 8E-8F further illustrate an example of current selection indicator 1514 comprising handles (eight graphical dots) around the border of original image 1516 indicating that original image 1516 will be adjusted in accordance with the gesture. As shown in FIG. 8F, image mask 1504 is not moved by the user gesture in this example because contact 1510 has a maximum intensity that is above the respective intensity threshold. Therefore, only original image 1516 is moved.

In some embodiments, the original image (e.g., image 1516-*a* in FIG. 8E) is displayed along with image mask (e.g., image mask 1504 in FIG. 8E) in response to detecting the increase in intensity of the contact to an intensity that is greater than a respective intensity threshold (e.g., $IT_D$), as shown in FIG. 8E. In some embodiments, after the original image and image mask have been displayed, the original image and image mask continue to be displayed even if the intensity of the contact decreases below the respective intensity threshold (e.g., $IT_D$). For example, after the original image and image mask have been displayed, the display of the original image and image mask is maintained when the intensity of the contact decreases to an intensity below $IT_D$, and the original image and image mask are replaced with a masked image when the intensity of the contact is reduced below $IT_L$. As another example, after the original image and image mask the display of the original image and image mask is maintained when the intensity of the contact decreases to an intensity below $IT_D$, and the original image and image mask are replaced with a masked image when the contact is lifted off of the touch-sensitive surface (e.g., the intensity of the contact is reduced below $IT_0$). Thus, in some embodiments, in response to detecting a press input on the touch-sensitive surface that includes a contact with an intensity above $IT_D$, the device enters an mask-edit mode in which the image mask and the original image can be modified (e.g., moved and/or resized) independently of each other without regard to whether or not the intensity of the contact is above $IT_D$. In some embodiments, the device exits the mask-edit mode in response to detecting a decrease in intensity of the contact below a different intensity threshold (e.g., $IT_L$) such as $IT_L$. In some embodiments, the device exits the mask-edit mode in response to detecting liftoff of the contact from the touch-sensitive surface (e.g., a decrease in intensity of the contact below $IT_0$). In some embodiments, the device exits the mask-edit mode in response to detecting an increase in intensity of the contact from an intensity below a different intensity threshold (e.g., $IT_L$) to an intensity above the respective intensity threshold (e.g. $IT_D$). In some embodiments, original image 1516-*a* is moved relative to image mask 1504 while contact has an intensity between $IT_L$ and $IT_D$ (e.g., contact 1510 has an intensity between $IT_L$ and $IT_D$ during some or all of movement 1513). In some embodiments, original image 1516-*a* is moved relative to image mask 1504 while contact has an intensity between $IT_0$ and $IT_D$ (e.g., contact 1510 has an intensity between $IT_0$ and $IT_L$ during some or all of movement 1513).

Figure 8G:
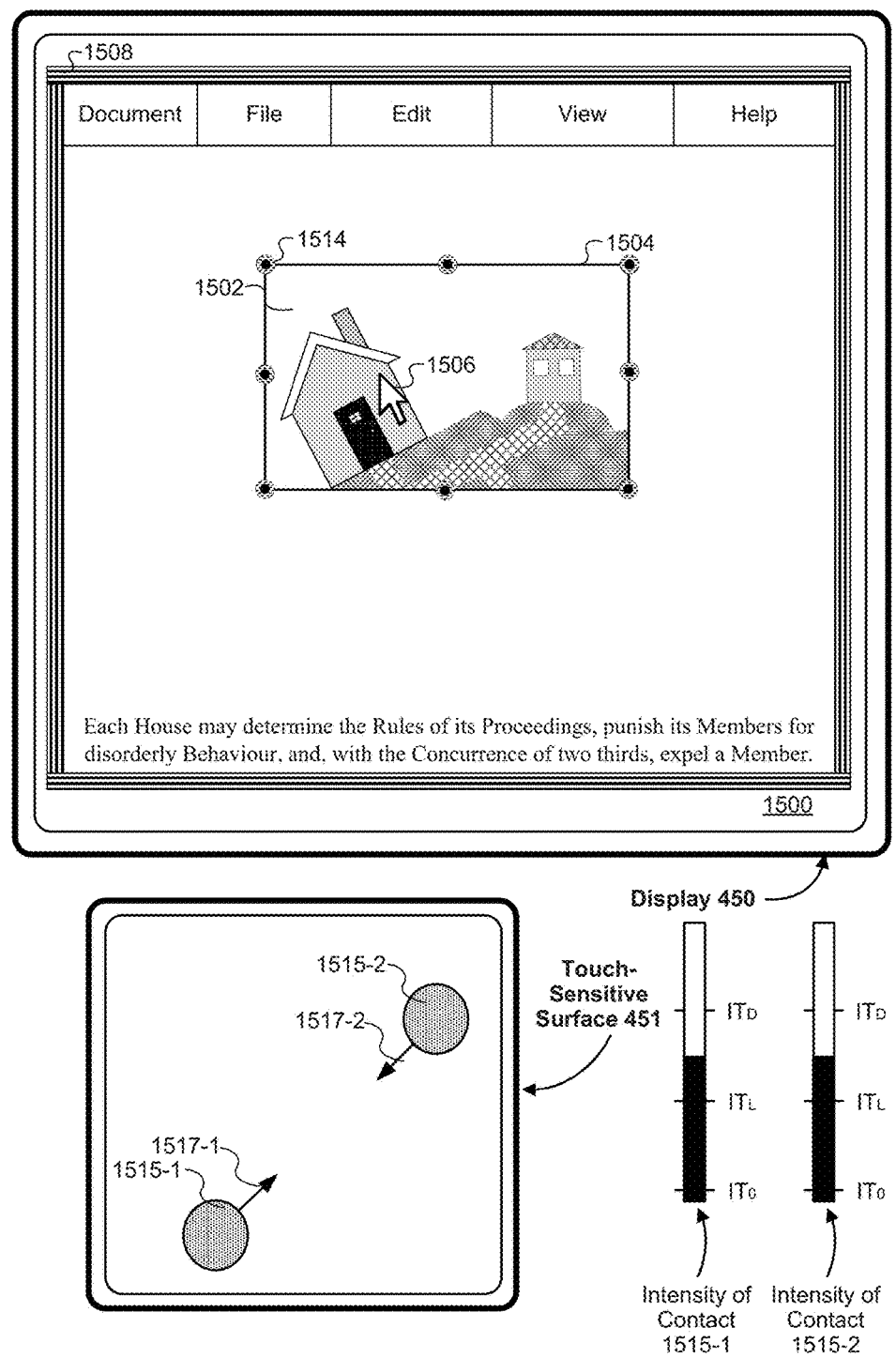
Figure 8H:
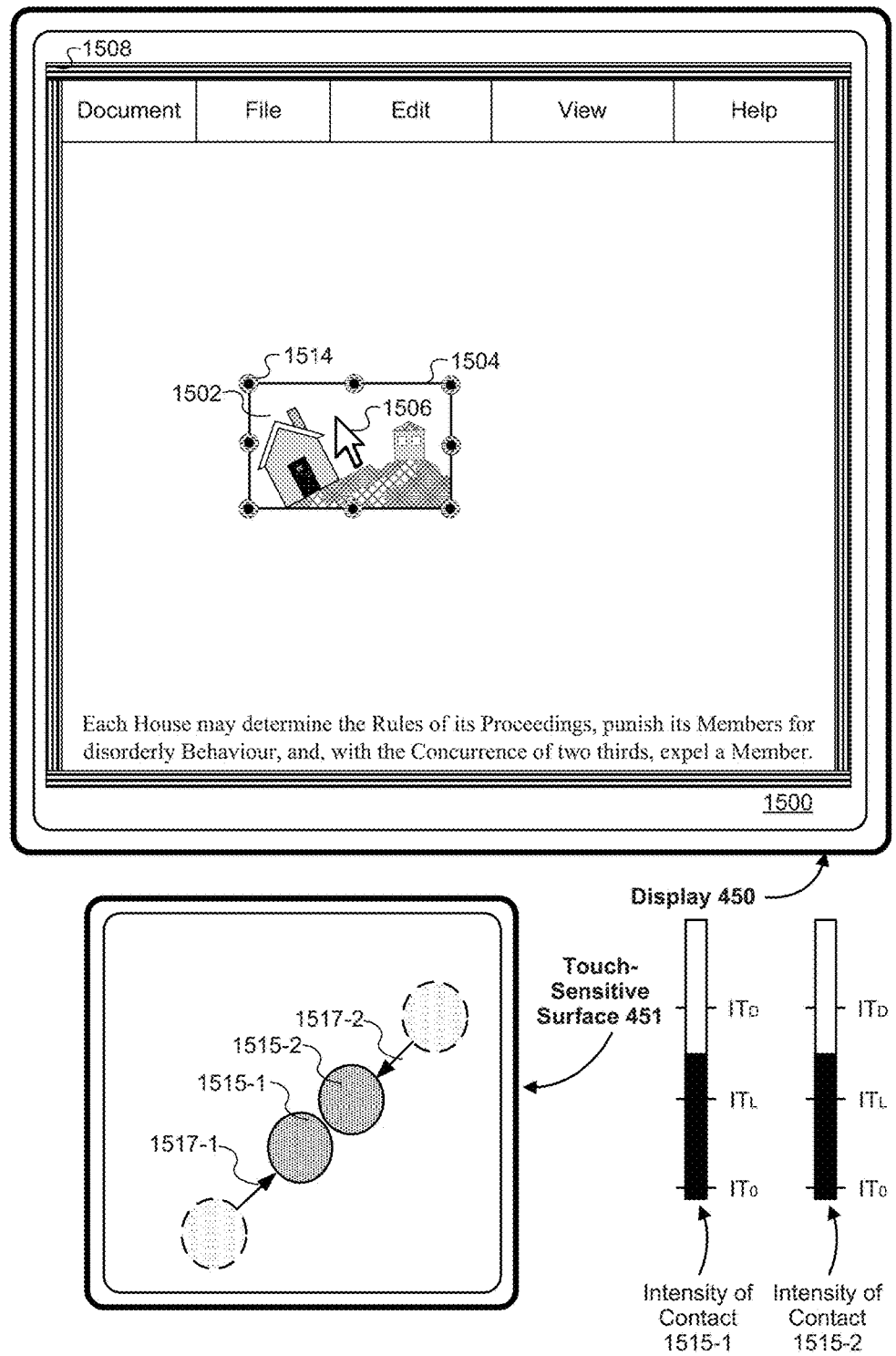

FIGS. 8G-8H illustrate another example of modifying a masked image. In this example, the gesture includes a plurality of contacts 1515 and movement 1517 of the plurality of contacts relative to each other on touch-sensitive surface 451, as shown in FIG. 8H. FIG. 8G shows the initial size of masked image 1502 and FIG. 8H shows masked image 1502 reduced in size in accordance with movement 1517 of contacts 1515 on touch-sensitive surface 451.

Figure 8I:
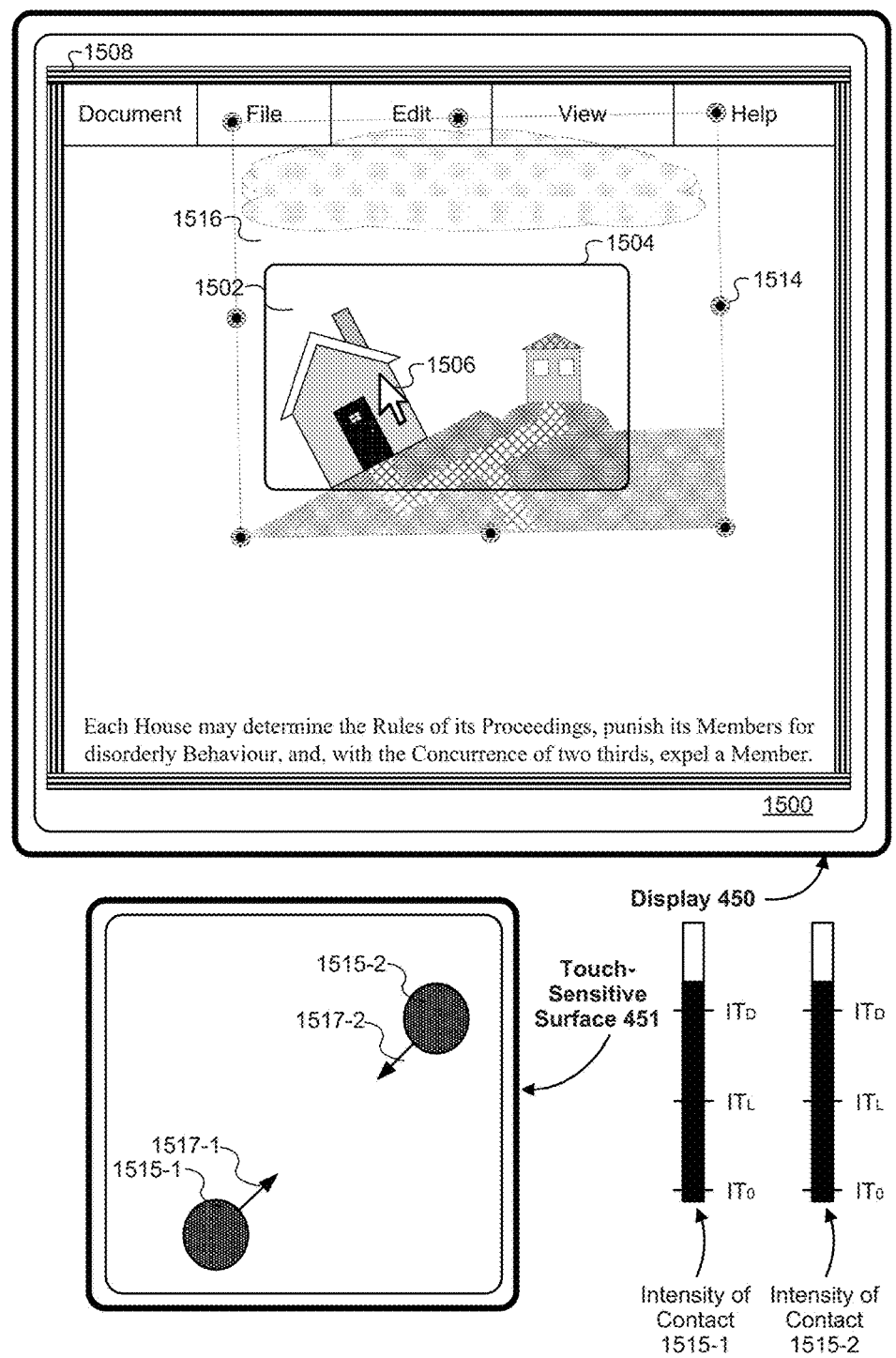
Figure 8J:
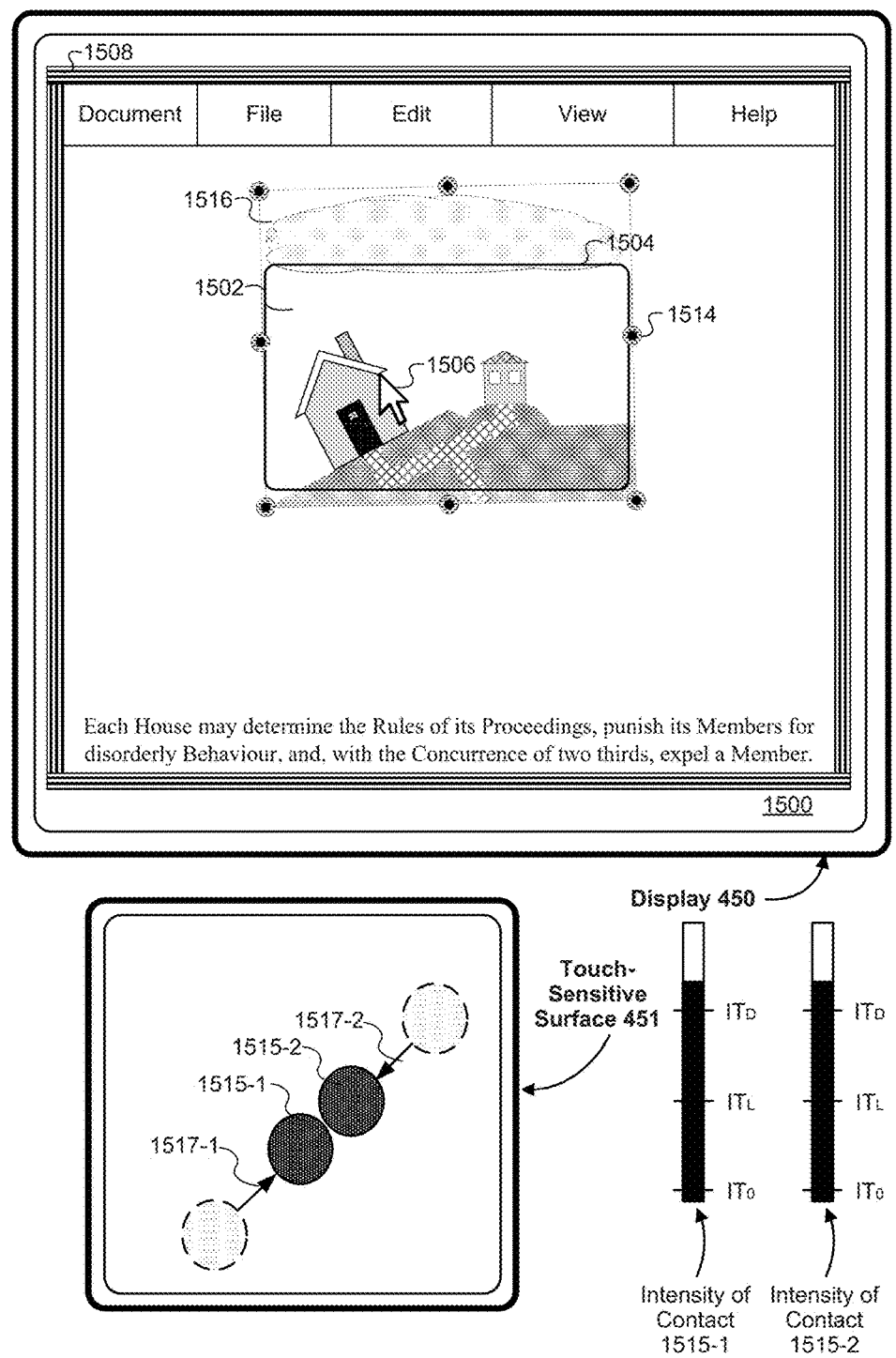

FIGS. 8I-8J illustrate another example of modifying an original image corresponding to a masked image within an image mask. In this example, the gesture again includes a plurality of contacts 1515 and movement 1517 of the plurality of contacts relative to each other on touch-sensitive surface 451, as shown in FIG. 8J. In response to detecting the gesture and in accordance with a determination that contacts 1515 have a maximum intensity that is above a respective intensity threshold (e.g., "$IT_D$") during the gesture, original image 1516 is resized without resizing image mask 1504. FIG. 8I shows the initial size of original image 1516 and FIG. 8J shows original image 1516 reduced in size in accordance with movement 1517 of contacts 1515 on touch-sensitive surface 451.

Figure 8K:
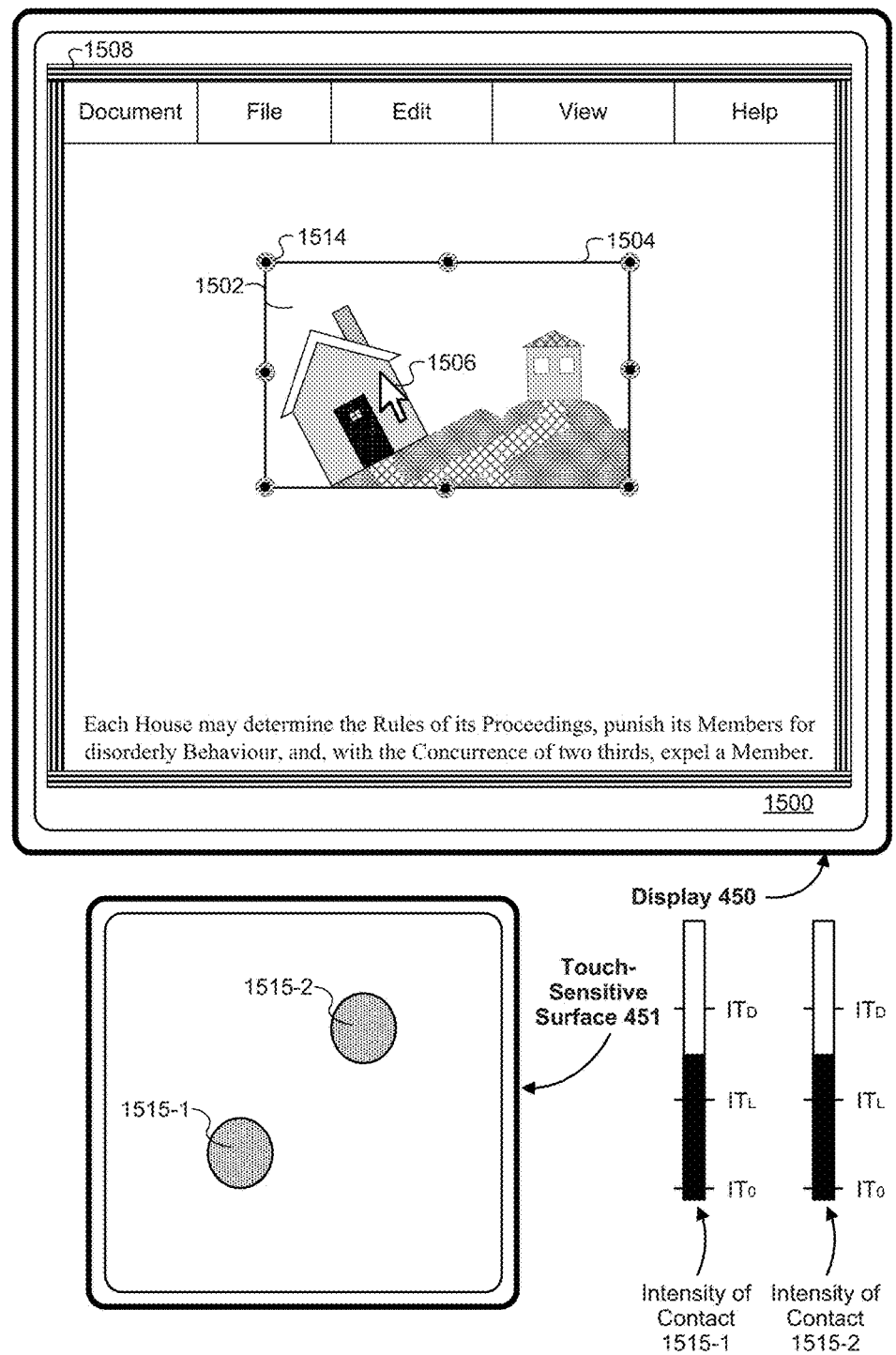
Figure 8L:
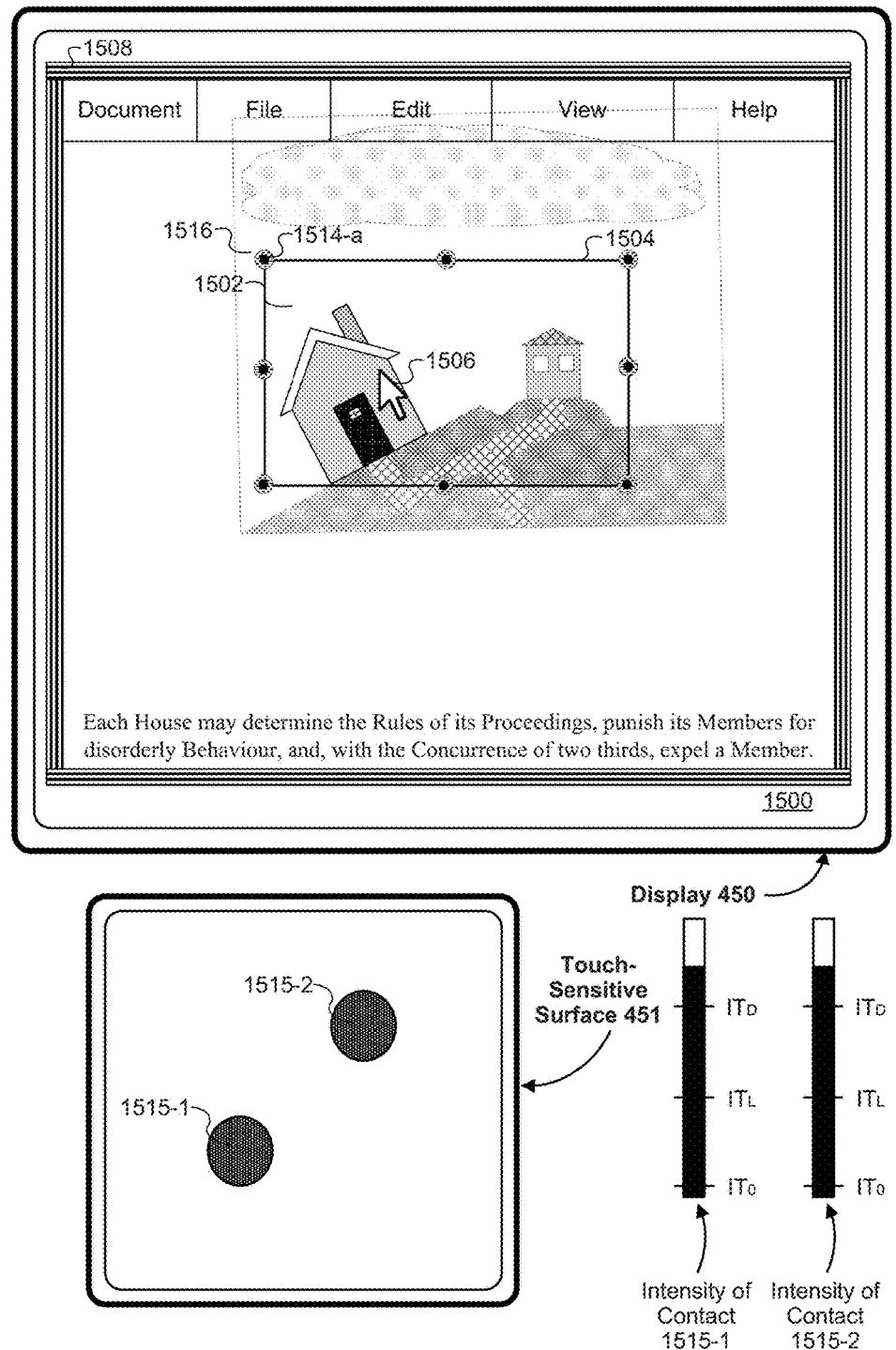
Figure 8M:
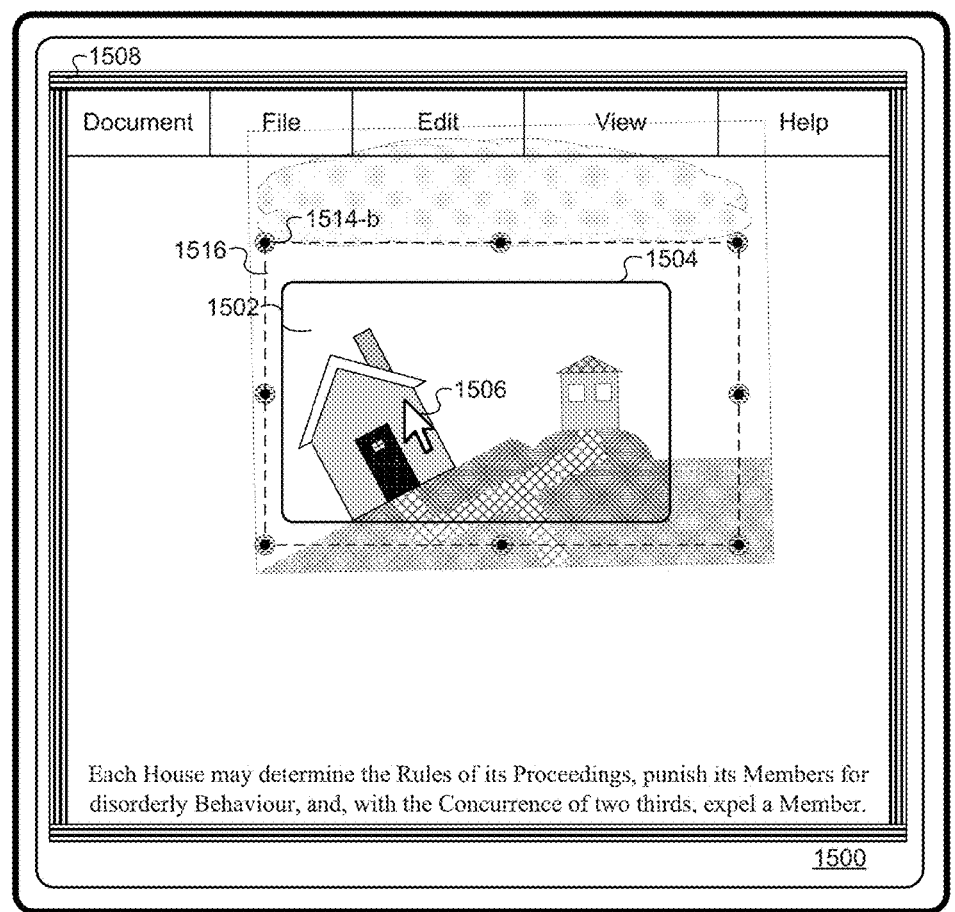
Figure 8M:
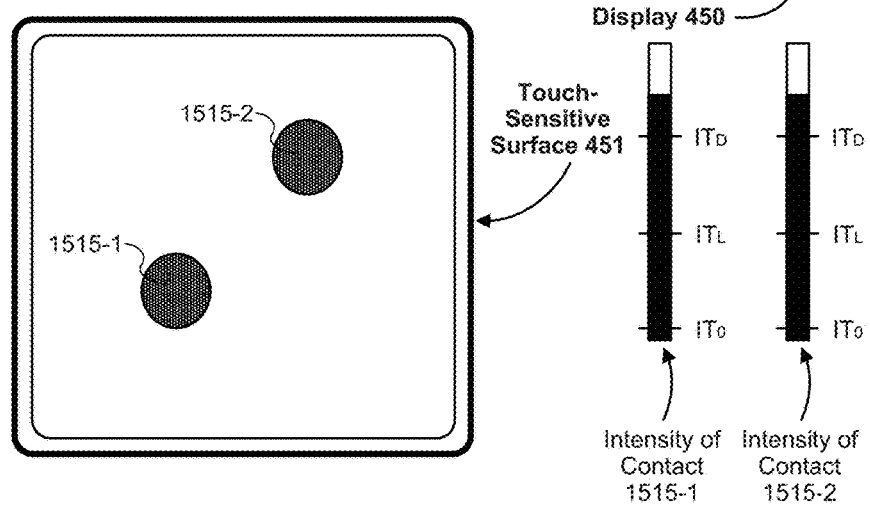
Figure 8N:
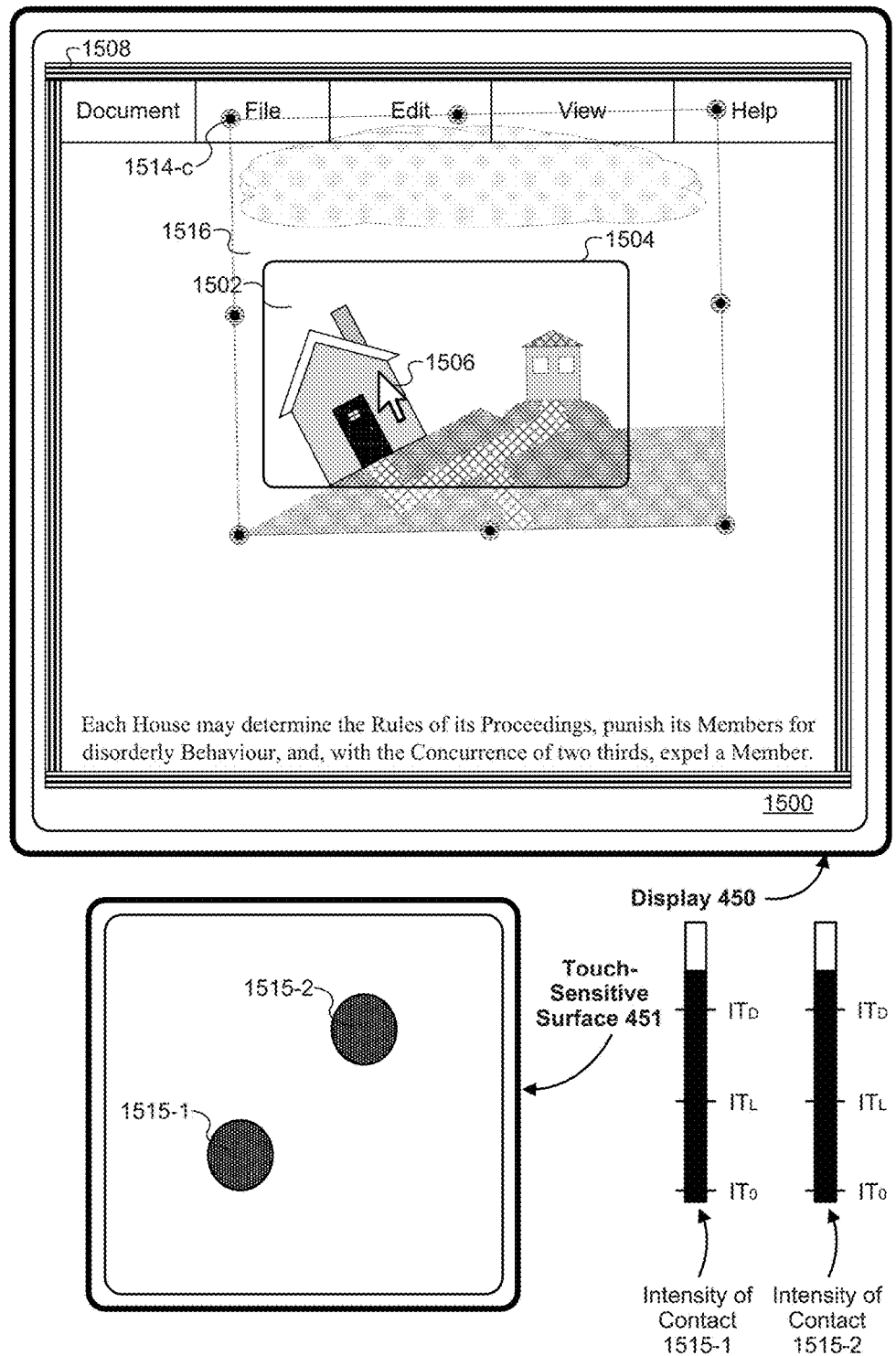
Figure 9A:
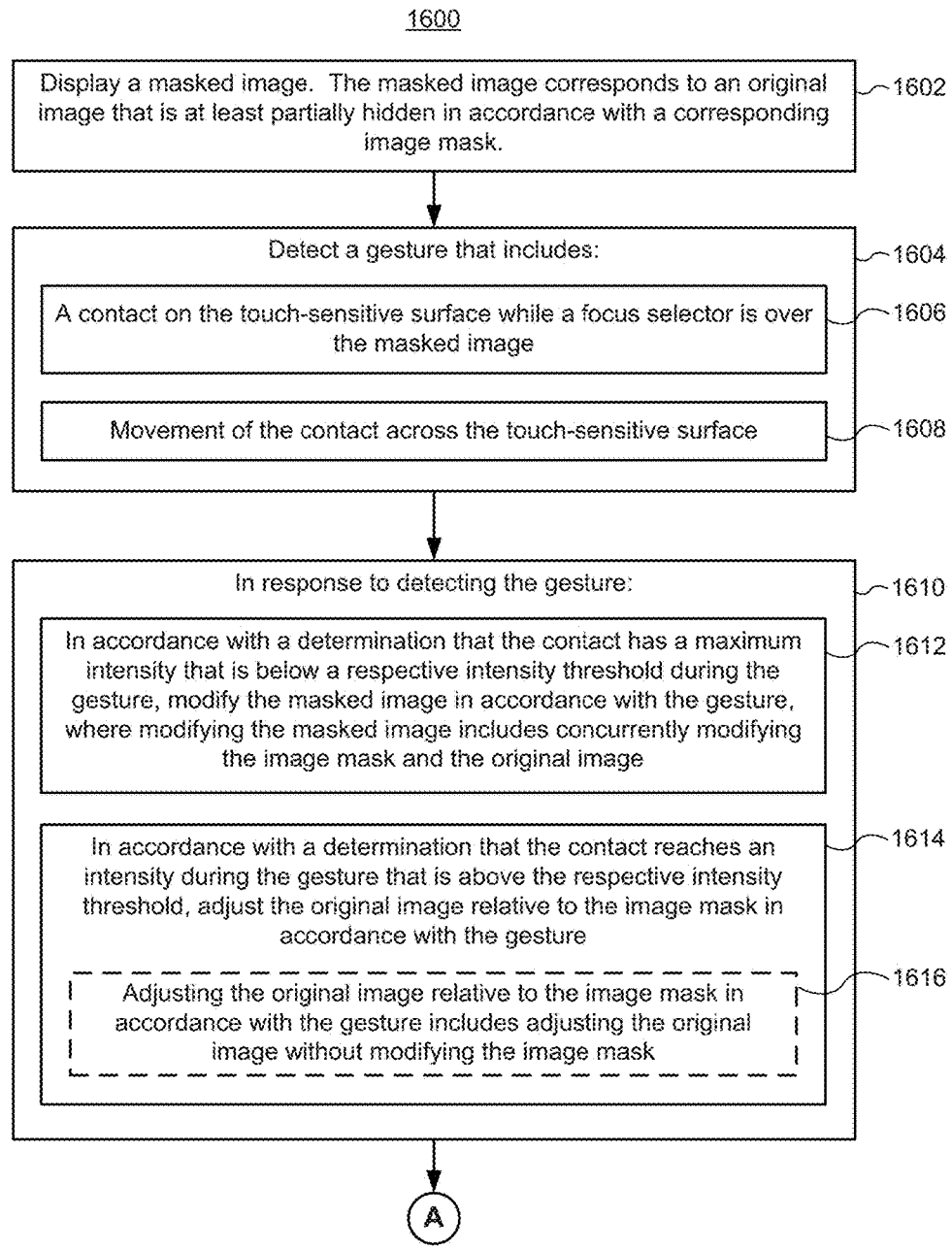
FIGS. 9A-9C are flow diagrams illustrating a method of manipulating images and masked images in accordance with some embodiments.
Figure 9B:
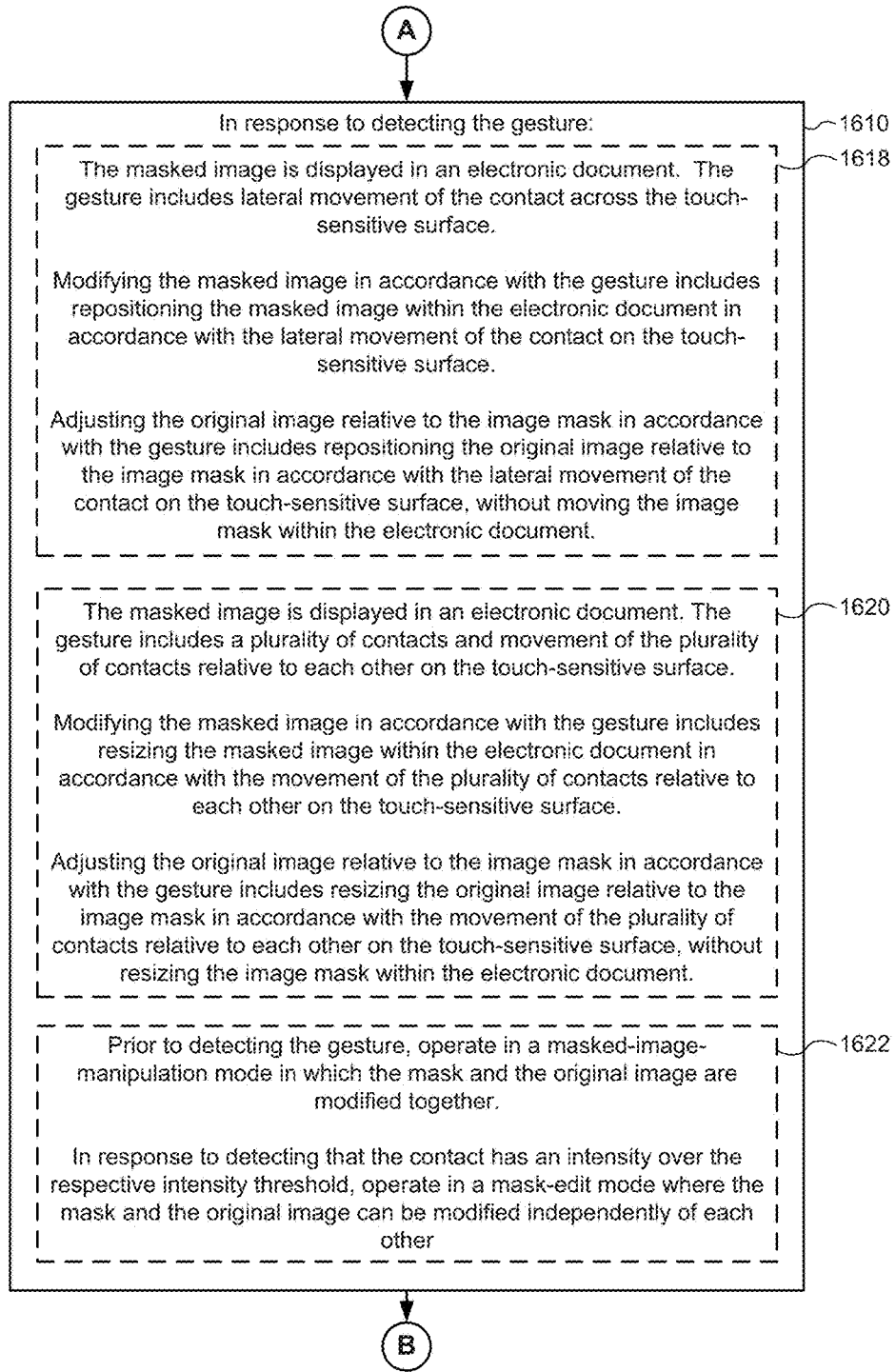
Figure 9C:
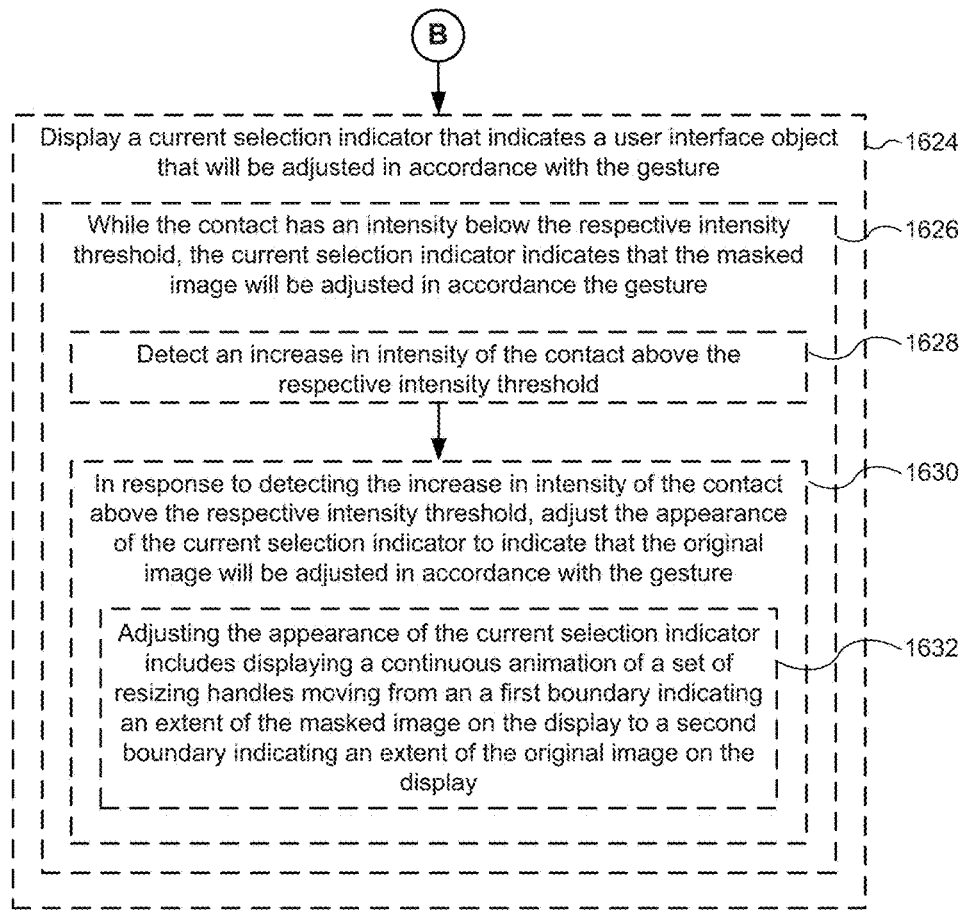

FIGS. 8K-8N illustrate an example of adjusting the appearance of a current selection indicator, for example in response to determining that a contact (e.g., contact 1515-1 or contact 1515-2 in FIG. 8K) has exceeded a respective intensity threshold (e.g., "$IT_D$"). In this example, current selection indicator 1514 comprises handles (eight graphical dots) around the border of a selected user interface object as illustrated in FIG. 8K. FIG. 8K shows an initial state of current selection indicator 1514 at initial position 1514-*a* indicating that masked image 1502 will be adjusted, while contacts 1515 have an intensity below the respective intensity threshold. In FIG. 8L, after detecting an increase in intensity of contacts 1515 above the respective intensity threshold (e.g., "$IT_D$") original image 1516 is revealed and continuous animation of current selection indicator 1514 occurs. In this instance, continuous animation of current selection indicator 1514 includes the handles moving from an initial position (e.g., position 1514-*a* in FIG. 8L) indicating that masked image 1502 will be adjusted to intermediate positions (e.g., position 1514-*b* in FIG. 8M) to an end position (e.g., position 1514-*c* in FIG. 8N) indicating that original image 1516 will be adjusted.

FIGS. 9A-9C are flow diagrams illustrating a method 1600 of manipulating images and masked images in accordance with some embodiments. The method 1600 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 1600 are, optionally, combined and/or the order of some operations may be changed.

As described below, the method 1600 provides an intuitive way to manipulate images and masked images. The method reduces the cognitive burden on a user when manipulating images and masked images, thereby creating a more efficient human-machine interface. For battery-operated electronic devices, enabling a user to manipulate images and masked images faster and more efficiently conserves power and increases the time between battery charges.

The device displays (1602) a masked image, where the masked image corresponds to an original image that is at least partially hidden in accordance with a corresponding image mask. In some embodiments, the masked imaged is displayed in an electronic document. FIG. 8E, for example, shows masked image 1502 relative to image mask 1504 and corresponding to original image 1516.

The device detects (1604) a gesture that includes a contact (1606) on the touch-sensitive surface (e.g., a finger contact) while a focus selector is over the graphical object and movement (1608) of the contact across the touch-sensitive surface. As shown in FIG. 8D, for example, contact 1510 and movement 1512 of the contact is detected on touch-sensitive surface 451. In some embodiments, the gesture includes lateral movement of the contact across the touch-sensitive surface. In some embodiments, the gesture includes a plurality of contacts and movement of the plurality of contacts relative to each other on the touch-sensitive surface.

In response to detecting a gesture (1610) one or more of operations 1612-1622 are performed. In accordance with a determination that the contact has a maximum intensity that is below a respective intensity threshold (e.g., "$IT_D$") during the gesture, the device modifies (1612) the masked image in accordance with the gesture; where modifying the masked image includes concurrently modifying the image mask and the original image. For example, FIGS. 8C-8D show contact 1510 having a maximum intensity that is below a respective intensity threshold (e.g., "$IT_D$"). Therefore, masked image 1502 is modified (moved from position 1502-a in FIG. 8C to position 1502-b in FIG. 8D).

In response to detecting a gesture and in accordance with a determination that the contact reaches an intensity during the gesture that is above the respective intensity threshold, the device adjusts (1614) the original image (e.g., by resizing, rotating and/or repositioning the original image) relative to the image mask in accordance with the gesture. In some embodiments, the determination as to whether to modify the masked image or to modify the original image inside of the image mask is made based on an intensity of the contact before movement of the contact is detected. For example, FIGS. 8E-8F show contact 1510 having a maximum intensity that is above a respective intensity threshold (represented by a dense patterned background in contact 1510). Therefore, as shown in FIG. 8F original image 1516 is modified (moved from position 1516-a in FIG. 8E to position 1516-b in FIG. 8F) without adjusting or modifying image mask 1504.

In some embodiments, adjusting the original image relative to the image mask in accordance with the gesture includes adjusting (1616) the original image without modifying the image mask. Thus, in some embodiments, when the contact has an intensity above the respective intensity threshold, the original image is adjusted independently from the image mask. FIGS. 8E-8F, for example, illustrate original image 1516 moving from position 1516-a (FIG. 8E) to position 1516-b (FIG. 8F) in accordance with movement of focus selector 1506 and without modification to image mask 1504.

In some embodiments, the masked image is displayed in an electronic document, the gesture includes lateral movement of the contact across the touch-sensitive surface, modifying the masked image in accordance with the gesture includes repositioning (1618) the masked image within the electronic document in accordance with the lateral movement of the contact on the touch-sensitive surface, and adjusting the original image relative to the image mask in accordance with the gesture includes repositioning the original image relative to the image mask in accordance with the lateral movement of the contact on the touch-sensitive surface, without moving the image mask within the electronic document. As a result, when the contact has an intensity below the respective intensity threshold the whole masked image is repositioned in response to detecting the gesture, whereas when the contact has an intensity above the respective intensity threshold, a different portion of the original image is shown inside the image mask in response to detecting the gesture. In FIGS. 8C-8D, for example, masked image 1502 is displayed within electronic document 1508 and is moved from position 1502-a (FIG. 8C) to position 1502-b (FIG. 8D) in accordance with lateral movement 1512 of contact 1510 on touch-sensitive surface 451. In contrast, in FIGS. 8E-8F, for example, original image 1516 is displayed (corresponding to masked image 1502 within electronic document 1508) and is moved from position 1516-a (FIG. 8E) to position 1516-b (FIG. 8F) in accordance with lateral movement 1513 of contact 1510 on touch-sensitive surface 451. Image mask 1504 is not moved in FIGS. 8E-8F in accordance with a determination that contact 1510 reaches an intensity during the gesture that is above the respective intensity threshold.

In some embodiments, the aforementioned masked image is displayed in an electronic document, the gesture includes a plurality of contacts and movement of the plurality of contacts relative to each other on the touch-sensitive surface, modifying the masked image in accordance with the gesture includes resizing (1620) the masked image within the electronic document in accordance with the movement of the plurality of contacts relative to each other on the touch-sensitive surface, and adjusting the original image relative to the image mask in accordance with the gesture includes resizing the original image relative to the image mask in accordance with the movement of the plurality of contacts relative to each other on the touch-sensitive surface, without resizing the image mask within the electronic document. As a result, when the contact has an intensity below the respective intensity threshold the whole masked image is resized in response to detecting the gesture, whereas when the contact has an intensity above the respective intensity threshold, the original image resized without resizing the mask in response to detecting the gesture. In FIGS. 8G-8H, for example, masked image 1502 is resized within electronic document 1508. FIG. 8G shows the initial size of masked image 1502 and FIG. 8H shows masked image 1502 reduced in size in accordance with movement 1517 of contacts 1515 on touch-sensitive surface 451. In contrast, in FIGS. 8I-8J, for example, original image 1516 is resized within electronic document 1508. FIG. 8I shows the initial size of original image 1516 and FIG. 8J shows original image 1516 reduced in size in accordance with movement 1517 of contacts 1515 on touch-sensitive surface 451. Image mask 1504 is not resized in FIGS. 8I-8J in accordance with a determination that a contact 1515 reaches an intensity during the gesture that is above the respective intensity threshold.

In some embodiments, prior to detecting the gesture, the device operates in a masked-image-manipulation mode in which the mask and the original image are modified together, and in response to detecting that the contact has an intensity over the respective intensity threshold, the device enters and subsequently operates in (1622) a mask-edit mode where the mask and the original image can be modified (e.g., moved and/or resized) independently of each other. In FIGS. 8C-8D, for example, masked image 1502 and image mask 1504 are moved (modified) together, corresponding to a device operating in a masked-image-manipulation mode. In contrast, in FIGS. 8E-8F, for example, contact 1510 has an intensity over the respective intensity threshold and original image 1516 is moved (modified) independent of image mask 1504, corresponding to the device operating in a mask-edit mode.

In some embodiments, the device displays (1624) a current selection indicator that indicates a user interface object that will be adjusted in accordance with the gesture. In FIG. 8C, for example, current selection indicator 1514 is displayed indicating that masked image 1502 will be adjusted in accordance with the gesture. In this example, current selection indicator 1514 comprises handles (eight graphical dots) around the border of masked image 1502.

In some embodiments, while the contact has an intensity below the respective intensity threshold, the current selection indicator indicates that the masked image will be adjusted in accordance the gesture (1626). In some of these embodiments, the device detects (1628) an increase in intensity of the contact above the respective intensity threshold, and in response to detecting the increase in intensity of the contact above the respective intensity threshold, the device adjusts (1630) the appearance of the current selection indicator to indicate that the original image will be adjusted (e.g., without adjusting the image mask) in accordance with the gesture. For example, in FIGS. 8K-8N, current selection indicator 1514 initially indicates that masked image 1502 will be adjusted (FIG. 8K) and in response to determining that a respective contact (e.g., 1515-1 or 1515-2) has exceeded the respective intensity threshold, current selection indicator 1514 indicates that original image 1516 will be adjusted (FIG. 8N).

In some embodiments, adjusting the appearance of the current selection indicator includes displaying a continuous animation of a set of resizing handles moving from an a first boundary indicating an extent of the masked image on the display to a second boundary indicating an extent of the original image on the display (1632). FIGS. 8K-8N illustrate an example of adjusting the appearance of current selection indicator 1514 in response to determining that a respective contact (e.g., 1515-1 or 1515-2) has exceeded the respective intensity threshold. FIG. 8K illustrates an initial state of current selection indicator 1514 at initial position 1514-*a* indicating that masked image 1502 will be adjusted. In FIG. 8L, in accordance with a determination that a respective contact (e.g., 1515-1 or 1515-2) has a maximum intensity that is above a respective intensity threshold (e.g., "$IT_D$"), original image 1516 is revealed and continuous animation of current selection indicator 1514 occurs. In this instance, continuous animation of current selection indicator 1514 includes the handles moving from an initial position (e.g., position 1514-*a* in FIG. 8L) indicating that masked image 1502 will be adjusted through one or more intermediate positions (e.g., position 1514-*b* in FIG. 8M) to an end position (e.g., position 1514-*c* in FIG. 8N) indicating that original image 1516 will be adjusted.

It should be understood that the particular order in which the operations in FIGS. 9A-9C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 1600 described above with respect to FIGS. 9A-9C. For example, the gestures, contacts, intensity thresholds, images, image masks, and focus selectors described above with reference to method 1600 optionally have one or more of the characteristics of the gestures, contacts, intensity thresholds, images, image masks, and focus selectors described herein with reference to other methods described herein (e.g., those listed in the fifth paragraph of the Description of Embodiments). For brevity, these details are not repeated here.

Figure 10:
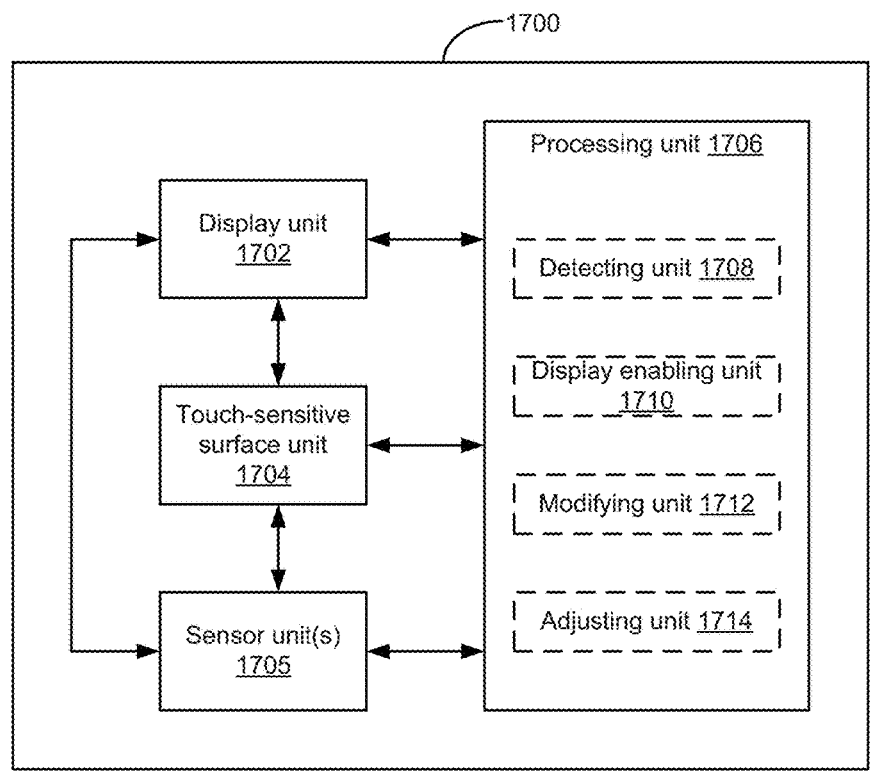
FIG. 10 is a functional block diagram of an electronic device in accordance with some embodiments.

In accordance with some embodiments, FIG. 10 shows a functional block diagram of an electronic device 1700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein. As shown in FIG. 10, an electronic device 1700 includes a display unit 1702 configured to a masked image, wherein the masked image corresponds to an original image that is at least partially hidden in accordance with a corresponding image mask; a touch-sensitive surface unit 1704 configured to receive user gestures; one or more sensor units 1705 configured to detect intensity of contacts with the touch-sensitive surface unit; and a processing unit 1706 coupled to the display unit 1702, the touch-sensitive surface unit 1704, and the sensor units 1705. In some embodiments, the processing unit includes a detecting unit 1708, a display enabling unit 1710, a modifying unit 1712, and an adjusting unit 1714.

The processing unit 1706 is configured to detect a gesture (e.g., with the detecting unit 1708) that includes a contact on the touch-sensitive surface unit while a focus selector is over the masked image, and movement of the contact across the touch-sensitive surface unit. The processing unit 1706 is further configured to respond to detecting the gesture, in accordance with a determination that the contact has a maximum intensity that is below a respective intensity threshold during the gesture, by modifying the masked image in accordance with the gesture (e.g., with the modifying unit 1712), wherein modifying the masked image includes concurrently modifying the image mask and the original image; and in accordance with a determination that the contact reaches an intensity during the gesture that is above the respective intensity threshold, by adjusting the original image relative to the image mask in accordance with the gesture (e.g., with the adjusting unit 1714).

In some embodiments, adjusting the original image relative to the image mask in accordance with the gesture includes adjusting the original image without modifying the image mask (e.g., with the adjusting unit 1714).

In some embodiments, the masked image is displayed in an electronic document on the display unit 1702, the gesture includes lateral movement of the contact across the touch-sensitive surface unit 1704, modifying the masked image in accordance with the gesture (e.g., with the modifying unit 1712) includes repositioning the masked image within the electronic document in accordance with the lateral movement of the contact on the touch-sensitive surface unit, and adjusting the original image relative to the image mask in accordance with the gesture (e.g., with the adjusting unit 1714) includes repositioning the original image relative to the image mask in accordance with the lateral movement of the contact on the touch-sensitive surface unit, without moving the image mask within the electronic document. As a result of this repositioning, a different portion of the original image is shown inside the image mask.

In some embodiments, the masked image is displayed in an electronic document on the display unit 1702, the gesture includes a plurality of contacts and movement of the plurality of contacts relative to each other on the touch-sensitive surface unit 1704, modifying the masked image in accordance with the gesture (e.g., with the modifying unit 1712) includes resizing the masked image within the electronic document in accordance with the movement of the plurality of contacts relative to each other on the touch-sensitive surface unit, and adjusting the original image relative to the image mask in accordance with the gesture (e.g., with the adjusting unit 1714) includes resizing the original image relative to the image mask in accordance with the movement of the plurality of contacts relative to each other on the touch-sensitive surface unit 1704, without resizing the image mask within the electronic document.

In some embodiments, the processing unit 1706 is further configured to enable display (e.g., with the display enabling unit 1710) of a current selection indicator that indicates a user interface object that will be adjusted in accordance with the gesture.

In some embodiments, while the contact has an intensity below the respective intensity threshold, the current selection indicator indicates that the masked image will be adjusted in accordance the gesture. Furthermore, the processing unit 1706 is configured detect (e.g., with the detecting unit 1708) an increase in intensity of the contact above the respective intensity threshold and to respond to detecting the increase in intensity of the contact above the respective intensity threshold, by adjusting (e.g., with the adjusting unit 1714) the appearance of the current selection indicator to indicate that the original image will be adjusted in accordance with the gesture.

In some embodiments, adjusting the appearance of the current selection indicator (e.g., with the adjusting unit 1714) includes displaying a continuous animation of a set of resizing handles moving from an a first boundary indicating an extent of the masked image on the display unit to a second boundary indicating an extent of the original image on the display unit 1702.

In some embodiments, the processing unit 1706 is further configured, prior to detecting the gesture, to operate in a masked-image-manipulation mode in which the mask and the original image are modified together; and in response to detecting that the contact has an intensity over the respective intensity threshold (e.g., with the detecting unit 1708), to operate in a mask-edit mode where the mask and the original image can be modified independently of each other.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 9A-9C are, optionally, implemented by components depicted in FIGS. 1A-1B or FIG. 10. For example, detection operation 1604, modifying operation 1612, and adjusting operation 1614 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Word Spelling Correction

When a user is editing text in an electronic document, the user may wish to correct spelling of a misspelled word in the text, some applications have separate spelling correction interfaces that are accessed through a complex sequence of gestures or other inputs however these interfaces are cumbersome and inefficient for correcting spelling errors. In some methods, the user would edit the misspelled word manually or move a focus selector over the word and activate a spelling correction that provides candidate words for correcting the spelling. This process involves multiple steps on the part of the user, and thus can be tedious and time-consuming. The embodiments below improve on these methods by allowing the user to activate correction of a misspelled word by, while a focus selector is located over the misspelled word, performing a gesture with contact that meets predefined intensity criteria. If the contact meets the predefined intensity criteria, the misspelled word is automatically corrected. This makes text editing more efficient by allowing the user to correct misspelled words more quickly.

FIGS. 11A-11DD illustrate exemplary user interfaces for word spelling correction in accordance with some embodiments. The user interfaces in these figures are used to illustrate the processes described below, including the processes in FIGS. 12A-12D. FIGS. 11A-11DD include intensity diagrams that show the current intensity of the contact on the touch-sensitive surface relative to a plurality of intensity thresholds including one or more of a word replacement intensity threshold (e.g., "$IT_D$"), a first word preview intensity threshold (e.g., "$IT_1$"), a second word preview intensity threshold (e.g., "$IT_2$"), a correction-cancellation intensity threshold (e.g., "$IT_C$") and a light press intensity threshold (e.g., "$IT_L$").

Figure 11A:
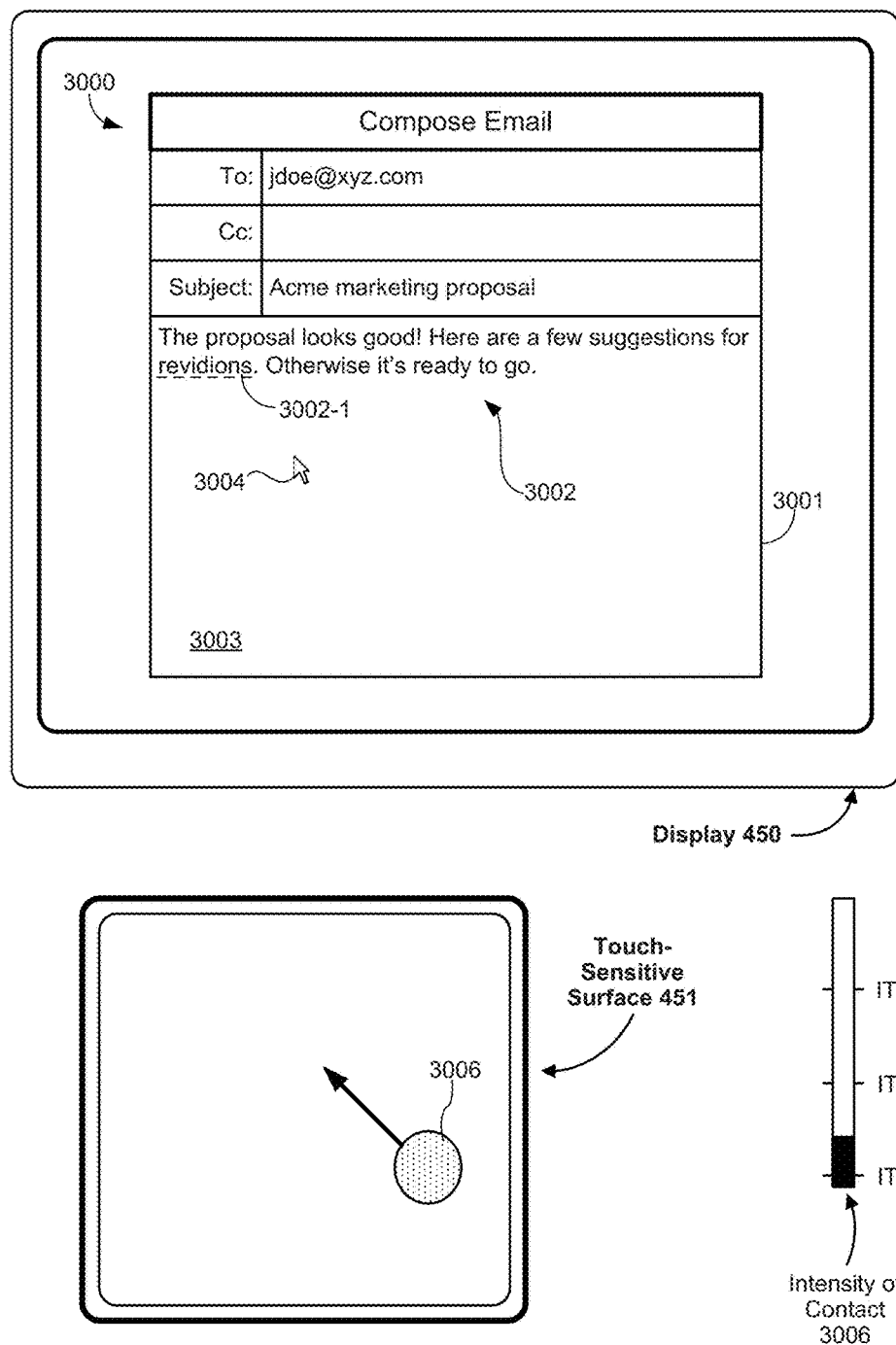
FIGS. 11A-11DD illustrate exemplary user interfaces for word spelling correction in accordance with some embodiments.

FIG. 11A illustrates user interface 3000 displayed on display 450 (e.g., display 340) of a device (e.g., device 300). User interface 3000 is an interface corresponding to an application. For example, user interface 3000 is, optionally, an interface corresponding to a web browser application, text editor application, word processor application, note application, messaging (e.g., email, chat) application, e-book application, or document reader application. User interface 3000 as shown in FIG. 11A is an email composition user interface for an email application.

User interface 3000 includes text display area 3001, in which textual content, such as words 3002, is, optionally, displayed. In some embodiments, words 3002 are part of electronic document 3003 (for example, text document, word processor document, email message, web page, electronic book). Words 3002 include word "revidions" 3002-1, which is misspelled, as determined by the device. A word displayed in text display area 3001 (e.g., word 3002) is, optionally, determined to be misspelled in accordance with a spell check function on the device, which compares words 3002 to word entries in a dictionary (e.g., a dictionary stored in the memory 370 of the device.

In some embodiments, words 3002 that are determined to be misspelled are, optionally, displayed with visual indication of their status as misspelled words. For example, a word 3002 determined to be misspelled is, optionally, displayed with underlining, different font size, different font color, bold font, italics, highlighting, and so on. For example, word 3002-1 is misspelled and is thus underlined in FIG. 11A. The style of the underlining is, optionally, single underline, double underline, dotted underline, wavy underline, etc.

Figure 11B:
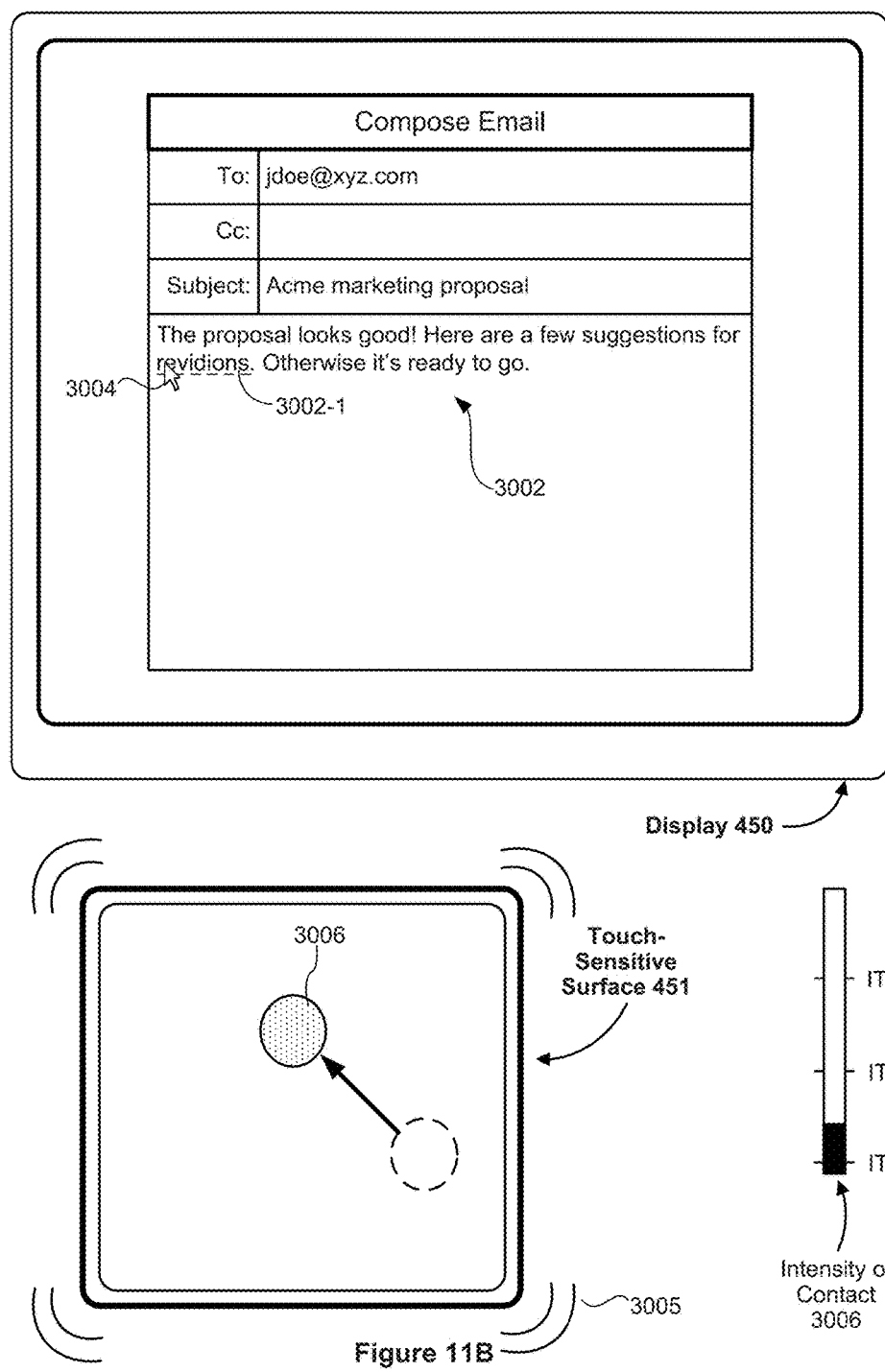

Cursor 3004 (for example, a mouse pointer) is also displayed in user interface 3000. Cursor 3004 is an example of a focus selector. A user optionally uses an input device (e.g., mouse 350, touchpad 355 or other touch-sensitive surface) to move cursor 3004 to different locations in user interface 3000. For example, FIG. 11A shows cursor 3004 displayed over text display area 3001, and the device detects a gesture including movement of contact 3006 across touch-sensitive surface 451 (e.g., touchpad 355) of the device (e.g., while an intensity of contact 3006 is between a contact-detection intensity threshold $IT_0$ and a light press intensity threshold $IT_L$), as shown in FIGS. 11A-11B. FIG. 11B shows cursor 3004 located over word 3002-1 with contact 3006 still detected on touch-sensitive surface 451. While cursor 3004 is located over word 3002-1, the gesture is, optionally, ended by lifting contact 3006 off touch-sensitive surface 451.

In some embodiments, when cursor 3004 is moved over word 3002-1, a haptic indication is, optionally, provided. The haptic indication indicates to the user that performing a gesture that satisfies predefined intensity criteria (described below) on misspelled word 3002-1 will cause correction of the misspelled word. For example, in FIG. 11B, in response to detecting movement of the focus selector (e.g., cursor 3006) over word 3002-1, the device generates tactile output 3005 (e.g., a vibration or other movement of the touch-sensitive surface 451) to provide an indication that word 3002-1 is responsive to a gesture including a contact with an intensity above the respective threshold (e.g., "$IT_D$").

While cursor 3004 is positioned over word 3002-1, the device monitors an intensity of contact 3006 to determine whether or not contact 3006 meets one or more predefined intensity criteria. In some embodiments, the predefined intensity criteria are met when a contact has an intensity above a word replacement intensity threshold at a predefined time relative to liftoff of the contact. For example, the intensity of contact 3006 at a predefined time prior to liftoff (e.g., 10 ms) is determined to evaluate whether the predefined intensity criteria are met. In some embodiments, the predefined intensity criteria are met when the contact has an intensity above the word replacement intensity threshold (e.g., "$IT_D$") at any time during the gesture (while cursor 3004 is located over word 3002-1) prior to detecting liftoff of the contact. For example, the intensity of contact 3006 just prior to liftoff is determined to evaluate whether the predefined intensity criteria are met. As another example, the maximum intensity of contact 3006 prior to liftoff is determined to evaluate whether the predefined intensity criteria are met.

Figure 11C:
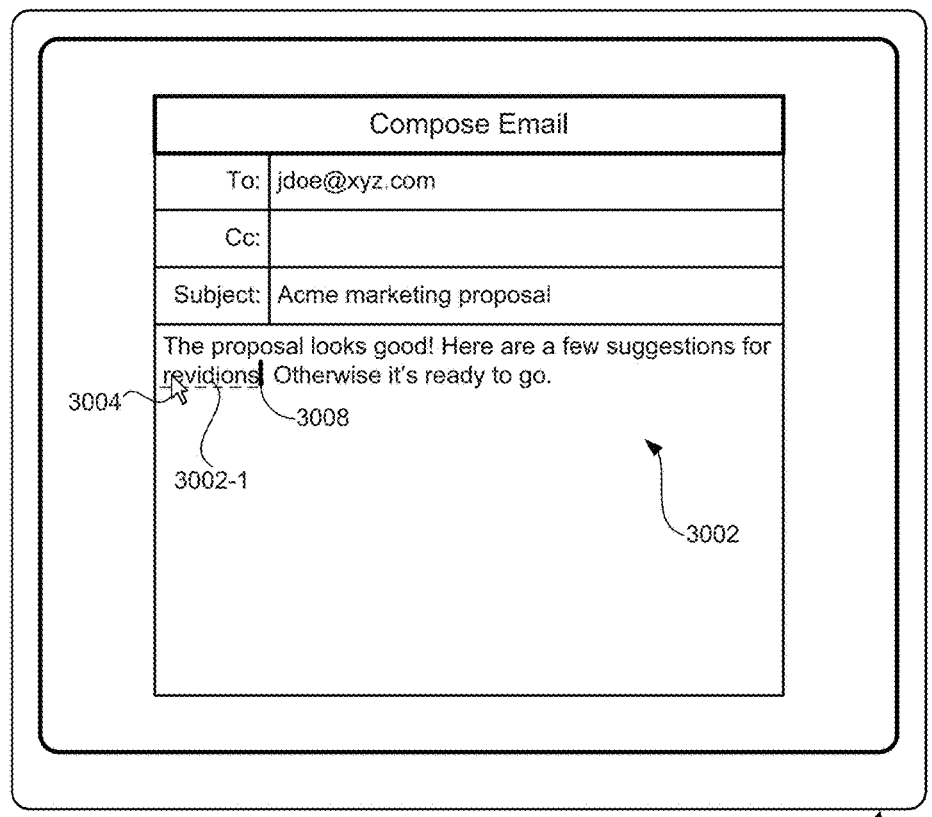
Figure 11C:
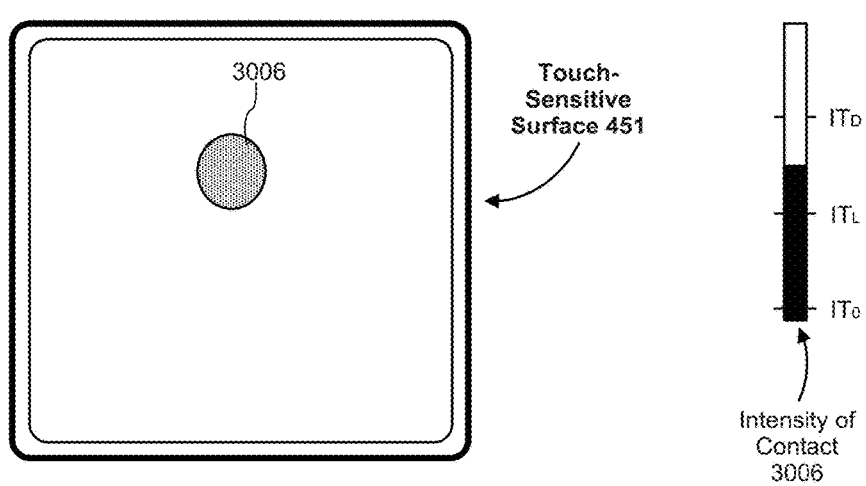
Figure 11D:
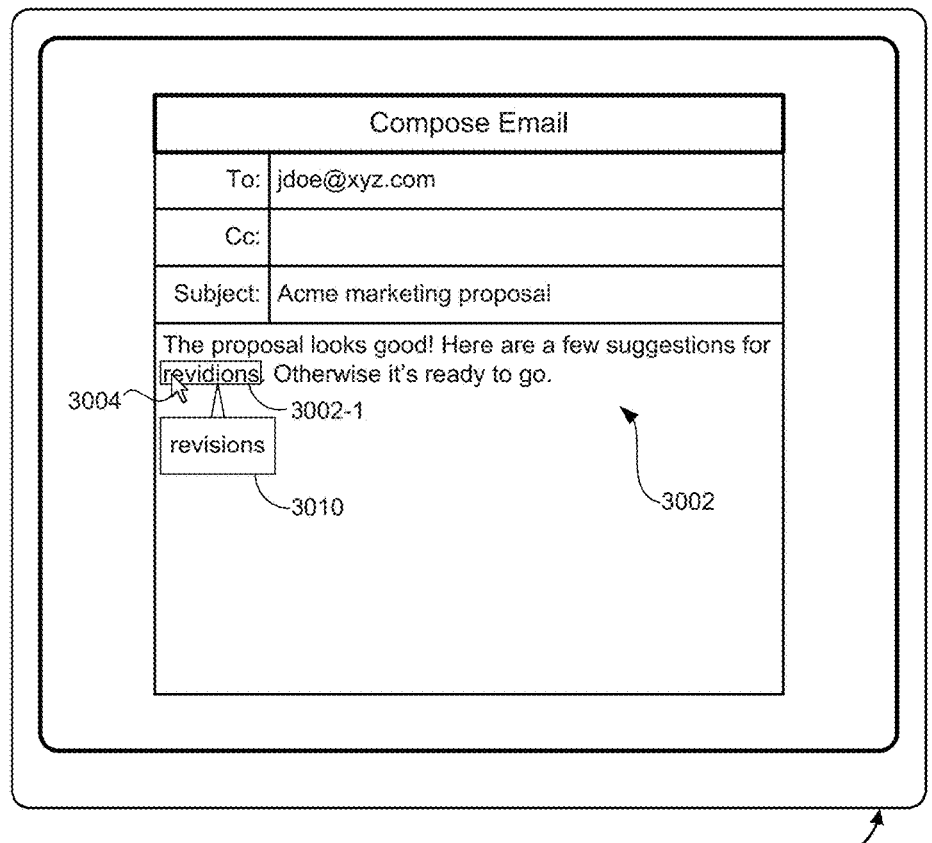
Figure 11D:
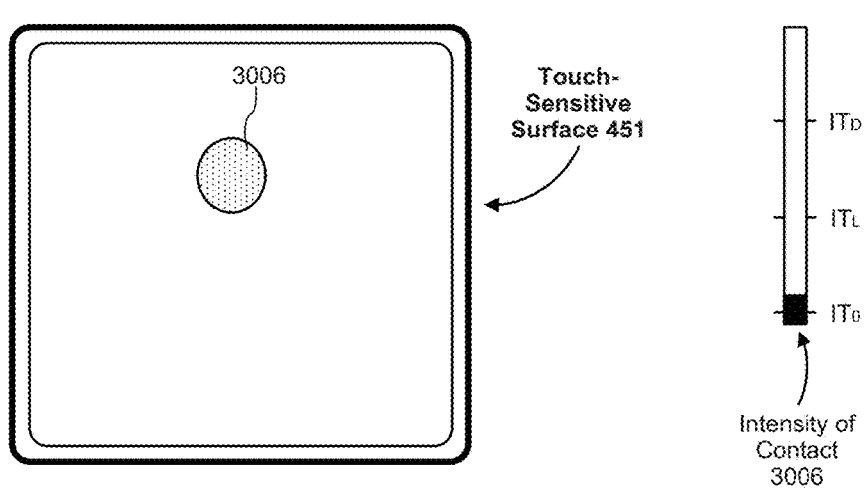

In FIG. 11B, contact 3006 is a contact that does not meet the predefined intensity criteria (e.g., contact 3006 has a maximum intensity below $IT_D$). In FIGS. 11C-11D, the device detects a press input including an increase in intensity of contact 3006 from an intensity below a light press intensity threshold (e.g., "$IT_L$") to an intensity above the light press intensity threshold (e.g., "$IT_L$") as shown in FIG. 11C and a decrease in intensity of contact 3006 below the light press intensity threshold (e.g., "$IT_L$") as shown in FIG. 11D. In response to detecting the gesture performed with contact 3006, when an end of the gesture (e.g., liftoff of contact 3006 or a reduction in intensity of the contact below $IT_L$) is detected, a user interface for interacting with word 3002-1 within text display area 3001 is displayed.

In some embodiments, the use interface for interacting with word 3002-1 includes a text cursor, insertion point, or the like. For example, text cursor 3008 is, optionally, displayed near word 3002-1 (for example, at the beginning or end of word 3002-1, within word 3002-1) in response to detection of the increase in intensity of contact 3006 from an intensity below a light press intensity threshold (e.g., "$IT_L$") to an intensity above the light press intensity threshold (e.g., "$IT_L$"), as shown in FIG. 11C. Text cursor 3008 indicates a current location in words 3002 at which the user optionally enters additional characters or delete characters.

In some embodiments, the use interface for interacting with word 3002-1 includes an affordance for a replacement word that, when activated, replaces word 3002-1 with the replacement word. For example, replacement word affordance 3010 is, optionally, displayed near word 3002-1 in response to detection of the decrease in intensity of contact 3006 from an intensity above the light press intensity threshold (e.g., "$IT_L$") to an intensity below the light press intensity threshold (e.g., "$IT_L$"), as shown in FIG. 11D. Replacement word affordance 3010 includes a suggested replacement word ("revisions") for word 3002-1. The replacement word is, optionally, a word that corrects the spelling of word 3002-1 or auto-completes word 3002-1. The user optionally activates replacement word affordance 3010 by positioning cursor 3004 over replacement word affordance 3010 and performing a gesture (e.g., a tap gesture or a press input) on touch-sensitive surface 451 while cursor 3004 is located over replacement word affordance 3010. In response to the activation of replacement word affordance 3010, word "revisions" 3002-1 would be replaced with word "revisions."

Figure 11E:
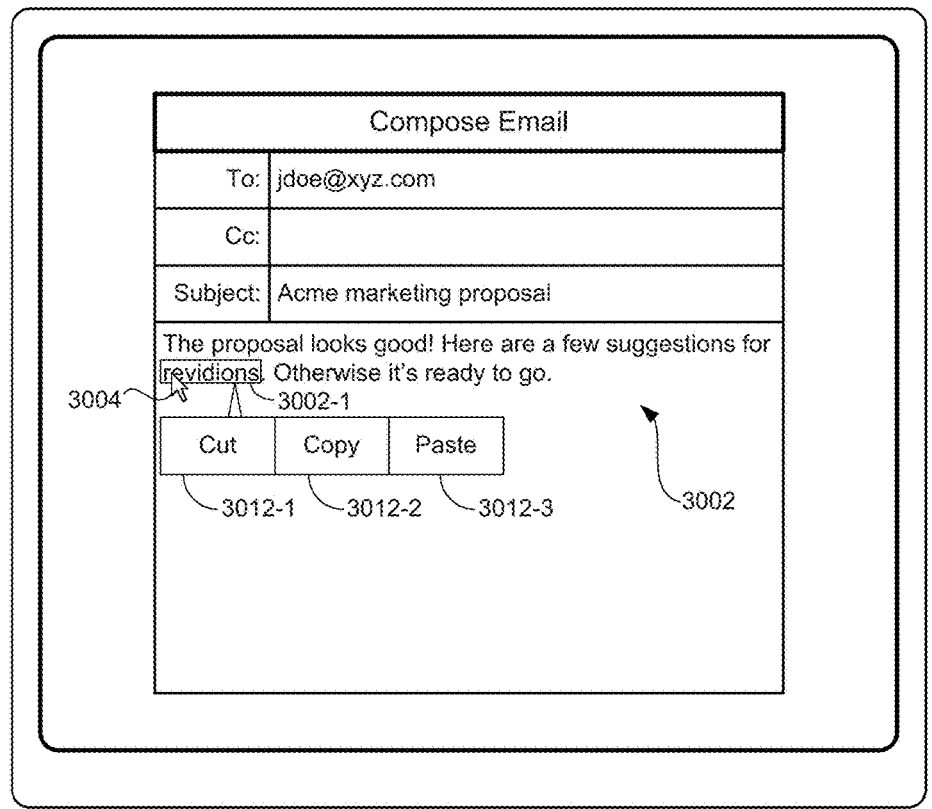
Figure 11E:
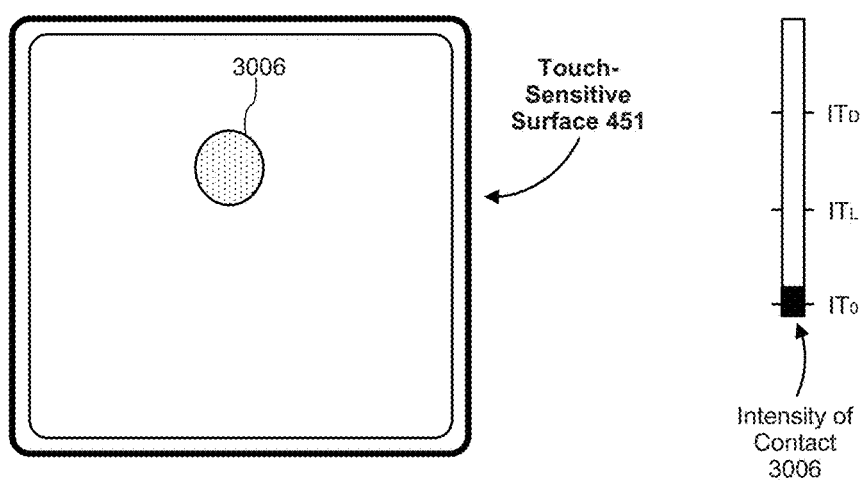

In some embodiments, the user interface for interacting with word 3002-1 includes one or more affordances 3012 for interacting with word 3002-1. For example, "Cut" affordance 3012-1, "Copy" affordance 3012-2, and "Paste" affordance 3012-3 is, optionally, displayed, as shown in FIG. 11E. A user optionally activates "Cut" affordance 3012-1 to copy word 3002-1 (e.g., to a virtual clipboard for pasting elsewhere) and to delete word 502-1 from words 3002. A user optionally activates "Copy" affordance 3012-2 to copy word 3002-1 (e.g., to a virtual clipboard for pasting elsewhere). A user optionally activates "Paste" affordance 3012-3 to insert previously copied text (e.g., text copied into a virtual clipboard) to replace word 3002-1.

Figure 11F:
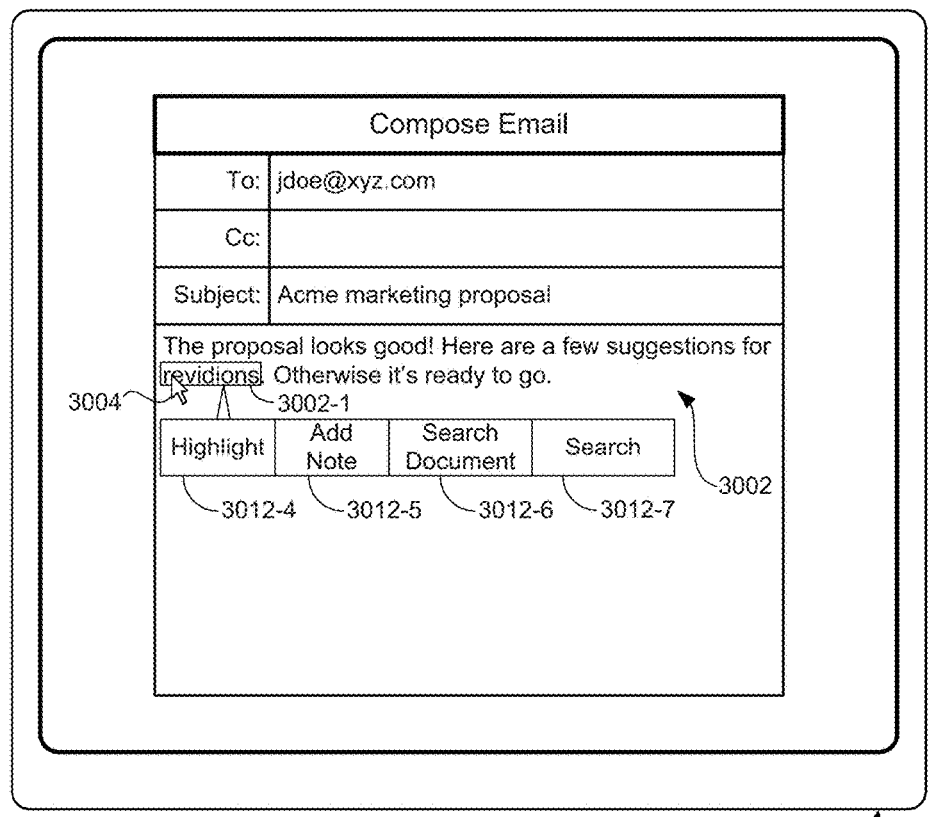
Figure 11F:
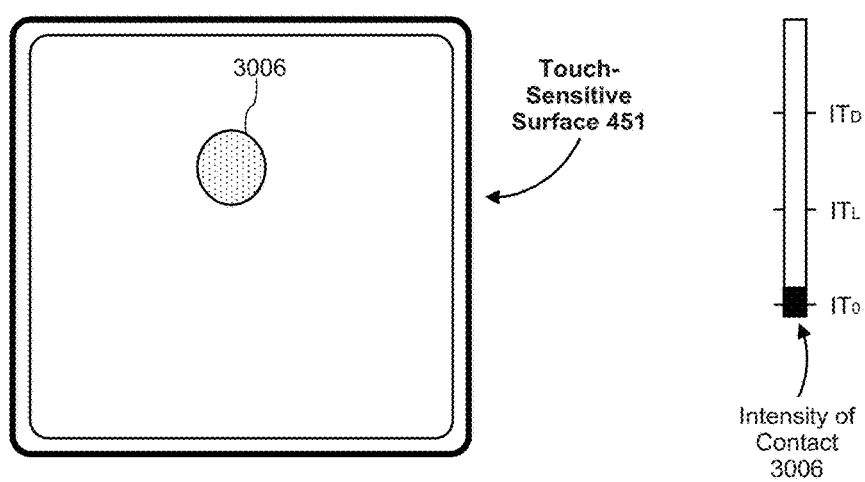

Other examples of affordances for interacting with word 3002-1 include, for example, "Highlight" affordance 3012-4, "Add Note" affordance 3012-5, "Search Document" affordance 3012-6, and "Search" affordance 3012-7, as shown in FIG. 11F. A user optionally activates "Highlight" affordance 3012-4 to highlight (e.g., with yellow or green color) word 3002-1. A user optionally activates "Add Note" affordance 3012-5 to create a note to be associated with word 3002-1. A user optionally activates "Search Document" affordance 3012-6 to search electronic document 3003 or words 3002 using word 3002-1 as a search term. A user optionally activates "Search" affordance 3012-7 to search an information repository (e.g., a search engine, an online encyclopedia) using word 3002-1 as a search term.

Figure 11G:
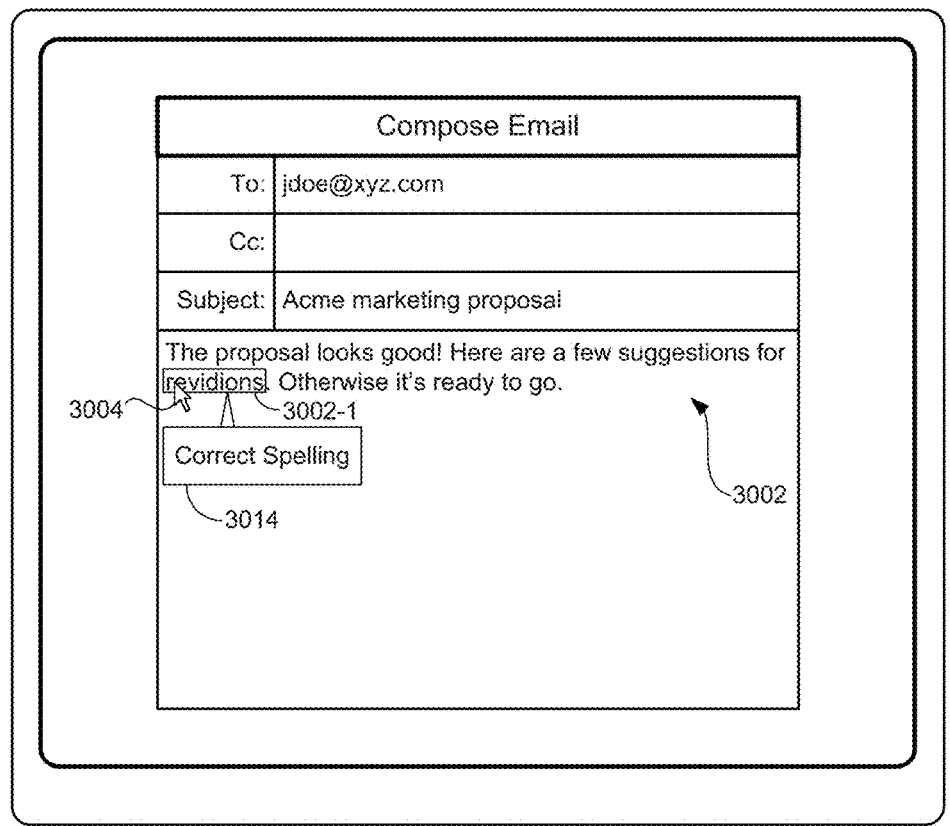
Figure 11G:
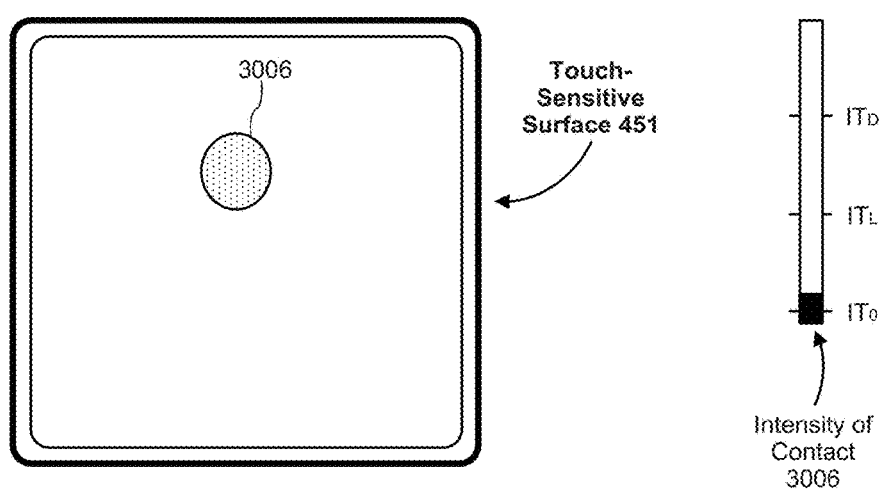
Figure 11H:
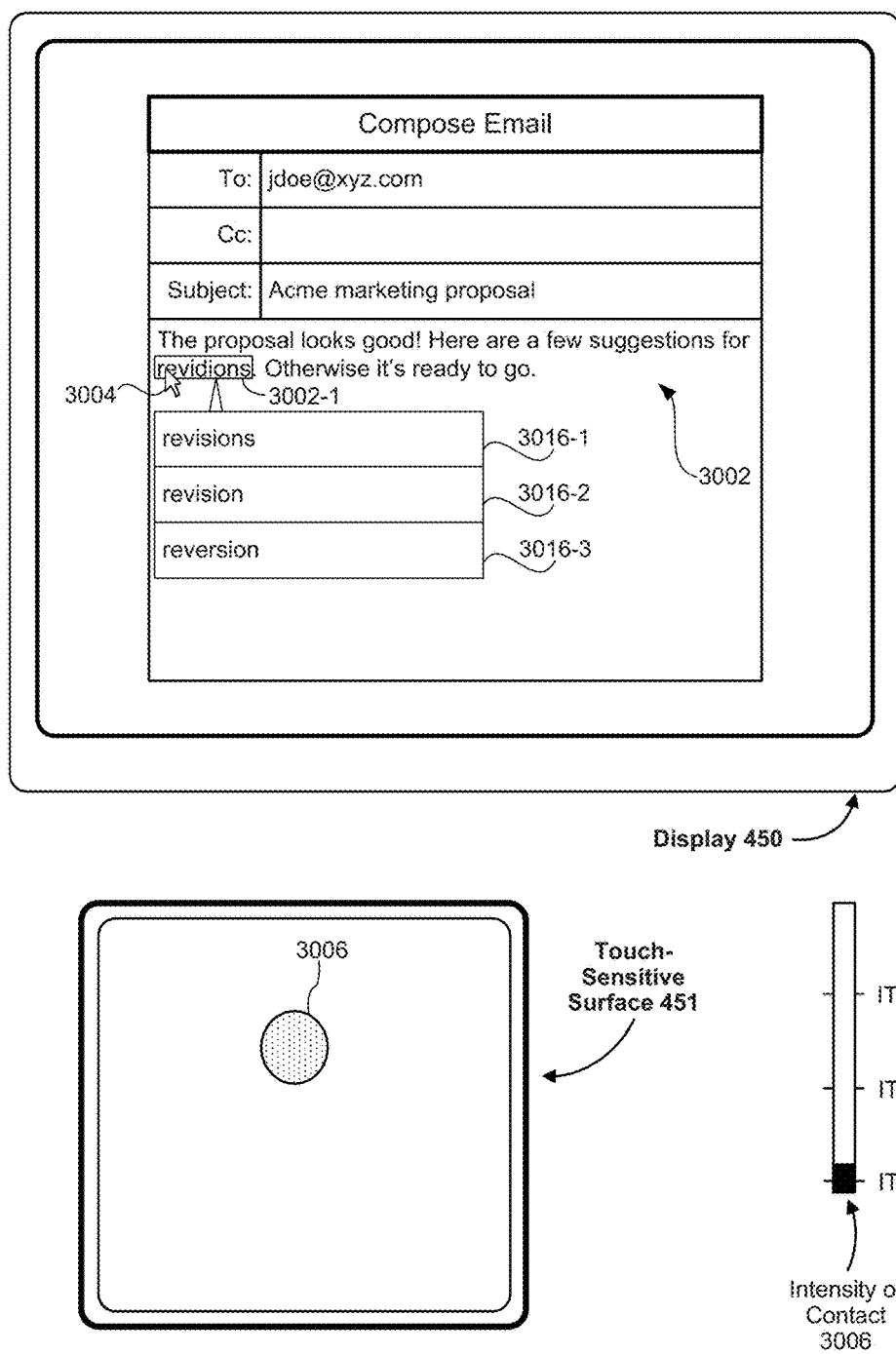

In some embodiments, the use interface for interacting with word 3002-1 includes an affordance for launching a spelling correction interface. For example, spelling correction affordance 3014 is, optionally, displayed near word 3002-1 in response to detection of the gesture, as shown in FIG. 11G. When spelling correction affordance 3014 is activated, a spelling correction interface is launched, as shown in FIG. 5H. The spelling correction interface optionally includes one or more options 3016 (e.g., one or more candidate replacement words) for correcting the spelling of word 3002-1. The user optionally activates one of the options 3016 to replace word 3002 with a replacement word corresponding to the activated option 3016. In some embodiments, the spelling correction affordance includes the one or more options 3016 (e.g., one or more candidate replacement words) for correcting the spelling of word 3002-1, as shown in FIG. 11H.

Figure 11I:
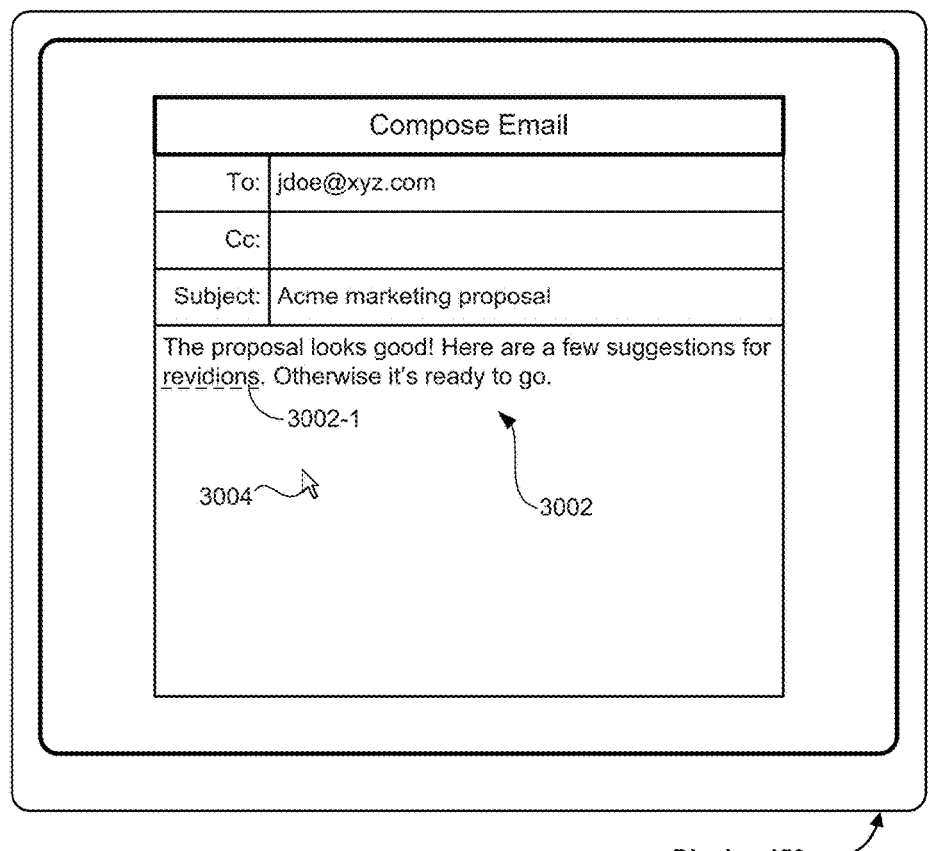
Figure 11I:
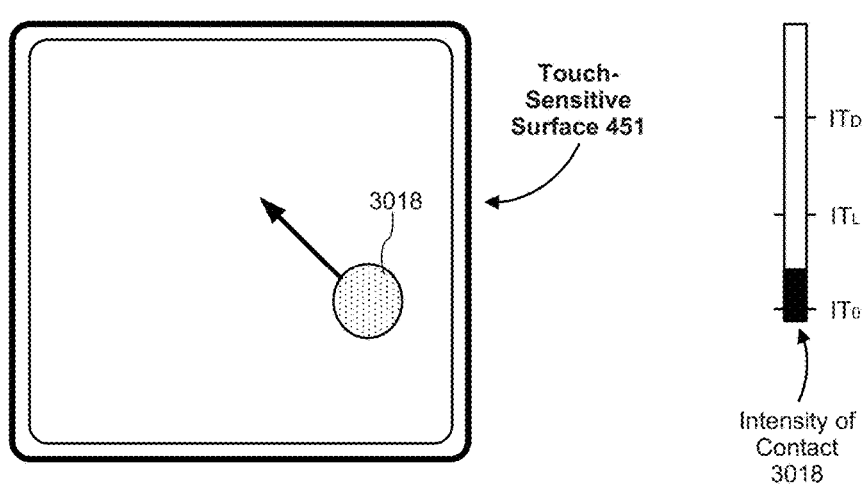

FIG. 11I shows, instead of the gesture performed with contact 3006, a gesture performed with contact 3018 detected on touch-sensitive surface 451. As with FIG. 11A, if cursor 3004 is not already located over word 3002-1, the gesture optionally includes movement of contact 3018 to move cursor 3004 to a location over word 3002-1 (e.g., while an intensity of contact 3018 is between a contact-detection intensity threshold $IT_0$ and a light press intensity threshold $IT_L$). FIG. 11J shows cursor 3004 located over word 3002-1 with contact 3018 (and the corresponding gesture) still detected on touch-sensitive surface 451. While cursor 3004 is located over word 3002-1, the gesture is, optionally, ended by lifting contact 3018 off touch-sensitive surface 451.

In some embodiments, when cursor 3018 is moved over word 3002-1, a haptic indication is, optionally, provided. The haptic indication indicates to the user that performing a gesture that satisfies the predefined intensity criteria on misspelled word 3002-1 will cause correction of the misspelled word. For example, in FIG. 11J, in response to detecting movement of the focus selector (e.g., cursor 3006) over word 3002-1, the device generates tactile output 3005 (e.g., a vibration or other movement of the touch-sensitive surface 451) to provide an indication that word 3002-1 is responsive to a gesture including a contact with an intensity above the respective threshold (e.g., "$IT_D$").

Figure 11K:
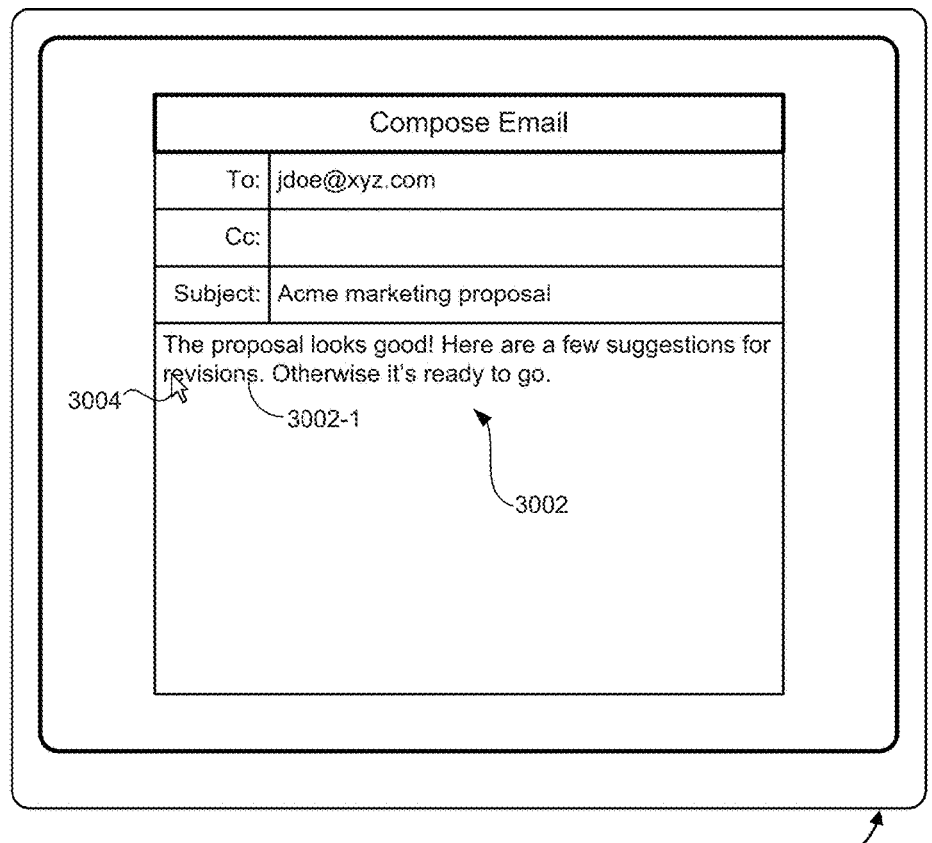
Figure 11K:
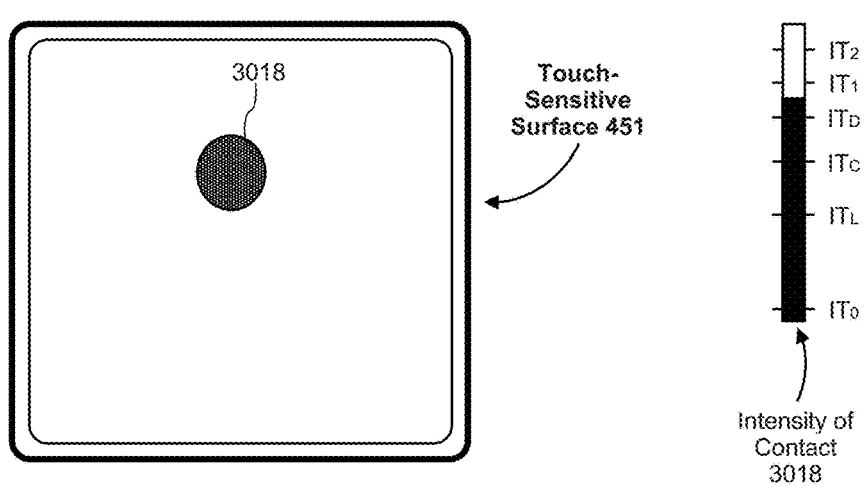

While cursor 3004 is positioned over word 3002-1, the device monitors an intensity of contact 3018 to determine whether or not contact 3018 meets one or more predefined intensity criteria. In FIG. 11J, contact 3018 meets the predefined intensity criteria (e.g., contact 3006 has an intensity above $IT_D$). For example, as shown in FIG. 11I the intensity of contact 3018 is below the word replacement intensity threshold (e.g., "$IT_D$") prior to cursor 3004 being located over word 3002-1, and the intensity of contact 3018 is increased from an intensity below the word replacement intensity threshold (e.g., "$IT_D$"), as shown in FIG. 11J, to an intensity above the word replacement intensity threshold (e.g., by the user pressing harder on touch-sensitive surface 451 with contact 3018 to increase the intensity of contact 3018 over IT, as shown in FIG. 11K) while cursor 3004 is located over word 3002-1. While cursor 3004 is located over word 3002-1, the gesture is, optionally, ended by lifting contact 3018 off touch-sensitive surface 451.

In response to detecting the gesture performed with contact 3018, when a increase in intensity of contact 3018 from an intensity below the word replacement intensity threshold (e.g., "$IT_D$") to an intensity above the word replacement intensity threshold (e.g., "$IT_D$") is detected, the spelling of word 3002-1 is corrected, as shown in FIG. 11K.

In some embodiments, the spelling of word 3002-1 is corrected in response to detecting an end of the gesture (e.g., detecting liftoff of contact 3018 or detecting a decrease in intensity of contact 3018 from an intensity above $IT_D$ to an intensity below $IT_L$). For example, the originally misspelled word 3002-1 "revidions" is replaced with correctly-spelled "revisions," as shown in FIG. 11K. After the correction, visual indication of misspelling (e.g., dotted underline) for word 3002-1 ceases to be displayed.

In some embodiments, the replacement word (e.g., "revisions") that replaces the originally misspelled word 3002-1 ("revidions") is a highest ranked candidate replacement word amongst multiple candidate replacement words. The highest ranked candidate replacement word is, optionally, determined by the device. For example, the device determines multiple candidate replacement words for the misspelled word (e.g., identifying words in a dictionary that are within an edit distance threshold from the misspelled word), ranks the multiple candidate replacement words (e.g., based on usage frequency and/or edit distance from the misspelled word), and selects the highest ranked candidate replacement word from the multiple candidate replacement words.

Figure 11L:
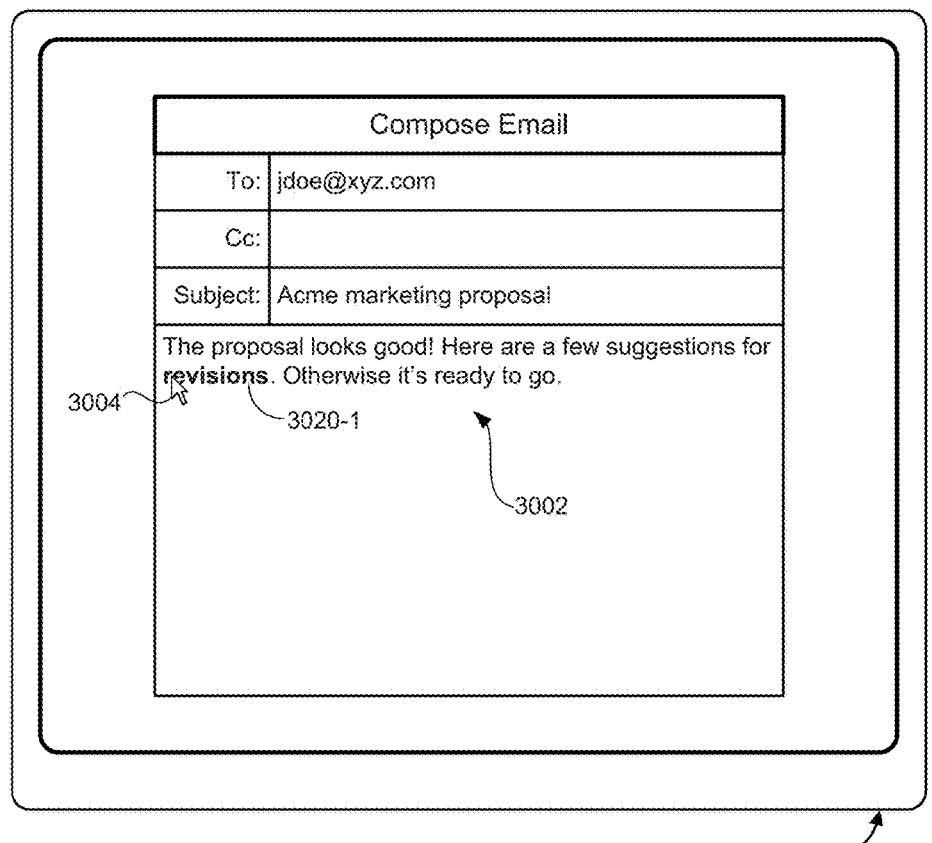
Figure 11L:
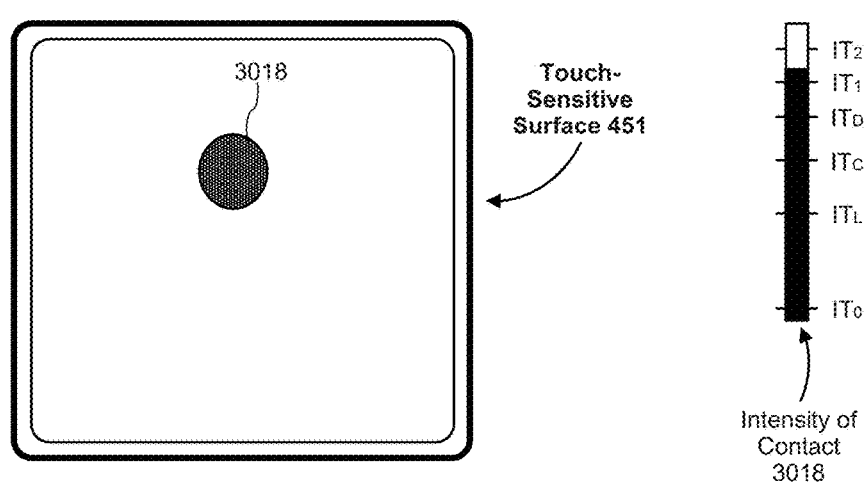

In some embodiments, a plurality of previews of the replacement words for misspelled word 3002-1 are, optionally, displayed prior to the actual replacement of misspelled word 3002-1 with a replacement. FIG. 11L shows contact 3018, continuing the gesture shown in FIG. 11I. In FIG. 11J, the intensity of contact 3018 is determined to be below a first word preview intensity threshold (e.g., "$IT_1$"). In FIG. 11L, the intensity of contact 3018 is determined to exceed the first word preview intensity threshold (e.g., "$IT_1$"). In response to the determination that the intensity of contact 3018 exceeds the first word preview intensity threshold (e.g., "$IT_1$"), word preview 3020-1 ("revisions") is displayed in place of misspelled word 3002-1. Word preview 3020-1 shows a preview of a first candidate replacement word that corrects misspelled word 3002-1. Word preview 3020-1 is, optionally, displayed with different visual styling (e.g., bold font, different font size, different font color, etc.) than other words adjacent to the word preview in the block of text to emphasize that it is a preview of the replacement word and that the replacement of word 3002-1 has not occurred yet. In some embodiments, the first word preview intensity threshold is also the word replacement intensity threshold (e.g., the first word preview intensity threshold is $IT_D$) for the first candidate replacement word shown in word preview 3020-1; if the gesture with contact 3018 ends (e.g., by detecting liftoff of contact 3018 or a reduction in intensity of contact 3018 below $IT_L$), word 3002-1 is replaced with the word in word preview 3020-1 (e.g., "revisions).

Figure 11M:
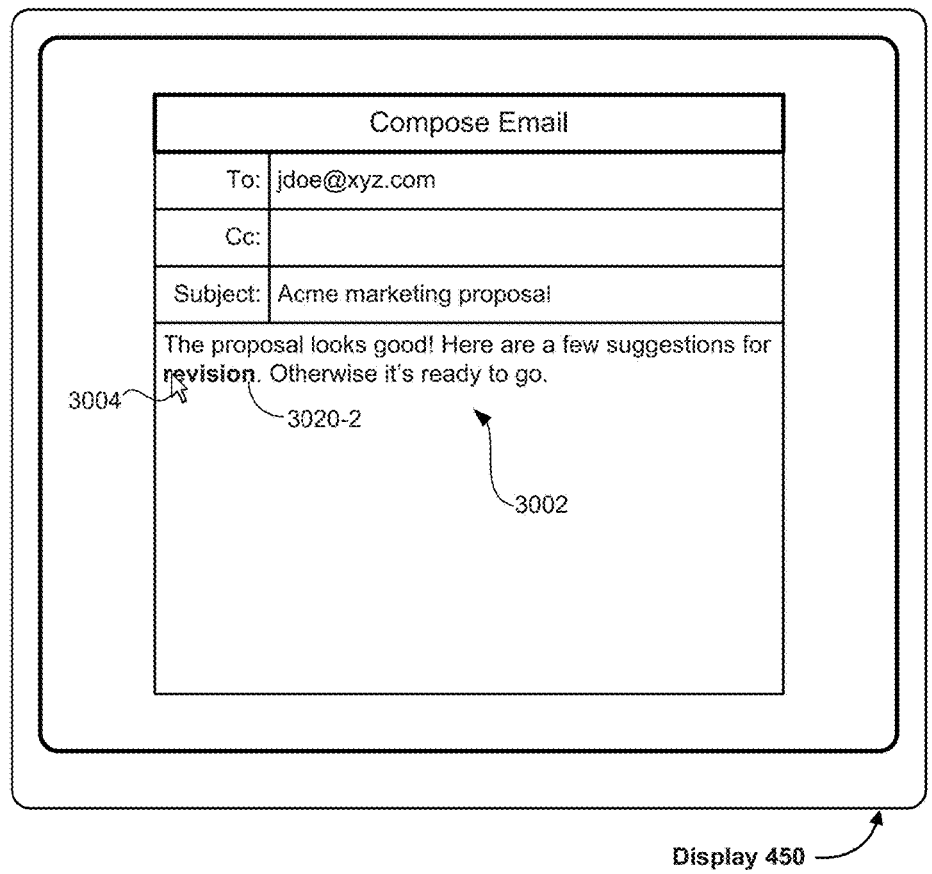
Figure 11M:
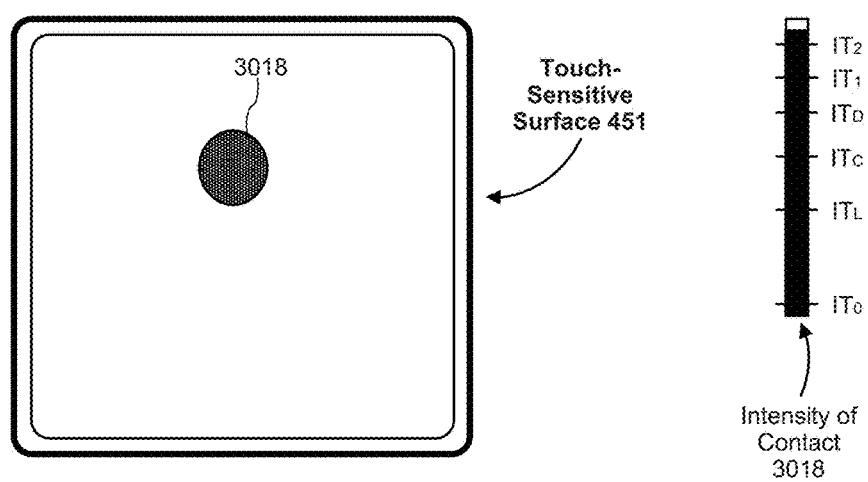

The intensity of contact 3018 is, optionally, increased further to exceed a second word preview intensity threshold (e.g., "$IT_L$") that is higher than the first word preview intensity threshold (e.g., "$IT_1$"), as shown in FIG. 11M. In response to the determination that the intensity of contact 3018 exceeds the second word preview intensity threshold (e.g., "$IT_2$"), word preview 3020-2 (e.g., "revision") is displayed in place of word preview 3020-1, as shown in FIG. 11M. Word preview 3020-2 previews shows a preview of a second candidate replacement word that corrects misspelled word 3002-1. As with word preview 3020-1, word preview 3020-2 is, optionally, displayed with different visual styling (e.g., bold font, different font size, different font color, etc.) than other words adjacent to the word preview in the block of text to emphasize that the replacement of word 3002-1 has not occurred yet. In some embodiments, the second word preview intensity threshold (e.g., "$IT_2$") is also a word replacement intensity threshold for the second candidate replacement word shown in word preview 3020-2; if the gesture with contact 3018 ends (e.g., by detecting liftoff of contact 3018 or a reduction in intensity of contact 3018 below $IT_L$), word 3002-1 is replaced with the word in word preview 3020-2.

Figure 11N:
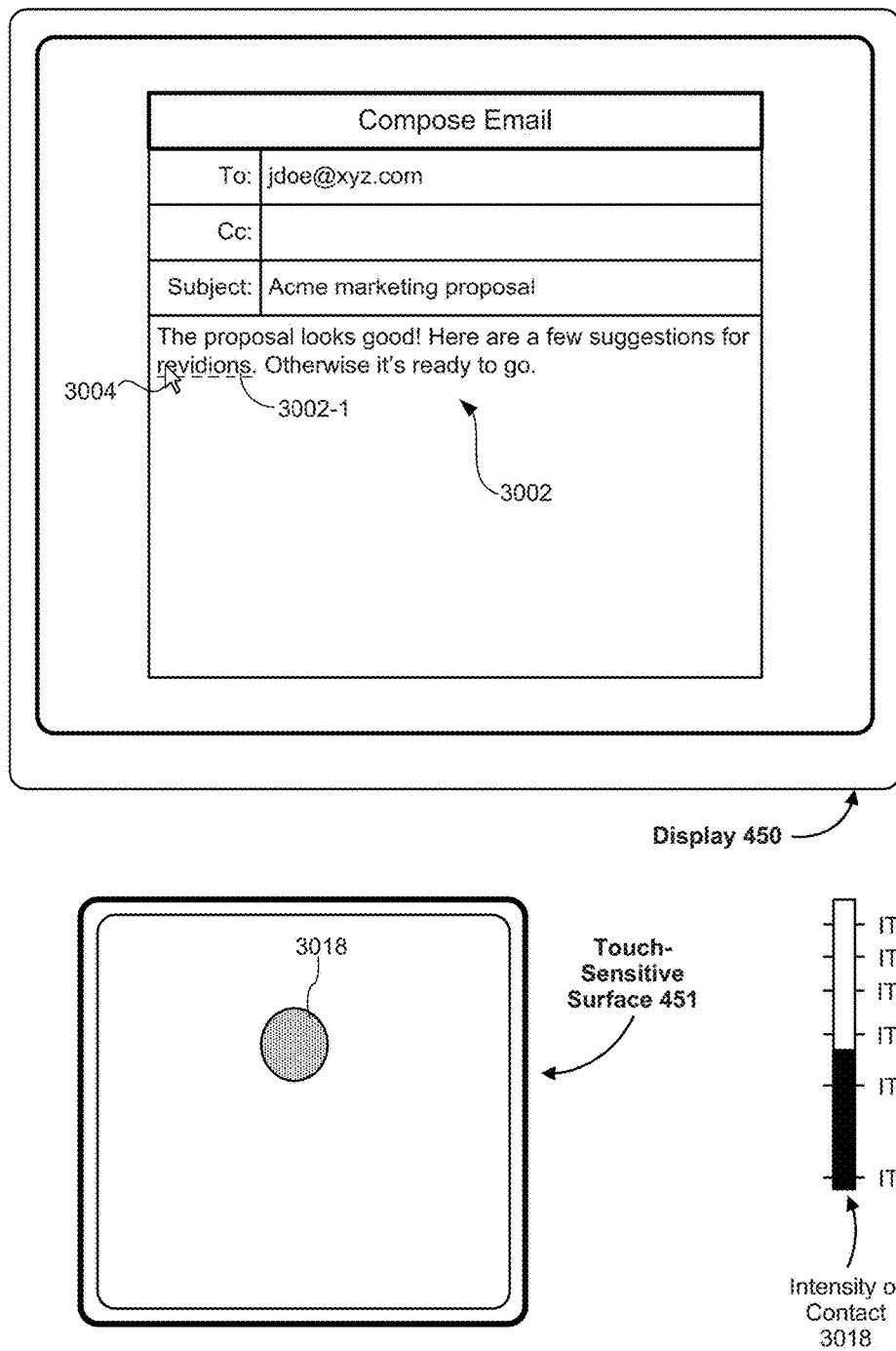

In some circumstances, the device detects a decrease in the intensity of contact 3018 from an intensity above the first word preview intensity threshold (e.g., "$IT_1$") or the second word preview intensity threshold (e.g., "$IT_2$") to a lower intensity below the first word preview intensity threshold (e.g., "$IT_1$") or the second word preview intensity threshold (e.g., "$IT_2$") prior to liftoff of contact 3018 (or prior to reduction of intensity of contact 3018 to an intensity below $IT_L$). FIGS. 11L and 11N show contact 3018 with an intensity that is decreased from above the first word preview intensity threshold (e.g., "$IT_1$") to an intensity that is below a correction-cancellation intensity threshold (e.g., "$IT_C$"). The intensity that is below the correction-cancellation intensity threshold (e.g., "$IT_C$") is maintained for at least a predefined amount of time (e.g., 1-2 seconds) before detecting an end of the gesture (e.g., liftoff of contact 3018 or a decrease in intensity of contact 3018 below $IT_L$). In some embodiments, the correction-cancellation intensity threshold and the first word preview intensity threshold are the same (e.g., the correction-cancellation intensity threshold and the first word preview intensity threshold are both $IT_D$ or are both $IT_1$ for the first replacement word). In some other embodiments, the correction-cancellation intensity threshold (e.g., "$IT_C$") and the first word preview intensity threshold (e.g., "$IT_1$") are different. In response to detection of the decrease in intensity of contact 3018 below the correction-cancellation intensity threshold (e.g., "$IT_C$") and maintenance of the intensity of contact 3018 below the correction-cancellation intensity threshold (e.g., "$IT_C$") for at least a predefined time before detecting an end of the gesture (e.g., liftoff of contact 3018 or a decrease in intensity of contact 3018 below $IT_L$), word preview 3020-1 ceases to be displayed and word 3002-1 is displayed again, as shown in FIG. 11N.

Figure 11O:
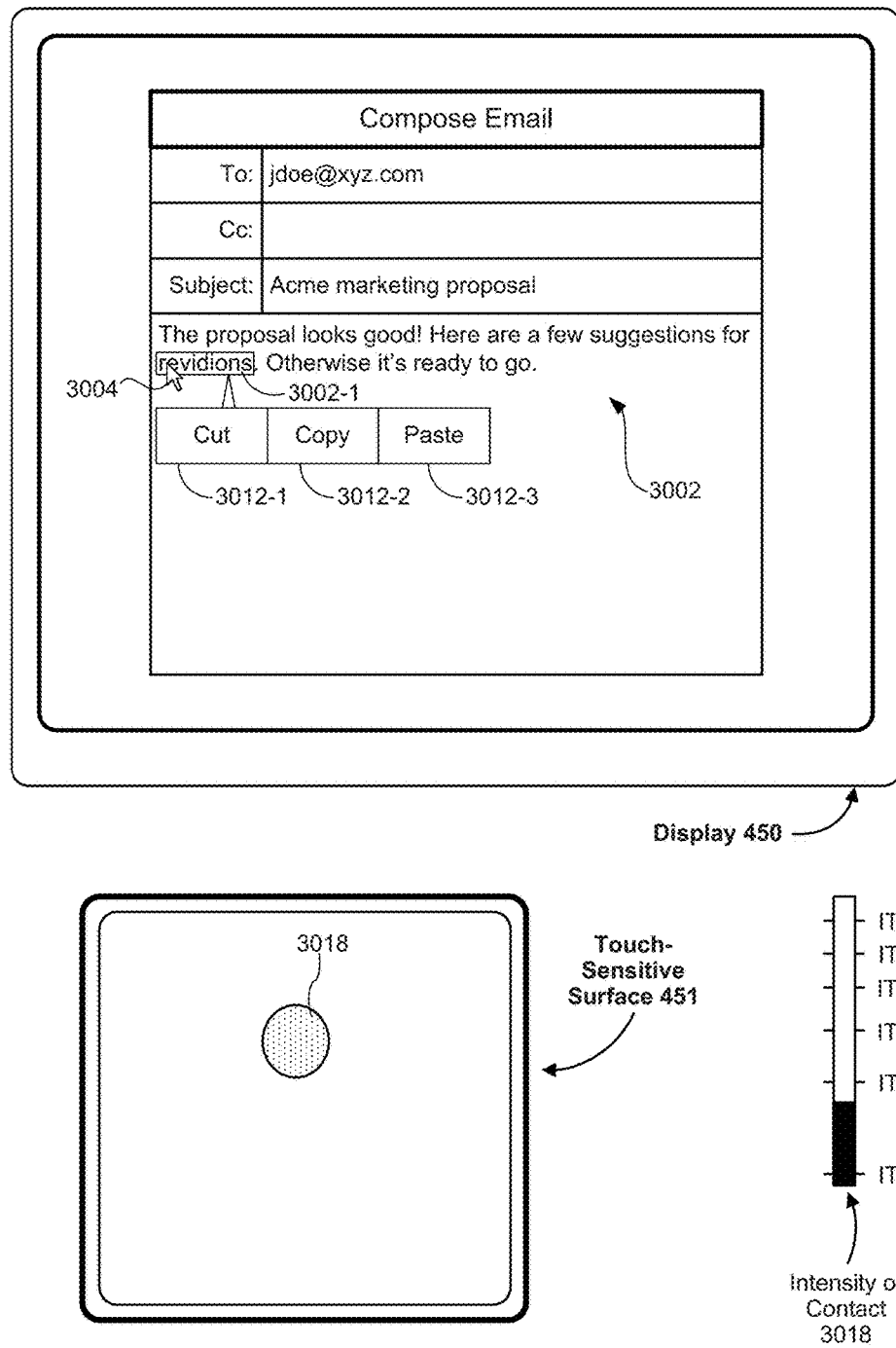

After word preview 3020-1 ceases to be displayed, intensity of contact 3018 is, optionally reduced to an intensity below $IT_L$ (or contact 3018 is lifted off touch-sensitive surface 451), ending the gesture. In response to detection of the end of the gesture, a user interface (e.g., affordances 3012) for interacting with word 3002-1 is, optionally, displayed, as shown in FIG. 11O.

Figure 11P:
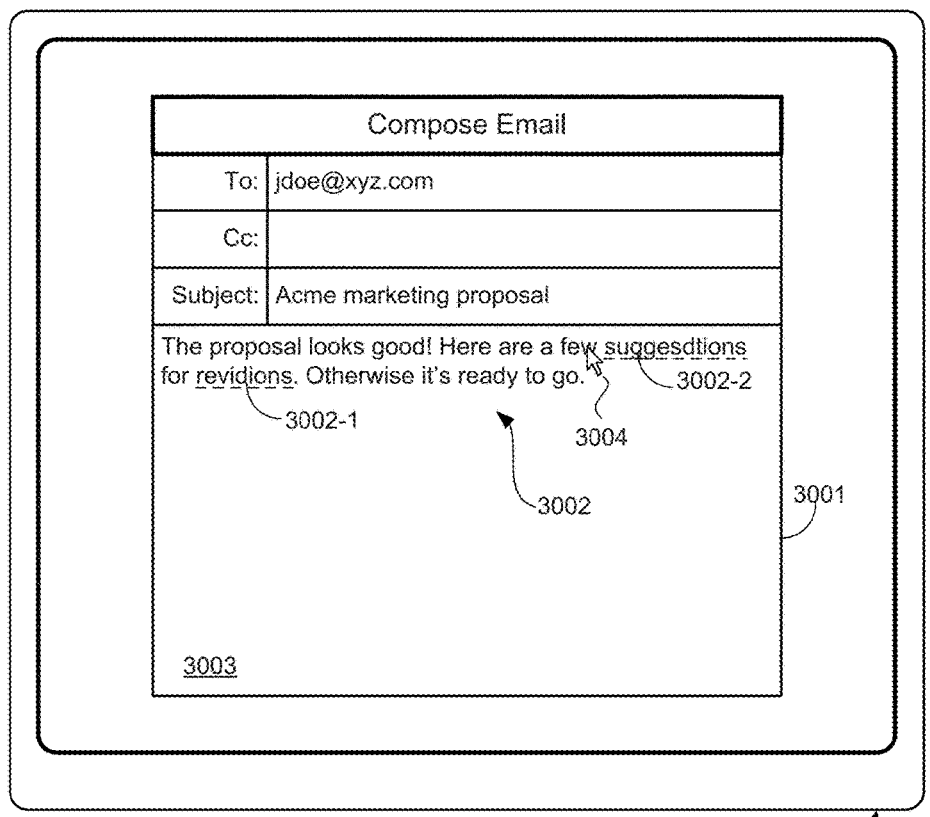
Figure 11P:
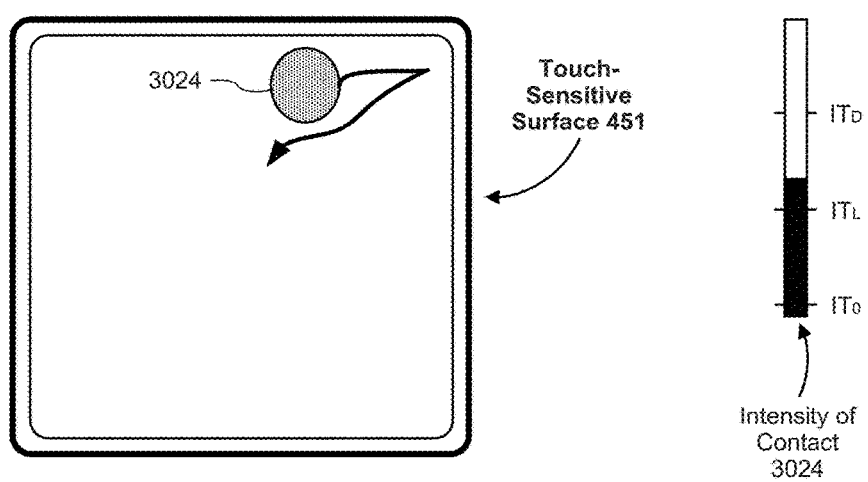

FIG. 11P shows electronic document 3003 with words 3002 displayed in text display area 3001. Cursor 3004 is displayed on display 450 as well. Words 3002 includes misspelled words 3002-1 "revidions" and 3002-2 "sugestions." A gesture with contact 3024 is detected on touch-sensitive surface 451. The gesture includes movement of contact 3024 (e.g., while contact has an intensity between $IT_L$ and $IT_D$) that selects selection 3026 (FIG. 11Q) of a set of one or more words in words 3002 and moves cursor 3004 to a position over word 3002-1, as shown in FIG. 11Q.

Figure 11Q:
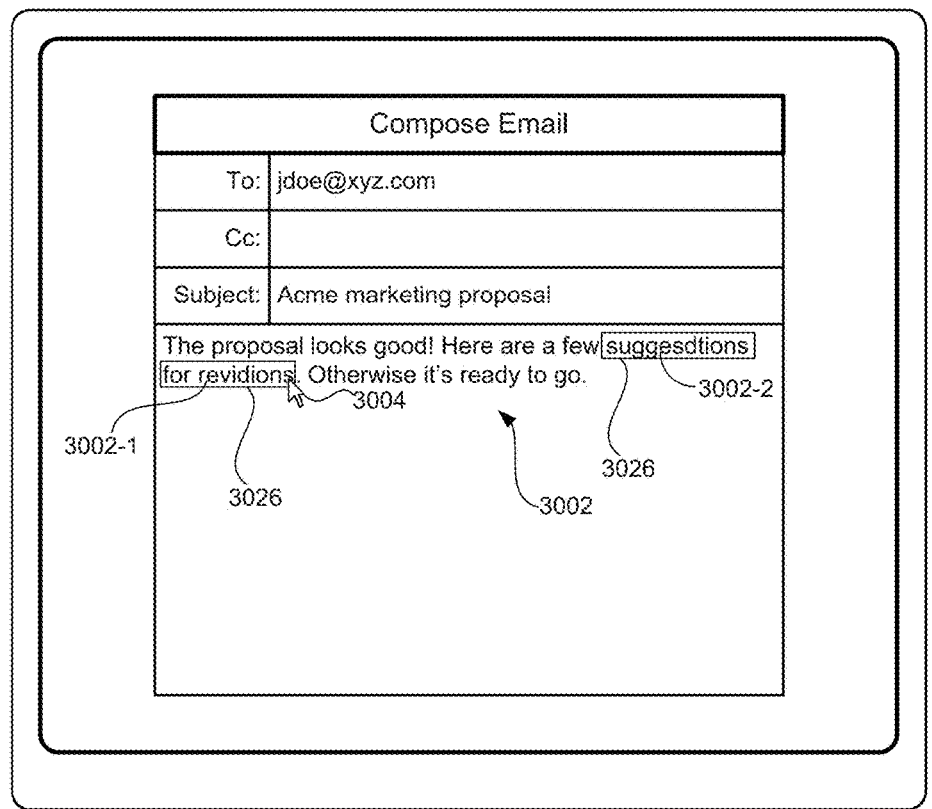
Figure 11Q:
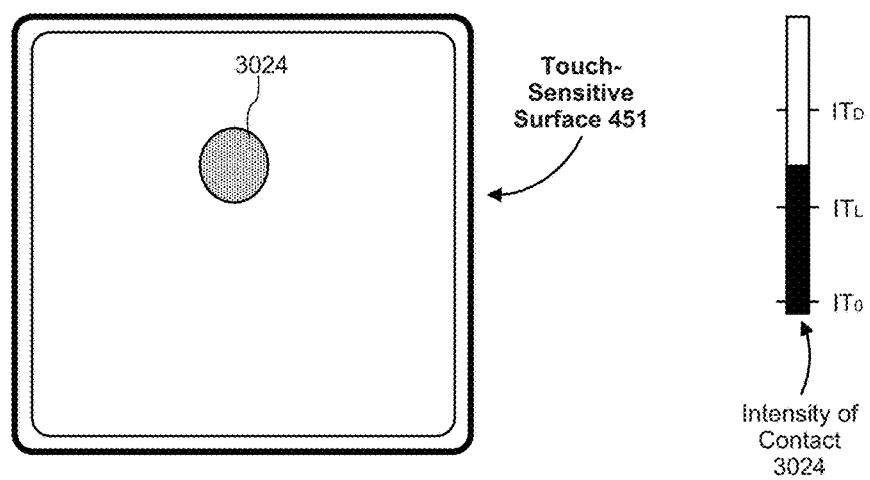
Figure 11R:
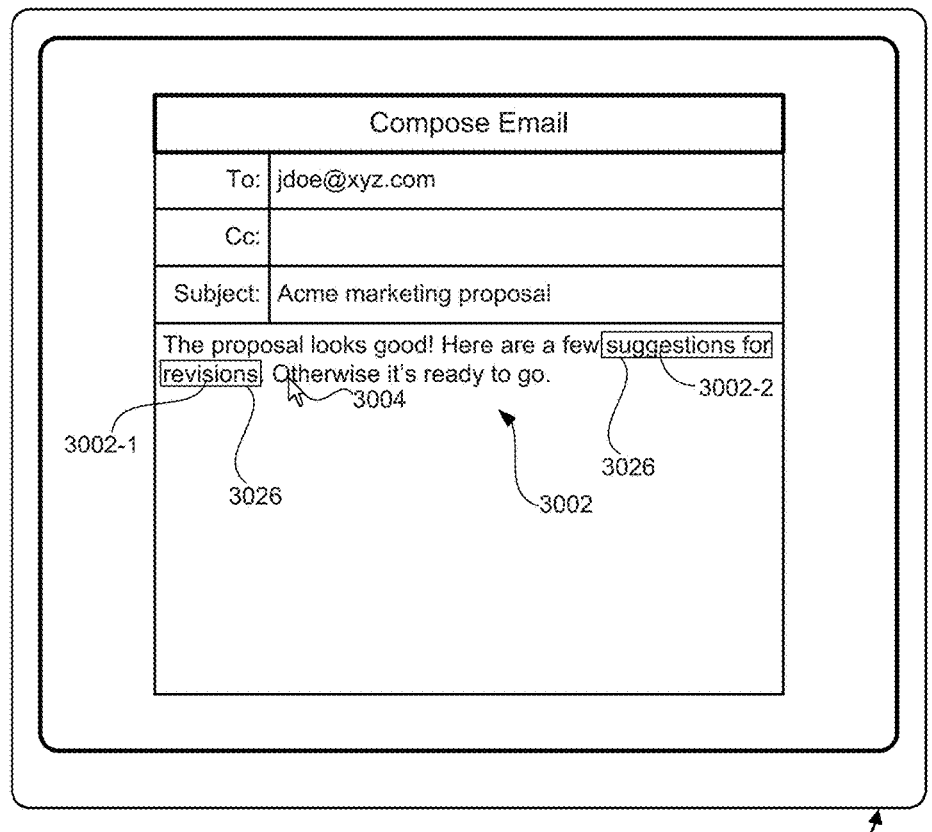
Figure 11R:
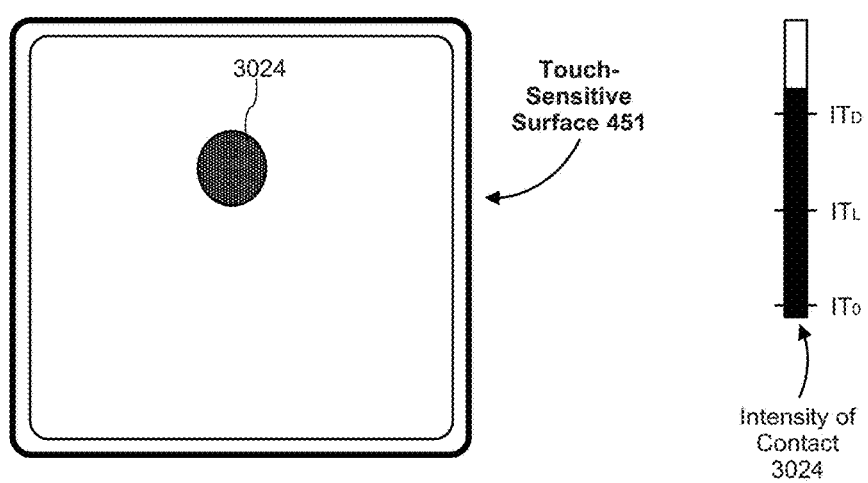

FIG. 11Q shows selection 3026 of a set of one or more words 3002. Included in the word selection 3026 are words 3002-1 and 3002-2. In some circumstances, the user changes the intensity of contact 3024 so that contact 3024 meets the predefined intensity criteria, as shown in FIG. 11R, where contact 3024 has an intensity above a word replacement intensity threshold (e.g., "$IT_D$"). In response to detecting the gesture, in accordance with a determination that contact 3024 meets the predefined intensity criteria, words 3002-1 and 3002-2 within selection 3026 are both replaced with replacement words that correct their respective spelling, as shown in FIG. 11R.

Figure 11S:
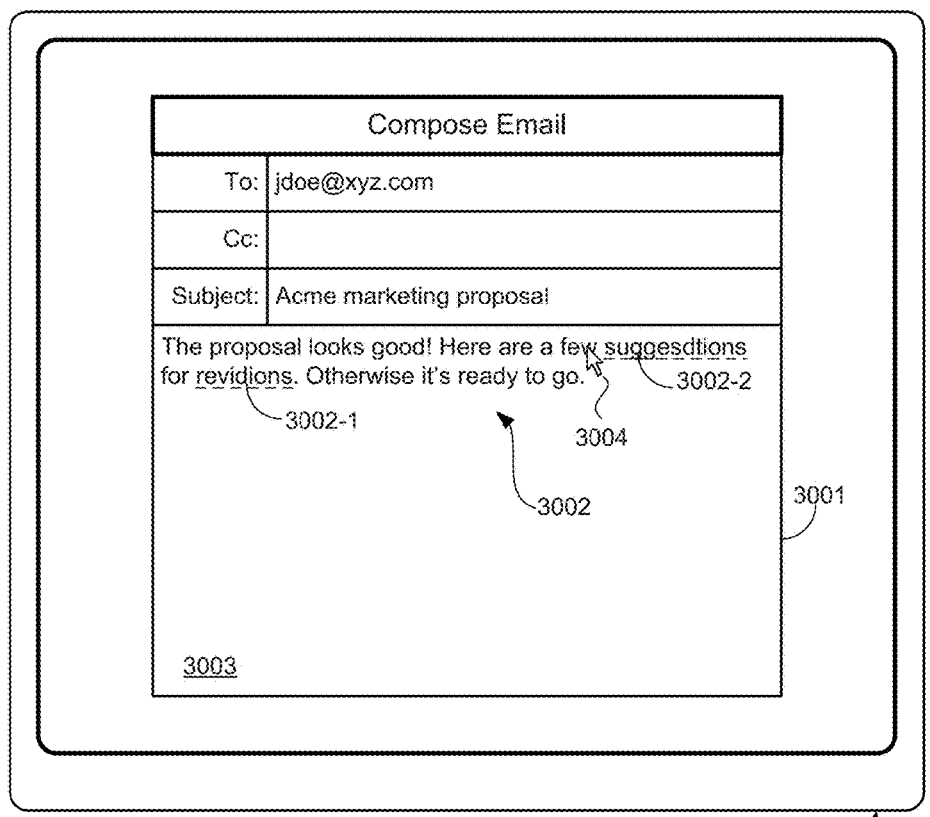
Figure 11S:
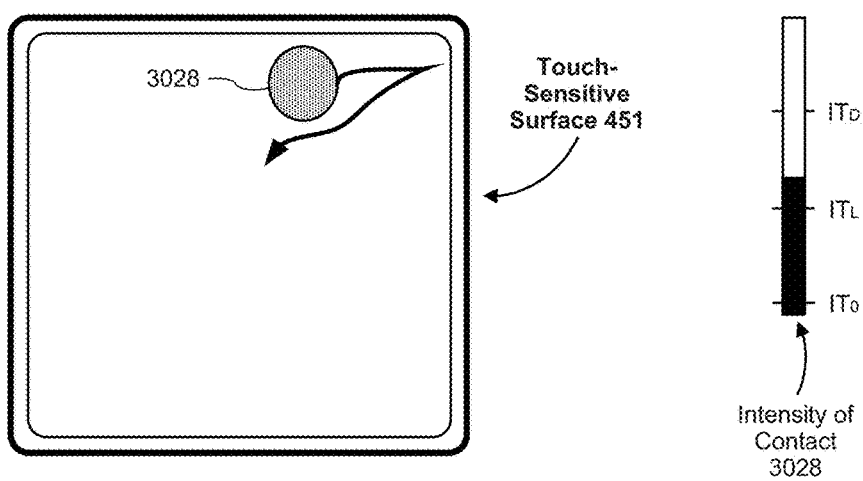

FIG. 11S shows words 3002 with misspelled words 3002-1 and 3002-2, as in FIG. 11P. A gesture with contact 3028 is detected on touch-sensitive surface 451. The gesture includes movement of contact 3028 (e.g., while contact has an intensity between $IT_L$ and $IT_D$) that selects a selection 3026 (FIG. 11T) of a set of one or more words in words 3002 and moves cursor 3004 to a position over word 3002-1, as shown in FIG. 11T.

Figure 11T:
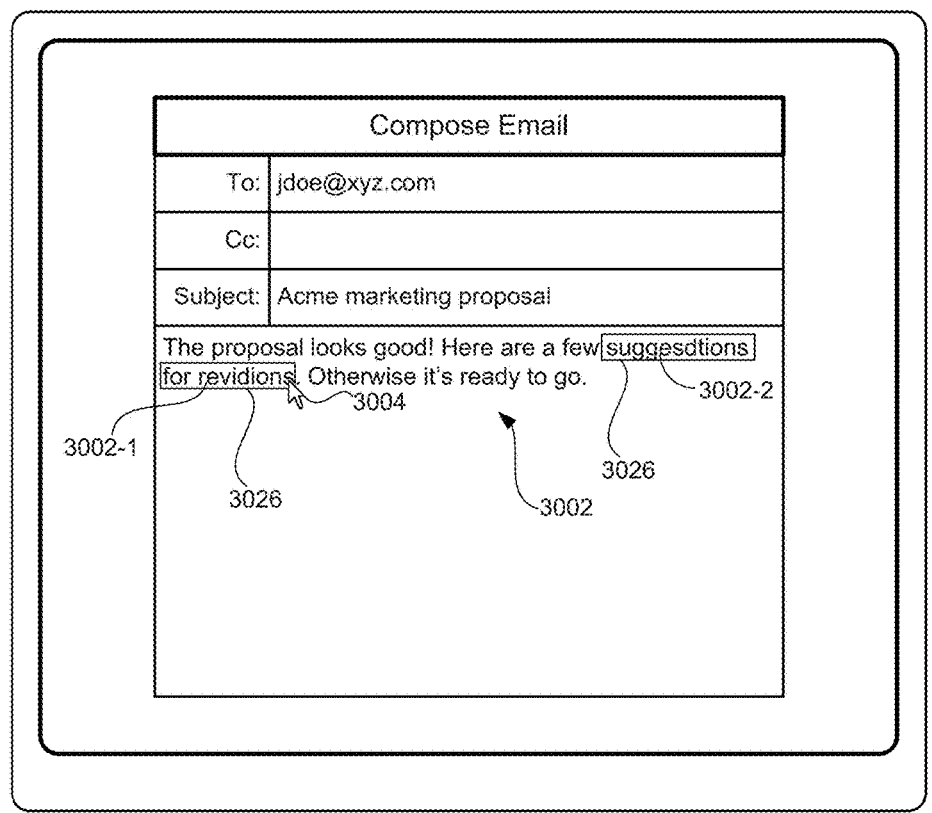
Figure 11T:
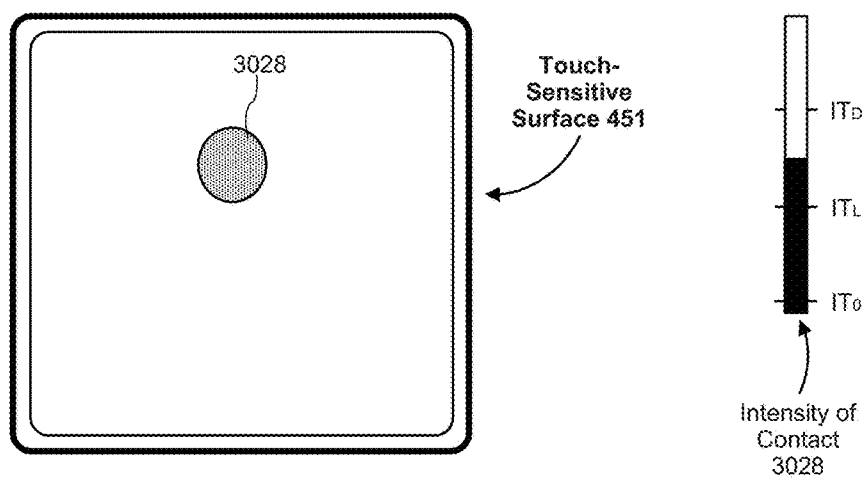
Figure 11U:
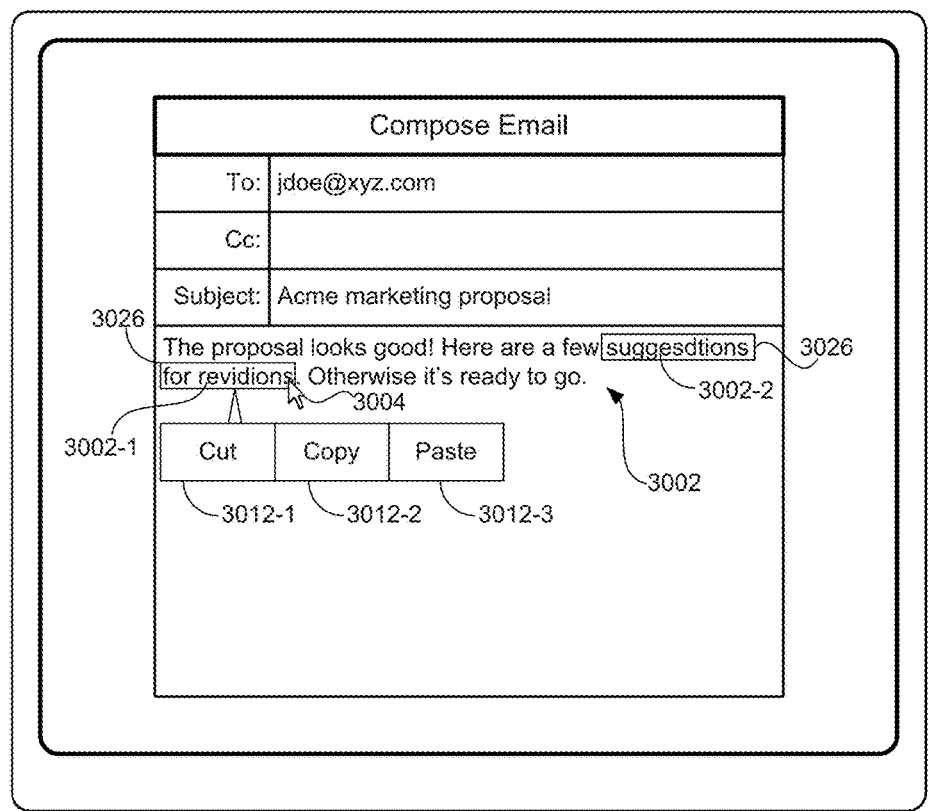
Figure 11U:
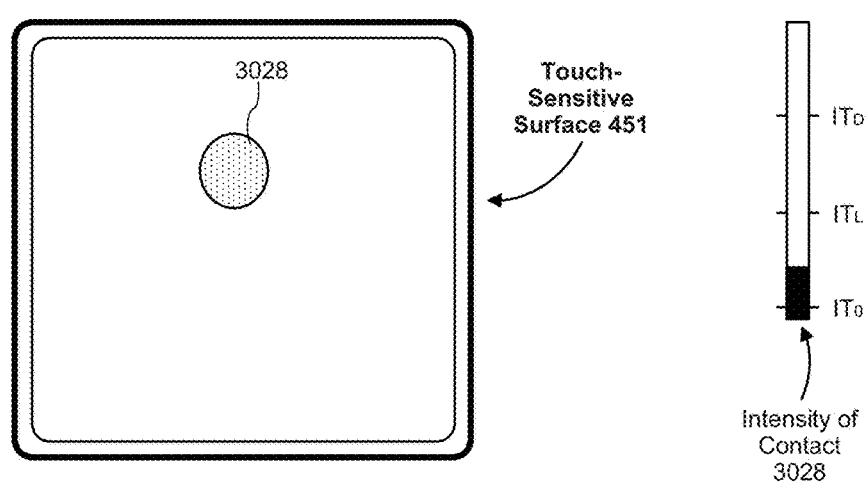

FIG. 11T shows selection 3026 of a set of one or more words 3002. Included in the word selection 3026 are words 3002-1 and 3002-2. Contact 3028 does not meet the predefined intensity criteria, as shown in FIG. 11T. In response to detecting the gesture, in accordance with a determination that contact 3028 does not meet the predefined intensity criteria, as shown in FIGS. 11S-11U where contact 3024 has a maximum intensity below the word replacement intensity threshold (e.g., "$IT_D$"), a user interface for interacting with selection 3026 is, optionally, displayed, as shown in FIG. 11U after detecting an end of the gesture (e.g., liftoff of contact 3028 or a reduction in intensity of contact 3028 to an intensity below $IT_L$). For example, FIG. 11U shows affordances 3012-1 thru 3012-3 that act on selection 3026 (or the text in selection 3026), not just word 3002-1.

Figure 11V:
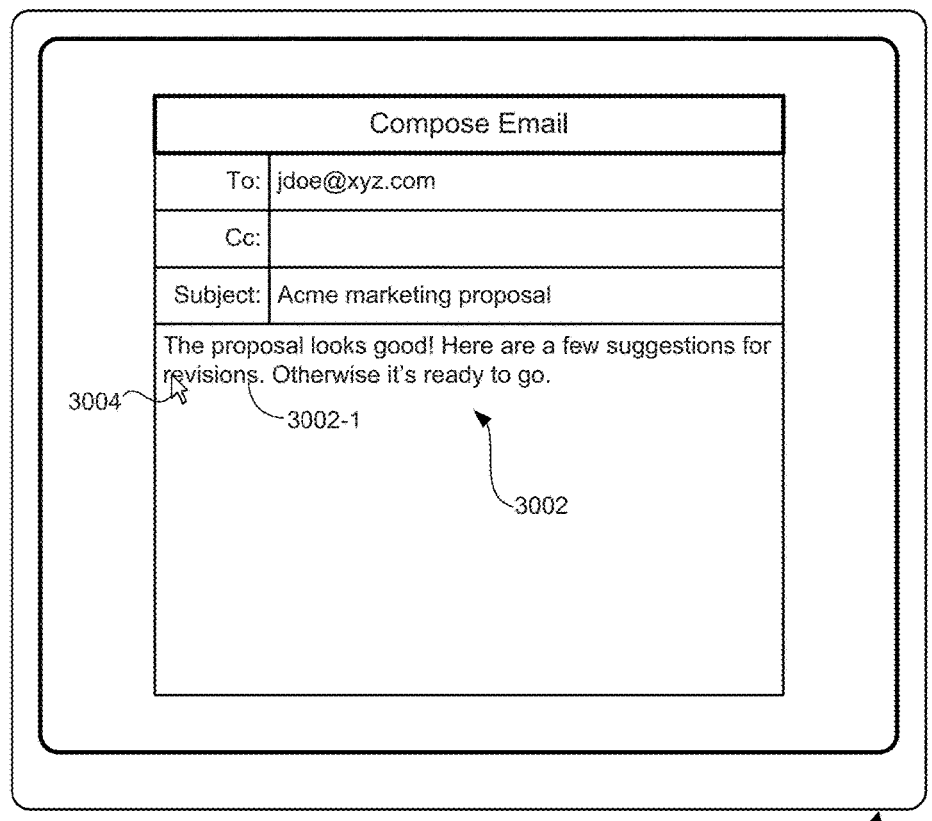
Figure 11V:
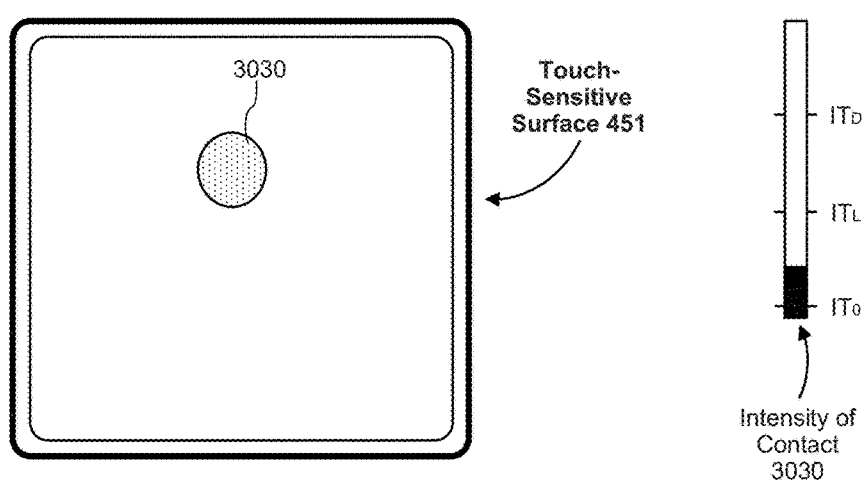
Figure 11W:
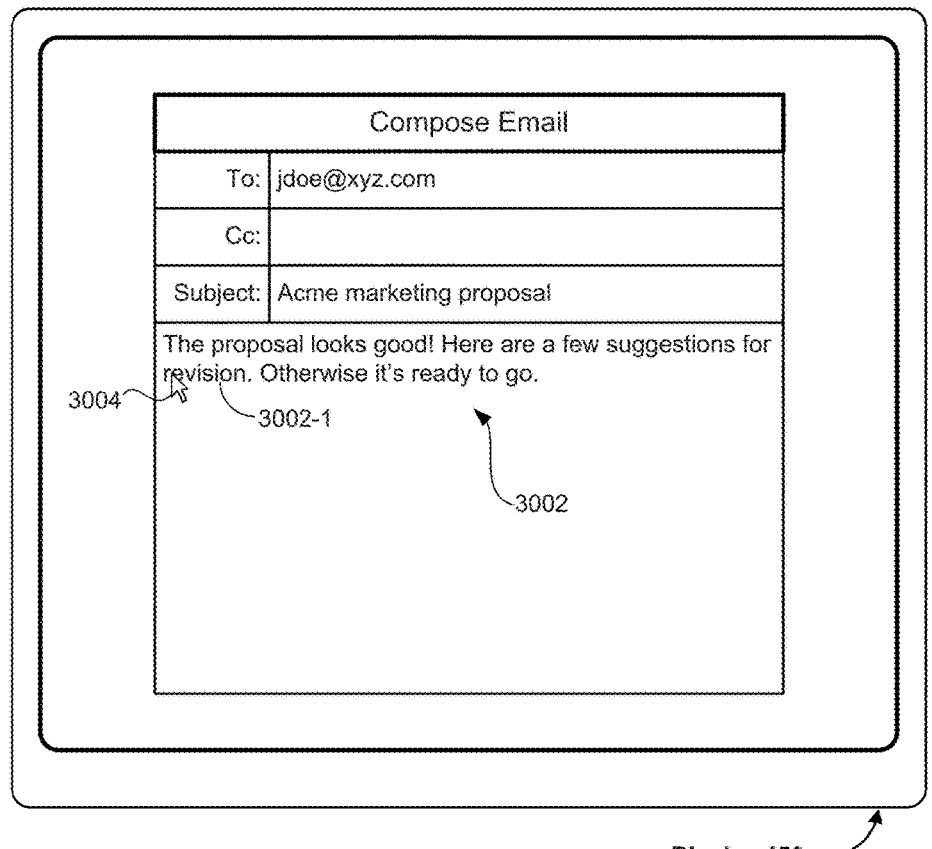
Figure 11W:
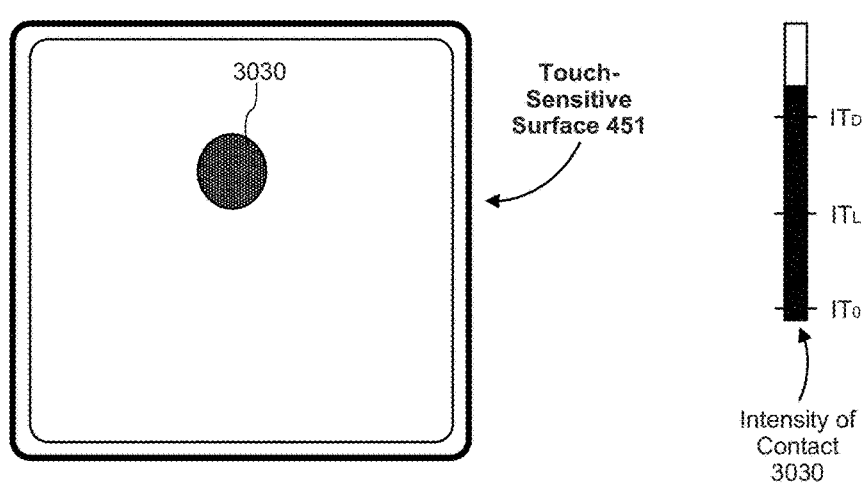

Returning to and continuing from FIG. 11K, FIGS. 11V-11W show, after word 3002-1 has been corrected with a replacement word, a new gesture with contact 3030 detected on touch-sensitive surface 451 while cursor 3004 is positioned over word 3002-1. In FIG. 11V contact 3030 has an intensity below the word replacement intensity threshold (e.g., "$IT_D$") and in FIG. 11W, the intensity of contact 3030 is increased to an intensity over the word replacement intensity threshold (e.g., "$IT_D$") and thus the gesture including contact 3030 meets the predefined intensity criteria.

In response to detecting the gesture performed with contact 3030, corrected word 3002-1 is replaced with another replacement word. For example, the corrected word 3002-1 "revisions" is replaced with "revision," which is also correctly spelled, as shown in FIG. 11V. In some embodiments, the corrected word is replaced with another replacement word during the gesture (e.g., in response to detecting the increase in intensity of contact 3030 above the word replacement intensity threshold). In some embodiments, the corrected word is replaced with another replacement word in response to detecting a end of the gesture (e.g., in response to detecting liftoff of contact 3030 or in response to detecting a decrease in intensity of contact 3030 from an intensity above the word replacement intensity threshold to an intensity below the word replacement intensity threshold.

Figure 11X:
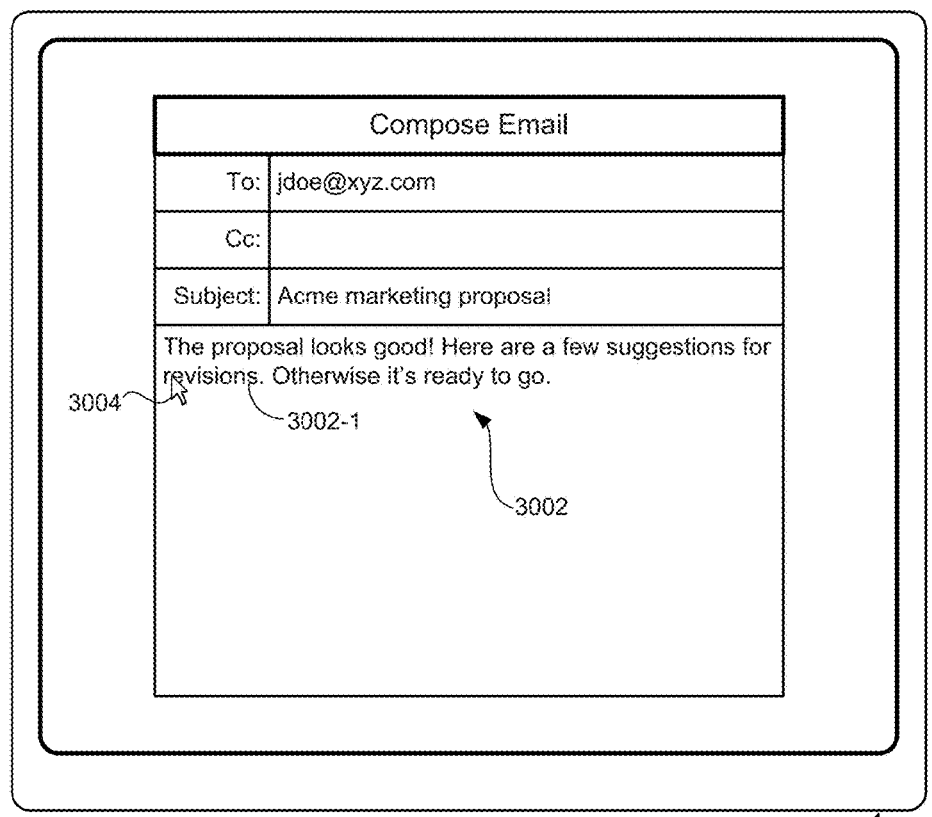
Figure 11X:
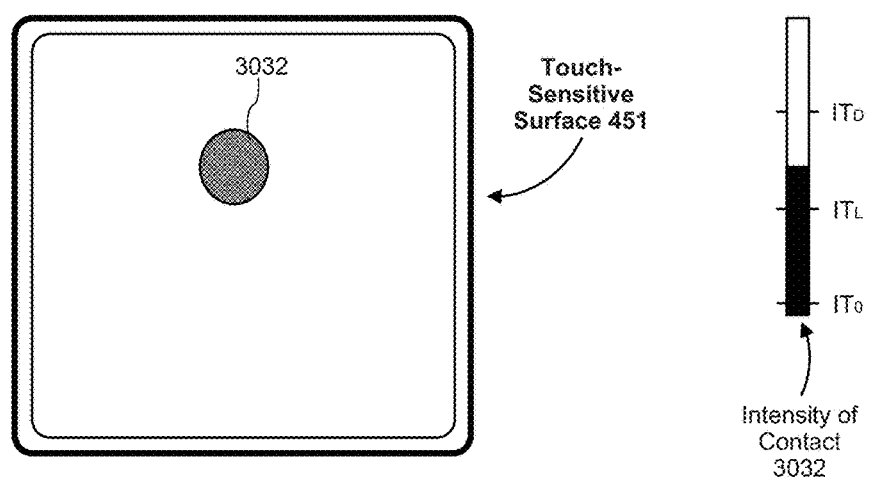
Figure 11Y:
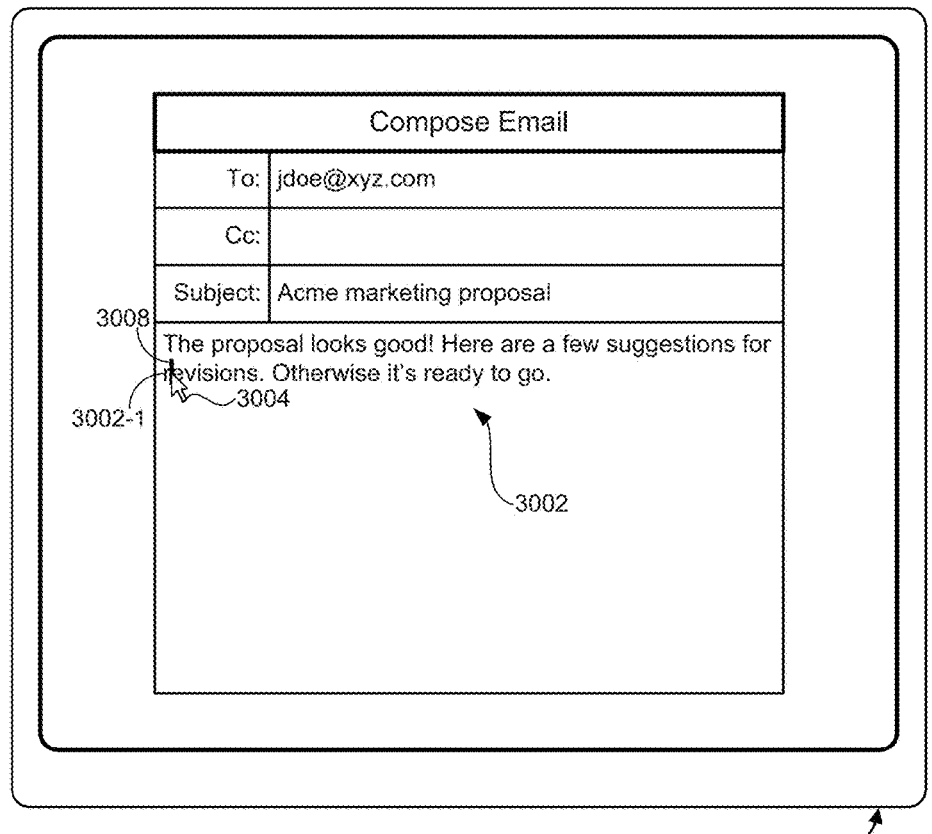
Figure 11Y:
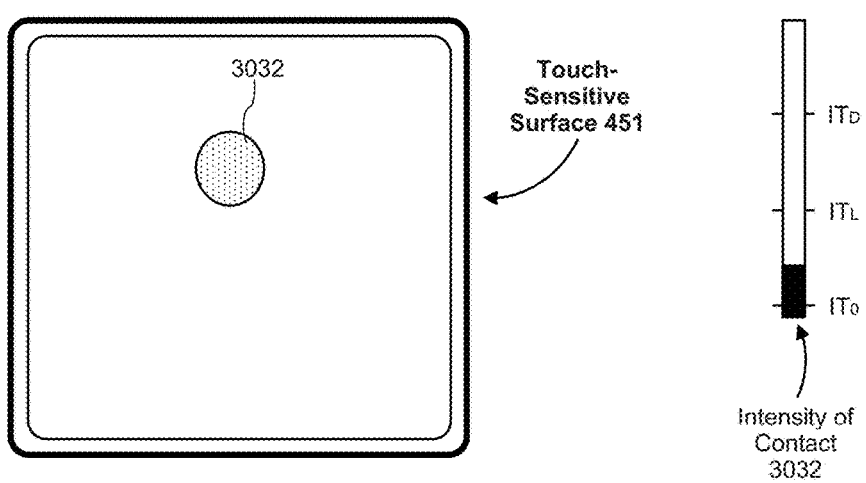

FIGS. 11X-11Y show, as in FIG. 11V, after word 3002-1 has been corrected with a replacement word, a gesture with contact 3032 (instead of contact 3030) detected on touch-sensitive surface 451 while cursor 3004 is positioned over word 3002-1. The gesture performed with contact 3032 includes detecting an increase in intensity of contact 3032 from an intensity below a light press intensity threshold (e.g., "$IT_L$") to an intensity above the light press intensity threshold (e.g., "$IT_L$"). Contact 3032 does not meet the predefined intensity criteria (e.g., because a maximum intensity of contact 3032 in FIGS. 11X-11Y is below the word replacement intensity threshold). In response to detecting the gesture performed with contact 3032, cursor 3008 is placed within the corrected word 3002-1 and displayed, as shown in FIG. 11Y. In some embodiments, the cursor is placed within the corrected word during the gesture (e.g., in response to detecting the increase in intensity of contact 3032 above the light press intensity threshold). In some embodiments, the cursor is placed within the corrected word in response to detecting a end of the gesture (e.g., in response to detecting liftoff of contact 3032 or in response to detecting a decrease in intensity of contact 3032 from an intensity above the light press intensity threshold to an intensity below the light press intensity threshold.

Figure 11Z:
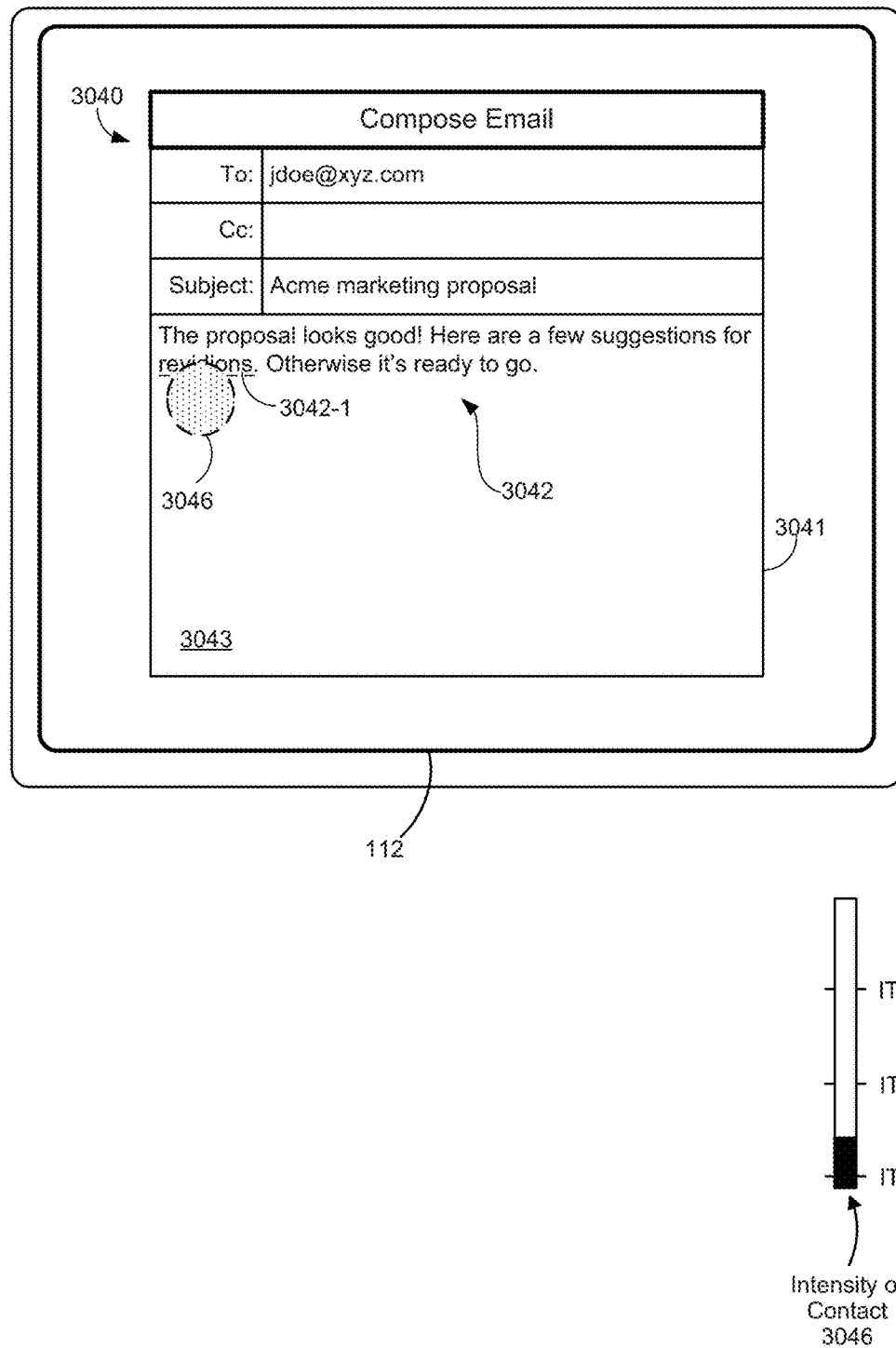
Figure 11A:
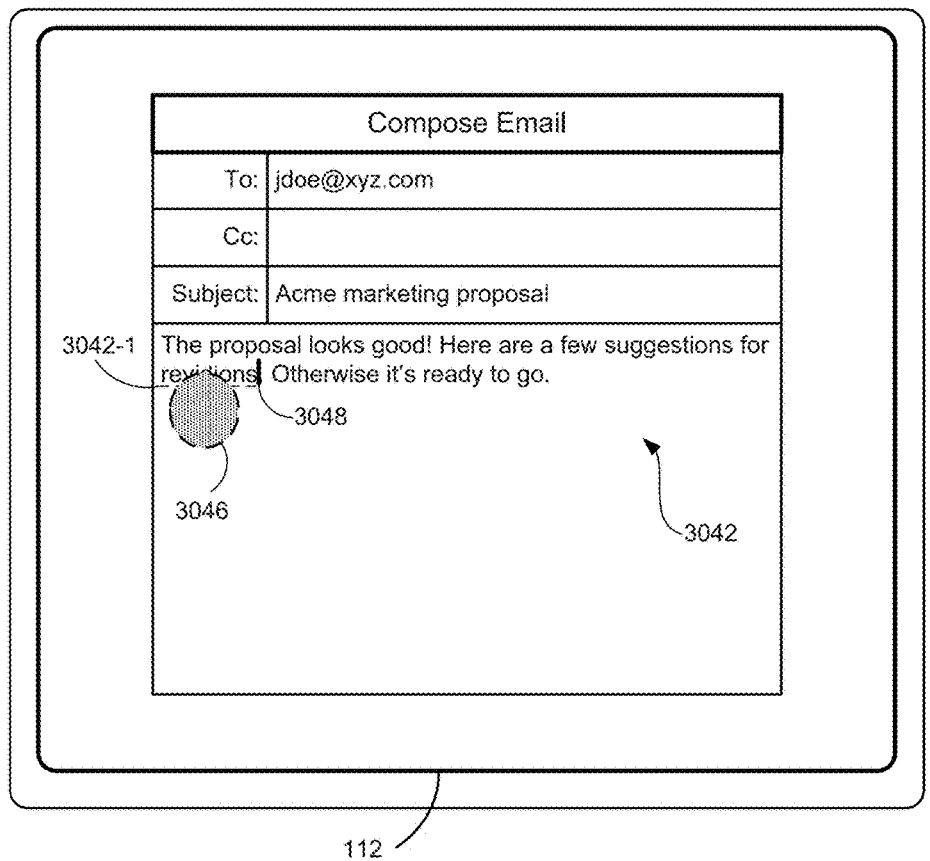
Figure 11A:
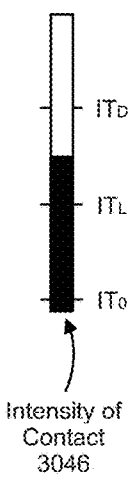
Figure 11B:
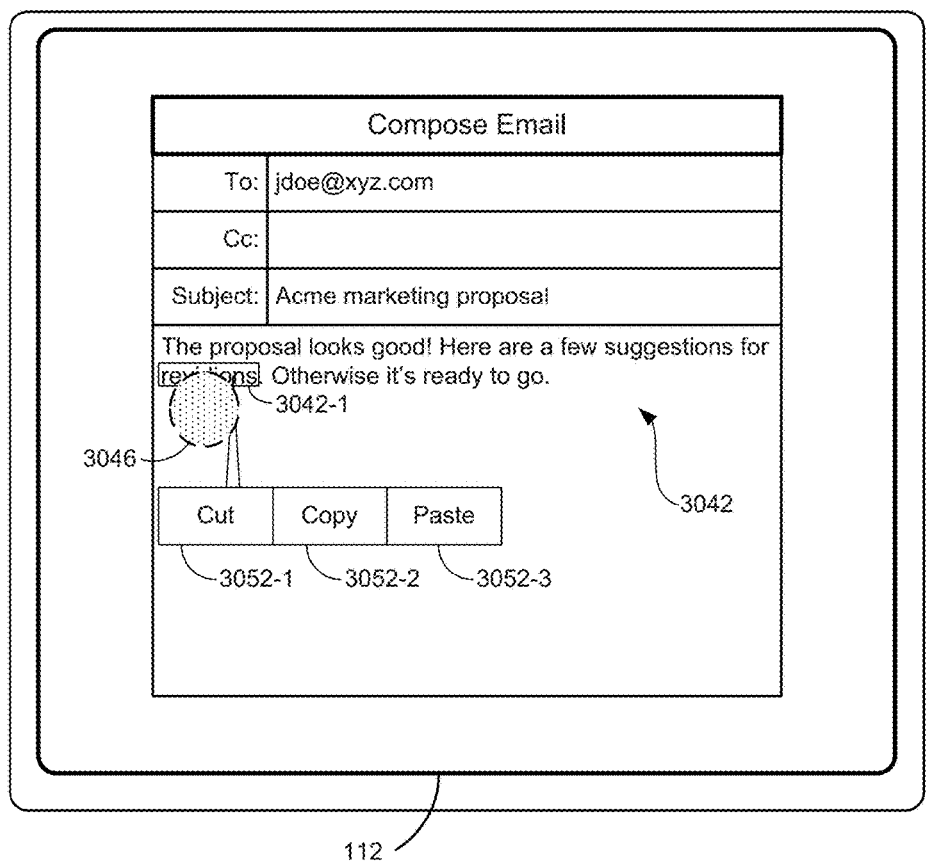
Figure 11B:
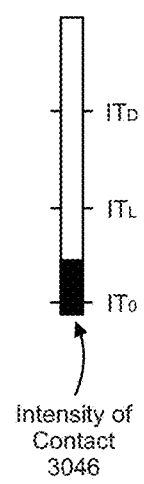
Figure 11C:
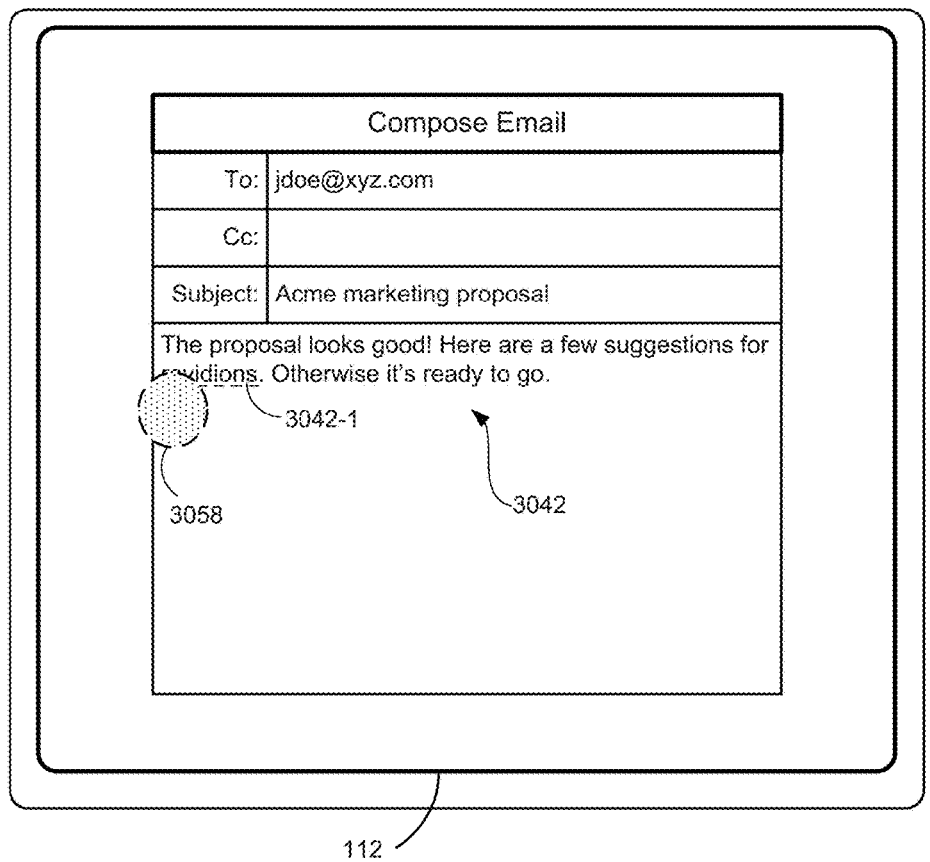
Figure 11C:
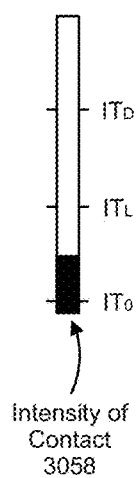
Figure 11D:
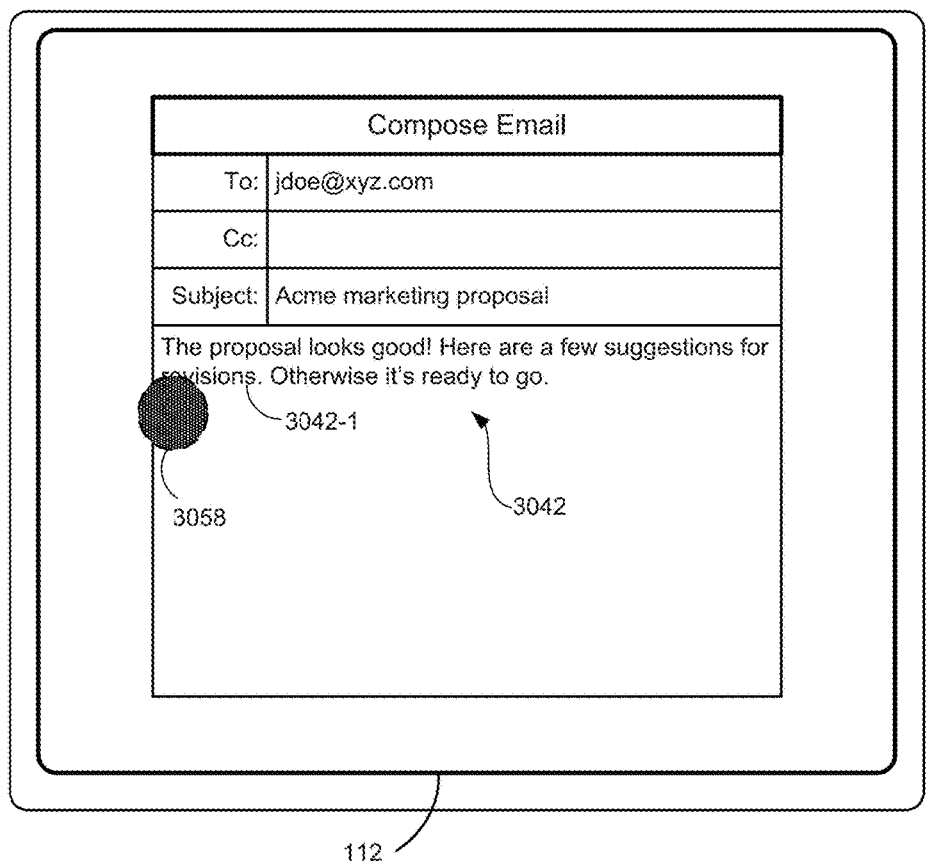
Figure 11D:
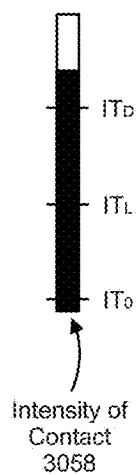
Figure 12B:
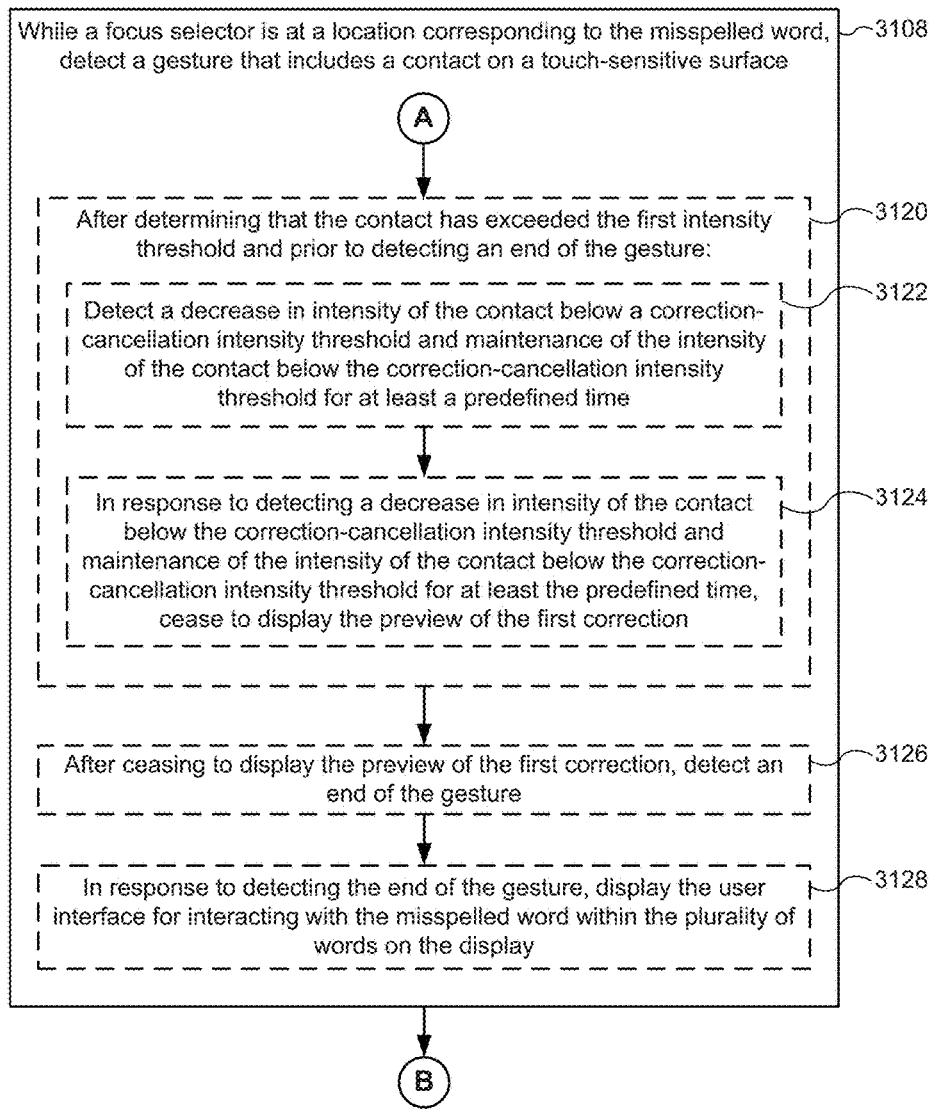
Figure 12C:
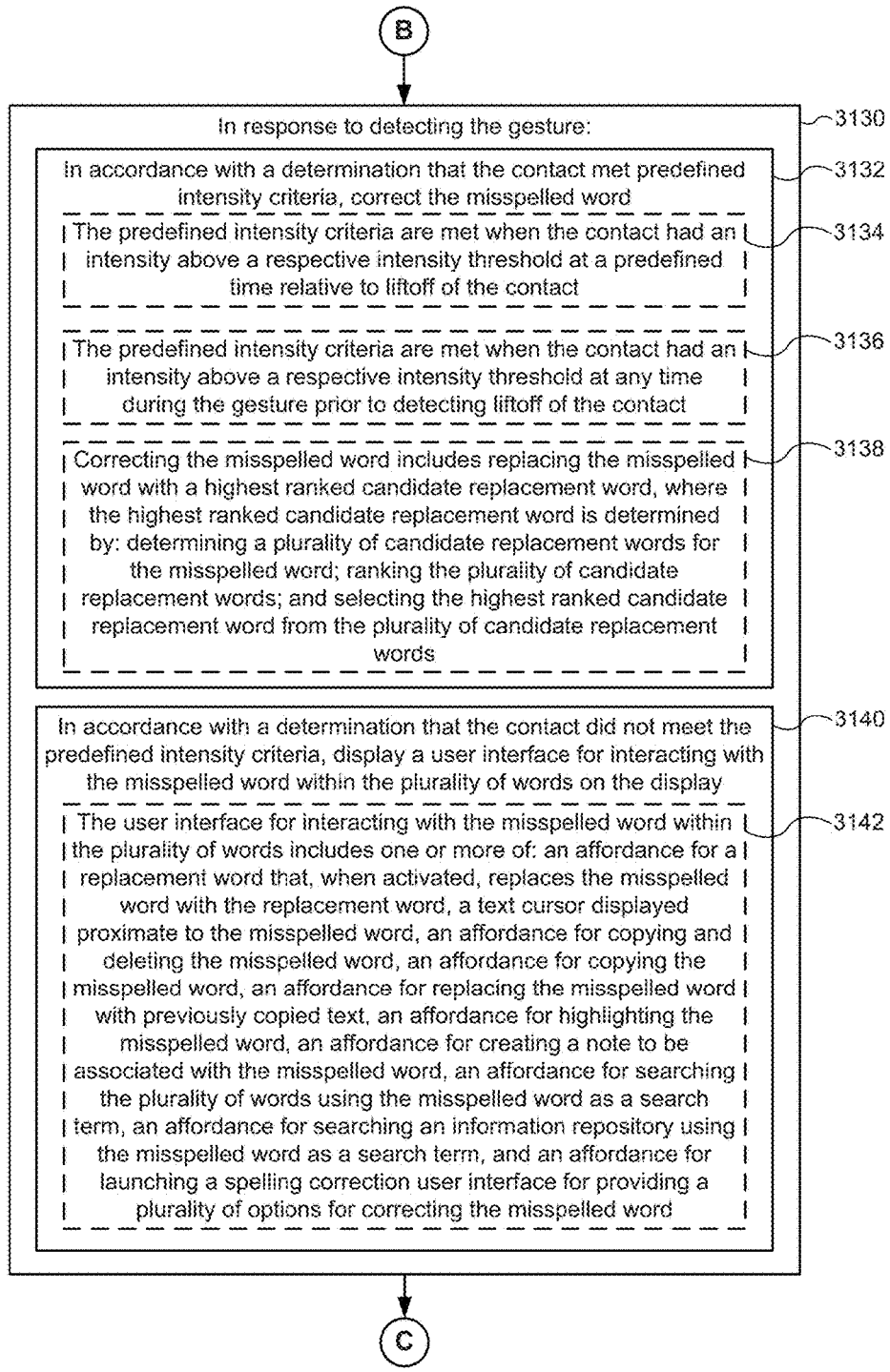
Figure 12D:
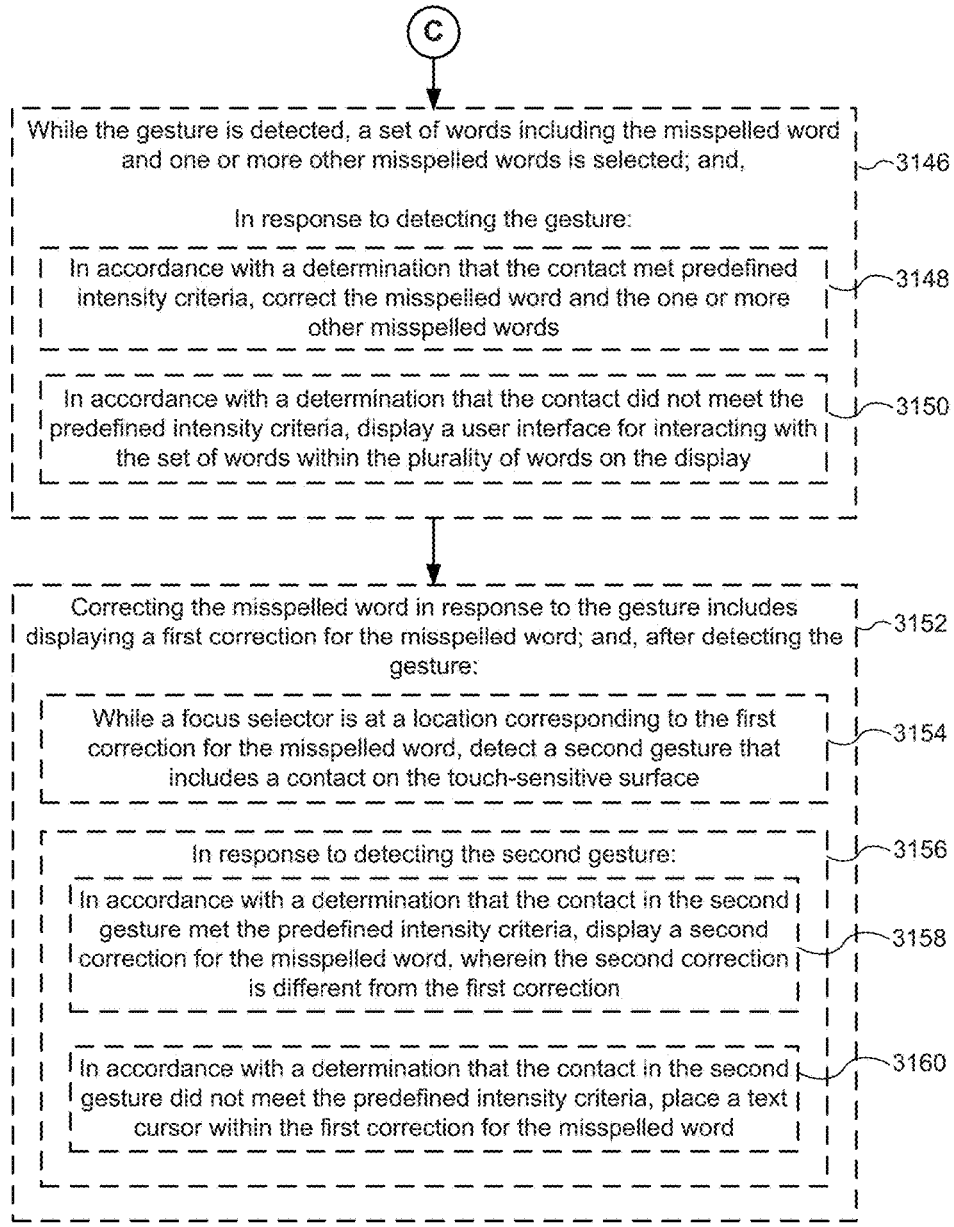

FIGS. 11Z-11DD illustrate examples of the user interfaces described above, with reference to FIGS. 11A-11Y, implemented on a device (e.g., device 100) with a touch-sensitive display 112. FIG. 11Z illustrates user interface 3040 displayed on touch-sensitive display 112 (e.g., display 112) of a device (e.g., device 100). User interface 3040 includes text display area 3041, in which textual content, such as words 3042, is, optionally, displayed. In some embodiments, words 3042 are part of electronic document 3043 (for example, text document, word processor document, email message, web page, electronic book). Words 3042 include word "revidions" 3042-1, which is misspelled as determined by the device. Word 3042-1 is displayed with underlining to indicate that it has been determined by the device to be a misspelling.

A gesture performed with contact 3046 is detected on touch-sensitive display 112 at a location over word 3042-1. The gesture includes increase in intensity of contact 3046 from an intensity below a light press intensity threshold (e.g., "IT$_L$") in FIG. 11Z to an intensity above the light press intensity threshold (e.g., "IT$_L$"), as shown in FIG. 11AA. In some embodiments, the device detects an end of the gesture performed with contact 3046 when the intensity of contact 3046 decreases below the light press intensity threshold (e.g., "IT$_L$"), as shown in FIG. 11B. In some embodiments, the device detects an end of the gesture performed with contact 3046 when the device detects liftoff of contact 3046 from touch-sensitive display 112.

In some embodiments, when contact 3046 is detected over word 3042-1, a haptic indication is, optionally, provided. The haptic indication indicates to the user that performing a gesture that satisfies predefined intensity criteria (described below) on misspelled word 3042-1 will cause correction of the misspelled word. For example, when contact 3046 is detected on touch-sensitive display 112 over word 3042-1, a detent or slight vibration of touch-sensitive display 112 is, optionally, generated.

While contact 3046 is detected over word 3042-1 the device monitors an intensity of contact 3046 to determine whether or not contact 3046 meets one or more predefined intensity criteria. In some embodiments, the predefined intensity criteria are met when a contact has an intensity above a "word replacement intensity threshold" at a predefined time relative to liftoff of the contact. For example, the intensity of contact 3046 at a predefined time prior to liftoff (e.g., 10 ms) is determined to evaluate whether the predefined intensity criteria are met. In some embodiments, the predefined intensity criteria are met when the contact has an intensity above the word replacement intensity threshold (e.g., "IT$_D$") at any time during the gesture (while contact 3046 is detected over word 3042-1) prior to detecting liftoff of the contact. For example, the intensity of contact 3046 just prior to liftoff is determined to evaluate whether the predefined intensity criteria are met. As another example, the maximum intensity of contact 3046 prior to liftoff is determined to evaluate whether the predefined intensity criteria are met.

In FIG. 11Z, contact 3046 is a contact that does not meet the predefined intensity criteria (e.g., contact 3046 has a maximum intensity below IT$_D$). In FIGS. 11Z-11BB, the device detects a press input including an increase in intensity of contact 3006 from an intensity below a light press intensity threshold (e.g., "IT$_L$") to an intensity above the light press intensity threshold (e.g., "IT$_L$") as shown in FIG. 11AA and a decrease in intensity of contact 3006 below the light press intensity threshold (e.g., "IT$_L$") as shown in FIG. 11BB. In response to detecting the gesture performed with contact 3046, when liftoff of contact 3046 (ending the gesture) is detected, a user interface for interacting with word 3042-1 within text display area 3041 is displayed.

In some embodiments, the use interface for interacting with word 3042-1 includes a text cursor, insertion point, or the like. For example, text cursor 3048 is, optionally, displayed near word 3042-1 (for example, at the beginning or end of word 3042-1, within word 3042-1) in response to detection of the increase in intensity of contact 3006 from an intensity below a light press intensity threshold (e.g., "IT$_L$") to an intensity above the light press intensity threshold (e.g., "IT$_L$"), as shown in FIG. 11AA. Text cursor 3048 indicates a current location in words 3042 at which the user optionally enters additional characters or delete characters.

In some embodiments, the use interface for interacting with word 3042-1 includes one or more affordances 3052 for interacting with word 3042-1. For example, "Cut" affordance 3052-1, "Copy" affordance 3052-2, and "Paste" affordance 3052-3 is, optionally, displayed near word 3042-1 in response to detection of the decrease in intensity of contact 3046 from an intensity above the light press intensity threshold (e.g., "IT$_L$") to an intensity below the light press intensity threshold (e.g., "IT$_L$"), as shown in FIG. 11BB. A user optionally activates "Cut" affordance 3052-1 to copy word 3042-1 (e.g., to a virtual clipboard for pasting elsewhere) and to delete word 542-1 from words 3042. A user optionally activates "Copy" affordance 3052-2 to copy word 3042-1 (e.g., to a virtual clipboard for pasting elsewhere). A user optionally activates "Paste" affordance 3052-3 to insert previously copied text (e.g., text copied into a virtual clipboard) to replace word 3042-1.

The user interfaces for interacting with word 3042-1 within text display area 3041, described above with reference to FIGS. 11AA-11BB, are but a few examples. Other user interfaces for interacting with word 3042-1, such as the analogues to the user interfaces for interacting with word 3042-1 described above with reference to FIGS. 11C-11H, are, optionally, displayed.

FIG. 11CC shows, instead of the gesture performed with contact 3046, a gesture performed with contact 3058 detected on touch-sensitive display 112. Contact 3058 is detected over word 3042-1. In some embodiments, when cursor 3058 is moved over word 3042-1, a haptic indication is, optionally, provided. The haptic indication indicates to the user that performing a gesture that satisfies the predefined intensity criteria on misspelled word 3042-1 will cause correction of the misspelled word. For example, when contact 3058 is detected on touch-sensitive display 112 over word 3042-1, a detent or slight vibration of touch-sensitive display 112 is, optionally, generated.

In FIG. 11CC, contact 3058 meets the predefined intensity criteria. For example, in some circumstances, the intensity of contact 3058 is below the word replacement intensity threshold while contact 3058 is over word 3042-1 and the device detects an increase in intensity of contact 3058 from an intensity below a word replacement intensity threshold (e.g., "IT$_D$") to an intensity above the word replacement intensity threshold (e.g., "IT$_D$"). While contact 3058 remains located over word 3042-1, gesture is, optionally, ended by lifting contact 3058 off touch-sensitive display 3058 or be reducing the intensity of contact 3058 below a light press intensity threshold (e.g., "$IT_L$").

In response to detecting the gesture with contact 3058 (e.g., in response to detecting the increase in intensity of contact 3058 above $IT_D$, or in response to detecting an end of the gesture including liftoff of contact 3058 or a decrease in intensity of the contact below $IT_L$), the device corrects the spelling of word 3042-1. For example, the originally misspelled word 3042-1 "revidions" is replaced with correctly-spelled "revisions," as shown in FIG. 11DD. After the correction, visual indication of misspelling (e.g., dotted underline) for word 3042-1 ceases to be displayed.

FIGS. 12A-12D are flow diagrams illustrating a method 3100 of word spelling correction in accordance with some embodiments. The method 3100 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 3100 is, optionally, combined and/or the order of some operations is, optionally, changed.

As described below, the method 3100 provides an intuitive way to correct word spelling. The method reduces the cognitive burden on a user when correcting word spelling, thereby creating a more efficient human-machine interface. For battery-operated electronic devices, enabling a user to correct word spelling faster and more efficiently conserves power and increases the time between battery charges.

The device displays (3102) a plurality of words on the display, where the plurality of words include a misspelled word. For example, FIG. 11A shows words 3002 displayed on display 450. Words 3002 includes misspelled word 3002-1. FIG. 11Z shows words 3042, which includes misspelled word 3042-1, displayed on touch-sensitive display 112.

In some embodiments, prior to detecting the gesture, the device displays (3104) a visual indication that performing the gesture on the misspelled word will cause the misspelled word to be corrected (e.g., display a visual indication that the word is misspelled). For example, in FIGS. 11A, 11I and 11Z misspelled word 3002-1 is shown with underlining, to indicate that the word is misspelled. The underlining is, optionally, displayed before the gesture is detected.

In some embodiments, the device provides (3106) a haptic indication that performing the gesture on the misspelled word will cause the misspelled word to be corrected (e.g., by generating a detent or slight vibration of the touch-sensitive surface when the user moves the contact so that the focus selector moves over the misspelled word, indicating that applying pressure to the contact will cause the device to correct the misspelled word). For example, when cursor 3004 is moved over misspelled word 3002-1, a tactile output, such as a detent or a slight vibration, is, optionally, generated on touch-sensitive surface 451, as shown in FIGS. 11B and 11J.

While a focus selector is at a location corresponding to the misspelled word, the device detects (3108) a gesture that includes a contact (e.g., a finger contact) on the touch-sensitive surface. For example, FIGS. 11B-11D show a gesture performed with contact 3006 while cursor 3004 is located over word 3002-1, and FIG. 11J shows a gesture performed with contact 3018 while cursor 3004 is located over word 3002-1. As another example, FIG. 11Z shows a gesture performed with contact 3046 while contact 3046 is over word 3042-1.

In some embodiments, while detecting (3110) the gesture, the device determines (3112) that the contact has exceeded a first intensity threshold, and in response to determining that the contact has exceeded the first intensity threshold, displays (3114) a preview of a first correction for the misspelled word (e.g., a first replacement word). FIG. 11L, for example, shows contact 3018 that exceeds a first word preview intensity threshold (e.g., "$IT_1$"). In response to a determination that contact 3018 exceeds the first word preview intensity threshold (e.g., "$IT_1$"), replacement word preview 3020-1 (e.g., "revisions") is displayed in place of word 3002-1 (e.g., "revidions").

In some embodiments, while detecting (3110) the gesture, the device determines (3116) that the contact has exceeded a second intensity threshold, where the second intensity threshold is higher than the first intensity threshold, and in response to determining that the contact has exceeded the second intensity threshold, displays (3118) a preview of a second correction (e.g., a second replacement word) for the misspelled word, wherein the second correction is different from the first correction. FIG. 11M, for example, shows contact 3018 that exceeds a second word preview intensity threshold (e.g., "$IT_2$") that is higher than the first word preview intensity threshold (e.g., "$IT_2$"). In response to a determination that contact 3018 exceeds the second word preview intensity threshold (e.g., "$IT_2$"), replacement word preview 3020-2 (e.g., "revision"), is displayed in place of word preview 3020-1 (e.g., "revisions").

In some embodiments, after determining that the contact has exceeded (3120) the first intensity threshold and prior to detecting an end of the gesture, the device detects (3122) a decrease in intensity of the contact below a correction-cancellation intensity threshold and maintenance of the intensity of the contact below the correction-cancellation intensity threshold for at least a predefined time. In some embodiments, the correction-cancellation intensity threshold is the same as the first intensity threshold. In some embodiments, the correction-cancellation intensity threshold is different from the first intensity threshold (e.g., so as to provide some hysteresis for the correction selection and thereby reduce jitter when the contact intensity is close to the first intensity threshold). For example, FIG. 11N shows contact 3018 with an intensity that has decreased, from an intensity above a first word preview intensity threshold (FIG. 11L), below a correction-cancellation intensity threshold (e.g., "$IT_C$"). The intensity of contact 3018 is maintained below the correction-cancellation intensity threshold (e.g., "$IT_C$") for at least a predefined time.

In response to detecting a decrease in intensity of the contact below the correction-cancellation intensity threshold and maintenance of the intensity of the contact below the correction-cancellation intensity threshold for at least the predefined time, the device ceases (3124) to display the preview of the first correction. In response to detection of the decrease in intensity of contact 3018 below the correction-cancellation intensity threshold and maintenance of the intensity below the correction-cancellation intensity threshold for at least the predefined time, word preview 3020-1 ceases to be displayed, as shown in FIG. 11N.

After ceasing to display the preview of the first correction, the device detects (3126) an end of the gesture, and in response to detecting the end of the gesture, displays (3128) the user interface for interacting with the misspelled word within the plurality of words on the display (e.g., without correcting the misspelled word). Thus, in some embodiments, the user is able to preview the correction and slowly decrease intensity of the contact so as to "cancel" the correction. For example, after word preview 3020-1 ceases to be displayed, intensity of contact 3018 is decreased below a light press intensity threshold (e.g., "IT$_L$") or, optionally contact 3018 is lifted off, ending the gesture. In response to detection of the end of the gesture, a user interface for interacting with word 3002-1 (for example, affordances 3012-1 thru 3012-3) is displayed, as shown in FIG. 11O.

In response (3130) to detecting the gesture, in accordance with a determination that the contact met (3132) predefined intensity criteria, the device corrects the misspelled word. In some embodiments, the predefined intensity criteria are met (3134) when the contact had an intensity above a respective intensity threshold (e.g., the word replacement intensity threshold) at a predefined time relative to liftoff of the contact (e.g., the device evaluates the intensity of the contact 10 milliseconds prior to liftoff). Contact 3018, for example, optionally meets the predefined intensity criteria by having an intensity above a word replacement intensity threshold (e.g., "IT$_D$") at a predefined time prior to liftoff of contact 3018. In some embodiments, the predefined intensity criteria are met (3136) when the contact had an intensity above a respective intensity threshold (e.g., the word replacement intensity threshold) at any time during the gesture prior to detecting liftoff of the contact (e.g., the device evaluates the maximum intensity of the contact prior to liftoff). Contact 3018, for example, optionally meets the predefined intensity criteria by having a maximum intensity above the word replacement intensity threshold (e.g., "IT$_D$") prior to liftoff of contact 3018.

In some embodiments, correcting the misspelled word includes replacing (3138) the misspelled word with a highest ranked candidate replacement word, where the highest ranked candidate replacement word is determined by: determining a plurality of candidate replacement words for the misspelled word, ranking the plurality of candidate replacement words, and selecting the highest ranked candidate replacement word from the plurality of candidate replacement words. For example, the replacement word "revisions" that replaces the misspelled word 3002-1 "revidions" in FIGS. 11J-11K is, optionally, a highest ranked candidate replacement word amongst multiple candidate replacement words. The candidate replacement words are, optionally, determined from a dictionary on device 300 and ranked according to, for example, usage frequency and edit distance to the originally misspelled word. In some embodiments, the determining, ranking, and selecting steps typically occur prior to detecting the gesture, rather than in response to detecting the gesture. Thus, in some embodiments, for a given misspelled word, the device determines the highest ranked candidate replacement word prior to detecting the gesture that corrects the misspelling.

In contrast, in accordance with a determination that the contact did not meet the predefined intensity criteria, the device displays (3140) a user interface for interacting with the misspelled word within the plurality of words on the display. For example, FIG. 11K shows word 3002-1 corrected with the replacement word "revisions" in response to detection of the gesture with contact 3018, which meets the predefined intensity criteria, while FIGS. 11C-11H show examples of user interfaces for interacting with word 3002-1 that are displayed in response to detection of the gesture with contact 3006, which does not meet the predefined intensity criteria, as described in greater detail above. As another example, FIG. 11DD shows word 3042-1 corrected with the replacement word "revisions" in response to detection of the gesture with contact 3058, which meets the predefined intensity criteria, while FIGS. 11AA-11BB show examples of user interfaces for interacting with word 3042-1 that are displayed in response to detection of the gesture with contact 3046, which does not meet the predefined intensity criteria, as described in greater detail above.

In some embodiments, the user interface for interacting with the misspelled word within the plurality of words includes (3142) one or more of: an affordance for a replacement word that, when activated, replaces the misspelled word with the replacement word, a text cursor displayed proximate to the misspelled word, an affordance for copying and deleting the misspelled word (e.g., a "cut" button), an affordance for copying the misspelled word, an affordance for replacing the misspelled word with previously copied text (e.g., a paste button), an affordance for highlighting the misspelled word, an affordance for creating a note to be associated with the misspelled word, an affordance for searching the plurality of words using the misspelled word as a search term, an affordance for searching an information repository using the misspelled word as a search term (e.g., submitting the misspelled word to a search engine or Wikipedia), and an affordance for launching a spelling correction user interface for providing a plurality of options for correcting the misspelled word. The user interface for interacting with word 3002-1 is, optionally, text cursor 3008 (FIG. 11C), replacement word affordance 3010 (FIG. 11D), "Cut" affordance 3012-1 (FIG. 11E), "Copy" affordance 3012-2 (FIG. 11E), "Paste" affordance 3012-3 (FIG. 11E), "Highlight" affordance 3012-4 (FIG. 11F), "Add Note" affordance 3012-5 (FIG. 11F), "Search Document" affordance 3012-6 (FIG. 11F), "Search" affordance 3012-7 (FIG. 11F), and affordance 3014 (FIG. 11G) for launching spelling correction options 3016 (FIG. 11H).

In some embodiments, while the gesture is detected, a set of words including the misspelled word and one or more other misspelled words is selected (3146) (e.g., the user selects a paragraph or multiple paragraphs including multiple misspelled words and is able to correct all of the misspelled words in the selection at once by pressing on the selection). For example, FIGS. 11P-11Q shows selection 3026 of a plurality of words, including words 3002-1 and 3002-2, while a gesture performed with contact 3024 is detected. Similarly, FIGS. 11S-11T shows selection 3026 a plurality of words, including words 3002-1 and 3002-2, while a gesture performed with contact 3028 is detected.

In response to detecting the gesture, in accordance with a determination that the contact met predefined intensity criteria, the device corrects (3148) the misspelled word and the one or more other misspelled words, and in accordance with a determination that the contact did not meet the predefined intensity criteria, the device displays (3150) a user interface for interacting with the set of words within the plurality of words on the display. For example, in response to detecting the gesture performed with contact 3024 and in accordance with a determination that contact 3024 meets the predefined intensity criteria, words 3002-1 and 3002-2 are corrected with replacement words, as shown in FIG. 11R. In response to detecting the gesture performed with contact 3028 and in accordance with a determination that contact 3028 does not meet the predefined intensity criteria, a user interface for interacting with selection 3026 (e.g., affordances 3012) is displayed, as shown in FIG. 11U.

In some embodiments, correcting the misspelled word in response to the gesture includes displaying (3152) a first correction for the misspelled word (e.g., replacing the misspelled word with a first substitute word). After detecting the gesture, while a focus selector is at a location corresponding to the first correction for the misspelled word, the device detects (3154) a second gesture that includes a contact on the touch-sensitive surface. For example, FIG. 11V shows correction "revisions" displayed for word 3002-1 and, after the gesture with contact 3018 is detected, a second gesture with contact 3030 is detected on touch-sensitive surface 451 while cursor 3004 is over the corrected word 3002-1. FIG. 11X shows the same thing, but the second gesture includes contact 3032 instead. Contact 3030 meets the predefined intensity criteria, and contact 3032 does not meet the predefined intensity criteria.

In response to detecting the second gesture (3156), in accordance with a determination that the contact in the second gesture met the predefined intensity criteria, the device displays (3158) a second correction for the misspelled word, where the second correction is different from the first correction (e.g., replacing the first correction for the misspelled word with a second substitute word different from the first correction for the misspelled word); and in accordance with a determination that the contact in the second gesture did not meet the predefined intensity criteria, the device places (3160) a text cursor within the first correction for the misspelled word. As shown in FIG. 11W, for example, in response to detecting the gesture with contact 3030 and in accordance with the determination that contact 3030 meets the predefined intensity criteria, a different correction "revision" is displayed for word 3002-1 (e.g., replacing the previous correction "revisions"). In contrast, as shown in FIG. 11Y, for example, in response to detecting the gesture with contact 3032 and in accordance with the determination that contact 3032 does not meet the predefined intensity criteria, cursor 3008 is placed and displayed within word 3002-1.

In some embodiments, the methods described above with reference to a correction of a misspelled word are applied in an analogous manner to correcting a grammatical error in a sentence or correcting an improper word choice (e.g., replacing "their" with "there").

It should be understood that the particular order in which the operations in FIGS. 12A-12D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 3100 described above with respect to FIGS. 12A-12D. For example, the contacts, gestures, intensity thresholds, focus selectors described above with reference to method 3100 optionally has one or more of the characteristics of the contacts, gestures, intensity thresholds, focus selectors described herein with reference to other methods described herein (e.g., those listed in the fifth paragraph of the Description of Embodiments). For brevity, these details are not repeated here.

Figure 13:
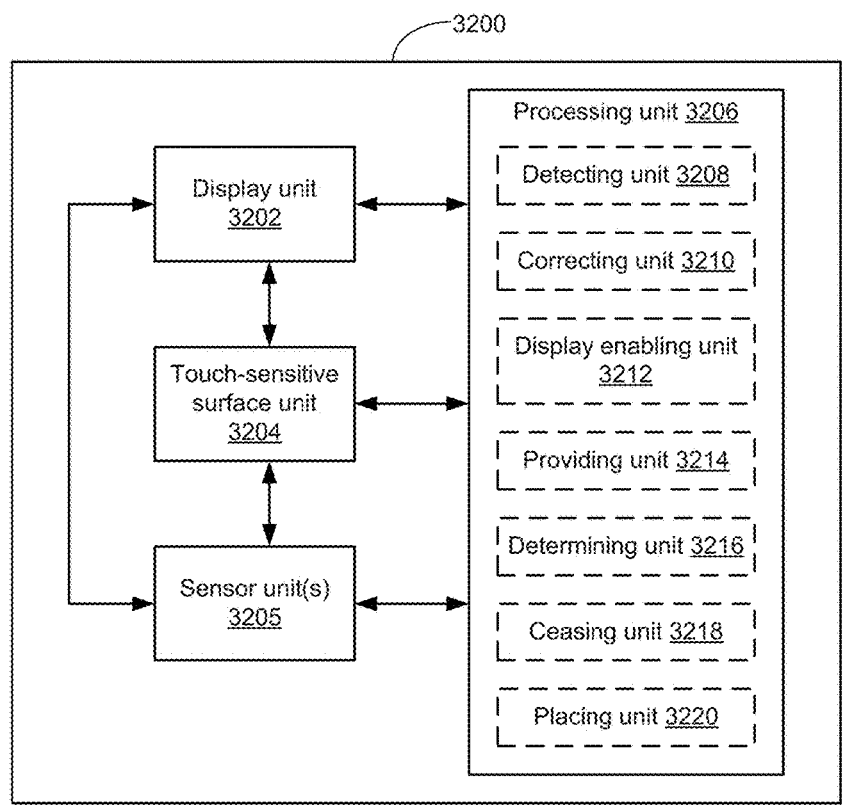
FIG. 13 is a functional block diagram of an electronic device in accordance with some embodiments.

In accordance with some embodiments, FIG. 13 shows a functional block diagram of an electronic device 3200 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 3200 includes a display unit 3202 configured to display a plurality of words, where the plurality of words include a misspelled word; a touch-sensitive surface unit 3204 configured to receive gestures, the gestures including contacts; one or more sensor units 3205 to detect intensity of contacts with the touch-sensitive surface unit 3204; and a processing unit 3206 coupled to the display unit 3202, the touch-sensitive surface unit 3204 and the sensor units 3205. In some embodiments, the processing unit 3206 includes a detecting unit 3208, a correcting unit 3210, a display enabling unit 3212, a providing unit 3214, a determining unit 3216, a ceasing unit 3218, and a placing unit 3220.

The processing unit 3206 is configured to: while a focus selector is at a location corresponding to the misspelled word, detect a gesture that includes a contact on the touch-sensitive surface unit 3204 (e.g., with the detecting unit 3208). The processing unit 3206 is further configured to, in response to detecting the gesture: in accordance with a determination (e.g., with the determining unit 3216) that the contact met predefined intensity criteria, correct the misspelled word (e.g., with the correcting unit 3210); and in accordance with a determination (e.g., with the determining unit 3216) that the contact did not meet the predefined intensity criteria, enable display of a user interface for interacting with the misspelled word within the plurality of words on the display unit 3202 (e.g., with the display enabling unit 3212).

In some embodiments, the predefined intensity criteria are met when the contact had an intensity above a respective intensity threshold at a predefined time relative to liftoff of the contact.

In some embodiments, the predefined intensity criteria are met when the contact had an intensity above a respective intensity threshold at any time during the gesture prior to detecting liftoff of the contact.

In some embodiments, the user interface for interacting with the misspelled word within the plurality of words includes one or more of: an affordance for a replacement word that, when activated, replaces the misspelled word with the replacement word, a text cursor displayed proximate to the misspelled word, an affordance for copying and deleting the misspelled word, an affordance for copying the misspelled word, an affordance for replacing the misspelled word with previously copied text, an affordance for highlighting the misspelled word, an affordance for creating a note to be associated with the misspelled word, an affordance for searching the plurality of words using the misspelled word as a search term, an affordance for searching an information repository using the misspelled word as a search term, and an affordance for launching a spelling correction user interface for providing a plurality of options for correcting the misspelled word.

In some embodiments, correcting the misspelled word (e.g., with the correcting unit 3210) includes: replacing the misspelled word with a highest ranked candidate replacement word, where the highest ranked candidate replacement word is determined (e.g., with the determining unit 3216) by: determining a plurality of candidate replacement words for the misspelled word; ranking the plurality of candidate replacement words; and selecting the highest ranked candidate replacement word from the plurality of candidate replacement words.

In some embodiments, the processing unit 3206 is configured to: prior to detecting the gesture, enable display of a visual indication that performing the gesture on the misspelled word will cause the misspelled word to be corrected (e.g., with the display enabling unit 3212).

In some embodiments, the processing unit 3206 is configured to: provide a haptic indication that performing the gesture on the misspelled word will cause the misspelled word to be corrected (e.g., with the providing unit 3214).

In some embodiments, the processing unit 3206 is configured to: while detecting the gesture: determine that the contact has exceeded a first intensity threshold (e.g., with the determining unit 3216); and in response to determining that the contact has exceeded the first intensity threshold, enable display of a preview of a first correction for the misspelled word (e.g., with the display enabling unit 3212).

In some embodiments, the processing unit 3206 is configured to: while detecting the gesture: determine that the contact has exceeded a second intensity threshold, wherein the second intensity threshold is higher than the first intensity threshold (e.g., with the determining unit 3216); and in response to determining that the contact has exceeded the second intensity threshold, enable display of a preview of a second correction for the misspelled word (e.g., with the display enabling unit 3212), where the second correction is different from the first correction.

In some embodiments, the processing unit 3206 is configured to: after determining that the contact has exceeded the first intensity threshold and prior to detecting an end of the gesture: detect a decrease in intensity of the contact below a correction-cancellation intensity threshold and maintenance of the intensity of the contact below the correction-cancellation intensity threshold for at least a predefined time (e.g., with the detecting unit 3208); and in response to detecting a decrease in intensity of the contact below the correction-cancellation intensity threshold and maintenance of the intensity of the contact below the correction-cancellation intensity threshold for at least the predefined time, cease to display the preview of the first correction (e.g., with the ceasing unit 3218); and after ceasing to display the preview of the first correction, detect an end of the gesture (e.g., with the detecting unit 3208); and in response to detecting the end of the gesture, enable display of the user interface for interacting with the misspelled word within the plurality of words on the display unit 3202 (e.g., with the display enabling unit 3212).

In some embodiments, while the gesture is detected, a set of words including the misspelled word and one or more other misspelled words is selected; and the processing unit 3206 is configured to: in response to detecting the gesture: in accordance with a determination (e.g., with the determining unit 3216) that the contact met predefined intensity criteria, correct the misspelled word and the one or more misspelled words (e.g., with the correcting unit 3210); and in accordance with a determination (e.g., with the determining unit 3216) that the contact did not meet the predefined intensity criteria, enable display of a user interface for interacting with the set of words within the plurality of words on the display unit 3202 (e.g., with the display enabling unit 3212).

In some embodiments, correcting the misspelled word in response to the gesture includes displaying a first correction for the misspelled word; and the processing unit 3206 is configured to: after detecting the gesture: while a focus selector is at a location corresponding to the first correction for the misspelled word, detect a second gesture that includes a contact on the touch-sensitive surface unit 3204 (e.g., with the detecting unit 3208); and in response to detecting the second gesture: in accordance with a determination that the contact in the second gesture met the predefined intensity criteria, enable display of a second correction for the misspelled word, wherein the second correction is different from the first correction (e.g., with the display enabling unit 3212); and in accordance with a determination that the contact in the second gesture did not meet the predefined intensity criteria, place a text cursor within the first correction for the misspelled word (e.g., with the placing unit 3220).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 12A-12D are, optionally, implemented by components depicted in FIGS. 1A-1B or FIG. 13. For example, detection operation 3108, correction operation 3132, and displaying operation 3140 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIG. 1A Editing a Field in a Sheet of an Electronic Document Many electronic devices use graphical user interfaces to display electronic documents. In some embodiments, these documents can include sheets however switching between editing the electronic document and templates for the electronic document sometimes takes a large number of distinct inputs that can be confusing and inefficient for the user. For example, a spreadsheet document tracking financial data for a company optionally includes several sheets, or pages, with each sheet corresponding to a different fiscal quarter. Likewise, a presentation document, such as a document produced by KEYNOTE available from APPLE, INC can include multiple slides. In some embodiments described below, sheets within the document are linked to default properties of a template. For example, a title slide in a presentation document can be linked to default properties of fields within the title slide (e.g., a title field, sub-title, etc). In some embodiments, these default properties also control properties of fields (e.g., font, boldface, font size, location within the slide) within a new title slide created by a user. There is a need for a fast, efficient, convenient manner in which to determine whether to edit content of a field in a sheet or to edit default properties of the field in a template for the sheet. The embodiments described below provide a fast, efficient, convenient manner in which to determine whether to edit content of a field in a sheet or to edit default properties of the field in a template for the sheet based on an intensity of a contact while a focus selector is over the field. In particular, in some embodiments described below, a determination as to whether to edit content of a field in a sheet or to edit default properties of the field in a template for the sheet is made by a device based on an intensity of a contact, on the touch-sensitive surface, associated with the respective field in the respective sheet.

FIGS. 14A-14N illustrate exemplary user interfaces for editing a field in a sheet of an electronic document in accordance with some embodiments. The user interfaces in these figures are used to illustrate the processes described below, including the processes in FIGS. 15A-15C. FIGS. 14A-14N include intensity diagrams that show the current intensity of the contact on the touch-sensitive surface relative to a plurality of intensity thresholds including a respective intensity threshold (e.g., "$IT_D$"). In some embodiments, operations similar to those described below with reference to "$IT_D$" are performed with reference to a different intensity threshold (e.g., "$IT_L$").

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 14A-14N and 15A-15C will be discussed with reference to display 450 and a separate touch-sensitive surface 451, however analogous operations are, optionally, performed on a device with a touch-sensitive display system 112 in response to detecting the contacts described in FIGS. 14A-14N on the touch-sensitive display system 112 while displaying the user interfaces shown in FIGS. 14A-14N on the touch-sensitive display system 112; in such embodiments, the focus selector is, optionally: a respective contact, a representative point corresponding to a contact (e.g., a centroid of a respective contact or a point associated with a respective contact), or a centroid of two or more contacts detected on the touch-sensitive display system 112, in place of cursor 5106.

FIG. 14A shows an electronic document 5104 that includes a respective slide 5101 and slide representations 5105 (e.g., thumbnail icons corresponding to associated slides). In this example, electronic document 5104 is a presentation document and slide 5101 is a sheet within the presentation document. Slide representations 5105-1 through 5105-4 correspond to slides within document 5104. Slide representation 5105-1, for example, corresponds to slide 5101. Slide representation 5105-3 corresponds to a different slide based on the same template as slide 5101 (e.g., a title slide template). Slide representations 5105-2 and 5105-4 correspond to still different slides based on one or more different templates. Slide 5101 has a plurality of fields for entering content. For example, field 5103 is a title field and 5107 is a subtitle field. A user, for example a supervisor reviewing an employee's work, may wish to correct several stylistic and typographical issues within fields of slide 5101. For example, the manager may want to correct the misspelling of the word "bellwether" (signified by the underlining of the word by a spell-checker) in subtitle field 5107 and italicize the content of subtitle field 5107 for emphasis. For convenience of explanation, in FIGS. 14A-14N reference numbers appended with hyphens and lower case letters (e.g., "5106-a" and "5106-b") indicate similar elements at different position.

Figure 14B:
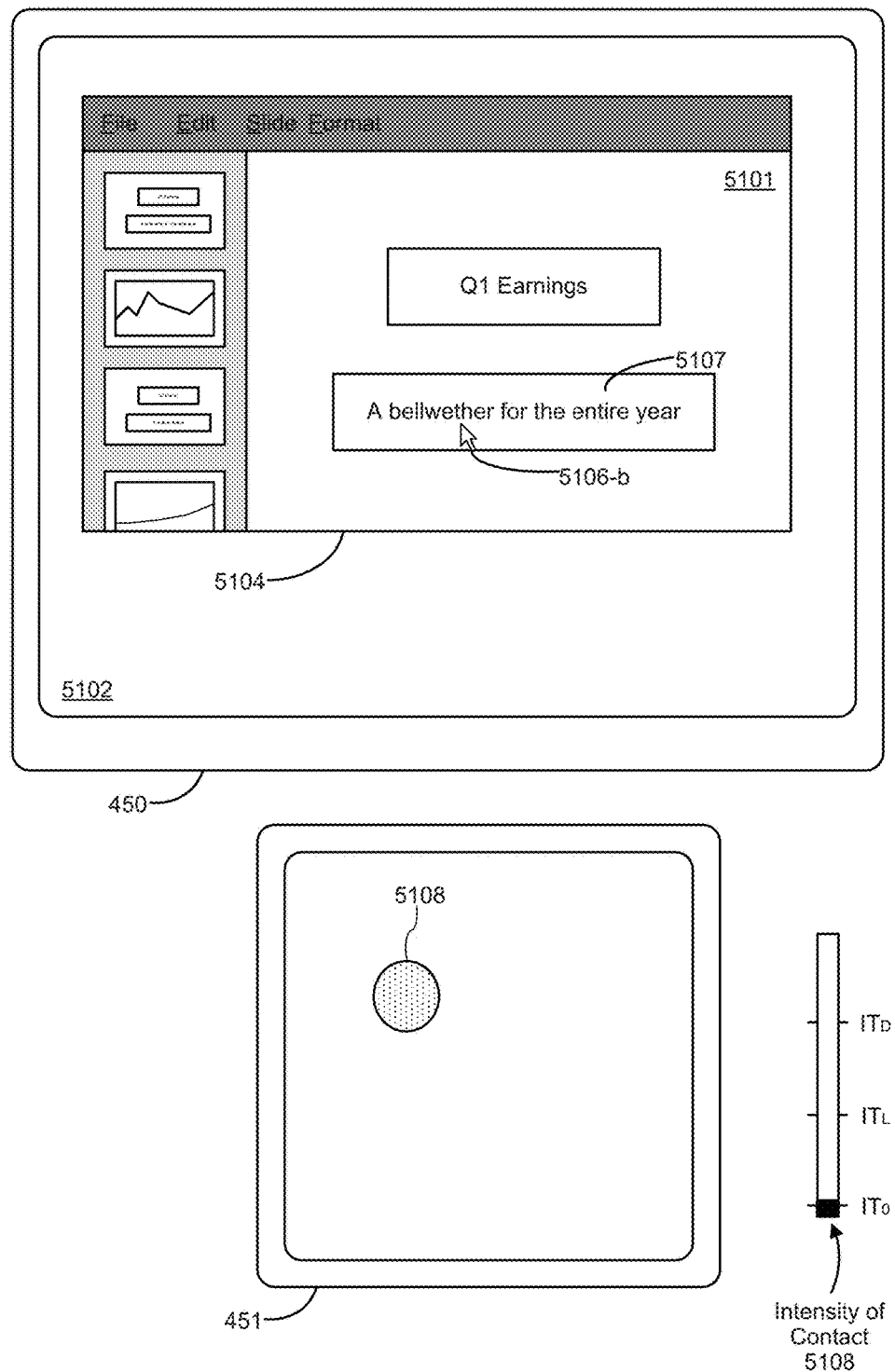

In FIGS. 14A-14B, the device detects movement of contact 5108 across the touch-sensitive surface 451 while contact 5108 has an intensity between $IT_0$ and $IT_L$ and in response to detecting movement of contact 5108, the device moves the focus selector (e.g., cursor 5106) over subtitle field 5107, as shown in FIG. 14B.

Figure 14C:
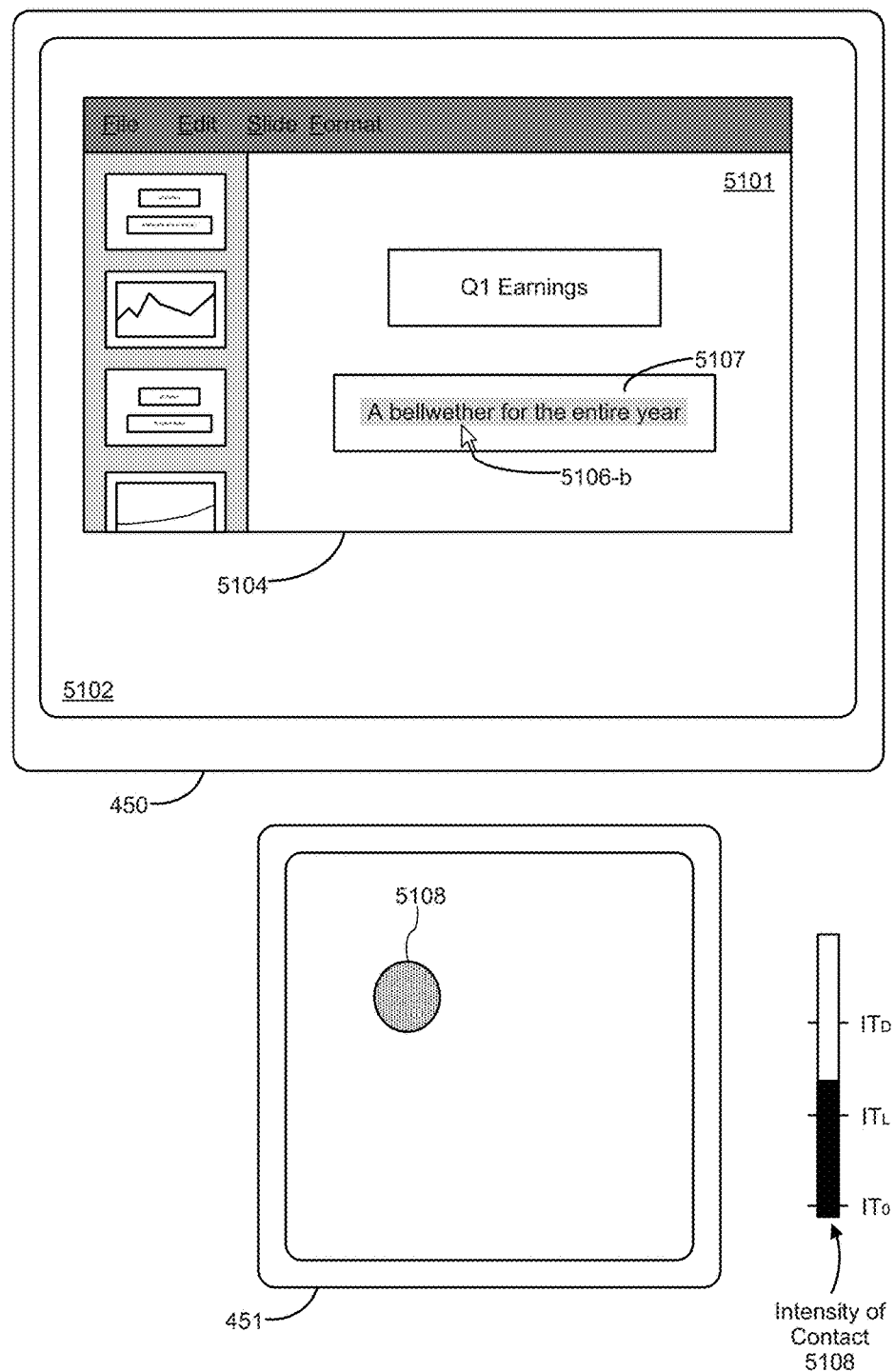

In FIGS. 14B-14C, the device detects a press input including an increase in intensity of contact 5108 from an intensity below $IT_L$ to an intensity above $IT_L$. In response to detecting the press input, the device enters a sheet editing mode and selects the text in subtitle field 5107 which can then be edited by the user.

Figure 14D:
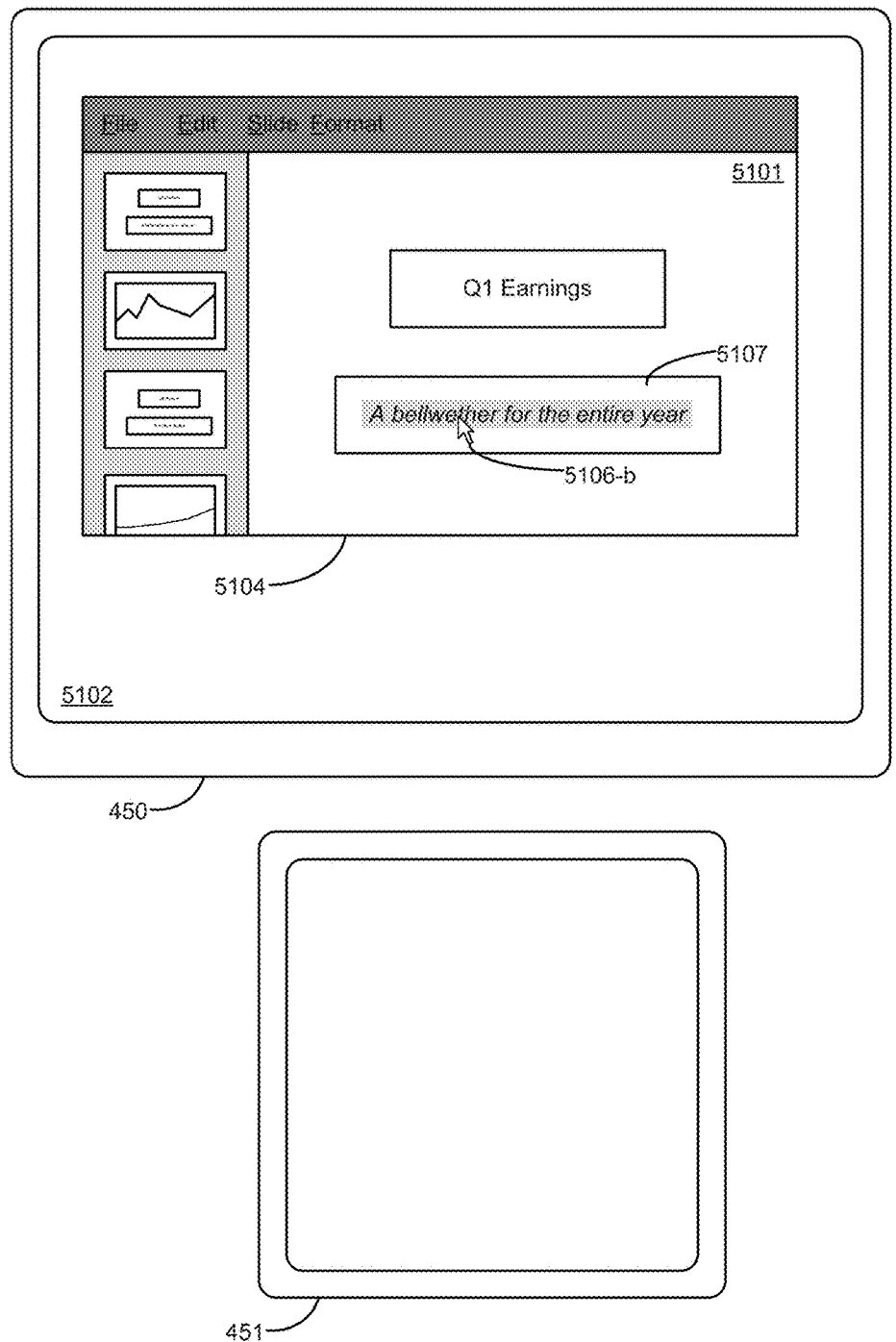

In FIG. 14D the user has instructed the device to change a default property (font style) of a respective field (subtitle field 5107) to a custom property (italics) in a particular sheet (slide 5101). The default property for subtitle fields within title slides using the same template as slide 5101 in general, however, is still non-italicized. For example, in some embodiments, if the user were to produce a new slide using the title slide template that was used for slide 5101, text in the subtitle field would not be italicized, because the default property of subtitle field 5107 has not been changed.

Figure 14E:
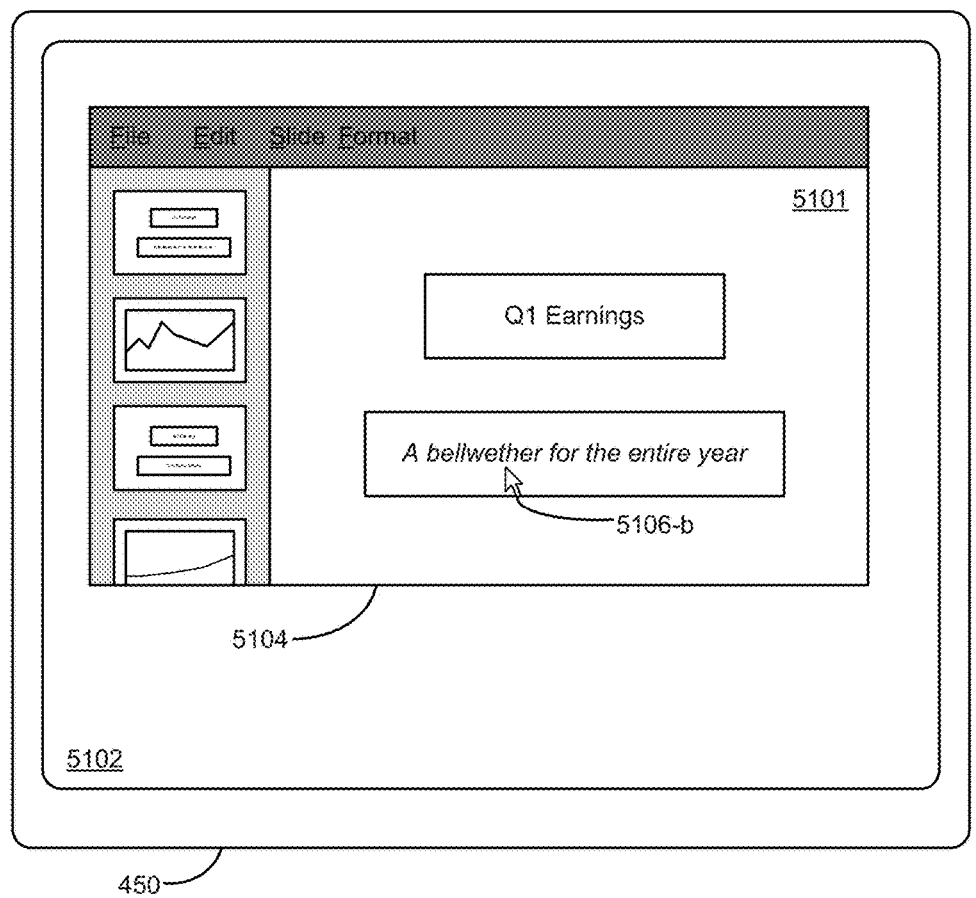
Figure 14E:
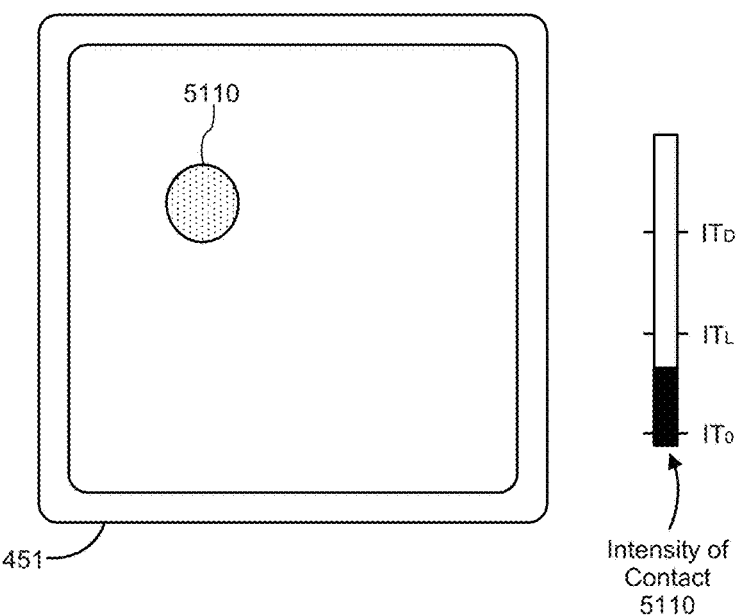
Figure 14F:
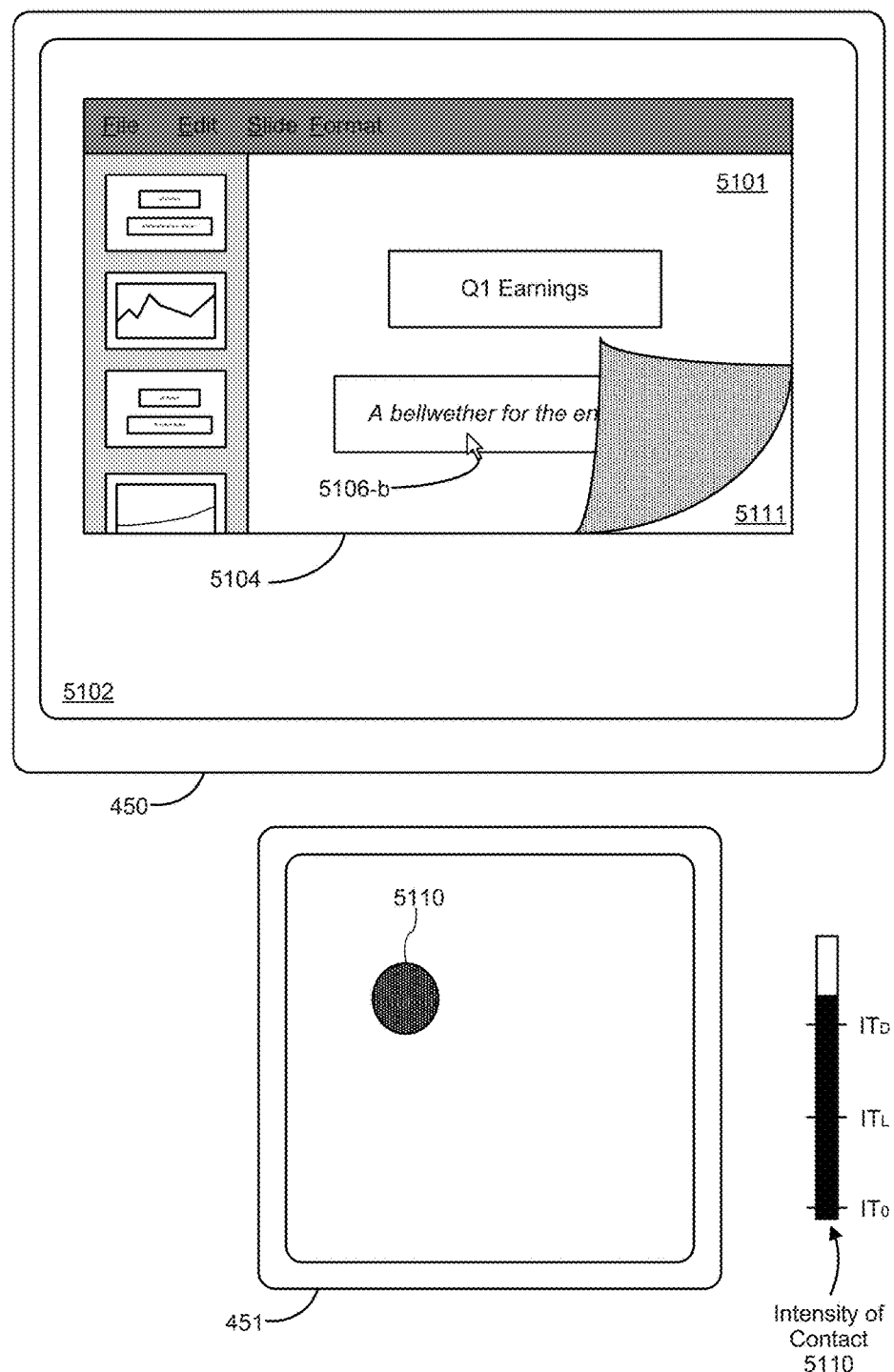
Figure 14G:
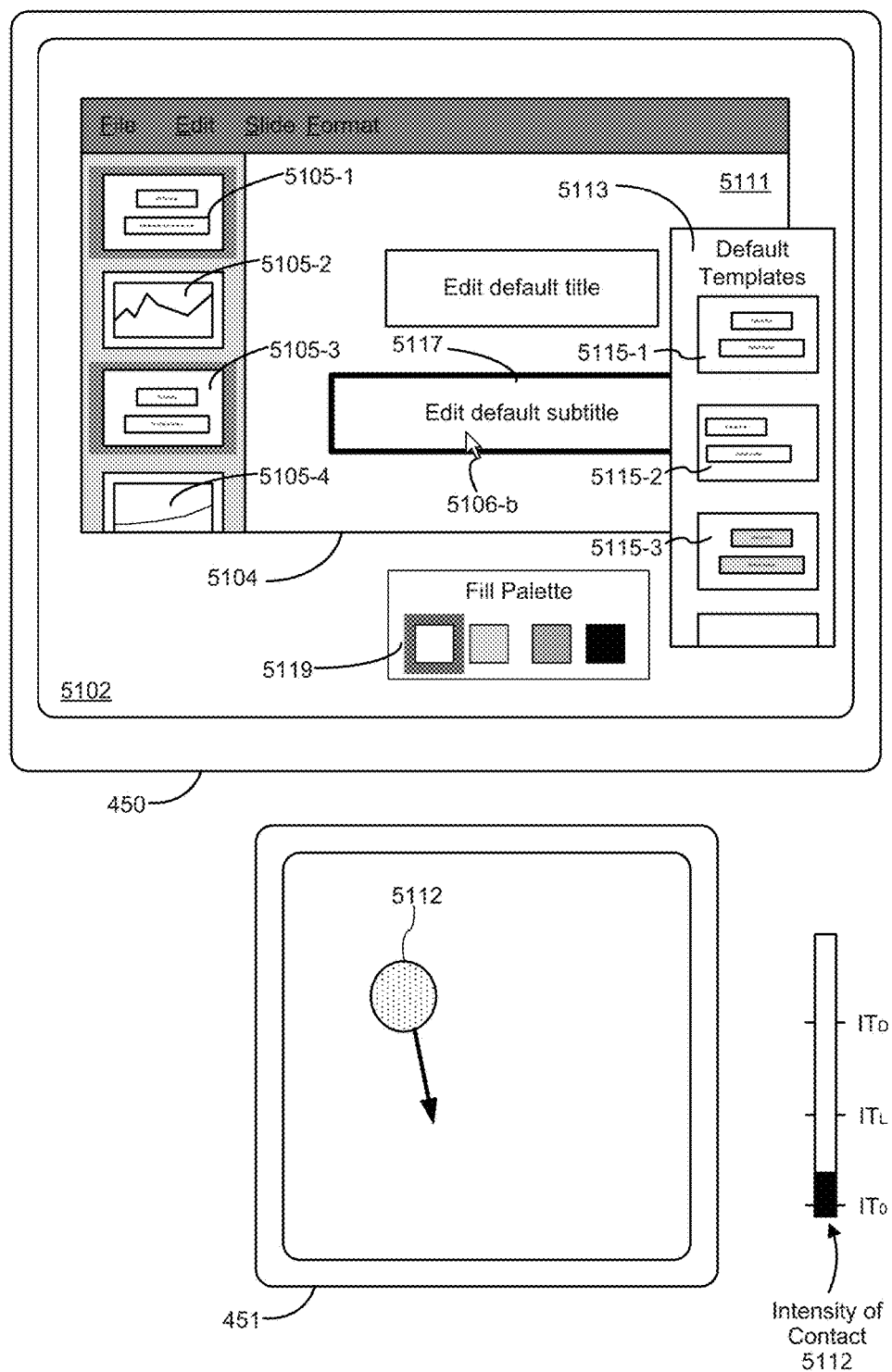

In FIGS. 14E-14G, the device detects a press input including an increase in intensity of contact 5110 from an intensity below $IT_D$ to an intensity above $IT_D$. In response to detecting the press input, the device enters a template editing mode for editing template 5111 (shown in FIG. 14G). FIG. 14F illustrates an example of displaying an animated transition corresponding to ceasing to display the portion of the respective sheet and displaying a portion of the template according to some embodiments. In this example, slide 5101 is "peeled away" from the display, leaving the template 5111 underneath. In some embodiments, slide 5101 "slides away" towards the top or bottom of electronic document 5104, template 5111 (shown in FIG. 14G) "slides over" slide 5101 from the top or bottom, and slide 5101 fades away (increases transparency) revealing template 5111 or "dissolves," revealing template 5111. In some embodiments, when the focus selector is over a particular field (e.g., field 5107 in FIG. 14D) in the sheet prior to displaying template 5111, a corresponding field (e.g., subtitle default field 5117) in template 5111 is selected when the template 5111 is displayed. In some embodiments, the animation progresses in accordance with an intensity or a change in intensity of contact 5110 on the touch-sensitive surface.

FIG. 14G illustrates an exemplary template editing mode for editing template 5111. In some embodiments, slide representations 5105-1 and 5105-3 are highlighted because they are based on template 5111. Slide representation 5105-2 and 5105-4 are not highlighted because they are based on a different template. In some embodiments, the template editing mode includes a template switching interface 5113. Template switching interface 5113 contains at least one default template. For example, template switching interface 5113 in FIG. 14G includes default templates 5115-1, 5115-2 and 5115-3.

Figure 14H:
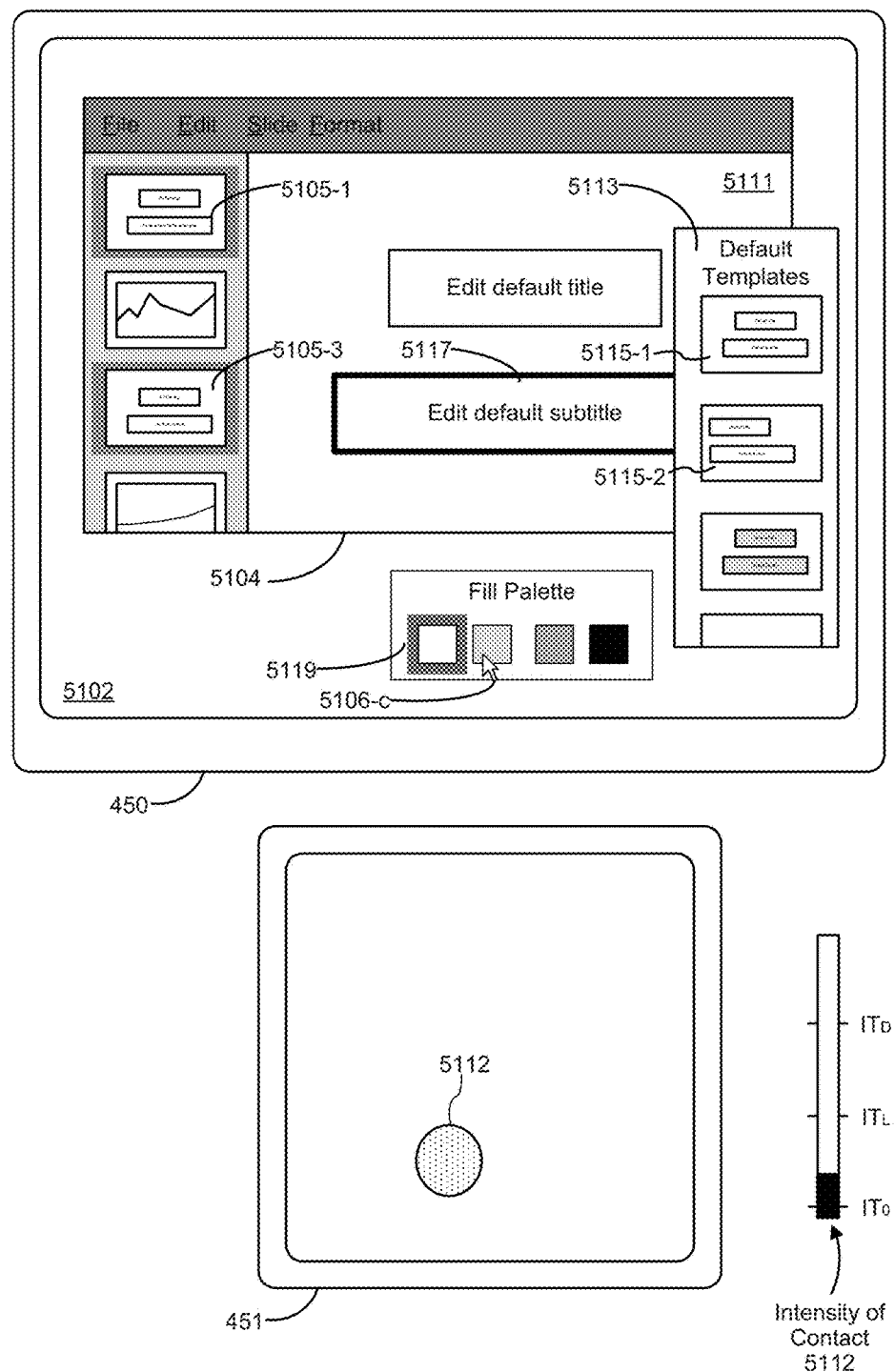

In FIGS. 14G-14H, the device detects movement of contact 5112 across the touch-sensitive surface 451 while contact 5112 has an intensity between $IT_0$ and $IT_L$ and in response to detecting movement of contact 5112, the device moves the focus selector (e.g., cursor 5106) from subtitle default field 5117 to fill palette 5119, as shown in FIG. 14H.

Figure 14I:
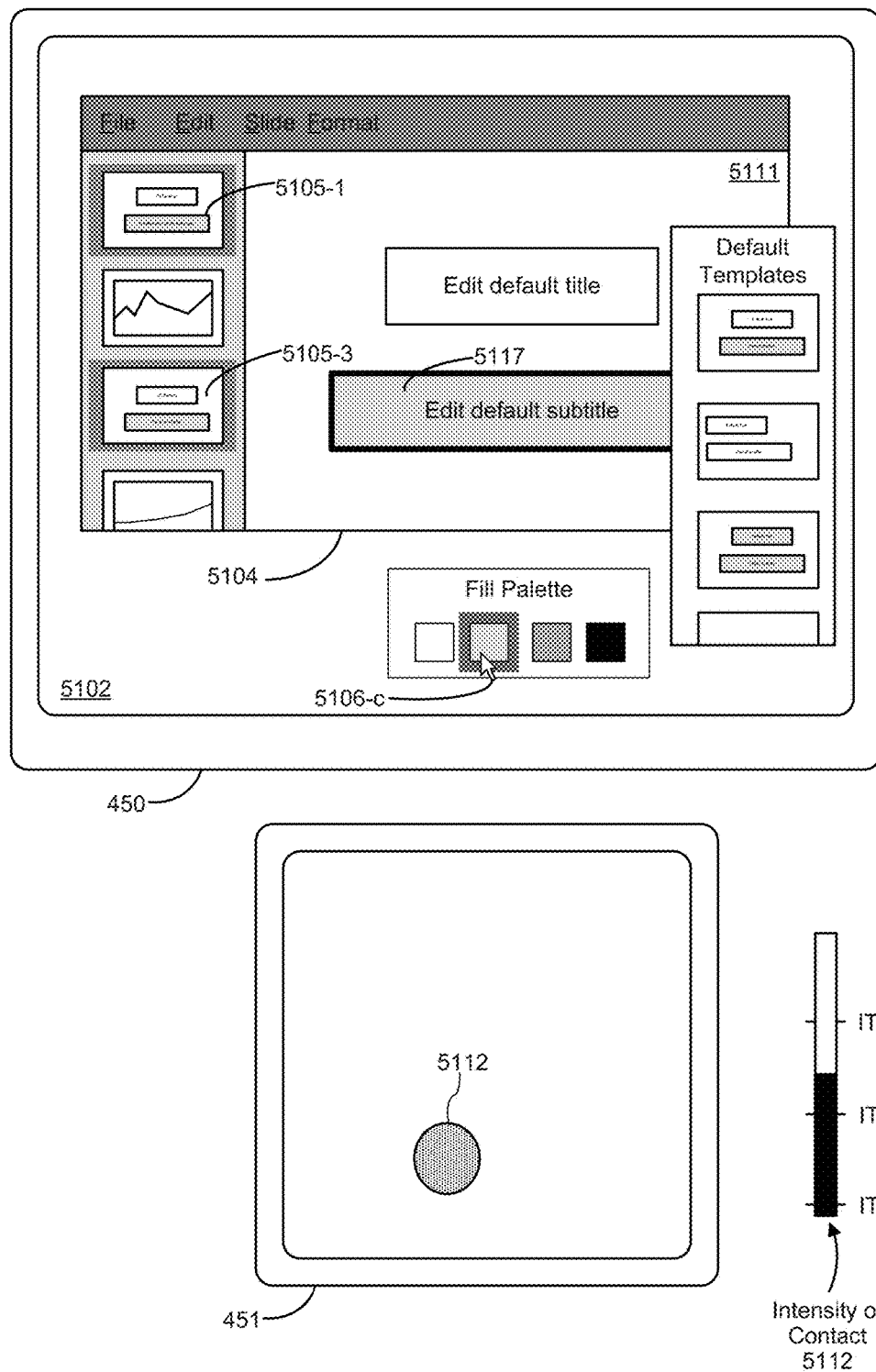

In FIGS. 14H-14I, the device detects a press input including an increase in intensity of contact 5112 from an intensity below $IT_L$ to an intensity above $IT_L$ while subtitle default field 5117 is active and the focus selector (e.g., cursor 5106) is over fill palette 5119. In response to detecting the press input, the device changes a fill property of subtitle default field 5117 (e.g., from a white fill to a gray fill). The same property is also changed in the respective subtitle fields of the slides corresponding to slide representations 5105-1 and 5105-3.

Figure 14J:
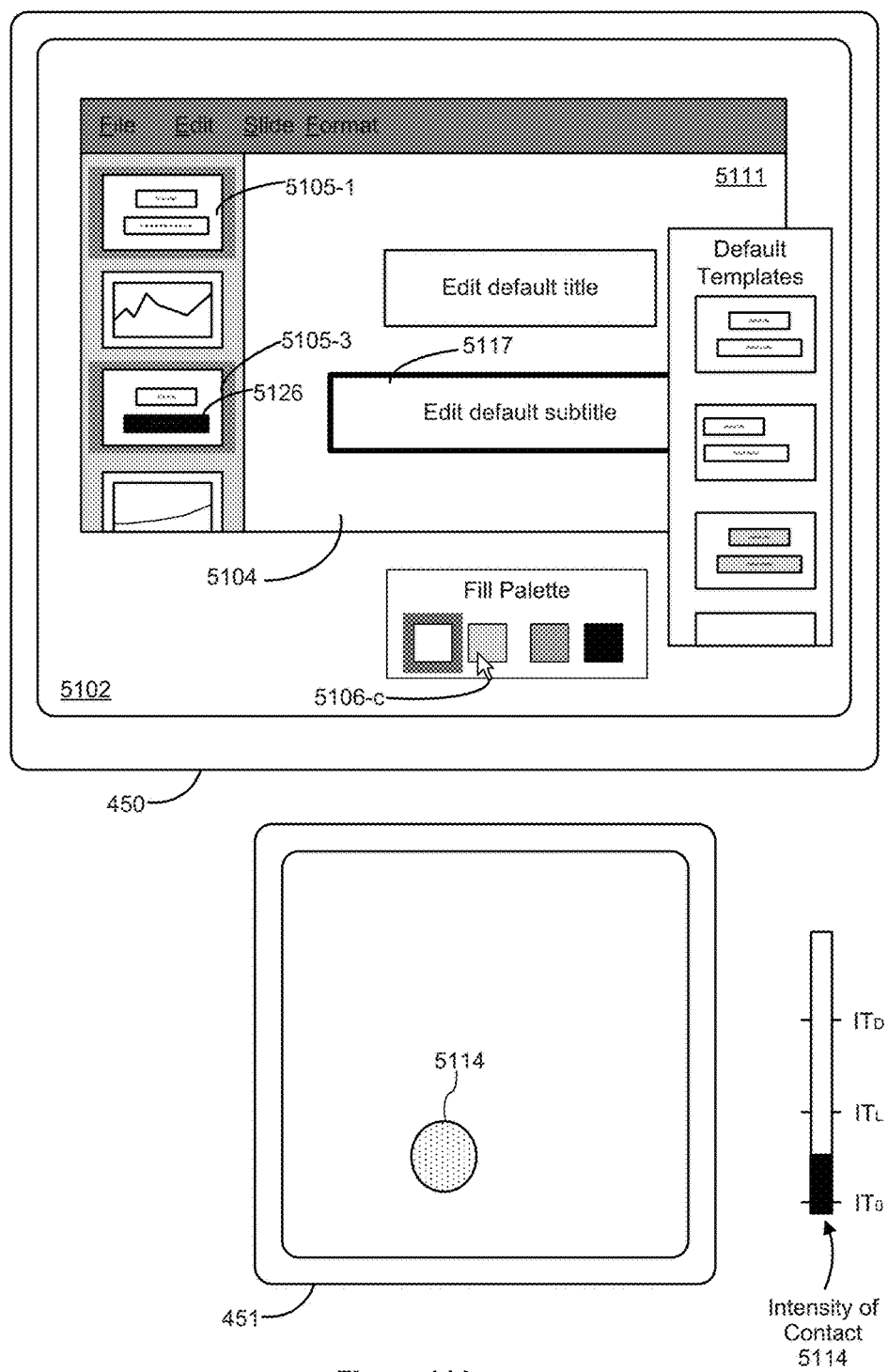
Figure 14K:
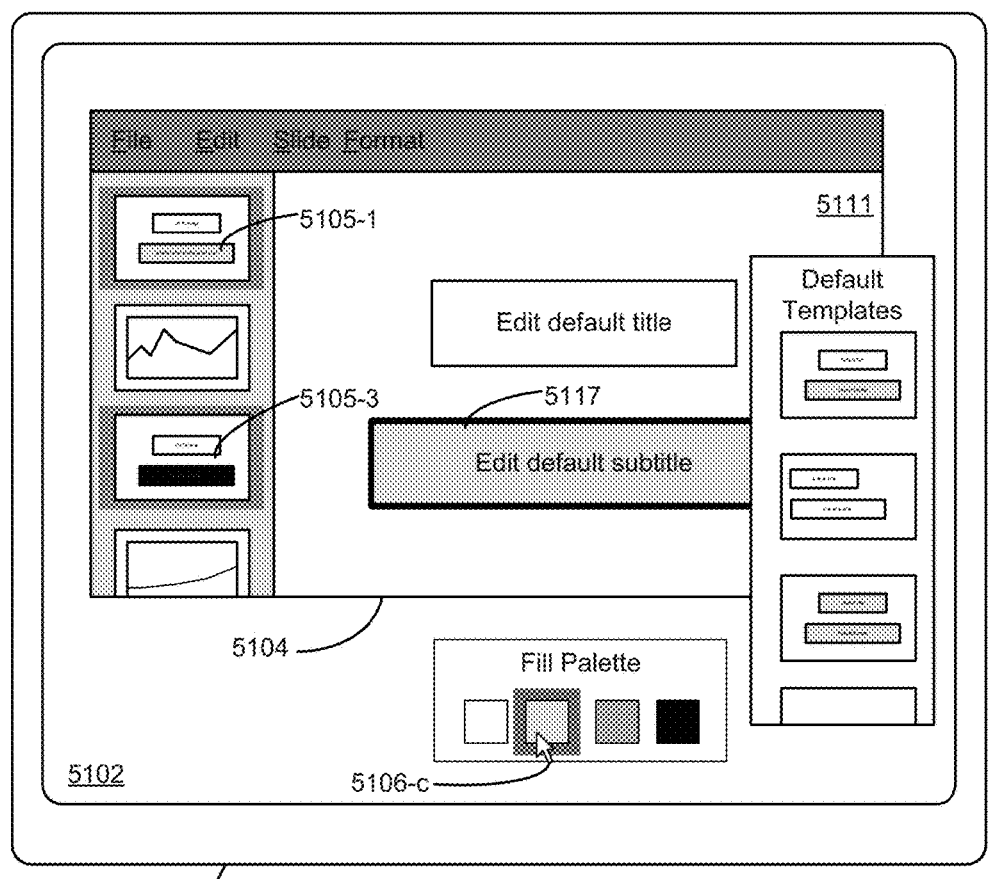
Figure 14K:
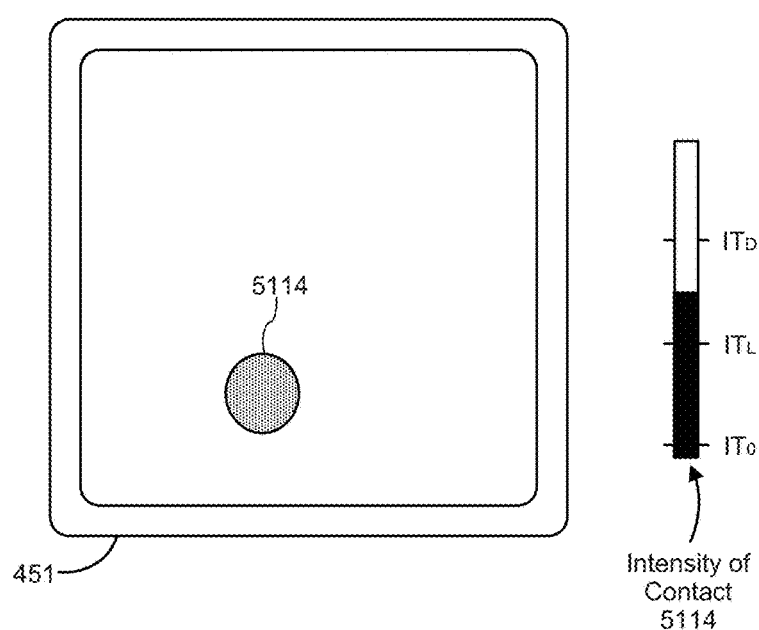

In FIGS. 14J-14K, the device detects a press input including an increase in intensity of contact 5114 from an intensity below $IT_L$ to an intensity above $IT_L$ while subtitle default field 5117 is active and the focus selector (e.g., cursor 5106) is over fill palette 5119. In response to detecting the press input, the device changes a fill property of subtitle default field 5117 (e.g., from a white fill to a gray fill), as in the previous example. In the example shown in FIG. 14J, however, the default fill property of field 5126 in the slide corresponding to slide representation 5105-3 was previously overridden (e.g., by a user changing the fill property of the field while the application was in a sheet editing mode) and the change in the default fill property of subtitle default field 5117 does not cause the fill property of field 5126 to change.

Figure 14L:
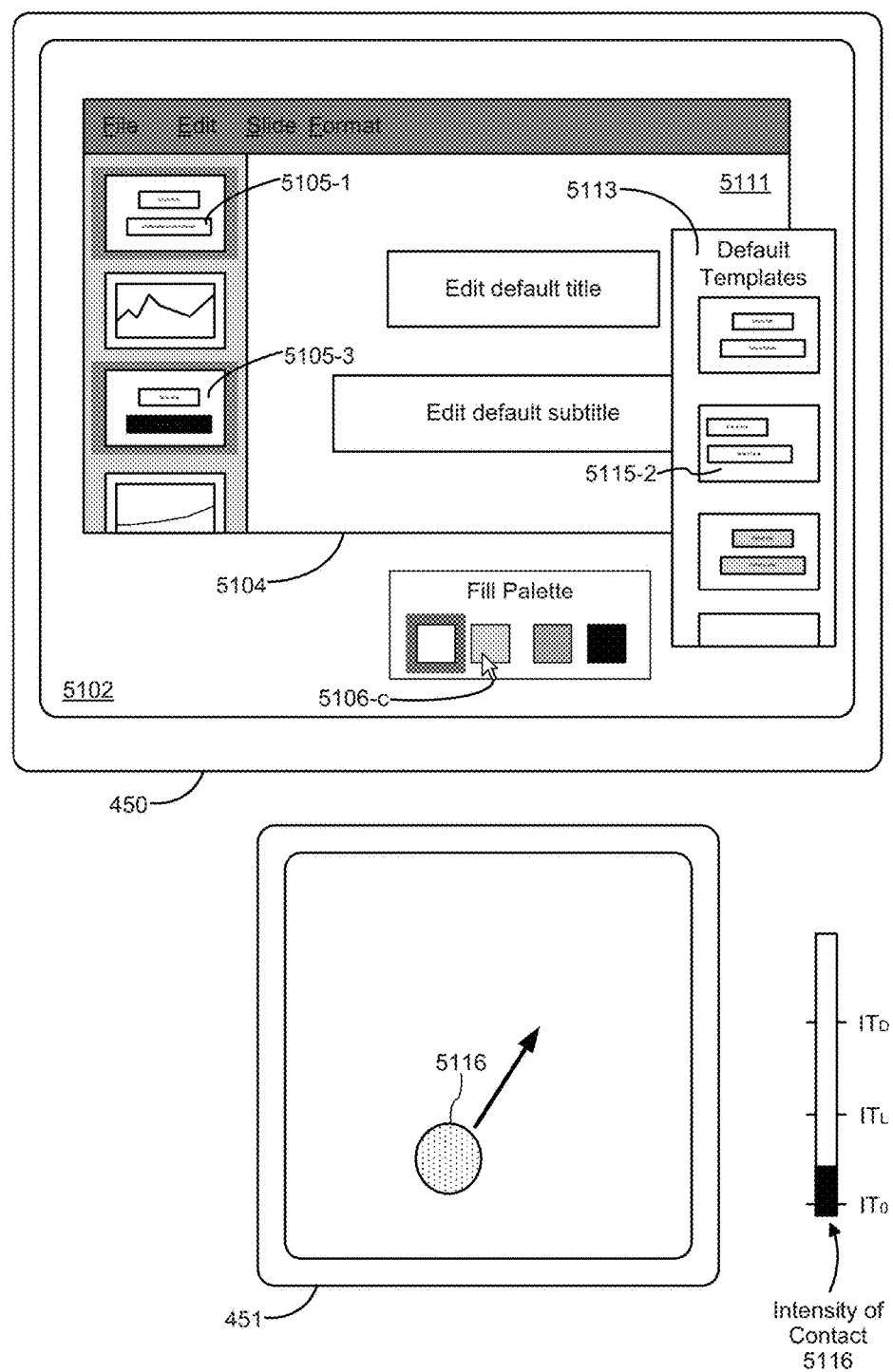
Figure 14M:
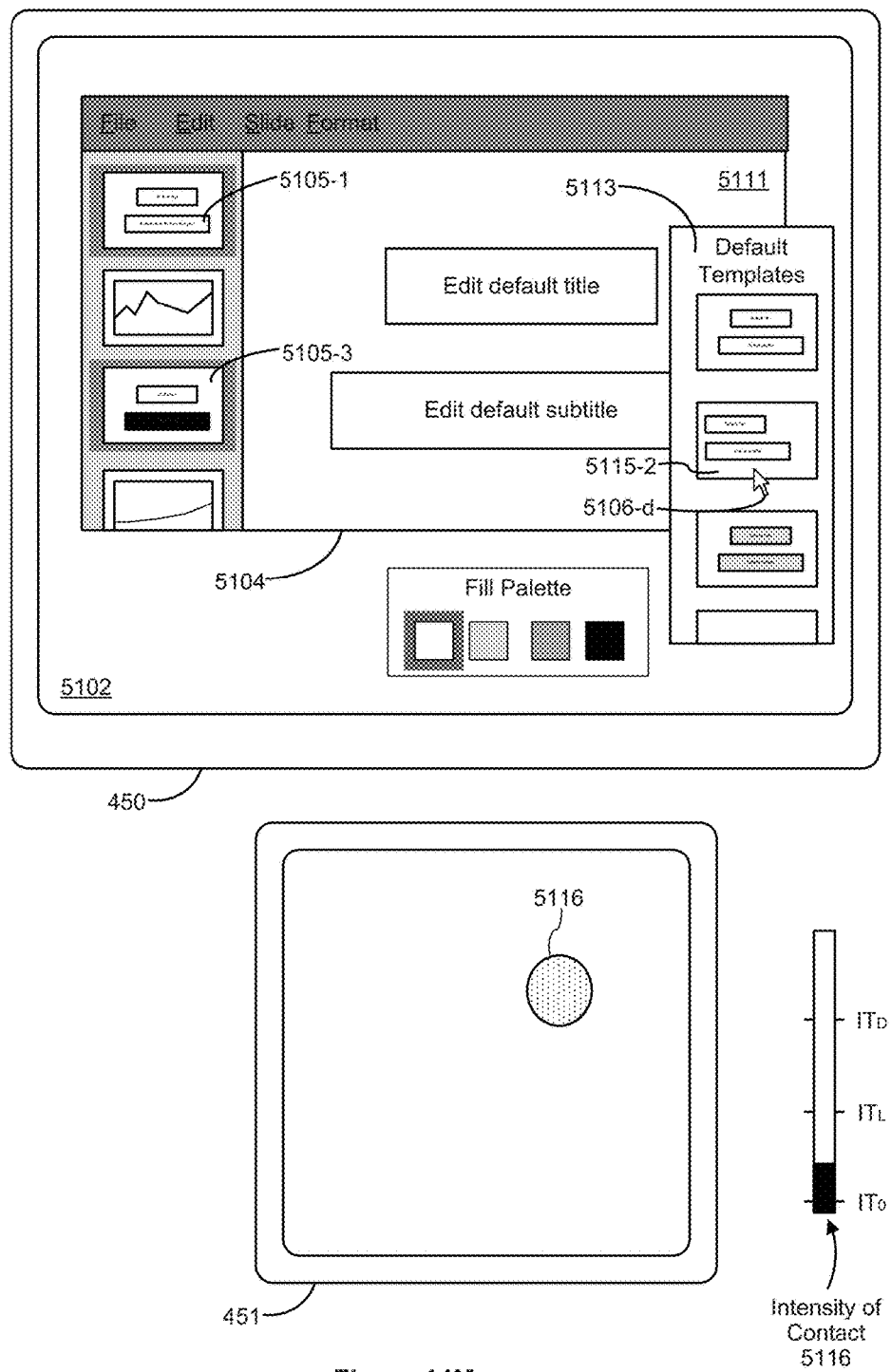

In FIGS. 14L-14M, the device detects movement of contact 5116 across the touch-sensitive surface 451 while contact 5116 has an intensity between $IT_0$ and $IT_L$ and in response to detecting movement of contact 5116, the device moves the focus selector (e.g., cursor 5106) from fill palette 5119 to template switching interface 5113, as shown in FIG. 14M.

In FIGS. 14M-14N, the device detects a press input including an increase in intensity of contact 5116 from an intensity below $IT_L$ to an intensity above $IT_L$ while the focus selector (e.g., cursor 5106) is over template switching interface 5113. In response to detecting the press input, the properties of template 5111 are replaced with properties of the default template 5115-2. For example, position properties of the title and subtitle default fields are changed, e.g., from center justified to left justified.

FIGS. 15A-15C are flow diagrams illustrating a method 5200 of editing a field in a sheet of an electronic document in accordance with some embodiments. The method 5200 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 5200 are, optionally, combined and/or the order of some operations is, optionally, changed.

As described below, the method 5200 provides an intuitive way to edit a field in a sheet of an electronic document. The method reduces the cognitive burden on a user when editing a field in a sheet of an electronic document, thereby creating a more efficient human-machine interface. For battery-operated electronic devices, enabling a user to editing a field in a sheet of an electronic document faster and more efficiently conserves power and increases the time between battery charges.

The device displays (5202) a respective sheet (e.g., slide 5101) of an electronic document having a plurality of sheets. The respective sheet includes a plurality of fields (e.g., title field 5103 and subtitle field 5107, FIG. 14A) for inserting content. The respective sheet is linked to a template that controls default properties of a respective field in the plurality of fields (e.g., template 5111 in FIGS. 14G-14N). In some embodiments, the electronic document is a presentation document (5204) and the respective sheet is a slide in the presentation document. In some embodiments, the electronic document is a word processing document (5206) and the respective sheet is a page in the word processing document. In some embodiments, the default properties include (5208) one or more of text typeface, text size, text color, border color, border style, border width, fill color, fill style, opacity, paragraph spacing, line spacing, and a text wrapping property. In some embodiments, a plurality of sheets in the electronic document, including the respective sheet, are based (5210) on the template, for example, the slides corresponding to slide representations 5105-1 and 5105-3 in FIG. 14G. In some embodiments, the device also displays (e.g., on display 450 in FIGS. 14A-14N) representations of two or more sheets in the electronic document, for example, slide representations 5105-1 through 5105-4.

The device detects (5212) a gesture that includes a press input from a contact (e.g., a finger contact) on the touch-sensitive surface while the focus selector is over the respective field (e.g., the increase in intensity of contact 5108 shown in FIGS. 14B-14C, or the increase in intensity of contact 5110 shown in FIGS. 14E-14F). In response to detecting the gesture on the touch-sensitive surface, the device performs (5214) one or more of operations 5216-5234.

The device determines whether the press input had a maximum intensity during the gesture that was above a respective intensity threshold (e.g., $IT_D$). In accordance with a determination that the press input reached an intensity during the gesture that was above the respective intensity threshold (e.g., "$IT_D$"), the device enters (5216) a template editing mode for editing default properties of the respective field in the template. For example, in FIG. 14F, contact 5108 has a maximum intensity that is above $IT_D$ and thus the device enters a template editing mode, as shown in FIGS. 14G-14N. In some embodiments, entering the template editing mode includes (5218) ceasing to display at least a portion of the respective sheet, displaying at least a portion of the template and displaying an animated transition corresponding to ceasing to display the portion of the respective sheet and displaying the portion of the template. For example, an animation is displayed of the respective sheet peeling back to display the template underneath or display the template appearing on top of the respective sheet (e.g., as shown in FIG. 14F).

In some embodiments, to the device displays, while in template editing mode, visual indicia that particular sheets in the plurality of sheets are based on the template. For example, in some embodiments, prior to detecting the gesture on the touch-sensitive surface, the device display representations of a plurality of sheets in the electronic document and while in the template editing mode, the device highlights (5220) representations of a subset of the plurality of sheets in the electronic document, the subset comprising sheets that are based on the template (e.g., as illustrated in FIGS. 14G-14N where sheets 5105-1 and 5105-3 are based on template 5111). In some embodiments, respective sheet representations of the subset of sheets based on the template are altered to give the appearance of highlighting by altering the border or body of a given sheet representation (e.g., the border of the representations are changed to a bright color to give the impression that those sheets are "glowing" or "active").

In some embodiments, while in the template editing mode, the device displays (5222) a template switching interface that includes a representation of the template for the respective sheet, and a representation of at least one different template, where selecting a representation of a respective template in the template switching interface selects the respective template for use as a template for the respective sheet (e.g., in response to detecting selection of a template from the template switching interface, the device selects a different template for the respective sheet). An illustrative example of a template switching interface 5113 is discussed in greater detail with reference to FIGS. 14L-14N.

In some embodiments, a plurality of sheets in the electronic document, including the respective sheet, are based (5224) on the template, and while in the template editing mode, the device detects (5226), an input that corresponds to a change in a default property of the respective field in the template (e.g., a press input corresponding to an increase in intensity of contact 5112 in FIGS. 14H-14I). In response to detection of the input, the device changes (5228) the default property of the respective field in the template and changes the default property of fields corresponding to the respective field in the template in the plurality of sheets in the electronic document that are based on the template (e.g., in FIG. 14I, default properties in fields corresponding to representations of sheets 5105-1 and 5105-3 are changed from a white fill to a gray fill). In some embodiments, changing the default property of a field in a particular sheet where the default property has not been overridden changes the field in the particular sheet. For example, if the default font color in title field within a slide template (e.g., template 5111 in FIGS. 14G-14N) is changed from red to green and, furthermore, the font color for the particular instance of the title field that is based on the template (e.g., title field 5103 in slide 5101) has not been overridden with a custom font color, the change from red to green is effected in the particular instance of the title field as well (e.g., title field 5103 in slide 5101). In some embodiments, changing the default property of a field in a particular sheet where the default property has been overridden by a custom property does not override or remove the custom property in the particular sheet. For example, if the default text color for text in a text box is red but in a particular sheet, a user has changed the color of the text to blue, changing the default text color for text in the text box from red to green will not affect the color of the text in the text box in the particular sheet, as the user has already overridden the default text color value for that text box on the particular sheet.

As described above, the device determines whether the press input had a maximum intensity during the gesture that was above a respective intensity threshold. In accordance with a determination that the press input had a maximum intensity during the gesture that was below the respective intensity threshold (e.g., "$IT_D$"), the device enters (5230) a sheet editing mode for editing content of the respective field in the respective sheet. In some embodiments, while in the sheet editing mode, the device detects (5232) an input that corresponds to a change in a respective property of the respective field from a default property to a custom property. In response to detecting the input, the device changes (5234) the respective property in the respective field in the respective sheet to the custom property without changing the default property in the respective field in the template (e.g., the default property in fields corresponding to the respective field in the template in the plurality of sheets in the electronic document are also not changed). For example, when the text in subtitle field 5107 is italicized in FIG. 14D the other subtitle fields in other sheets that use the same template are, optionally, not italicized.

It should be understood that the particular order in which the operations in FIGS. 15A-15C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 5200 described above with respect to FIGS. 15A-15C. For example, the contacts, gestures, user interface objects, intensity thresholds, focus selectors, animations described above with reference to method 600 optionally have one or more of the characteristics of the contacts, gestures, user interface objects intensity thresholds, focus selectors, animations described herein with reference to other methods described herein (e.g., those listed in the fifth paragraph of the Description of Embodiments). For brevity, these details are not repeated here.

Figure 16:
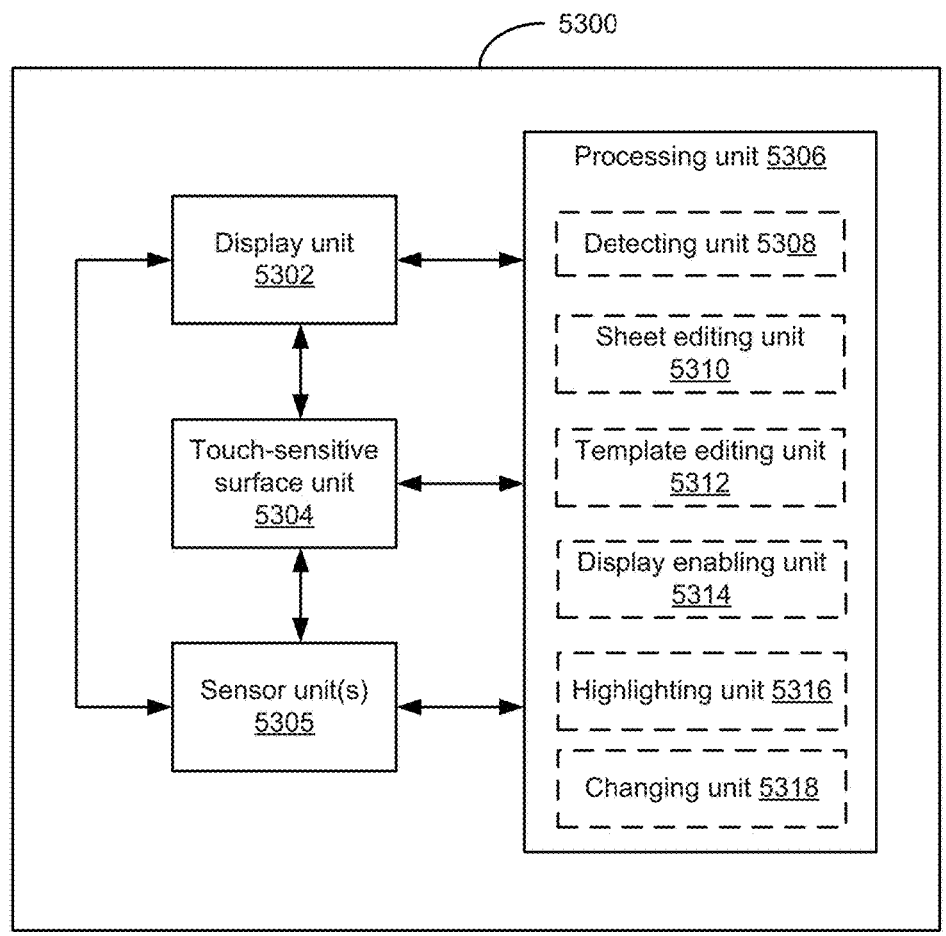
FIG. 16 is a functional block diagram of an electronic device in accordance with some embodiments.

In accordance with some embodiments, FIG. 16 shows a functional block diagram of an electronic device 5300 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 16 are, optionally, combined or separated into sub-blocks to implement the principles of the various described embodiments. Therefore, the description herein optionally supports any possible combination or separation or further definition of the functional blocks described herein.

As shown in FIG. 16, an electronic device 5300 includes a display unit 5302 configured to display a respective sheet of an electronic document having a plurality of sheets, where the respective sheet includes a plurality of fields for inserting content and the respective sheet is linked to a template that controls default properties of a respective field of the plurality of fields; a touch-sensitive surface unit 5304 configured to receive contacts; one or more sensor units 5305 configured to detect intensity of contacts with the touch-sensitive surface unit 5304; and a processing unit 5306 coupled to the display unit 5302, the touch-sensitive surface unit 5304, and the sensor units 5305. In some embodiments, the processing unit 5306 includes a detecting unit 5308, a sheet editing unit 5310, a template editing unit 5312, a display enabling unit 5314, a highlighting unit 5316 and a changing unit 5318.

The processing unit 5306 is configured to, while a focus selector is over the respective field, detect a gesture that includes a press input from a contact on the touch-sensitive surface unit (e.g., with the detecting unit 5308), and, in response to detecting the gesture on the touch-sensitive surface unit 5304, the processing unit 5306 is configured to, in accordance with a determination that the press input had a maximum intensity during the gesture that was below a respective intensity threshold, enter a sheet editing mode for editing content of the respective field in the respective sheet (e.g., with the sheet editing unit 5310), and in accordance with a determination that the press input reached an intensity during the gesture that was above the respective intensity threshold, enter a template editing mode for editing default properties of the respective field in the template (e.g., with the template editing unit 5312).

In some embodiments, the electronic document is a presentation document and the respective sheet is a slide in the presentation document.

In some embodiments, the electronic document is a word processing document and the respective sheet is a page in the word processing document.

In some embodiments, the default properties include one or more of: text typeface, text size, text color, border color, border style, border width, fill color, fill style, opacity, paragraph spacing, line spacing, and a text wrapping property.

In some embodiments, the processing unit 5306 is configured to: prior to detecting the gesture on the touch-sensitive surface unit, enable display of representations of two or more sheets in the electronic document (e.g., with the display enabling unit 5314); and while in the template editing mode, highlight representations of a subset of the plurality of sheets in the electronic document (e.g., with the highlighting unit 5316), the subset comprising sheets that are based on the template.

In some embodiments, entering the template editing mode includes: ceasing to display at least a portion of the respective sheet; enabling display of at least a portion of the template (e.g., with the display enabling unit 5314); and enabling display of an animated transition corresponding to ceasing to display the portion of the respective sheet and displaying the portion of the template (e.g., with the display enabling unit 5314).

In some embodiments, the processing unit 5306 is configured to, while in the template editing mode, enable display of a template switching interface that includes: a representation of the template for the respective sheet; and a representation of a different template, where selecting a representation of a respective template in the template switching interface causes the processing unit 5306 to select the respective template for use as a template for the respective sheet.

In some embodiments, two or more sheets in the electronic document, including the respective sheet, are based on the template; and the processing unit 5306 is configured to, while in the template editing mode: detect an input that corresponds to a change in a default property of the respective field in the template (e.g., with the detecting unit 5308); and in response to detecting the input: change the default property of the respective field in the template (e.g., with the changing unit 5318); and change the default property of fields corresponding to the respective field in the template in the two or more sheets in the electronic document that are based on the template (e.g., with the changing unit 5318).

In some embodiments, the processing unit 5306 is configured to, while in the sheet editing mode: detect an input (e.g., with the detecting unit 5308) that corresponds to a change in a respective property of the respective field from a default property to a custom property; and in response to detecting the input, change (e.g., with the changing unit 5318) the respective property in the respective field in the respective sheet to the custom property without changing the default property in the respective field in the template.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 15A-15C are, optionally, implemented by components depicted in FIGS. 1A-1B or FIG. 16. For example, detection operation 5212, template editing mode entering operation 5216, and sheet editing mode entering operation 5230 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Changing Text Wrapping Properties

Many electronic devices use graphical user interfaces to display electronic documents. These documents can include different types of objects, such as text and images, that are displayed with relationships relative to one another. For instance, the z-layer order of two images determines which of the images will be displayed on top if the images are position to overlap with one another. Text wrapping properties, more specifically, determine how text is displayed relative to user interface objects. Types of user interface objects include graphical objects such as images or icons, text boxes, and other objects that are displayed within an electronic document. There is often a need to change text wrapping properties in a fast, efficient, and convenient way however changing the text wrapping properties of a user interface object sometimes takes a large number of distinct inputs that can be confusing and inefficient for the user. The embodiments described below provide methods and user interfaces for changing text wrapping properties of a user interface objects in a fast, efficient, and convenient way based on an intensity of a contact while a focus selector is over the user interface object. For example, when a device has sensors that can detect the intensity of a contact with a touch-sensitive surface, the device can change text wrapping properties of an object in accordance with changes in intensity of a contact on the touch-sensitive surface. This method streamlines the process of changing text wrapping properties of an object by navigating through menus or memorizing keyboard shortcuts, thereby eliminating the need for extra, separate steps to change text wrapping properties of an object.

FIG. 17A-17K illustrate an exemplary user interfaces for changing the text wrapping properties of a user interface object in accordance with some embodiments. The user interfaces in these figures are used to illustrate processes described below, including the processes described with reference to FIGS. 18A-18B. FIGS. 17A-17K include intensity diagrams that show the current intensity of the contact on the touch-sensitive surface relative to a plurality of intensity thresholds including a predefined activation threshold (e.g., "$IT_D$"). In some embodiments, operations similar to those described below with reference to $IT_D$ are performed with reference to a different intensity threshold (e.g., "$IT_L$").

FIGS. 17A-17K show an example of a display 450 and a touch-sensitive surface 451 of an electronic device (e.g., electronic device 300, FIG. 3 or portable multifunction device 100, FIG. 1A). The touch-sensitive surface 451 includes a touch-sensitive surface with one or more contact intensity sensors 359 (FIG. 3). The display 450 displays an electronic document 6300.

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 17A-17K and 18A-18B will be discussed with reference to display 450 and a separate touch-sensitive surface 451, however analogous operations are, optionally, performed on a device with a touch-sensitive display system 112 in response to detecting the contacts described in FIGS. 17A-17K on the touch-sensitive display system 112 while displaying the user interfaces shown in FIGS. 17A-17K on the touch-sensitive display system 112; in such embodiments, the focus selector is, optionally: a respective contact, a representative point corresponding to a contact (e.g., a centroid of a respective contact or a point associated with a respective contact), or a centroid of two or more contacts detected on the touch-sensitive display system 112, in place of cursor 6306.

In accordance with some embodiments, a method is performed to change the text wrapping properties of a user interface object 6302 in an electronic document displayed by an electronic device. In some embodiments, the displayed electronic document includes text 6304 as well as one or more user interface objects 6302. Text 6304 is displayed proximate to a user interface object 6302 according to a first set of text wrapping rules. Here, text that is "proximate" to a user interface object includes text that overlaps the user interface object 6302, text that is overlapped by the user interface object 6302, text that is laterally adjacent to the user interface object 6302, and text that surrounds the user interface object 6302. In some embodiments, text wrapping properties of user interface object 6302 indicate, for example, that a paragraph of text proximate to an image in a word processing document is to be displayed under the image (e.g., in a z-layer order), laterally adjacent to the image (e.g., surrounding the image, such that the user interface object is placed within the text), or on top of the image (e.g., in a z-layer order), as shown in FIGS. 17A-17C, respectively. Stated another way, a current value of the text wrapping properties of user interface object 6302 indicates how the paragraph of text proximate to the image is to be displayed.

In some embodiments, as shown in FIGS. 17A-17K, the user interface also includes a displayed representation of a focus selector 6306, responsive to gestures (e.g., press inputs) on touch-sensitive surface 451, for performing operations such as selecting a user interface object 6302 and placing text cursors (e.g., 6314 in FIG. 17K) within text 6304. In some instances, a displayed representation of the focus selector 6306 is a cursor with a position on the display 450 in accordance with press inputs from touch-sensitive surface 451. Alternatively, in some embodiments a representation of the focus selector is not displayed. For example, in embodiments using a touch-sensitive display system, the position of the focus selector corresponds to the location on the display of the press input. Further, the focus selector is herein defined to be "over" a user interface object when the position of the focus selector corresponds to the location on the display of the user interface object.

FIGS. 17A-17C illustrate changing text wrapping properties of user interface object 6302 through a plurality of values in accordance with changes in an intensity of contact 6310 through a plurality of values. For example, in FIG. 17A, user interface object 6302 is displayed on top of text 6304 while the intensity of contact 6310 is below a first intensity threshold (e.g., "$IT_L$") and a second intensity threshold (e.g., "$IT_D$"). In response to detecting an increase in intensity of contact 6310 above the first intensity threshold while the focus selector (e.g., cursor 6306) is over the user interface object 6302, the device changes the text wrapping properties of user interface object 6302, so that user interface object 6302 is displayed within text 6304, as illustrated in FIG. 17B. In response to detecting a further increase in intensity of contact 6310 above the second intensity threshold while the focus selector (e.g., cursor 6306) is over the user interface object 6302, the device changes the text wrapping properties of user interface object 6302, so that user interface object 6302 is displayed underneath text 6304, as illustrated in FIG. 17C. For ease of explanation, a press input performed by a contact (e.g., contact 6310 in FIGS. 17A-17C) corresponding to a contact with an intensity above a predefined threshold is sometimes herein referred to as a press input with an intensity above a predefined threshold.

Figure 17D:
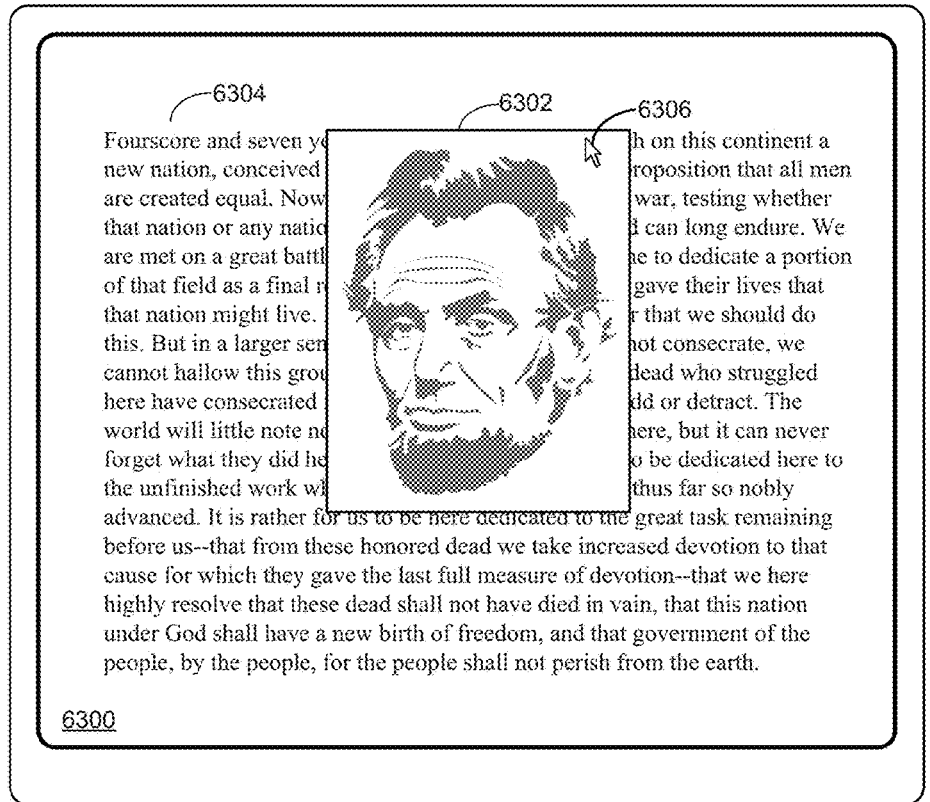
Figure 17D:
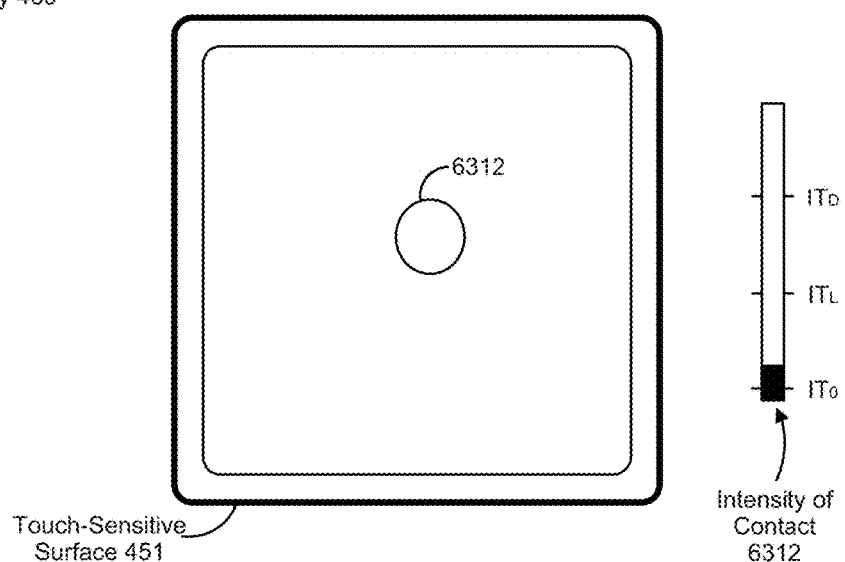
Figure 17E:
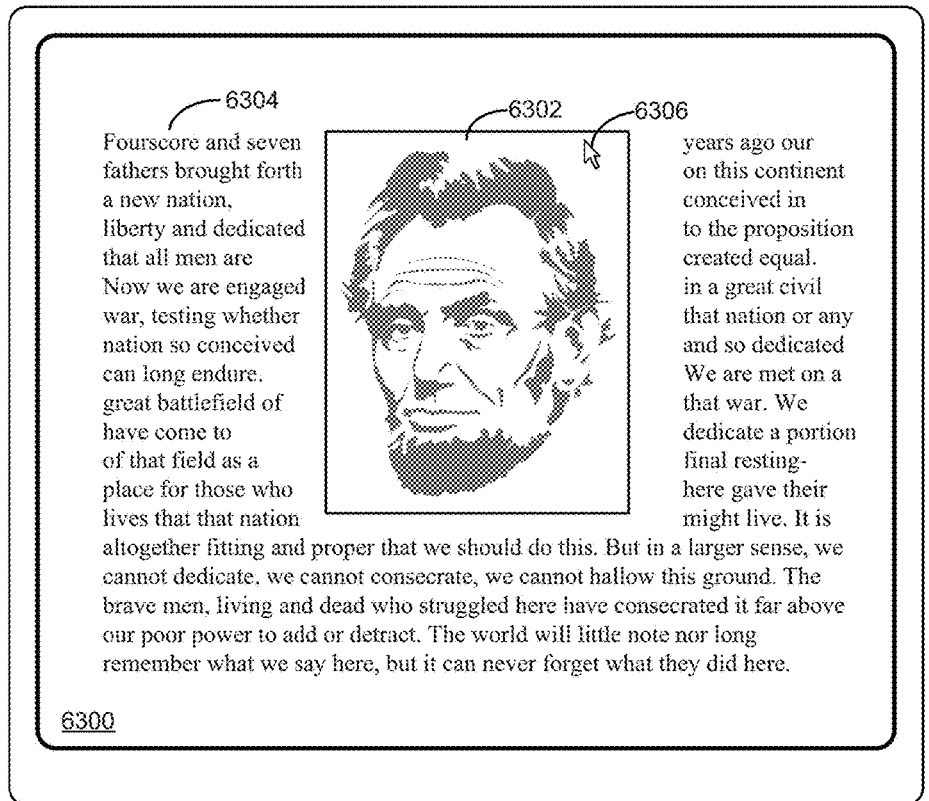
Figure 17E:
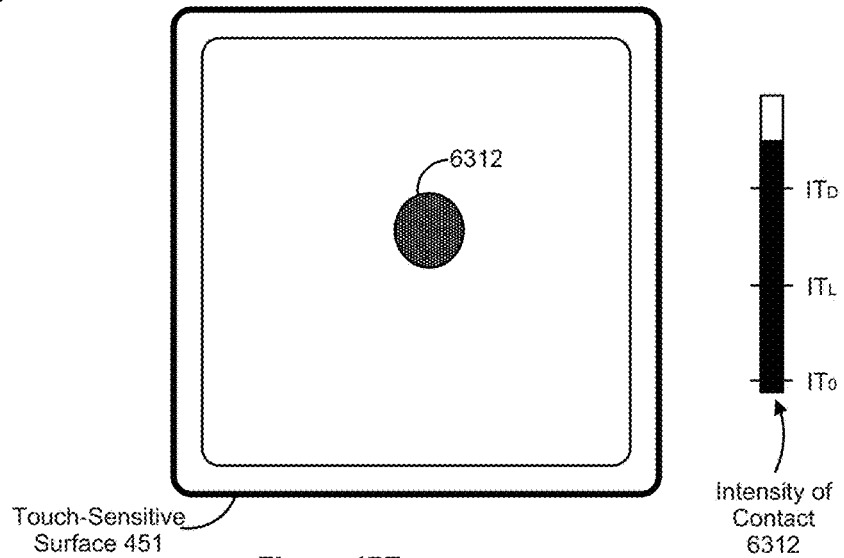
Figure 18B:
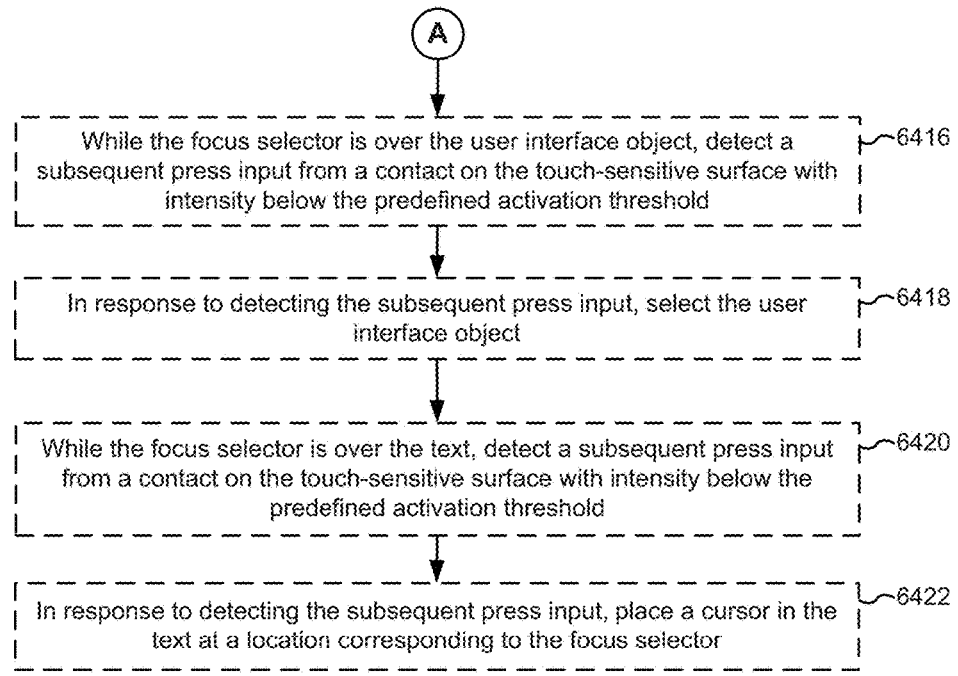

FIGS. 17D-17E illustrate an example of a change in the text wrapping properties from a first text wrapping property (e.g., "on top of text") to a second text wrapping property (e.g., "within text") when a press input, corresponding to a contact 6312 with an intensity above a predefined threshold (e.g., "$IT_D$"), is detected while the focus selector (e.g., cursor 6306) is over the user interface object 6302. In particular, in FIG. 17D, contact 6312 has an intensity below $IT_D$ and in FIG. 17E, contact 6312 has an intensity above $IT_D$.

Figure 17F:
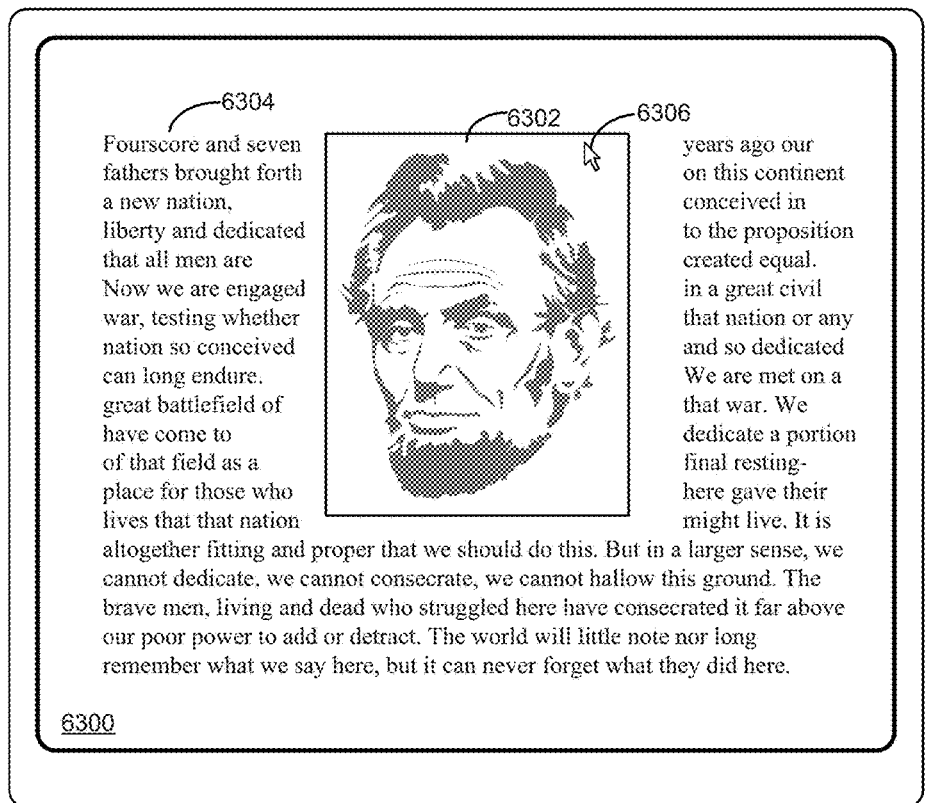
Figure 17F:
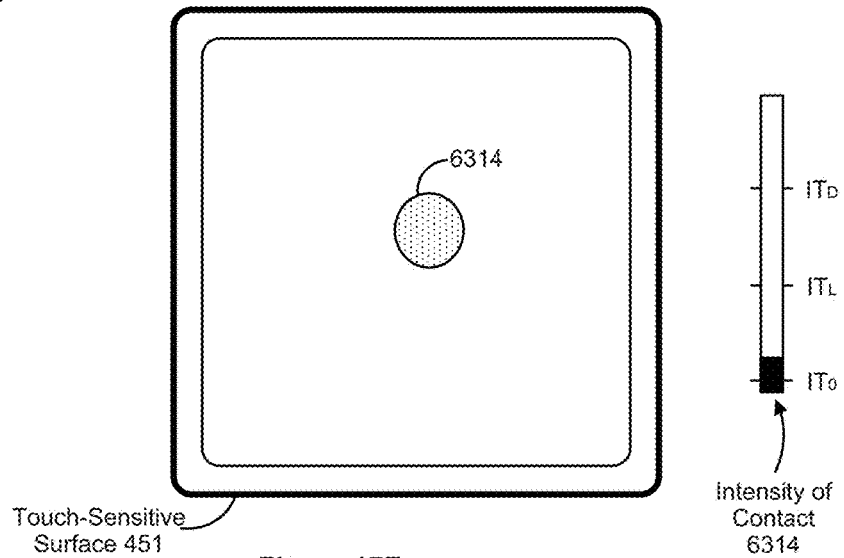
Figure 17G:
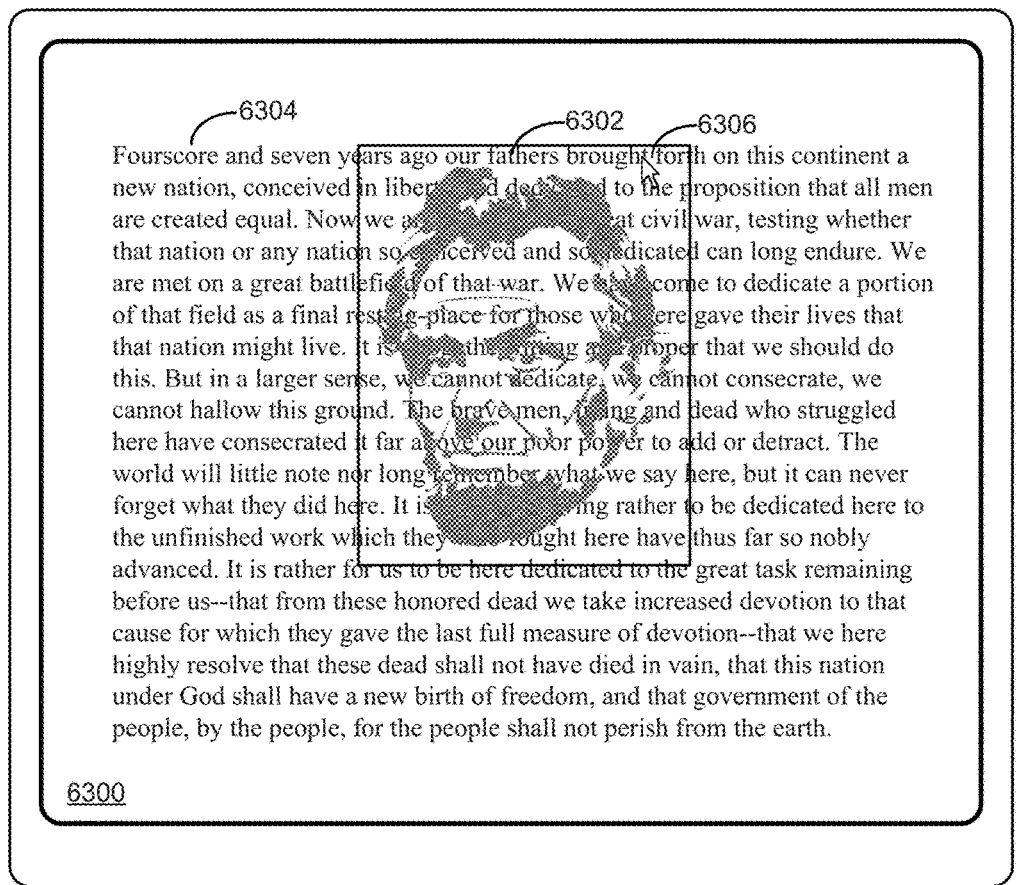
Figure 17G:
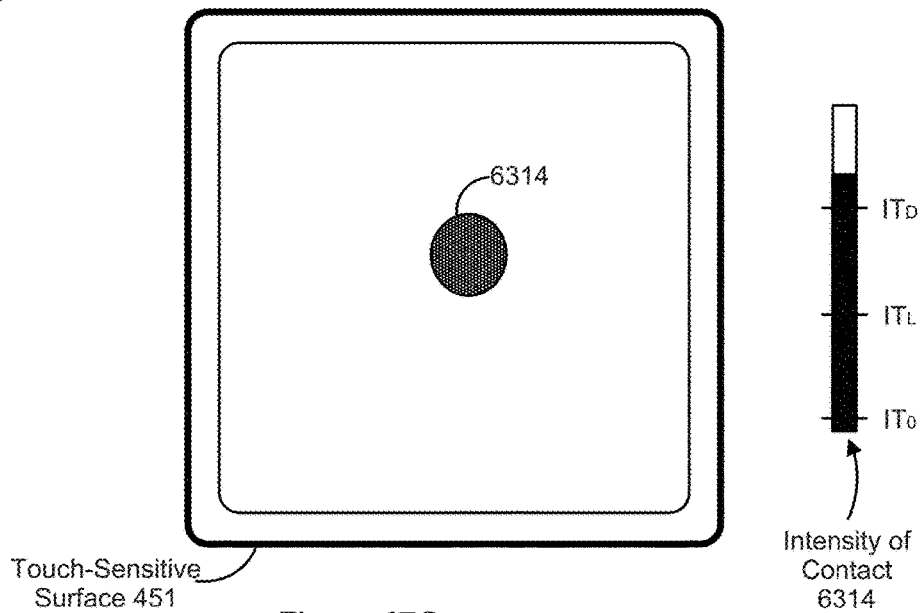

FIGS. 17F-17G illustrate an example of a change in the text wrapping properties from a first text wrapping property (e.g., "within text") to a second text wrapping property (e.g., "underneath text") when a press input, corresponding to a contact 6314 with an intensity above a predefined threshold (e.g., "$IT_D$"), is detected while the focus selector (e.g., cursor 6306) is over the user interface object 6302. In particular, in FIG. 17F, contact 6314 has an intensity below $IT_D$ and in FIG. 17G, contact 6314 has an intensity above $IT_D$.

Figure 17H:
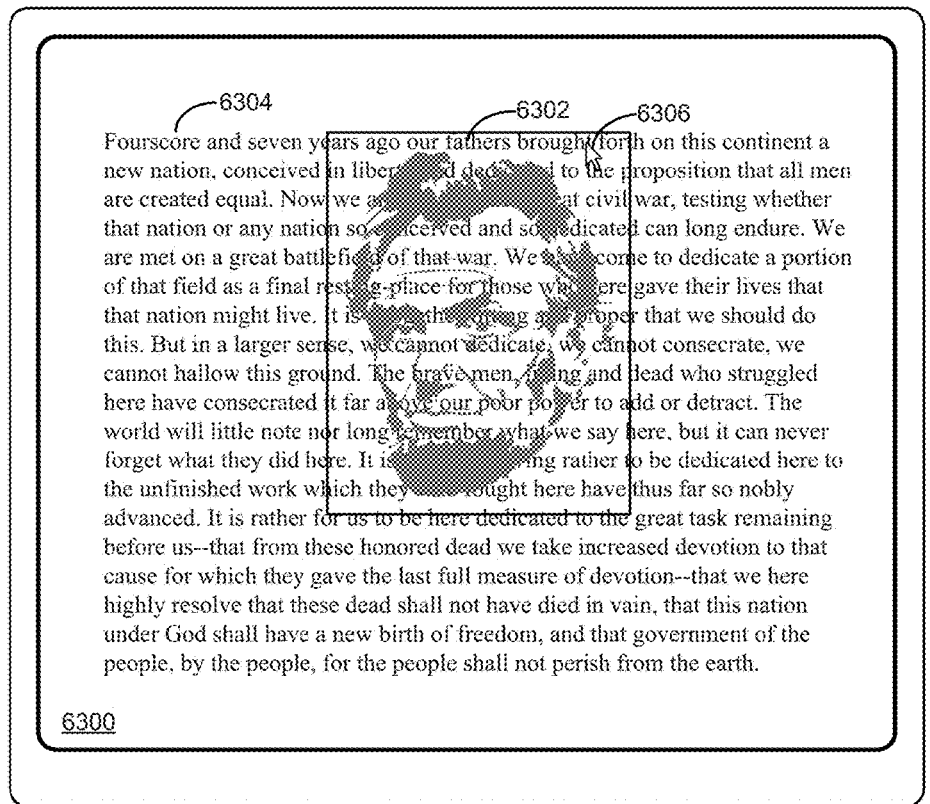
Figure 17H:
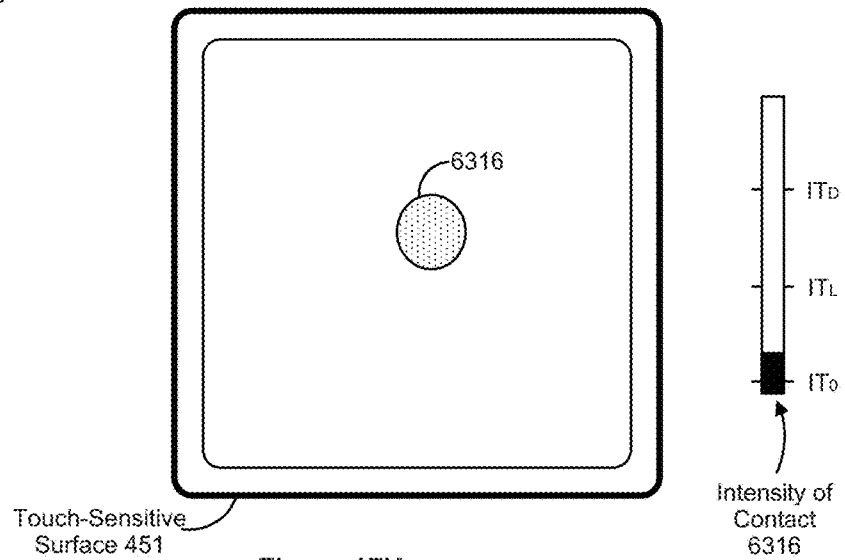
Figure 17I:
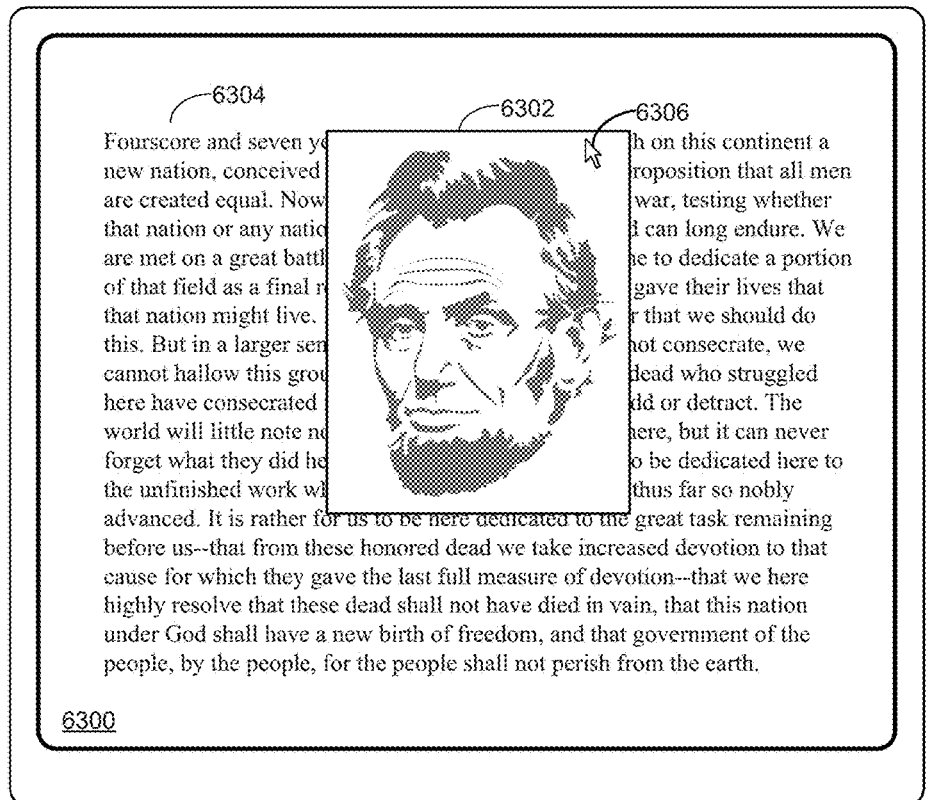
Figure 17I:
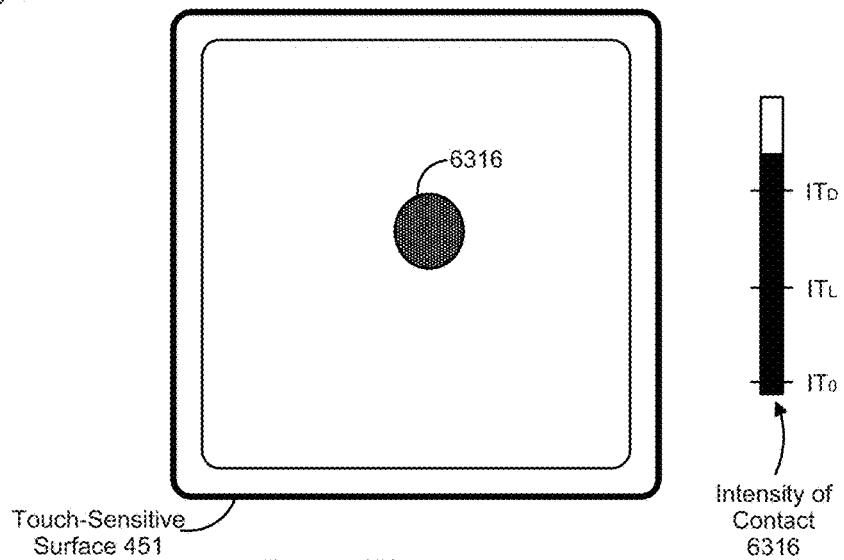

FIGS. 17H-17I illustrate an example of a change in the text wrapping properties from a first text wrapping property (e.g., "underneath text") to a second text wrapping property (e.g., "on top of text") when a press input, corresponding to a contact 6316 with an intensity above a predefined threshold (e.g., "$IT_D$"), is detected while the focus selector (e.g., cursor 6306) is over the user interface object 6302. In particular, in FIG. 17H, contact 6316 has an intensity below $IT_D$ and in FIG. 17I, contact 6316 has an intensity above $IT_D$.

Figure 17J:
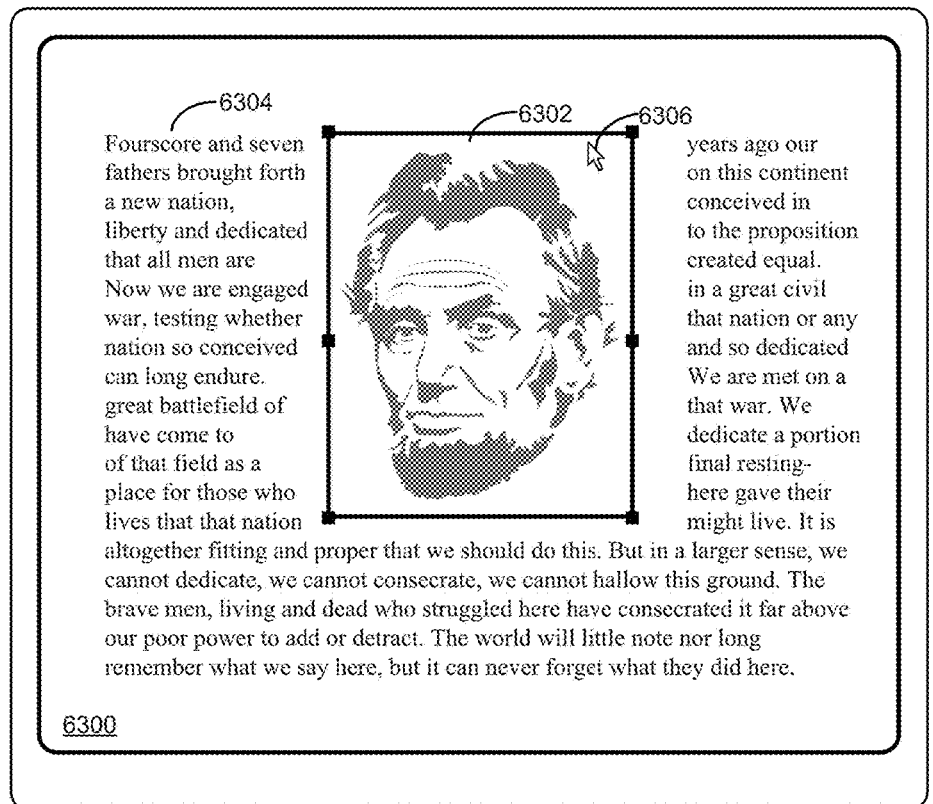
Figure 17J:
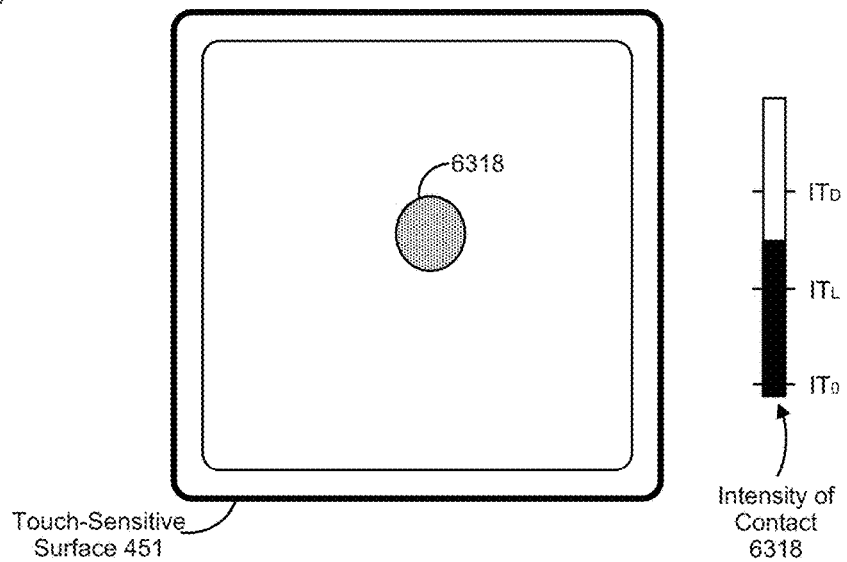
Figure 17K:
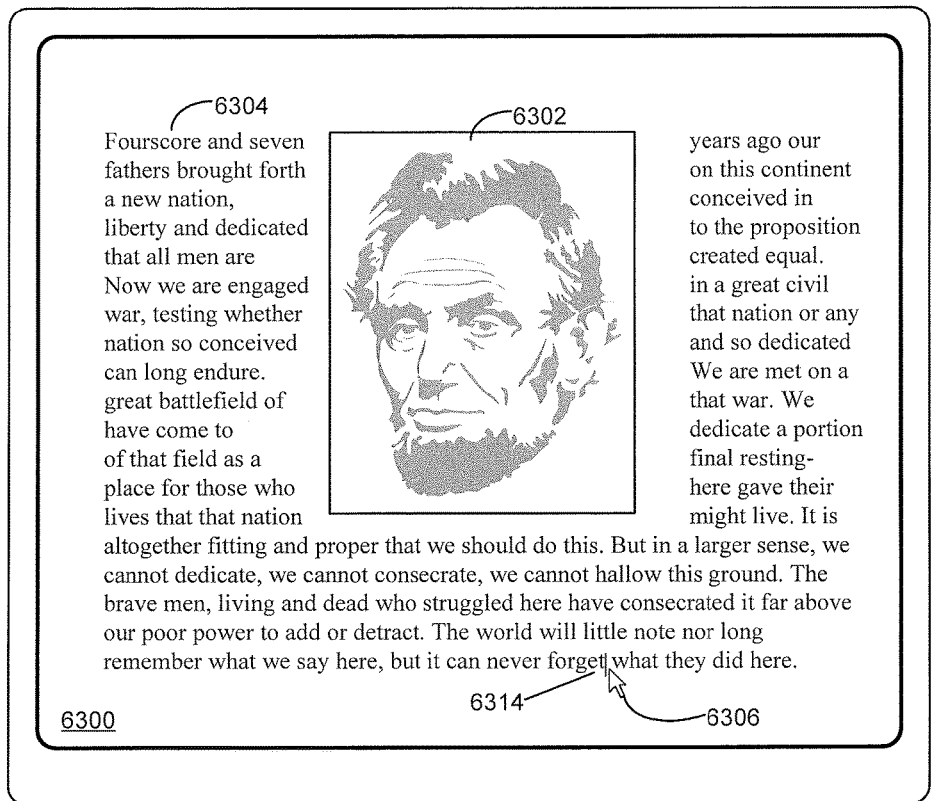
Figure 17K:
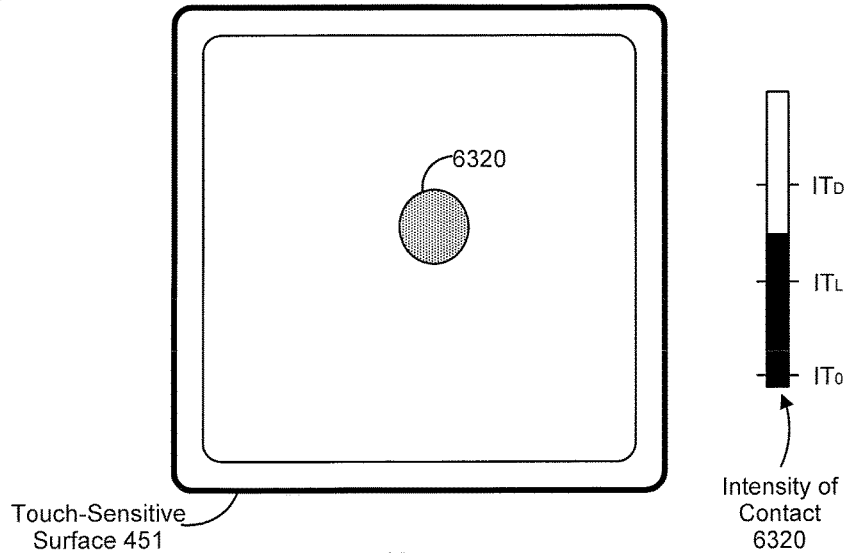

FIGS. 17J-17K illustrate examples of performing operations other than changing text wrapping properties of a user interface object when a contact has an intensity below the predefined activation threshold (e.g., "$IT_D$"). According to some embodiments, a subsequent gesture, corresponding to a subsequent contact having intensity below the aforementioned predefined activation threshold, (e.g., a subsequent press input corresponding to contact 6318 or contact 6320, which has an intensity between $IT_L$ and $IT_D$) is detected on the touch-sensitive surface 451. In some circumstances (e.g., when the focus selector 6306 is positioned over a respective user interface object, such as user interface object 6302 in FIG. 17J), in response to detecting a subsequent gesture (e.g., a press input corresponding to an increase of intensity of contact 6318 above $IT_L$, as shown in FIG. 17J), the respective user interface object is selected, as shown in FIG. 17J. In some other circumstances (e.g. when the focus selector 6306 is position over a respective paragraph of text as shown in FIG. 17K), in response to detecting a subsequent gesture (e.g., a press input corresponding to an increase of intensity of contact 6320 above $IT_L$, as shown in FIG. 17K), a text cursor 6314 is placed in the respective paragraph of text, as shown in FIG. 17K. In some instances, the text cursor 6314 is placed at a location determined by the location of the visual representation of the focus selector over the text (e.g. the text cursor 6314 is placed at the location of the focus selector 6306 on the display in FIG. 17K). It should be appreciated that, in some embodiments, other functions are associated with the subsequent gesture, such as the appearance of rotation handles or a displaying a copy/cut/paste interface to the user.

FIG. 18A-18B are flow diagrams illustrating a method 6400 of changing the text wrapping properties of a user interface object in accordance with some embodiments. The method 6400 is performed at an electronic device (e.g. device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 6400 are, optionally, combined and/or the order of some operations is, optionally, changed.

As described below, the method 6400 provides an intuitive way to change text wrapping properties of a user interface object. The method reduces the cognitive burden on a user when changing text wrapping properties of a user interface object, thereby creating a more efficient human-machine interface. For battery-operated electronic devices, enabling a user to change text wrapping properties of a user interface object faster and more efficiently conserves power and increases the time between battery charges.

The device displays (6402) a document (e.g., document 6300 in FIG. 17A) that includes text (e.g., 6304 in FIG. 17A) and a user interface object (e.g., object 6302 in FIG. 17A) on the display (e.g., a graphical object such as an image or an icon, or a text box or other object that is to be displayed in conjunction with the text of the document). Text proximate to the user interface object is initially displayed in accordance with first text wrapping properties of the user interface object. Here, text that is "proximate" to a user interface object includes text that overlaps the user interface object, text that is overlapped by the user interface object, text that is laterally adjacent to the user interface object, and text that surrounds the user interface object. For example, a paragraph of text proximate to an image in a word processing document is, optionally, displayed over the image (e.g., in a z-layer order) as shown in FIG. 17A, under the image (e.g., in a z-layer order) as shown in FIG. 17B, laterally adjacent to the image, or above the image as shown in FIG. 17C.

In some embodiments, shown in FIG. 17D, the first text wrapping properties indicate that the user interface object (e.g., object 6302 in FIG. 17D) is to be displayed on top of the text (e.g., text 6304 in FIG. 17D). Alternatively, as shown in FIG. 17F, the first text wrapping properties indicate that the user interface object (e.g., object 6302 in FIG. 17F) is to be displayed within the text (e.g., text 6304 in FIG. 17F). Still another alternative, shown in FIG. 17H, is that the first text wrapping properties indicate that the user interface object (e.g., object 6302 in FIG. 17H) is to be displayed underneath the text (e.g., 6304 in FIG. 17H).

While the focus selector is over the user interface object, the device detects (6404) a respective press input from a contact (e.g., a finger contact) on the touch-sensitive surface with an intensity above a predefined threshold (e.g., an increase in intensity of contact 6310 in FIGS. 17B-17C, contact 6312 in FIG. 17E, contact 6314 in FIG. 17G, or contact 6316 in FIG. 17I above $IT_D$). In some embodiments, the contact is a finger contact.

In response to the detection of the respective press input, the device changes (6406) the text wrapping properties of the user interface object to second text wrapping properties, distinct from the first text wrapping properties and the device displays text proximate to the user interface object in accordance with the second text wrapping properties of the user interface object. In some embodiments, the first text wrapping properties indicate that the user interface object is to be displayed (6408) on top of the text (e.g., the user interface object is displayed so that it overlays at least a portion of a block of text, as illustrated in FIG. 17D); and the second text wrapping properties indicate that the user interface object is to be displayed within the text (e.g., text is wrapped around the user interface object, as illustrated in FIG. 17E when contact 6312 increases above $IT_D$). In some embodiments, the first text wrapping properties indicate that the user interface object is to be displayed (6410) within the text (e.g., text is wrapped around the user interface object, as illustrated in FIG. 17F); and the second text wrapping properties indicate that the user interface object is to be displayed underneath the text (e.g., the text is displayed so that it overlays the user interface object, as illustrated in FIG. 17G when contact 6314 increases above $IT_D$). In some embodiments, the first text wrapping properties indicate that the user interface object is to be displayed (6412) on top of the text (e.g., the user interface object is displayed so that it overlays at least a portion of a block of text, as illustrated in FIG. 17A); and the second text wrapping properties indicate that the user interface object is to be displayed underneath the text (e.g., the text is displayed so that it overlays the user interface object, as illustrated in FIG. 17C when contact 6310 increases above $IT_D$). In some embodiments, the first text wrapping properties indicate that the user interface object is to be displayed (6414) underneath the text (e.g., the text is displayed so that it overlays the user interface object, as illustrated in FIG. 17F); and the second text wrapping properties indicate that the user interface object is to be displayed on top of the text (e.g., the user interface object is displayed so that it overlays at least a portion of a block of text, as illustrated in FIG. 17G when contact 6316 increases above $IT_D$). Thus, in some embodiments, if the user interface object is already at a "lowest" text wrapping level, a deep press on the object causes the object to spring back up to the "highest" text wrapping level.

In some embodiments, while the focus selector (e.g., cursor 6306 in FIG. 17J) is over the user interface object, the device detects (6416) a subsequent press input from a contact (e.g., a finger contact) on the touch-sensitive surface with intensity below the predefined activation threshold (e.g., an increase in intensity of contact 6318 in FIG. 17J above $IT_L$), and in response to detecting the subsequent press input, the device selects (6418) the user interface object. For example, in FIG. 17J, user interface object 6302 is selected in response to the press input corresponding to the increase in intensity of contact 6318. Thus, in the embodiment described above, if the respective press input has an intensity below the predefined activation threshold, the user interface object is selected in response to detecting the respective press input, instead of changing the text wrapping properties of the user interface object. In some embodiments, press inputs detected with a contact intensity below a predefined activation threshold can perform tasks commonly and intuitively associated with a low intensity press input, such as the selection of an object on a display.

In some embodiments, while the focus selector (e.g., cursor 6306 in FIG. 17K) is over the text, the device detects (6420) a subsequent press input from a contact (e.g. a finger contact) on the touch-sensitive surface with intensity below the predefined activation threshold (e.g., an increase in intensity of contact 6320 in FIG. 17K above $IT_L$); and in response to detecting the subsequent press input, the device places (6422) a cursor in the text at a location corresponding to the focus selector. For example, in FIG. 17K, text cursor 6314 is placed in the text in response to the press input corresponding to the increase in intensity of contact 6320. Thus, in the embodiment described above, if the respective press input has an intensity below the predefined activation threshold, a text cursor is inserted into the text in response to detecting the respective press input, instead of changing the text wrapping properties of the user interface object. In some embodiments, press inputs detected with a contact intensity below a predefined activation threshold can perform tasks commonly and intuitively associated with a low intensity press input, such as the placement of a cursor within text.

It should be understood that the particular order in which the operations in FIGS. 18A-18B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 6400 described above with respect to FIGS. 18A-18B. For example, the contacts, user interface objects, intensity thresholds, and focus selectors described above with reference to method 6400 optionally have one or more of the characteristics of the contacts, user interface objects, intensity thresholds, and focus selectors described herein with reference to other methods described herein (e.g., those listed in the fifth paragraph of the Description of Embodiments). For brevity, these details are not repeated here.

Figure 19:
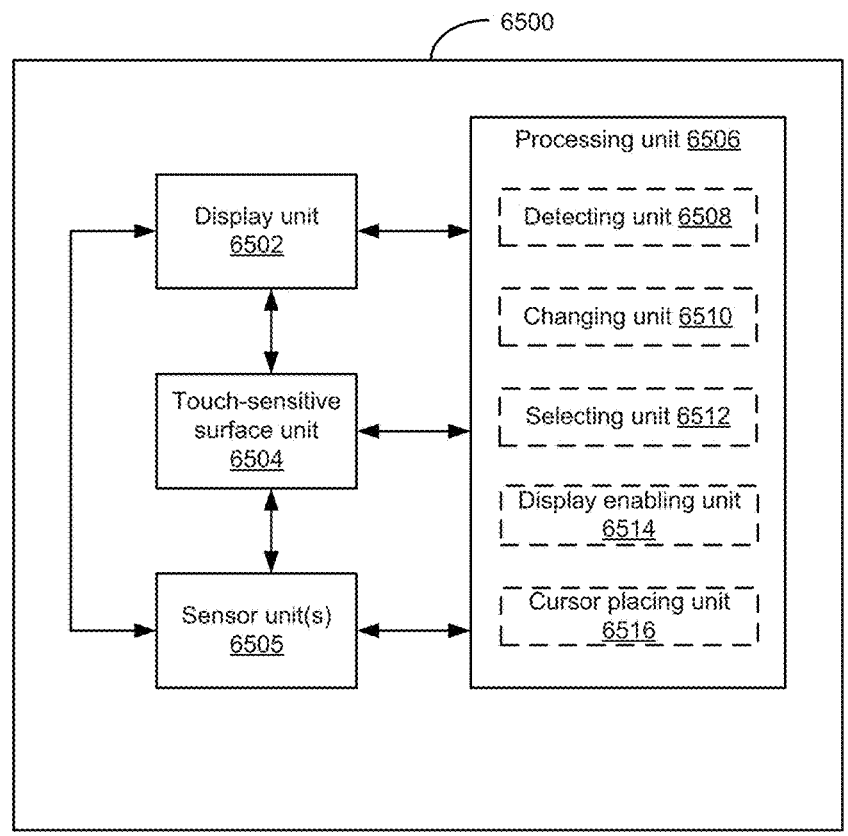
FIG. 19 is a functional block diagram of an electronic device in accordance with some embodiments.

In accordance with some embodiments, FIG. 19 shows a functional block diagram of an electronic device 6500 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 19 are, optionally, combined or separated into sub-blocks to implement the principles of the various described embodiments. Therefore, the description herein optionally supports any possible combination or separation or further definition of the functional blocks described herein.

As shown in FIG. 19, an electronic device 6500 includes a display unit 6502 configured to display a document, where the document has at least text and a user interface object; a touch-sensitive surface unit 6504 configured to receive contacts; one or more sensor units 6505 configured to detect intensity of contacts with the touch-sensitive surface unit 6504; and a processing unit 6506 coupled to the display unit 6502, the touch-sensitive surface unit 6504, and the sensor units 6505. In some embodiments, the processing unit 6506 includes a detecting unit 6508, a changing unit 6510, a selecting unit 6512, a display enabling unit 6514, and a cursor placing unit 6516.

The processing unit 6506 is configured to enable display of a document that includes text and a user interface object on the display (e.g., with the display enabling unit 6514), where text proximate to the user interface object is displayed in accordance with first text wrapping properties of the user interface object and while a focus selector is over the user interface object, detect the respective press input from the contact on the touch-sensitive surface unit 6504 with intensity above a predefined activation threshold (e.g., with the detecting unit 6508). The processing unit 6506 is further configured to, in response to detection of the respective press input, change the text wrapping properties of the user interface object to second text wrapping properties (e.g., with the changing unit 6510), distinct from the first text wrapping properties, and enable display of text proximate to the user interface object (e.g., with the display enabling unit 6514) in accordance with the second text wrapping properties of the user interface object.

In some embodiments, the first text wrapping properties indicate that the user interface object is to be displayed on top of the text; and the second text wrapping properties indicate that the user interface object is to be displayed within the text.

In some embodiments, the first text wrapping properties indicate that the user interface object is to be displayed within the text; and the second text wrapping properties indicate that the user interface object is to be displayed underneath the text.

In some embodiments, the first text wrapping properties indicate that the user interface object is to be displayed on top the text; the second text wrapping properties indicate that the user interface object is to be displayed underneath the text.

In some embodiments, the first text wrapping properties indicate that the user interface object is to be displayed underneath the text; and the second text wrapping properties indicate that the user interface object is to be displayed on top of the text.

In some embodiments, the touch-sensitive surface unit 6504 is further configured to receive a subsequent press input from a contact on the touch-sensitive surface unit 6504 with intensity below the predefined activation threshold.

In some embodiments, the processing unit 6506 is further configured to: while the focus selector is over the user interface object, detect the subsequent press input from the contact on the touch-sensitive surface unit 6504 with intensity below the predefined activation threshold (e.g., with the detecting unit 6508); and in response to the detection of the subsequent press input, select the user interface object (e.g., with the selecting unit 6512).

In some embodiments, the processing unit 6506 is further configured to, while the focus selector is over the text, detect the subsequent press input from the contact on the touch-sensitive surface unit 6504 with intensity below the predefined activation threshold (e.g., with the detecting unit 6508); and in response to the detection of the subsequent press input, place a cursor in the text at a location corresponding to the focus selector (e.g., with the cursor placing unit 6516).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 17A-17K, 18A-18B are, optionally, implemented by components depicted in FIGS. 1A-1B or FIG. 19. For example, display operation 6402, detection operation 6404, and text wrapping property changing operation 6406 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

It should be understood that the particular order in which the operations have been described above is merely exemplary and is not intended to indicate that the described order is the only order in which the operations could be performed. One of ordinary skill in the art would recognize various ways to reorder the operations described herein. Additionally, it should be noted that the various processes separately described herein (e.g., those listed in the fifth paragraph of the Description of Embodiments) can be combined with each other in different arrangements. For example, the contacts, user interface objects, tactile sensations, intensity thresholds, and/or focus selectors described above with reference to any one of the various processes separately described herein (e.g., those listed in the fifth paragraph of the Description of Embodiments) optionally have one or more of the characteristics of the contacts, gestures, user interface objects, tactile sensations, intensity thresholds, and focus selectors described herein with reference to one or more of the other methods described herein (e.g., those listed in the fifth paragraph of the Description of Embodiments). For brevity, all of the various possible combinations are not specifically enumerated here, but it should be understood that the claims described above may be combined in any way that is not precluded by mutually exclusive claim features.

The foregoing description, for purpose of explanation, has been described with reference to specific embodiments. However, the illustrative discussions above are not intended to be exhaustive or to limit the various described embodiments to the precise forms disclosed. Many modifications and variations are possible in view of the above teachings. The embodiments were chosen and described in order to best explain the principles of the various described embodiments and their practical applications, to thereby enable others skilled in the art to best utilize the various described embodiments with various modifications as are suited to the particular use contemplated.

What is claimed is:

1. A non-transitory computer readable storage medium storing one or more programs, the one or more programs comprising instructions for manipulating framed graphical objects which, when executed by an electronic device with a display, a touch-sensitive surface and one or more sensors to detect intensities of contacts with the touch-sensitive surface, cause the electronic device to:
    display a first portion of a graphical object inside of a frame on the display;
    detect a gesture, wherein detecting the gesture includes:
        detecting a contact on the touch-sensitive surface while a focus selector is over the graphical object; and
        detecting movement of the contact across the touch-sensitive surface; and
    in response to detecting the gesture that includes movement of the contact across the touch-sensitive surface:
        in accordance with a determination that the contact meets predefined intensity criteria, remove the graphical object from the frame; and
        in accordance with a determination that the contact does not meet the predefined intensity criteria, adjust an appearance of the graphical object inside of the frame in accordance with the movement of the contact across the touch-sensitive surface to display a second portion of the graphical object that was not displayed prior to detecting the gesture.

2. The non-transitory computer readable storage medium of claim 1, wherein the movement of the contact of moves the focus selector outside of the frame.

3. The non-transitory computer readable storage medium of claim 2, wherein the predefined intensity criteria include that the contact reached an intensity during the gesture above a respective intensity threshold before the focus selector moved outside of the frame.

4. The non-transitory computer readable storage medium of claim 1, wherein the predefined intensity criteria include that the contact reached an intensity during the gesture above a respective intensity threshold at any point in time during the gesture.

5. The non-transitory computer readable storage medium of claim 1, wherein the predefined intensity criteria include that the contact reached an intensity during the gesture above a respective intensity threshold prior to detecting the movement of the contact.

6. The non-transitory computer readable storage medium of claim 1, wherein adjusting the appearance of the graphical object inside of the frame includes translating the graphical object laterally within the frame.

7. The non-transitory computer readable storage medium of claim 1, wherein adjusting the appearance of the graphical object inside of the frame includes resizing the graphical object within the frame.

8. The non-transitory computer readable storage medium of claim 1, including instructions which cause the device to, after removing the graphical object from the frame:
   continue to detect movement of the contact, wherein the movement of the contact corresponds to movement of the focus selector; and
   display a thumbnail image of the graphical object moving on the display in accordance with movement of the focus selector.

9. The non-transitory computer readable storage medium of claim 1, including instructions which cause the device to:
   after removing the graphical object from the frame, detect an end of the gesture; and
   in response to detecting the end of the gesture, move the graphical object to a different frame.

10. An electronic device for manipulating framed graphical objects, comprising:
   a display;
   a touch-sensitive surface;
   one or more sensors to detect intensities of contacts with the touch-sensitive surface;
   one or more processors;
   memory; and
   one or more programs, wherein the one or more programs are stored in the memory and configured to be executed by the one or more processors, the one or more programs including instructions for:
      displaying a first portion of a graphical object inside of a frame on the display;
      detecting a gesture, wherein detecting the gesture includes:
         detecting a contact on the touch-sensitive surface while a focus selector is over the graphical object; and
         detecting movement of the contact across the touch-sensitive surface; and
      in response to detecting the gesture that includes movement of the contact across the touch-sensitive surface:
         in accordance with a determination that the contact meets predefined intensity criteria, removing the graphical object from the frame; and
         in accordance with a determination that the contact does not meet the predefined intensity criteria, adjusting an appearance of the graphical object inside of the frame in accordance with the movement of the contact across the touch-sensitive surface to display a second portion of the graphical object that was not displayed prior to detecting the gesture.

11. The device of claim 10, wherein the movement of the contact moves the focus selector outside of the frame.

12. The device of claim 11, wherein the predefined intensity criteria include that the contact reached an intensity during the gesture above a respective intensity threshold before the focus selector moved outside of the frame.

13. The device of claim 10, wherein the predefined intensity criteria include that the contact reached an intensity during the gesture above a respective intensity threshold at any point in time during the gesture.

14. The device of claim 10, wherein the predefined intensity criteria include that the contact reached an intensity during the gesture above a respective intensity threshold prior to detecting the movement of the contact.

15. The device of claim 10, wherein adjusting the appearance of the graphical object inside of the frame includes translating the graphical object laterally within the frame.

16. The device of claim 10, wherein adjusting the appearance of the graphical object inside of the frame includes resizing the graphical object within the frame.

17. The device of claim 10, including instructions for, after removing the graphical object from the frame:
   continuing to detect movement of the contact, wherein the movement of the contact corresponds to movement of the focus selector; and
   displaying a thumbnail image of the graphical object moving on the display in accordance with movement of the focus selector.

18. The device of claim 10, including instructions for:
   after removing the graphical object from the frame, detecting an end of the gesture; and
   in response to detecting the end of the gesture, moving the graphical object to a different frame.

19. A method for manipulating framed graphical objects, comprising: at an electronic device with a touch-sensitive surface and a display, wherein the device includes one or more sensors to detect intensities of contacts with the touch-sensitive surface:
   displaying a first portion of a graphical object inside of a frame on the display;
   detecting a gesture, wherein detecting the gesture includes:
      detecting a contact on the touch-sensitive surface while a focus selector is over the graphical object; and
      detecting movement of the contact across the touch-sensitive surface; and
   in response to detecting the gesture that includes movement of the contact across the touch-sensitive surface:
      in accordance with a determination that the contact meets predefined intensity criteria, removing the graphical object from the frame; and
      in accordance with a determination that the contact does not meet the predefined intensity criteria, adjusting an appearance of the graphical object inside of the frame in accordance with the movement of the contact across the touch-sensitive surface to display a second portion of the graphical object that was not displayed prior to detecting the gesture.

20. The method of claim 19, wherein the movement of the contact moves the focus selector outside of the frame.

21. The method of claim 19, wherein the predefined intensity criteria include that the contact reached an intensity during the gesture above a respective intensity threshold before the focus selector moved outside of the frame.

22. The method of claim 21, wherein the predefined intensity criteria include that the contact reached an intensity during the gesture above a respective intensity threshold at any point in time during the gesture.

23. The method of claim 19, wherein the predefined intensity criteria include that the contact reached an intensity during the gesture above a respective intensity threshold prior to detecting the movement of the contact.

24. The method of claim 19, wherein adjusting the appearance of the graphical object inside of the frame includes translating the graphical object laterally within the frame.

25. The method of claim 19, wherein adjusting the appearance of the graphical object inside of the frame includes resizing the graphical object within the frame.

26. The method of claim 19, including, after removing the graphical object from the frame:
   continuing to detect movement of the contact, wherein the movement of the contact corresponds to movement of the focus selector; and displaying a thumbnail image of the graphical object moving on the display in accordance with movement of the focus selector.

27. The method of claim 19, including:

after removing the graphical object from the frame, detecting an end of the gesture; and in response to detecting the end of the gesture, moving the graphical object to a different frame.

\* \* \* \* \*

UNITED STATES PATENT AND TRADEMARK OFFICE
CERTIFICATE OF CORRECTION

PATENT NO. : 10,191,627 B2
APPLICATION NO. : 14/536235
DATED : January 29, 2019
INVENTOR(S) : Cieplinski et al.

It is certified that error appears in the above-identified patent and that said Letters Patent is hereby corrected as shown below:

In the Claims

Claim 2, Column 82, Line 42, please delete "contact of moves" and insert --contact moves--.

Signed and Sealed this
Ninth Day of April, 2019

Andrei Iancu
*Director of the United States Patent and Trademark Office*